United States Patent
Jackson

(10) Patent No.: US 11,571,011 B2
(45) Date of Patent: *Feb. 7, 2023

(54) COMPOSITIONS OF STEVIOL MULTIGLYCOSYLATED DERIVATIVES AND STEVIA COMPONENTS

(71) Applicant: SWEET GREEN FIELDS USA LLC, Bellingham, WA (US)

(72) Inventor: Mel Clinton Jackson, Waikoloa, HI (US)

(73) Assignee: Sweet Green Fields International Co., Limited, Kowloon (HK)

(*) Notice: Subject to any disclaimer, the term of this patent is extended or adjusted under 35 U.S.C. 154(b) by 343 days.

This patent is subject to a terminal disclaimer.

(21) Appl. No.: 16/746,068

(22) Filed: Jan. 17, 2020

(65) Prior Publication Data

US 2020/0205452 A1    Jul. 2, 2020

Related U.S. Application Data

(63) Continuation of application No. 16/579,000, filed on Sep. 23, 2019, which is a continuation of application No. 15/204,479, filed on Jul. 7, 2016, now Pat. No. 10,517,321.

(60) Provisional application No. 62/262,060, filed on Dec. 2, 2015, provisional application No. 62/190,964, filed on Jul. 10, 2015.

(51) Int. Cl.
    *A23L 27/30* (2016.01)

(52) U.S. Cl.
    CPC ........... *A23L 27/36* (2016.08); *A23V 2002/00* (2013.01)

(58) Field of Classification Search
    CPC .................. A23L 27/36; A23L 27/33
    See application file for complete search history.

(56) References Cited

U.S. PATENT DOCUMENTS

| | | | |
|---|---|---|---|
| 10,517,321 B2 * | 12/2019 | Jackson | A23L 27/36 |
| 2010/0166679 A1 | 7/2010 | Abelyan et al. | |
| 2010/0189861 A1 | 7/2010 | Abelyan et al. | |
| 2012/0157553 A1 | 6/2012 | Dewis et al. | |
| 2012/0214751 A1 | 8/2012 | Markosyan | |
| 2012/0214752 A1 | 8/2012 | Markosyan | |
| 2013/0071537 A1 | 3/2013 | Shi et al. | |
| 2013/0136838 A1 | 5/2013 | San Miguel et al. | |
| 2013/0203867 A1 | 8/2013 | Tezuka et al. | |
| 2013/0316043 A1 | 11/2013 | Purkayastha | |
| 2013/0337115 A1 | 12/2013 | Markosyan | |
| 2013/0337138 A1 | 12/2013 | Purkayastha et al. | |
| 2014/0010917 A1 | 1/2014 | Purkayastha | |
| 2014/0017378 A1 | 1/2014 | Purkayastha et al. | |
| 2014/0023750 A1 | 1/2014 | Purkayastha | |
| 2014/0030381 A1 | 1/2014 | Markysyan | |
| 2015/0223505 A1 | 8/2015 | Markosyan | |
| 2016/0088865 A1 | 3/2016 | Berry | |
| 2016/0192684 A1 | 7/2016 | Chaturvedula et al. | |
| 2017/0006906 A1 | 1/2017 | Jackson | |
| 2017/0156385 A1 | 6/2017 | Shi | |
| 2018/0000142 A1 | 1/2018 | Shi et al. | |
| 2018/0116266 A1 | 5/2018 | Jackson | |

FOREIGN PATENT DOCUMENTS

| | | |
|---|---|---|
| WO | 2014/172055 A2 | 10/2014 |
| WO | 2014/197898 A1 | 12/2014 |
| WO | 2015/015210 A1 | 2/2015 |
| WO | 2015/042344 A1 | 3/2015 |
| WO | 2016073740 A1 | 5/2016 |
| WO | 2016074761 A1 | 5/2016 |
| WO | 2016130609 A1 | 8/2016 |
| WO | 2016144175 A1 | 9/2016 |
| WO | 2017/214026 A1 | 12/2017 |

OTHER PUBLICATIONS

U.S. Appl. No. 16/579,000, filed Sep. 23, 2019, pending.
U.S. Appl. No. 15/204,479, filed Jul. 7, 2016, patented.
Okada et al. "Glucosylation of sucrose laurate with cyclodextrin glucanotransferase" Bioscience, Biotechnolofy, and Biochemistry, 71: 826-829, (2014).
Chinese Office Action for CN 201680040107.6, dated Nov. 23, 2021.
Progress in Medicinal Chemistry vol. 2, Peng Sixun, Chemical Industry Press, pp. 108-109, 20021231).
Written Opinion, PCT/US2016/041454, dated Jan. 19, 2017.
International Search Report, PCT/US2016/041454, dated Oct. 21, 2016.
International Search Report and Written Opinion of PCT/US19/31196, dated Aug. 30, 2019.

* cited by examiner

*Primary Examiner* — Nikki H. Dees
(74) *Attorney, Agent, or Firm* — Michael Ye; Rimon Law

(57) ABSTRACT

The invention describes a sweetener of glycosylated steviol glycosides and a rebaudioside in an aqueous solution for convenience of use in the food and beverage industry.

19 Claims, 44 Drawing Sheets

Concentration (ppm)

Concentration (ppm)

COMPOSITIONS OF STEVIOL MULTIGLYCOSYLATED DERIVATIVES AND STEVIA COMPONENTS

This application is a continuation of U.S. patent application Ser. No. 16/579,000, filed on Sep. 23, 2019, which is a continuation of U.S. patent application Ser. No. 15/204,479, filed Jul. 7, 2016, now U.S. Pat. No. 10,517,321, which claims priority to U.S. Provisional Application No. 62/190,964, filed Jul. 10, 2015 and U.S. Provisional Application No. 62/262,060, filed Dec. 2, 2015, the contents of which are incorporated herein in their entirety for all purposes.

FIELD

The present invention generally relates to a *Stevia* sweetener that includes one or more glycosylated steviol glycosides and a *Stevia* extract or *Stevia* component.

BACKGROUND

*Stevia* is a genus of about 240 species of herbs and shrubs in the sunflower family (Asteraceae), native to subtropical and tropical South America and Central America.

The species *Stevia rebaudiana* Bertoni, commonly known as sweet leaf, sugarleaf, or simply *Stevia*, is widely grown for its sweet leaves. The leaves have traditionally been used as a sweetener. Steviosides and rebaudiosides are the major constituents of glycosides found in the leaves of the *Stevia* plant.

Over 100 phytochemicals have been discovered in *Stevia*. It is rich in terpenes and flavonoids. Of these eight glycosides, stevioside is considered the sweetest and has been tested to be approximately 300 times sweeter than sugar. Stevioside, comprising 6-18% of the *Stevia* leaf, is also the most prevalent glycoside in the leaf. Other sweet constituents include steviolbioside, rebaudiosides A-E, and dulcoside A.

*Stevia* extracts generally contain a high percentage of the glycosides of the diterpene steviol. The leaves of *Stevia rebaudiana* contain over 10 different steviol glycosides. Steviol glycosides are considered high intensity sweeteners (about 250-300 times that of sucrose) and have been used for several years in a number of countries as a sweetener for a range of food products. Stevioside and rebaudioside A are the principal sweetening compounds and generally accompanied by smaller amounts of other steviol glycosides. The taste quality of rebaudioside A is better than stevioside, because of increased sweetness and decreased bitterness (Phytochemistry 68, 2007, 1855-1863).

The structures and chemical abstract service registry numbers for steviol and its glycosides that are the main sweetening agents of the additive steviol glycosides are shown below:

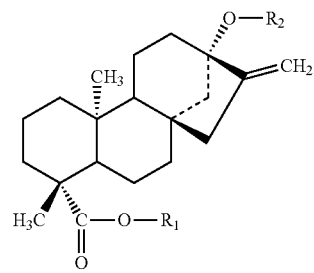

| | Compound name | C.A.S. No. | $R_1$ | $R_2$ |
|---|---|---|---|---|
| 1 | Steviol | 471-80-7 | H | H |
| 2 | Steviolbioside | 41093-60-1 | H | β-Glc-β-Glc(2→1) |
| 3 | Stevioside | 57817-89-7 | β-Glc | β-Glc-β-Glc(2→1) |
| 4 | Rebaudioside A | 58543-16-1 | β-Glc | β-Glc-β-Glc(2→1) <br> \| <br> β-Glc(3→1) |
| 5 | Rebaudioside B | 58543-17-2 | H | β-Glc-β-Glc(2→1) <br> \| <br> β-Glc(3→1) |
| 6 | Rebaudioside C | 63550-99-2 | β-Glc | β-Glc-β-Glc(2→1) <br> \| <br> β-Glc(3→1) |
| 7 | Rebaudioside D | 63279-13-0 | β-Glc-β-Glc(2→1) | β-Glc-β-Glc(2→1) <br> \| <br> β-Glc(3→1) |
| 8 | Rebaudioside E | 63279-14-1 | β-Glc-β-Glc(2→1) | β-Glc-β-Glc(2→1) <br> \| <br> β-Glc(3→1) |
| 9 | Rebaudioside F | 438045-89-7 | β-Glc | β-Glc-β-Xyl(2→1) <br> \| <br> β-Glc(3→1) |
| 10 | Rubusoside | 63849-39-4 | β-Glc | β-Glc-α- |
| 11 | Dulcoside A | 64432-06-0 | β-Glc | Rha(2→1) |
| 12 | Rebaudioside M (also known as Rebaudioside X) | 1220616-44-3 | (β-Glc)$_2$-β-glc- | (β-Glc)$_2$-β-glc- |

In addition to the above mentioned steviol glycosides, many steviol glycoside derivatives can be obtained for example, by synthetic manipulation or by enzymatic processes. KR10-2008-0085811 herein incorporated by reference, discloses the following steviol glycoside derivatives obtained from enzymatic processes.

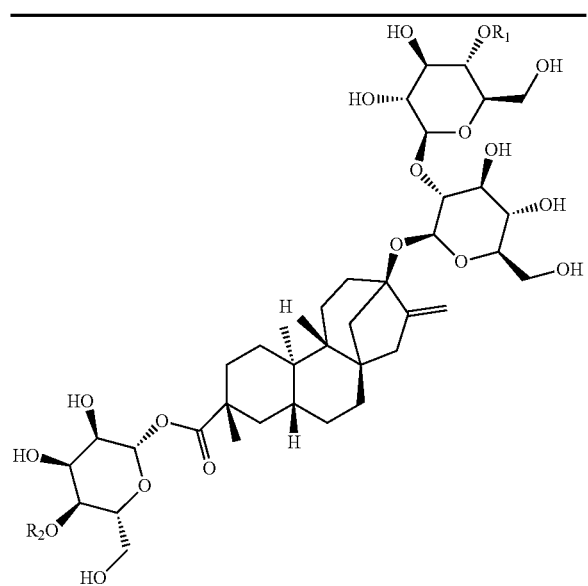

| Name | $R_1$ | $R_2$ |
|---|---|---|
| Stevioside(ST) | —H | —H |
| Stevioside-G1 (ST-G1) | -glucosyl —H | —H -glucosyl |
| Stevioside-G2 (ST-G2) | -(glucosy)$_2$ -glucosyl —H | —H -glucosyl -(glucosy)$_2$ |

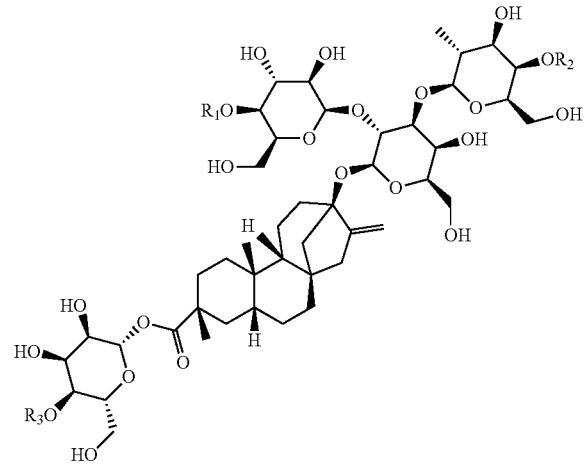

| Name | $R_1$ | $R_2$ | $R_3$ |
|---|---|---|---|
| RebaudiosideA | —H | —H | —H |
| RebaudiosideA-G1 (RA-G1) | -glucosyl —H —H | —H -glucosyl —H | —H —H -glucosyl |
| RebaudiosideA-G2 (RA-G2) | -(glucosy)$_2$ —H —H -glucosyl —H -glucosyl | —H -(glucosy)$_2$ —H -glucosyl -glucosyl —H | —H —H -(glucosy)$_2$ —H -glucosyl -glucosyl |

As shown, several glucosyl groups can be added on the backbone of a steviol glycoside such as, stevioside and rebaudioside A, by the disclosed enzymatic process. The glycosylated steviol materials with 1 additional glucosyl are referred to as G1, the materials with 2 additional glucosyls are referred to as G2, and so forth. Without limitation, glycosylated steviol glycosides containing even more glucosyl groups can be made.

As a sweetener and sugar substitute, rebaudioside A has a slower onset and longer duration than that of sugar, and be deemed very close to sucrose, although some of its extracts may have a bitter or licorice-like aftertaste at high concentrations. All steviol glycosides are bitter or lingering, some in less degree and some in greater degree.

The relationship between steviol glycoside mixtures, solubility, and how solubility of these mixtures affects the overall taste profile of *Stevia* sweeteners has not been studied in detail.

Therefore, a need exists for glycosidic compositions with superior taste profiles for the food and beverage industry.

BRIEF SUMMARY OF THE INVENTION

Embodiments are presented that surprisingly provide compositions containing a glycosylated steviol glycoside (GSG) or glycosylated steviol glycosides (GSGs) and a steviol glycoside(s). Components in combination with the GSG(s) can include *Stevia* extract, or individual components found in *Stevia* with improved solubility and/or taste profiles over previously reported *Stevia* compositions.

In one aspect of the present invention, a composition is provided that includes one or more glycosylated steviol glycoside and one or more steviol glycoside, wherein the composition is in solid or liquid form. The amount of glycosylated steviol glycoside in the composition is less than about 70 percentage by weight, preferably, less than about 50 percentage by weight, more preferably, from about 10 to less than about 50 percentage by weight, from about 20 to less than about 50 percentage by weight, from about 30 to less than about 50 percentage by weight, from about 40 to less than about 50 percentage by weight, from about 20 to 45 percentage by weight.

The one or more glycosylated steviol glycoside can include glycosylated rebaudioside A, glycosylated stevioside, glycosylated stevioside+glycosylated rebaudioside A, glycosylated rebaudioside B, glycosylated rebaudioside D, glycosylated rebaudioside A+glycosylated rebaudioside B, glycosylated rebaudioside A+glycosylated rebaudioside B+glycosylated stevioside, glycosylated rebaudioside A+glycosylated rebaudioside C, glycosylated rebaudioside A+glycosylated rebaudioside C+glycosylated stevioside, glycosylated rebaudioside A+glycosylated rebaudioside B+glycosylated rebaudioside C, glycosylated rebaudioside A+glycosylated rebaudioside B+glycosylated rebaudioside C+glycosylated stevioside, glycosylated rebaudioside A+glycosylated rebaudioside D, glycosylated rebaudioside D+glycosylated rebaudioside B, or glycosylated rebaudioside A+glycosylated rebaudioside B+glycosylated rebaudioside D.

In particular aspect glycosylated steviol glycoside derived from RA20, RA30, RA40, RA50, RA60, RA80, RA90, RA95, RA97, RA98, RA99, or RA99.5. The glycosylated steviol glycoside can be GSG-RA20, GSG-RA30, GSG-RA40, GSG-RA50, GSG-RA60, GSG-RA80, GSG-RA90, or GSG-RA95, and the GSG-RA20, GSG-RA30, GSG-RA40, GSG-RA50, and GSG-RA60 can include rebaudioside A, rebaudioside A-G1, rebaudioside A-G2, rebaudioside A-G3, rebaudioside A-G4, rebaudioside A-G5, rebaudioside A-G6, rebaudioside A-G7, stevioside, stevioside-G1, stevioside-G2, stevioside-G3, stevioside-G4, stevioside-G5, stevioside G6, and stevioside-G7, and GSG-RA80, or GSG-RA95 can include rebaudioside A, strebaudioside A-G1, rebaudioside A-G2, rebaudioside A-G3, rebaudioside A-G4, rebaudioside A-G5, rebaudioside A-G6, and rebaudioside A-G7.

In another aspect, the composition is an amorphous solid. In some aspects the total glycosides concentration ranges from about 100 ppm to about 1000 ppm, from about 300 ppm to about 500 ppm and preferably about 350 ppm, 400 ppm, or 450 ppm in solution. The compositions of the current embodiments containing any combination of GSG-RA20, GSG-RA30, GSG-RA40, GSG-RA50, GSG-RA95, GSG-RA80, and RA97 together from about 350 ppm to about 450 ppm in solution can provide a SE of 1-20%, preferably 5-15%, and most preferably 7-12%, e.g., 7%, 8%, 9%, 10%, 11%, 12% in solution. In some aspects the compositions further include one or more sweeteners, such as cane sugar, beet sugar, honey, sucrose, fructose, maltose, xylitol, sorbitol, dextrose, glucose, mannitol, arabinose, galactose, mannose, rhamnose, xylose, sucralose, aspartame, Stevia acesulfame-K, neotame, thaumatin, erythritol, trehalose, raffinose, cellobiose, tagatose, DOLCIA PRIMA™ allulose, inulin, N-[N-[3-(3-hydroxy-4-methoxyphenyl)propyl]-alpha-aspartyl]-L-phenylalanine 1-methyl ester, glycyrrhizin, thaumatin, monellin, monk fruit and derivatives, mogorosides 1 through 5, or Luohan Guo juice. In other aspects the compositions further include one or more salts, such as sodium carbonate, sodium bicarbonate, sodium chloride, potassium chloride, magnesium chloride, sodium sulfate, magnesium sulfate, and potassium sulfate, or any edible salt. The compositions can also further include cyclodextrin.

In another aspect, a composition is provided that includes one or more partially glycosylated steviol glycoside and one or more steviol glycoside, wherein the composition is in solid or liquid form. The one or more partially glycosylated steviol glycoside prepared by controlling the glycosylation process can contain from about 50% to about 90% glycosylated rebaudioside A, glycosylated stevioside, glycosylated stevioside+glycosylated rebaudioside A, glycosylated rebaudioside B, glycosylated rebaudioside D, glycosylated rebaudioside A+glycosylated rebaudioside B, glycosylated rebaudioside A+glycosylated rebaudioside D, glycosylated rebaudioside D+glycosylated rebaudioside B, or glycosylated rebaudioside A+glycosylated rebaudioside B+glycosylated rebaudioside D, and from about 10% to about 50% stevioside, rebaudioside A, rebaudioside B, rebaudioside C, or rebaudioside D, based on total glycosides or total glycosylated steviol glycosides in the composition.

In another aspect of the current invention, there is disclosed a composition containing a highly soluble multiple glycosylated rebaudioside A glycoside or glycosylated stevioside glycoside, wherein glycosylated rebaudioside A glycoside or glycosylated stevioside glycoside comprises one or more of rebaudioside A, strebaudioside A-G1, rebaudioside A-G2, rebaudioside A-G3, rebaudioside A-G4, rebaudioside A-G5, rebaudioside A-G6, rebaudioside A-G7, stevioside, stevioside-G1, stevioside-G2, stevioside-G3, stevioside-G4, stevioside-G5, stevioside G6, and stevioside-G7. The highly soluble multiple glycosylated rebaudioside A glycoside or glycosylated stevioside glycoside can be dissolved in solution, wherein the solubility of the glycosylated material is greater than 0.5 g per 100 g of water, and wherein the solubilized glycosylated glycoside material remains stable in the water for greater than 10 days at room temperature. In some aspects, a composition including a spray dried or recrystallized multiple glycosylated rebaudioside A glycoside or glycosylated stevioside glycoside and a spray dried or recrystallized Stevia extract, wherein the spray dried or recrystallized Stevia extract includes rebaudioside A, rebaudioside B, rebaudioside C, rebaudioside D, or rubusoside has a solubility of 0.5 g per 100 g of water and remains stable in the water for greater than 10 days at room temperature. The glycosylated rebaudioside A glycoside or glycosylated stevioside glycoside, for example, and a spray dried or recrystallized Stevia extract can be spray dried or recrystallized together or spray dried or recrystallized separately. In other aspects, a composition is provided including a spray dried or recrystallized multiple glycosylated rebaudioside A glycoside or glycosylated stevioside glycoside and a Stevia extract or a spray dried or recrystallized Stevia extract.

In another aspect there is disclosed a process for the preparation of a composition comprising one or more glycosylated steviol glycosides and one or more steviol glycosides with improved solubility in an aqueous solution comprising the following steps: (1) mixing a steviol glycoside and a GSG with water, (2) heating the mixture while stirring, until the mixture was completely dissolved to obtain a clear solution, (3) further stirring the solution at the temperature, and then cooling to ambient temperature. Step (4) can include subjecting the solution to crystallization or spray drying and the mixture can be heated to 40-100° C., 50-90° C., or even 60-70° C. in step (2).

DETAILED DESCRIPTION

Figure 1:
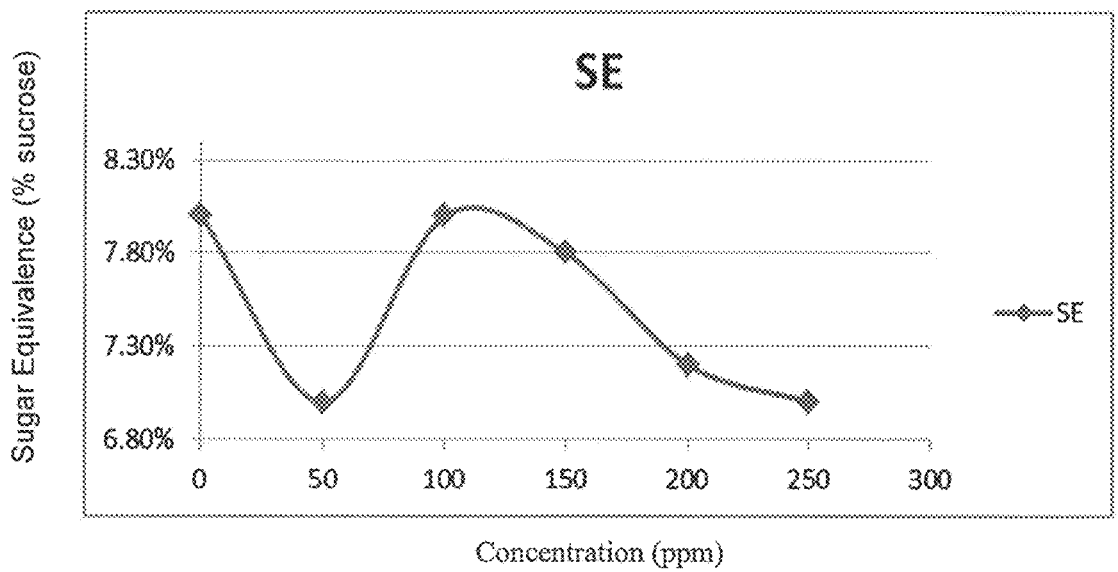
FIG. 1 is a graphical illustration showing sweetness plotted against the concentration of GSG-RA50.
Figure 2:
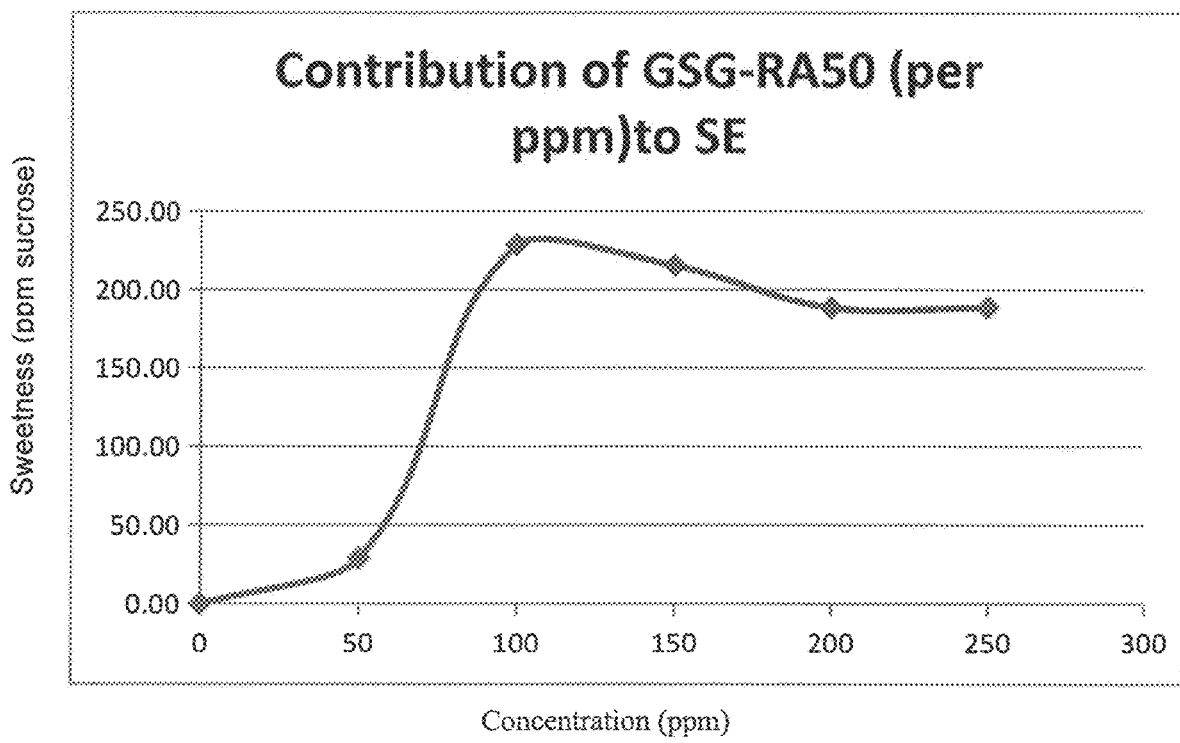
FIG. 2 is a graphical illustration showing the contribution of GSG-RA50 per ppm to SE.
Figure 3:
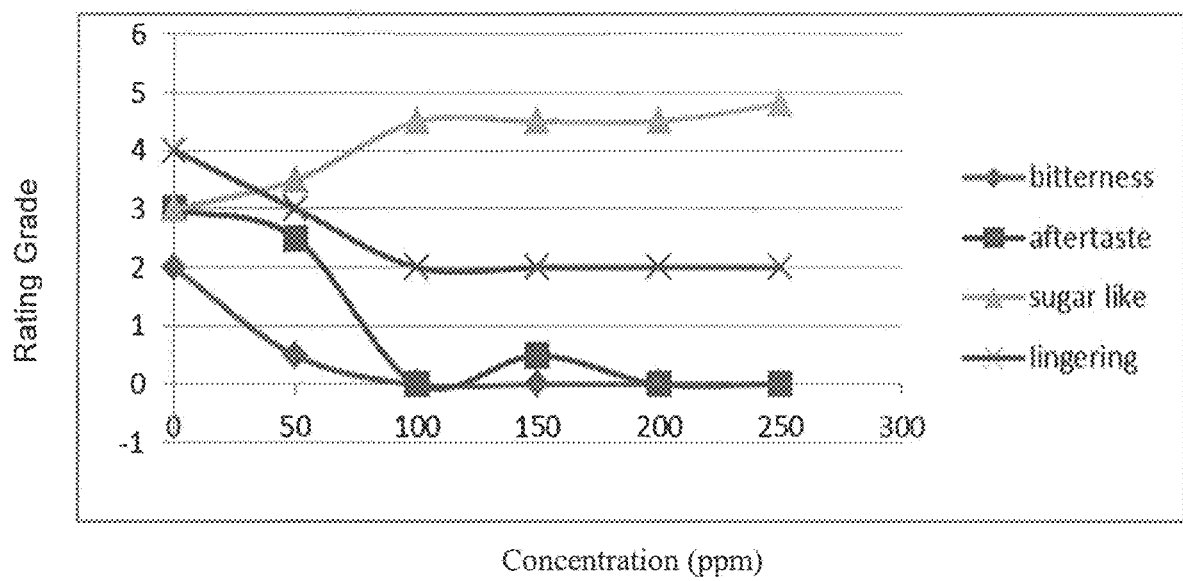
FIGS. 3-4 are graphical illustrations showing taste profiles of GSG-RA50/RA97 compositions.
Figure 4:
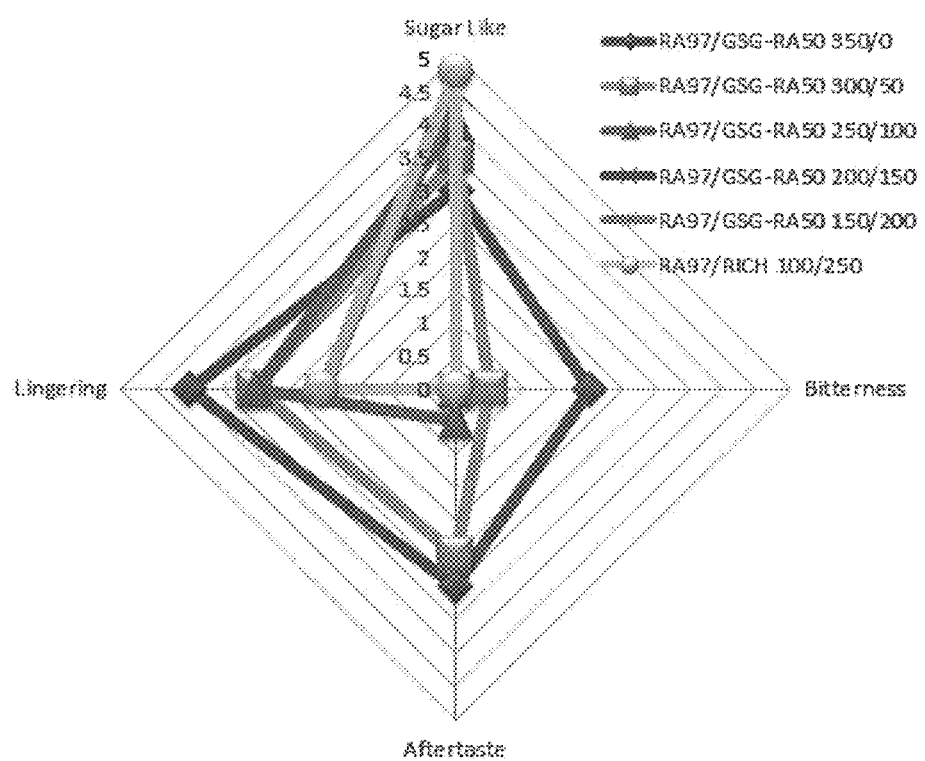
Figure 5:
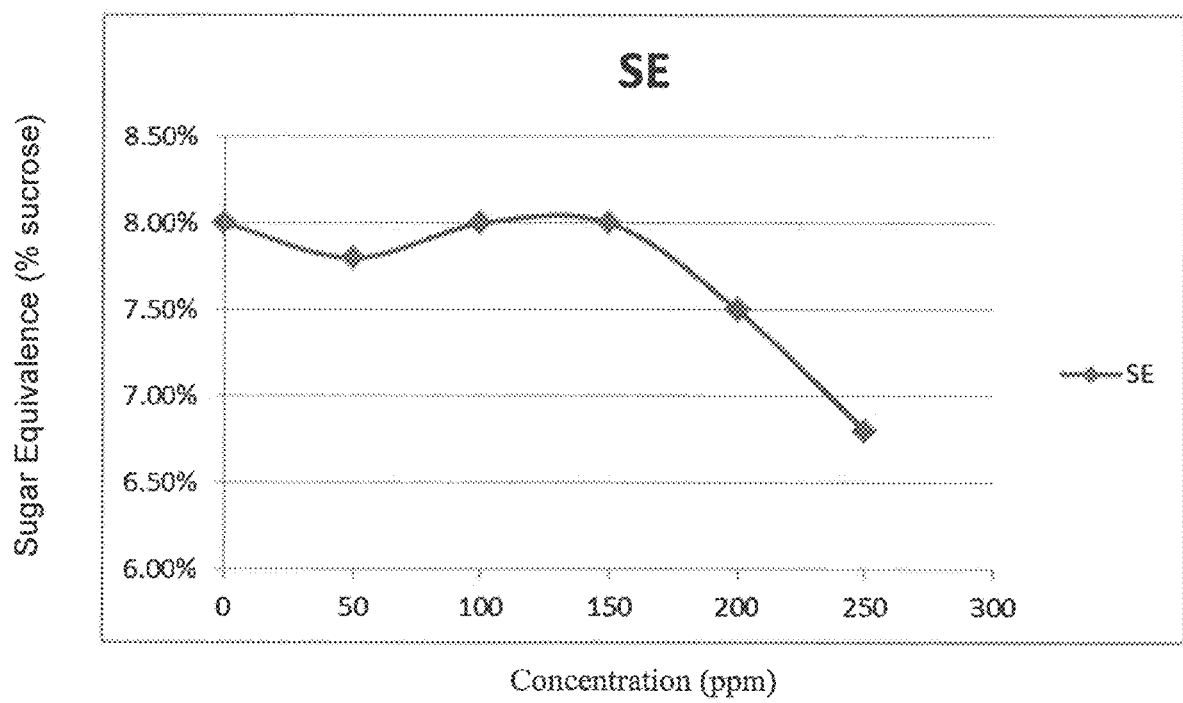
FIG. 5 is a graphical illustration showing sweetness plotted against the concentration of GSG-RA95.
Figure 6:
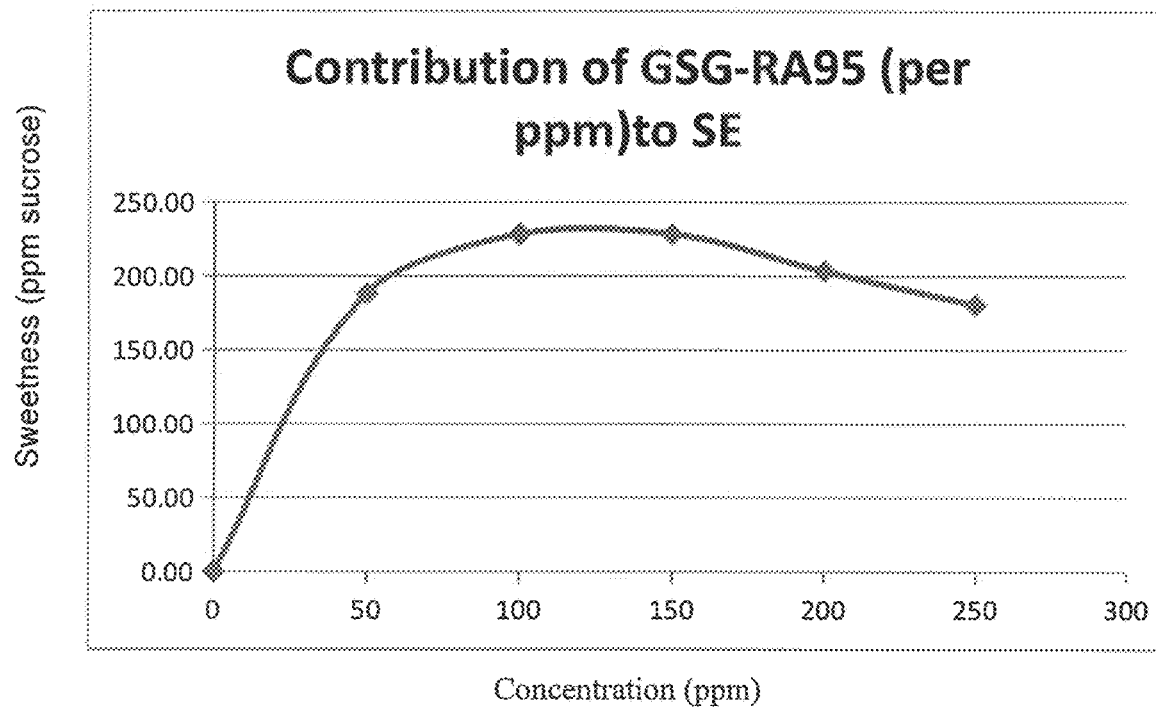
FIG. 6 is a graphical illustration showing the contribution of GSG-RA95 per ppm to SE.
Figure 7:
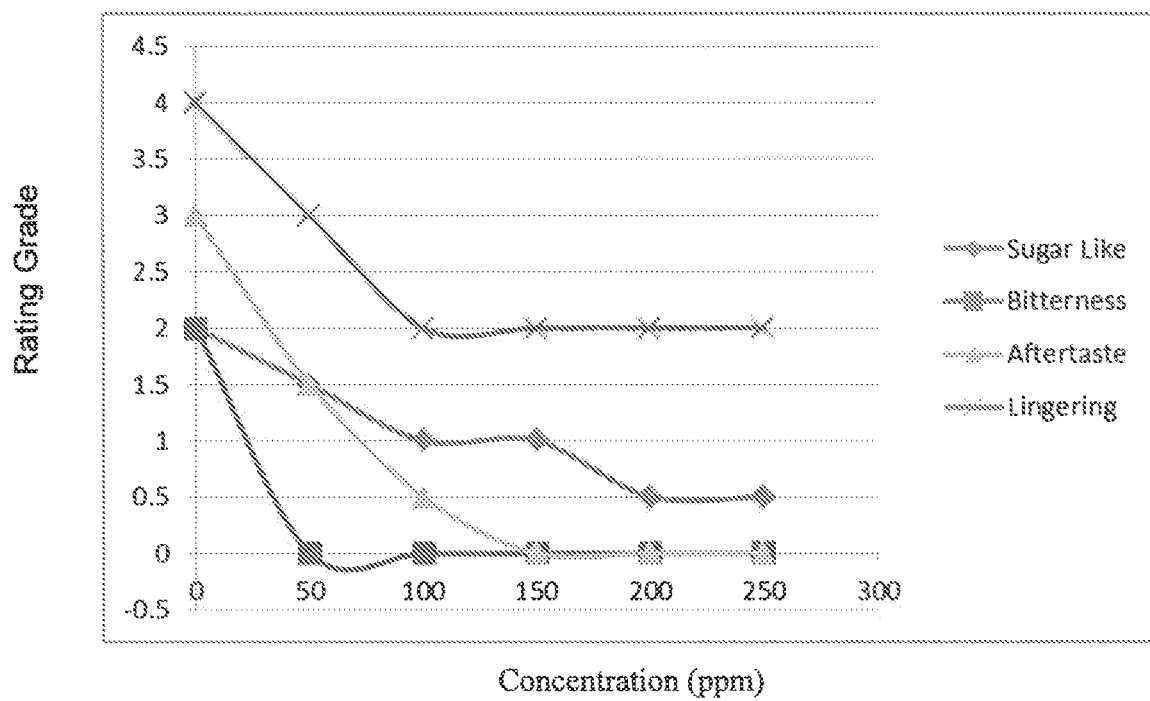
FIGS. 7-8 are graphical illustrations showing taste profiles of GSG-RA95/RA97 compositions.
Figure 8:
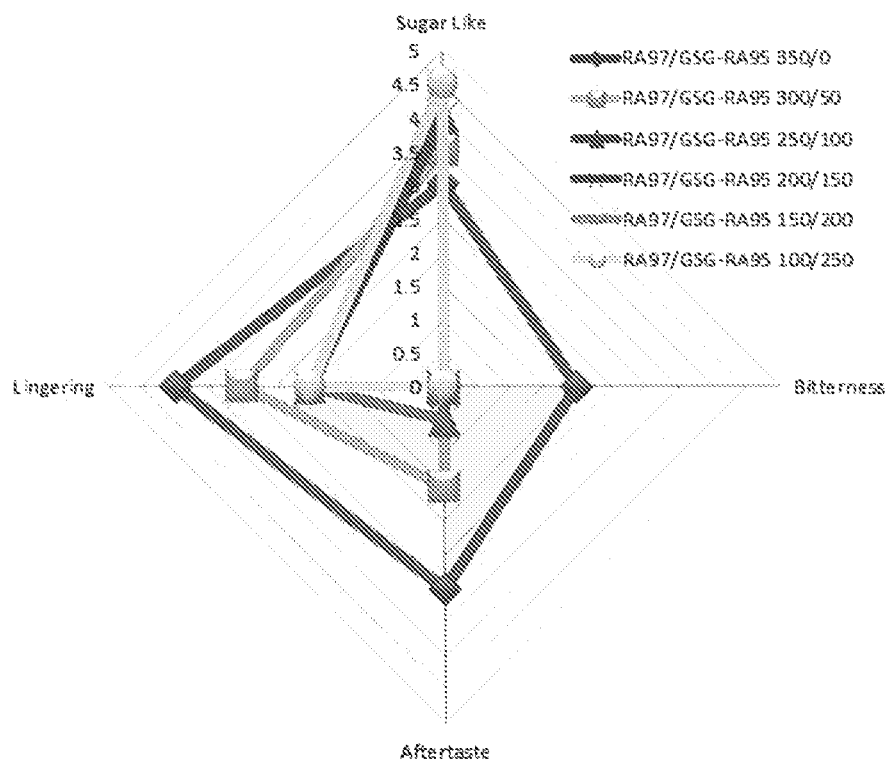

In the specification and in the claims, the terms "including" and "comprising" are open-ended terms and should be interpreted to mean "including, but not limited to . . . ". These terms encompass the more restrictive terms "consisting essentially of" and "consisting of."

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

Unless defined otherwise, all technical and scientific terms used herein have the same meanings as commonly understood by one of ordinary skill in the art to which this invention belongs. All publications and patents specifically mentioned herein are incorporated by reference in their entirety for all purposes including describing and disclosing the chemicals, instruments, statistical analyses and methodologies which are reported in the publications which might be used in connection with the invention. All references cited in this specification are to be taken as indicative of the level of skill in the art. Nothing herein is to be construed as an admission that the invention is not entitled to antedate such disclosure by virtue of prior invention.

The phrase "steviol glycoside" is recognized in the art and is intended to include the major and minor constituents of *Stevia*. These include, but are not limited to components of *Stevia* such as Steviol, Steviolbioside, Stevioside, Rebaudioside A (RA), Rebaudioside B (RB), Rebaudioside C (RC), Rebaudioside D (RD), Rebaudioside E (RE), Rebaudioside F (RF), Rebaudioside M (RM, also referred to as Rebaudioside X (RX), Rubusoside and Dulcoside A (DA). or Dulcoside (Dul.), herein Dulcoside A has the same definition as Dulcoside.

A "steviol glycoside" as referred to herein, pertains to a material that includes a steviol glycoside found in the *Stevia* plant, such as rebaudioside A (RA), rebaudioside B (RB), rebaudioside D (RD), Stevioside, and the mixture thereof. The steviol glycoside can be purified before use.

A "glycosylated steviol glycoside" as referred to herein, pertains to a steviol glycoside that is glycosylated at multiple positions (including partially glycosylated steviol glycosides) obtained, for example, by synthetic manipulation or by enzymatic processes, such as GSG-RA50.

The phrase "GSG composition(s)" as used herein is intended to mean a combination of at least one GSG and at least one steviol glycoside. The phrase is also intended to include multiple GSGs and multiple steviol glycosides. Further, a GSG composition can further include additional additives described throughout the specification.

The phrase "*Stevia* containing sweetener" is intended to include any composition that is prepared from a *Stevia* plant, such as a *Stevia* extract, or the individual components found in *Stevia*. The sweetener can include one or more of the components associated with the *Stevia* plant, such as those noted above. The sweetener can also include conventional artificial or natural sweeteners, such as sucrose, glucose, maltose, fructose, mannitol, sorbitol, aspartame, inulin, sucralose, acesulfame-K, sodium cyclamate, mogroside and its derivatives, etc.

The acronym "RAxx" is used herein to denote a purity of Rebaudioside A final product isolated from crude extract of *Stevia*, where "xx" is a number between 01 and 99 and is the percentage of Rebaudioside A in the dried product. More generally, acronyms of the type "YYxx" are used herein to denote the purity of a given ingredient denoted by the placeholder "YY", as a mass percentage of a compound, where "xx" is a number between 01 and 99 and is the percentage of product YY in the product. For instance, a compound that is 95% steviol glycosides ("SG") would be denoted by "SG95", and a compound that is 97% stevioside ("STV") would be denoted by "STV97". A product of that is 97% Rebaudioside A would be denoted by "RA97". Denoted percentages for RA ranged from 90 to 99.5 include a margin of plus or minus 0.5% point (any from 90% to 99.5%), unless otherwise indicated. Denoted percentages for RA ranged from 70 to less than 90 include a margin of plus or minus 0.5% point (any from 70% to less than 90%), unless otherwise indicated. Denoted percentages for RA ranged from 20 to less than 70 include a margin of plus or minus 0.5% point (any from 20% to less than 70%), unless otherwise indicated. For instance, "99% or higher purity Reb A" would include purity between 98.5% Reb A and RA99.5, whereas "RA97" would include a range of 96.5% to 97.5%. "RA99+" means greater than 99.0% purity Reb A. "Pure Reb A" is denoted as RA99.5, and is defined in U.S. Patent Application Publication No. 2006/0083838.

The phrase "sucrose equivalence" or "SE" is the amount of non-sucrose sweetener required to provide the sweetness of a given percentage of sucrose in the same food, beverage, or solution. For instance, a non-diet soft drink typically contains 12 grams of sucrose per 100 ml of water, i.e., 12% sucrose. This means that to be commercially accepted, diet soft drinks must have the same sweetness as a 12% sucrose soft drink, i.e., a diet soft drink must have a 12% SE. Soft drink dispensing equipment assumes an SE of 12%, since such equipment is set up for use with sucrose-based syrups.

The phrase "taste profile" is defined as the temporal profile of all basic tastes of a sweetener. The onset and decay of sweetness when a sweetener is consumed, as perceived by trained human tasters and measured in seconds from first contact with a taster's tongue ("onset") to a cutoff point (typically 180 seconds after onset), is called the "temporal profile of sweetness". A plurality of such human tasters is called a "sensory panel". In addition to sweetness, sensory panels can also judge the temporal profile of the other "basic tastes": bitterness, saltiness, sourness, piquance (aka spiciness), and umami (aka savoriness or meatiness). The onset and decay of bitterness when a sweetener is consumed, as perceived by trained human tasters and measured in seconds from first perceived taste to the last perceived aftertaste at the cutoff point, is called the "temporal profile of bitterness".

The term "flavor" or "flavor characteristic", as used herein, is the combined sensory perception of the components of taste, odor, and/or texture. The term "enhance", as used herein, includes augmenting, intensifying, accentuating, magnifying, and potentiating the sensory perception of a flavor characteristic without changing the nature or quality thereof. The term "modify", as used herein, includes altering, varying, suppressing, depressing, fortifying and supplementing the sensory perception of a flavor characteristic where the quality or duration of such characteristic was deficient.

The term "treated" as used herein describes a GSG+ steviol glycoside(s) of the current invention with improved solubility and/or taste profiles in an aqueous solution, in comparison with untreated compositions. Treatment includes the following steps: (1) mixing the composition with water, (2) heating the mixture while stirring, until the mixture was completely dissolved to obtain a clear solution, (3) further stirring the solution at the elevated temperature, (4) cooling to ambient temperature, and (5) subjecting the solution to spray drying. In step (2), the mixture can be heated to 30-200° C., preferably 40-120° C., more preferably 50-90° C., most preferably 60-70° C. In an alternative process of the present invention, the step (5) can be replaced by crystallization of the GSG+steviol glycoside(s).

While not to be bound by theory, the inventors have discovered compositions containing glycosylated steviol glycoside (GSG) or glycosylated steviol glycosides (GSGs) and one or more steviol glycosides resulting in improved taste profiles over previously reported *Stevia* compositions.

The abbreviation "GX" is noted throughout the specification and refers to glycosyl groups "G" where "X" is a value from 1 to 20 and refers to the number of glycosyl groups present in the molecule. For example, Stevioside G1 (ST-G1) has one (1) glycosyl group (G), thus "G1", Stevioside G2 (ST-G2) has two (2) glycosyl groups present, Stevioside G3 (ST-G3) has three (3) glycosyl groups present, Stevioside G4 (ST-G4) has four (4) glycosyl groups present, Stevioside G5 (ST-G5) has five (5) glycosyl groups present, Stevioside G6 (ST-G6) has six (6) glycosyl groups present, Stevioside G7 (ST-G7) has seven (7) groups present, Stevioside G8 (ST-G8) has eight (8) glycosyl groups present, Stevioside G9 (ST-G9) has nine (9) glycosyl groups present, etc. The glycosylation of the molecule can be determined by HPLC-MS as described herein and as exemplified by Example 17.

The technical problems solved by the invention are disclosed and claimed herein.

In one embodiment, glycosylated steviol glycosides (GSGs) can be obtained for example, by synthetic manipulation or by enzymatic processes. The GSGs obtained by these methods are not naturally occurring steviol glycosides. The methods and GSGs found in KR10-2008-0085811 are herein incorporated by reference. Stevioside G1 (ST-G1), Stevioside G2 (ST-G2), Stevioside G3 (ST-G3), Stevioside G4 (ST-G4), Stevioside G5 (ST-G5), Stevioside G6 (ST-G6), Stevioside G7 (ST-G7), Stevioside G8 (ST-G8), Stevioside G9 (ST-G9), Rebaudioside A G1 (RA-G1), Rebaudioside A G2 (RA-G2), Rebaudioside A G3 (RA-G3), Rebaudioside A G4 (RA-G4), Rebaudioside A G5 (RA-G5), Rebaudioside A G6 (RA-G6), Rebaudioside A G7 (RA-G7), Rebaudioside A G8 (RA-G8), Rebaudioside A G9 (RA-G9), Rebaudioside B G1 (RB-G1), Rebaudioside B G2 (RB-G2), Rebaudioside B G3 (RB-G3), Rebaudioside B G4 (RB-G4), Rebaudioside B G5 (RB-G5), Rebaudioside B G6 (RB-G6), Rebaudioside B G7 (RB-G7), Rebaudioside B G8 (RB-G8), Rebaudioside B G9 (RB-G9), Rebaudioside C G1 (RC-G1), Rebaudioside C G2 (RC-G2), Rebaudioside C G3 (RC-G3), Rebaudioside C G4 (RC-G4), Rebaudioside C G5 (RC-G5), Rebaudioside C G6 (RC-G6), Rebaudioside C G7 (RC-G7), Rebaudioside C G8 (RC-G8), Rebaudioside C G9 (RC-G9), or any combination thereof can be incorporated into the sweetener compositions of the current invention. Alternatively in the current embodiments, the glycosylation process can be modified as to provide partially glycosylated steviol glycosides that can have further unique solubility and/or taste profiles.

A suitable method to prepare the glycosylated steviol glycosides (GSGs) can be found, for example, in KR10-2008-0085811 in Examples 1 and 2. It is also anticipated that other steviol glycosides, for example steviol, steviolbioside, rebaudioside B, rebaudioside C, rebaudioside D, rebaudioside E, rebaudioside F, rebaudioside M, rubusoside and dulcoside A can be enzymatically modified to afford their corresponding multiple glycosylated glycosides: Steviol G1, Steviol G2 Steviol G3, Steviol G4, Steviol G5, Steviol G6, Steviol G7, Steviol G8, Steviol G9, Steviobioside G1, Steviobioside G2, Steviobioside G3, Steviobioside G4, Steviobioside G5, Steviobioside G6, Steviobioside G7, Steviobioside G8, Steviobioside G9, Rebaudioside B G1, Rebaudioside B G2, Rebaudioside B G3, Rebaudioside B G4, Rebaudioside B G5, Rebaudioside B G6, Rebaudioside B G7, Rebaudioside B G8, Rebaudioside B G9, Rebaudioside C G1, Rebaudioside C G2, Rebaudioside C G3, Rebaudioside C G4, Rebaudioside C G5, Rebaudioside C G6, Rebaudioside C G7, Rebaudioside C G8, Rebaudioside C G9, Rebaudioside D G1, Rebaudioside D G2, Rebaudioside D G3, Rebaudioside D G4, Rebaudioside D G5, Rebaudioside D G6, Rebaudioside D G7, Rebaudioside D G8, Rebaudioside D G9, Rebaudioside E G1, Rebaudioside E G2, Rebaudioside E G3, Rebaudioside E G4, Rebaudioside E G5, Rebaudioside E G6, Rebaudioside E G7, Rebaudioside E G8, Rebaudioside E G9, Rebaudioside F G1, Rebaudioside F G2, Rebaudioside F G3, Rebaudioside F G4, Rebaudioside F G5, Rebaudioside F G6, Rebaudioside F G7, Rebaudioside F G8, Rebaudioside F G9, Rebaudioside M G1, Rebaudioside M G2, Rebaudioside M G3, Rebaudioside E G4, Rebaudioside M G5, Rebaudioside M G6, Rebaudioside M G7, Rebaudioside M G8, Rebaudioside M G9, Rubusoside G1, Rubusoside G2, Rubusoside G3, Rubusoside G4, Rubusoside G5, Rubusoside G6, Rubusoside G7, Rubusoside G8, Rubusoside G9, Dulcoside A G1, Dulcoside A G2, Dulcoside A G3, Dulcoside A G4, Dulcoside A G5, Dulcoside A G6, Dulcoside A G7, Dulcoside A G8, and Dulcoside A G9. For example, G1 and G2 of steviol, steviolbioside, rebaudioside B, rebaudioside C, rebaudioside D, rebaudioside E, rebaudioside F, rubusoside and ducoside A are shown below.

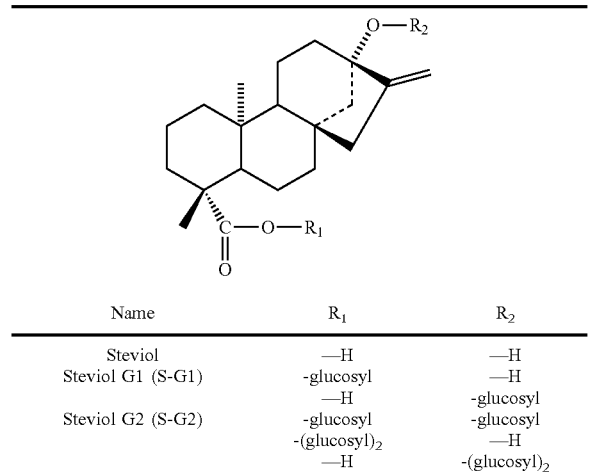

| Name | R₁ | R₂ |
|---|---|---|
| Steviol | —H | —H |
| Steviol G1 (S-G1) | -glucosyl | —H |
|  | —H | -glucosyl |
| Steviol G2 (S-G2) | -glucosyl | -glucosyl |
|  | -(glucosyl)₂ | —H |
|  | —H | -(glucosyl)₂ |

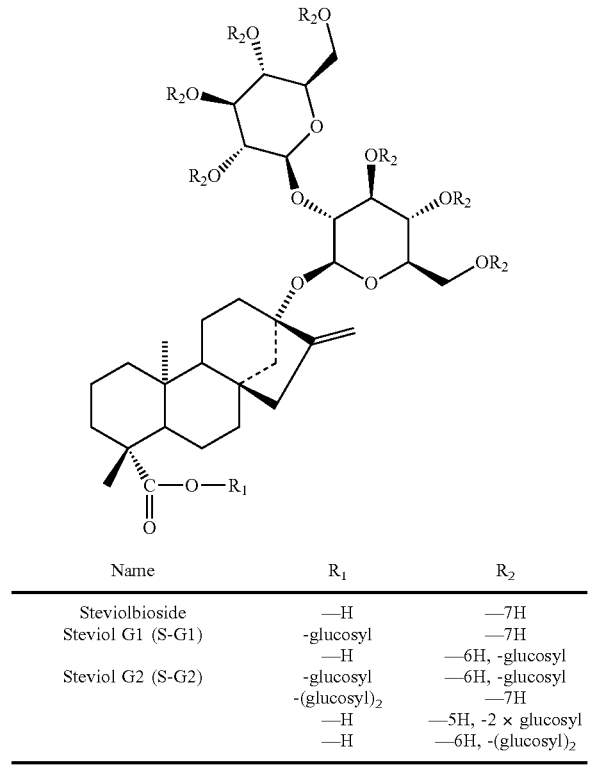

| Name | R₁ | R₂ |
|---|---|---|
| Steviolbioside | —H | —7H |
| Steviol G1 (S-G1) | -glucosyl | —7H |
|  | —H | —6H, -glucosyl |
| Steviol G2 (S-G2) | -glucosyl | —6H, -glucosyl |
|  | -(glucosyl)₂ | —7H |
|  | —H | —5H, -2 × glucosyl |
|  | —H | —6H, -(glucosyl)₂ |

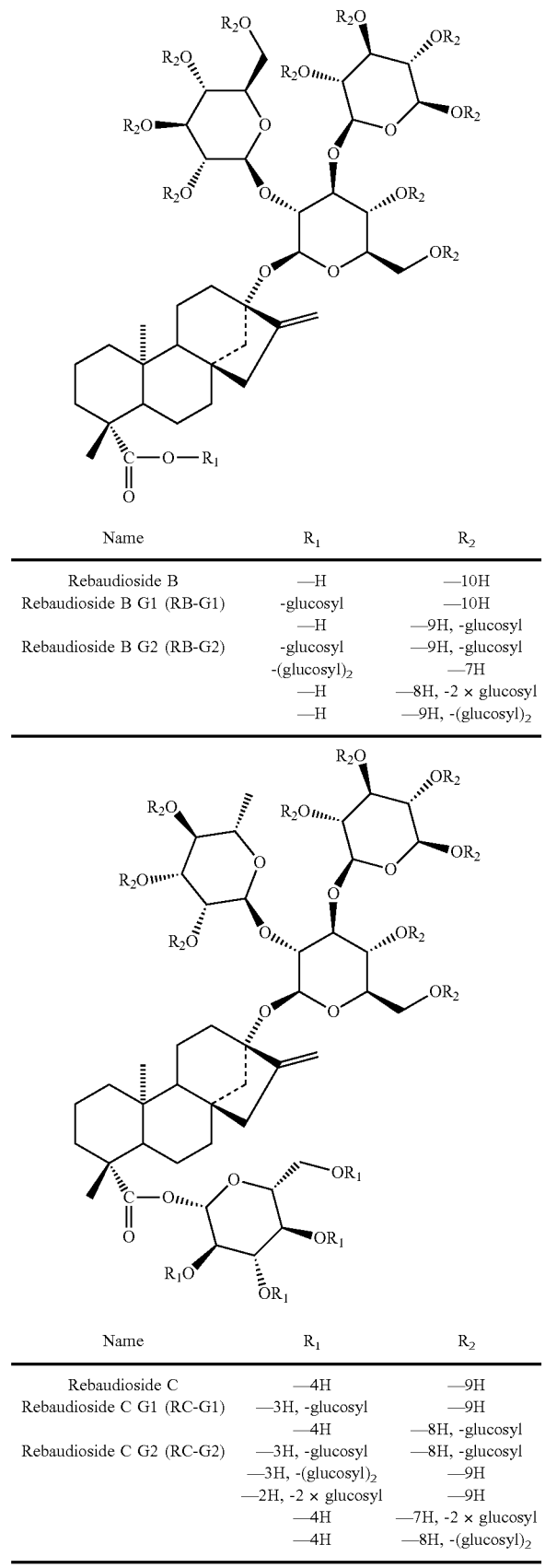

| Name | R₁ | R₂ |
|---|---|---|
| Rebaudioside B | —H | —10H |
| Rebaudioside B G1 (RB-G1) | -glucosyl | —10H |
|  | —H | —9H, -glucosyl |
| Rebaudioside B G2 (RB-G2) | -glucosyl | —9H, -glucosyl |
|  | -(glucosyl)₂ | —7H |
|  | —H | —8H, -2 × glucosyl |
|  | —H | —9H, -(glucosyl)₂ |

| Name | R₁ | R₂ |
|---|---|---|
| Rebaudioside C | —4H | —9H |
| Rebaudioside C G1 (RC-G1) | —3H, -glucosyl | —9H |
|  | —4H | —8H, -glucosyl |
| Rebaudioside C G2 (RC-G2) | —3H, -glucosyl | —8H, -glucosyl |
|  | —3H, -(glucosyl)₂ | —9H |
|  | —2H, -2 × glucosyl | —9H |
|  | —4H | —7H, -2 × glucosyl |
|  | —4H | —8H, -(glucosyl)₂ |

-continued

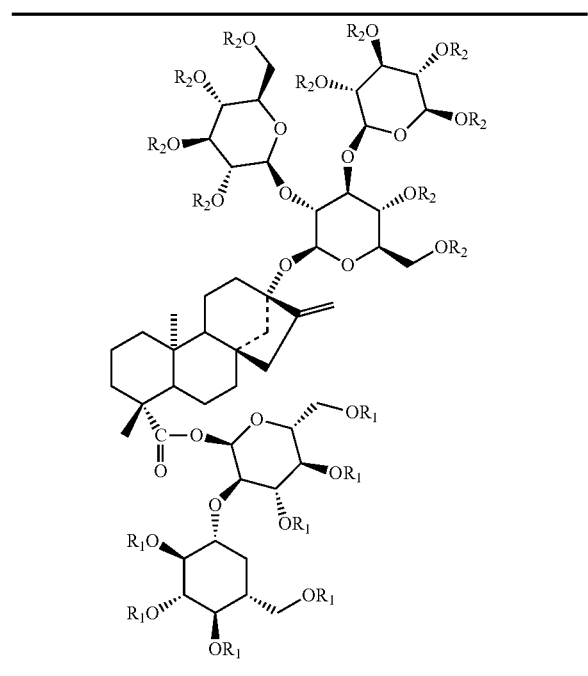

| Name | $R_1$ | $R_2$ |
|---|---|---|
| Rebaudioside D | —7H | —10H |
| Rebaudioside D G1 (RD-G1) | —6H, -glucosyl | —10H |
| | —7H | —9H, -glucosyl |
| Rebaudioside D G2 (RD-G2) | —6H, -glucosyl | —9H, -glucosyl |
| | —6H, -(glucosyl)$_2$ | —10H |
| | —5H, -2 × glucosyl | —10H |
| | —7H | —8H, -2 × glucosyl |
| | —7H | —9H, -(glucosyl)$_2$ |

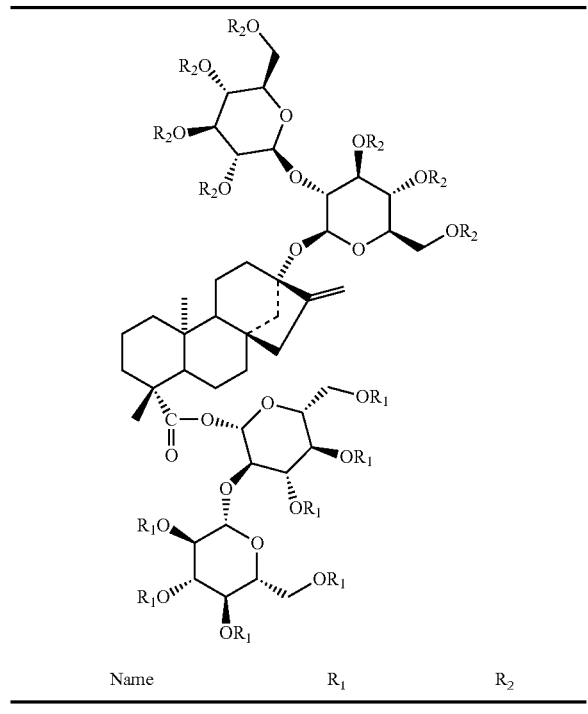

| Name | $R_1$ | $R_2$ |
|---|---|---|
| Rebaudioside E | —7H | —7H |
| Rebaudioside E G1 (RE-G1) | —6H, -glucosyl | —7H |
| | —7H | —6H, -glucosyl |
| Rebaudioside E G2 (RE-G2) | —6H, -glucosyl | —6H, -glucosyl |
| | —6H, -(glucosyl)$_2$ | —7H |

-continued

| | —5H, -2 × glucosyl | —7H |
|---|---|---|
| | —7H | —5H, -2 × glucosyl |
| | —7H | —6H, -(glucosyl)$_2$ |

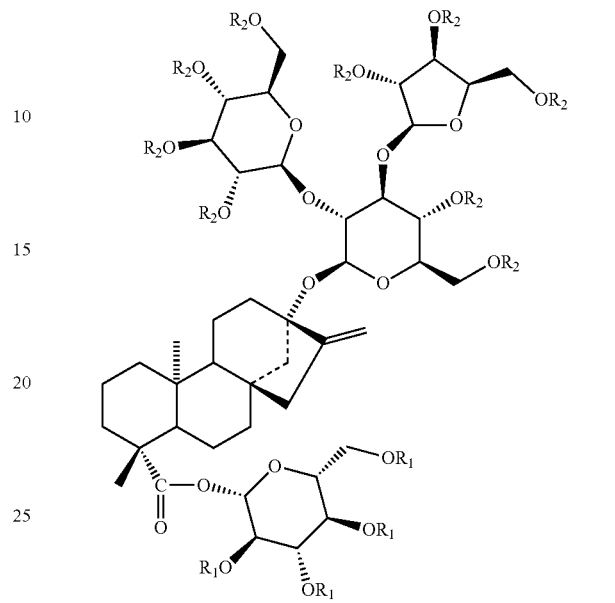

| Name | $R_1$ | $R_2$ |
|---|---|---|
| Rebaudioside F | —4H | —9H |
| Rebaudioside F G1 (RF-G1) | —3H, -glucosyl | —9H |
| | —4H | —8H, -glucosyl |
| Rebaudioside F G2 (RF-G2) | —3H, -glucosyl | —8H, -glucosyl |
| | —3H, -(glucosyl)$_2$ | —9H |
| | —2H, -2 × glucosyl | —9H |
| | —4H | —7H, -2 × glucosyl |
| | —4H | —8H, -(glucosyl)$_2$ |

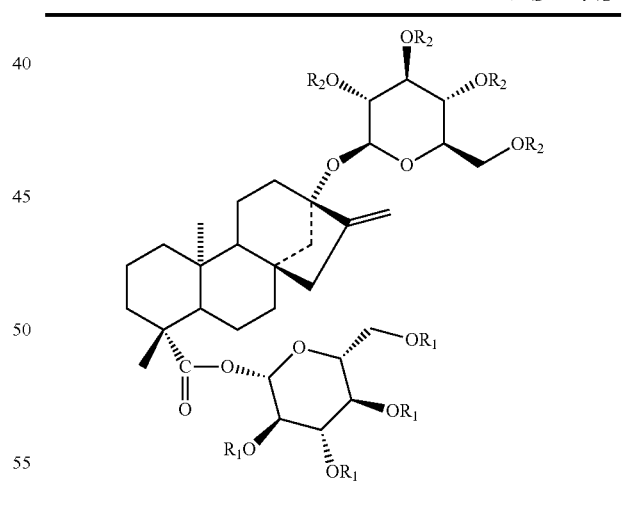

| Name | $R_1$ | $R_2$ |
|---|---|---|
| Rubusoside | —4H | —4H |
| Rubusoside G1 (R-G1) | —3H, -glucosyl | —4H |
| | —4H | —3H, -glucosyl |
| Rubusoside G2 (R-G2) | —3H, -glucosyl | —3H, -glucosyl |
| | —3H, -(glucosyl)$_2$ | —4H |
| | —2H, -2 × glucosyl | —4H |
| | —4H | —2H, -2 × glucosyl |
| | —4H | —3H, -(glucosyl)$_2$ |

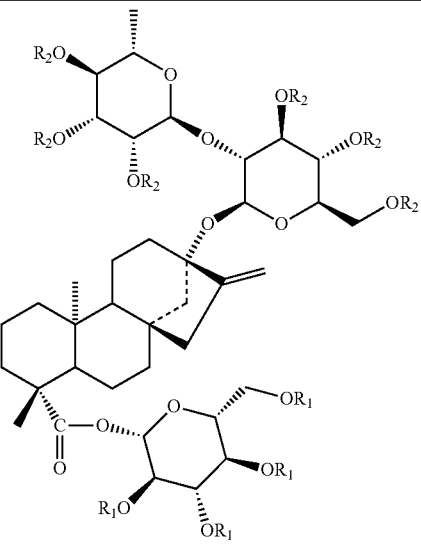

| Name | $R_1$ | $R_2$ |
|---|---|---|
| Dulcoside A | —4H | —6H |
| Dulcoside A G1 (DA-G1) | —3H, -glucosyl | —6H |
|  | —4H | —5H, -glucosyl |
| Dulcoside A G2 (DA-G2) | —3H, -glucosyl | —5H, -glucosyl |
|  | —3H, -(glucosyl)$_2$ | —6H |
|  | —2H, -2 × glucosyl | —6H |
|  | —4H | —4H, -2 × glucosyl |
|  | —4H | —5H, -(glucosyl)$_2$ |

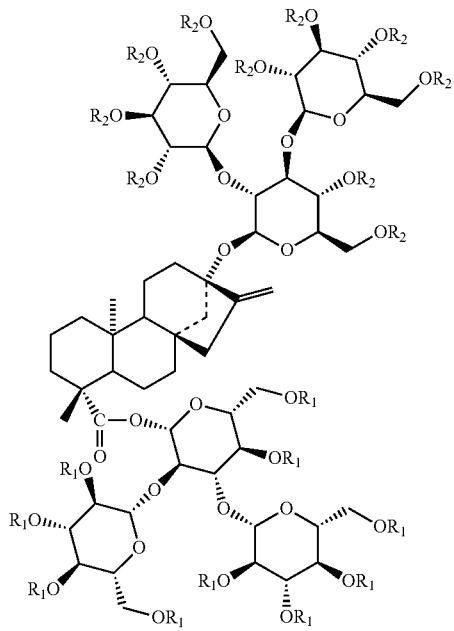

| Name | $R_1$ | $R_2$ |
|---|---|---|
| Rebaudioside M | —10H | —10H |
| Rebaudioside M G1 (RM-G1) | —9H, -glucosyl | —10H |
|  | —10H | —9H, -glucosyl |
| Rebaudioside M G2 (RM-G2) | —9H, -glucosyl | —9H, -glucosyl |
|  | —9H, -(glucosyl)$_2$ | —10H |
|  | —8H, -2 × glucosyl | —10H |
|  | —10H | —8H, -2 × glucosyl |
|  | —10H | —9H, -(glucosyl)$_2$ |

The GSGs can be treated individually or in combination as defined in the current application or treated in combination with other steviol glycosides that have not been enzymatically modified that are found in the *Stevia* plant or sweet tea extract. The mixtures of GSGs with steviol glycosides found in the *Stevia* plant or sweet tea extract can provide sweetener compositions with increased solubility and/or improved taste.

In a particular aspect, GSG-RA20, GSG-RA30, GSG-RA40, GSG-RA50, GSG-RA60, GSG-RA70, GSG-RA80, GSG-RA90, GSG-RA95, GSG-RA97, GSG-(RA50+RB8), GSG-(RA30+RC15), and GSG-(RA40+RB8) are GSGs which are used to be combined with steviol glycosides, such as RA, RB, RD, etc. GSG-RA20 is typically prepared from RA20 as a key starting material, GSG-RA30 is typically prepared from RA30 as a key starting material, GSG-RA40 is typically prepared from RA40 as a key starting material, GSG-RA50 is typically prepared from RA50 as a key starting material, GSG-RA60 is typically prepared from RA60 as a key starting material, GSG-RA70 is typically prepared from RA70 as a key starting material, GSG-RA80 is prepared from RA80 as the key starting material, GSG-RA90 is typically prepared from RA90 as a key starting material, GSG-RA95 is typically prepared from RA95 as a key starting material, and GSG-RA97 is prepared from RA97 as a key starting material. Since each composition contains varying concentrations of GSGs and steviol glycosides, then each composition may have different solubility and taste properties. It is envisioned that specific ratios of GSGs and steviol glycosides may have unique and beneficial physical and chemical properties that are unknown and have not been previously disclosed.

All of the components of the composition disclosed herein can be purchased or be made by processes known to those of ordinary skill in the art and combined (e.g., precipitation/co-precipitation, mixing, blending, grounding, mortar and pestal, microemulsion, solvothermal, sonochemical, etc.) or treated as defined by the current invention. Specifically in the current disclosure, any one or more of GSG-RA20, GSG-RA30, GSG-RA40, GSG-RA50, GSG-RA60, GSG-RA70, GSG-RA80, GSG-RA90, GSG-RA95, GSG-RA97, GSG-(RA50+RB8), GSG-(RA30+RC15), and GSG-(RA40+RB8) can be combined with one or more of steviol, stevioside, steviolbioside, rebaudioside A, rebaudioside B, rebaudioside C, rebaudioside D, rebaudioside E, rebaudioside F, rebaudioside M, rubusoside and dulcoside A to provide sweetener compositions with improved solubility and/or improved sweetness. The content of GSG or GSGs from any one or more of GSG-RA20, GSG-RA30, GSG-RA40, GSG-RA50, GSG-RA60, GSG-RA70, GSG-RA80, GSG-RA90, GSG-RA95, GSG-RA97, GSG-(RA50+RB8), GSG-(RA30+RC15), and GSG-(RA40+RB8) mixed with the disclosed steviol glycosides such as the steviol glycosides found in the *Stevia* plant or sweet tea extract can be from 1% wt/wt to 100% wt/wt. A GSG or GSGs, such as any one or more of GSG-RA20, GSG-RA30, GSG-RA40, GSG-RA50, GSG-RA60, GSG-RA70, GSG-RA80, GSG-RA90, GSG-RA95, GSG-RA97, GSG-(RA50+RB8), GSG-(RA30+RC15), and GSG-(RA40+RB8) can be included in the composition at 1% wt/wt, 2% wt/wt, 3% wt/wt, 4% wt/wt, 5 wt/wt, 6% wt/wt, 7% wt/wt, 8% wt/wt. 9% wt/wt, 10% wt/wt, 11% wt/wt, 12% wt/wt, 13% wt/wt, 14% wt/wt, 15% wt/wt, 16% wt/wt, 17% wt/wt, 18% wt/wt, 19% wt/wt, 20% wt/wt, 21% wt/wt, 22% wt/wt, 23% wt/wt, 24% wt/wt, 25% wt/wt, 26% wt/wt, 27% wt/wt, 28% wt/wt, 29% wt/wt, 30% wt/wt, 31% wt/wt, 32% wt/wt, 33% wt/wt, 34% wt/wt, 35% wt/wt, 36% wt/wt, 37% wt/wt, 38% wt/wt, 39% wt/wt, 40% wt/wt, 41% wt/wt, 42% wt/wt, 43% wt/wt, 44% wt/wt, 45% wt/wt, 46% wt/wt, 47% wt/wt, 48% wt/wt, 49% wt/wt, 50% wt/wt, 51% wt/wt, 52% wt/wt, 53% wt/wt, 54% wt/wt, 55% wt/wt, 56% wt/wt, 57% wt/wt, 58% wt/wt, 59% wt/wt, 60% wt/wt, 61% wt/wt, 62% wt/wt, 63% wt/wt, 64% wt/wt, 65% wt/wt, 66% wt/wt, 67% wt/wt, 68% wt/wt, 69% wt/wt, 70% wt/wt, 71% wt/wt, 72% wt/wt, 73% wt/wt, 74% wt/wt, 75% wt/wt, 76% wt/wt, 77% wt/wt, 78% wt/wt, 79% wt/wt, 80% wt/wt, 81% wt/wt, 82% wt/wt, 83% wt/wt, 84% wt/wt, 85% wt/wt, 86% wt/wt, 87% wt/wt, 88% wt/wt, 89% wt/wt, 90% wt/wt, 91% wt/wt, 92% wt/wt, 93% wt/wt, 94% wt/wt, 95% wt/wt, 96% wt/wt, 97 wt/wt, 98% wt/wt, 99% wt/wt, or 100% wt/wt and all ranges between 1 and 100% wt/wt, for example less than about 70 perpercentage by weight, less than about 50 perpercentage by weight, from about 1% wt/wt to about 99% wt/wt, from about 1% wt/wt to about 98% wt/wt, from about 1% wt/wt to about 97% wt/wt, from about 1% wt/wt to about 95% wt/wt, from about 1% wt/wt to about 90% wt/wt, from about 1% wt/wt to about 80% wt/wt, from about 1% wt/wt to about 70% wt/wt, from about 1% wt/wt to about 60% wt/wt, from about 1% wt/wt to about 50% wt/wt, from about 1% wt/wt to about 40% wt/wt, from about 1% wt/wt to about 30% wt/wt, from about 1% wt/wt to about 20% wt/wt, from about 1% wt/wt to about 10% wt/wt, from about 1% wt/wt to about 5% wt/wt, from about 2% wt/wt to about 99% wt/wt, from about 2% wt/wt to about 98% wt/wt, from about 2% wt/wt to about 97% wt/wt, from about 2% wt/wt to about 95% wt/wt, from about 2% wt/wt to about 90% wt/wt, from about 2% wt/wt to about 80% wt/wt, from about 2% wt/wt to about 70% wt/wt, from about 2% wt/wt to about 60% wt/wt, from about 2% wt/wt to about 50% wt/wt, from about 2% wt/wt to about 40% wt/wt, from about 2% wt/wt to about 30% wt/wt, from about 2% wt/wt to about 20% wt/wt, from about 2% wt/wt to about 10% wt/wt, from about 2% wt/wt to about 5% wt/wt, from about 3% wt/wt to about 99% wt/wt, from about 3% wt/wt to about 98% wt/wt, from about 3% wt/wt to about 97% wt/wt, from about 3% wt/wt to about 95% wt/wt, from about 3% wt/wt to about 90% wt/wt, from about 3% wt/wt to about 80% wt/wt, from about 3% wt/wt to about 70% wt/wt, from about 3% wt/wt to about 60% wt/wt, from about 3% wt/wt to about 50% wt/wt, from about 3% wt/wt to about 40% wt/wt, from about 3% wt/wt to about 30% wt/wt, from about 3% wt/wt to about 20% wt/wt, from about 3% wt/wt to about 10% wt/wt, from about 3% wt/wt to about 5% wt/wt, from about 5% wt/wt to about 99% wt/wt, from about 5% wt/wt to about 98% wt/wt, from about 5% wt/wt to about 97% wt/wt, from about 5% wt/wt to about 95% wt/wt, from about 5% wt/wt to about 90% wt/wt, from about 5% wt/wt to about 80% wt/wt, from about 5% wt/wt to about 70% wt/wt, from about 5% wt/wt to about 60% wt/wt, from about 5% wt/wt to about 50% wt/wt, from about 5% wt/wt to about 40% wt/wt, from about 5% wt/wt to about 30% wt/wt, from about 5% wt/wt to about 20% wt/wt, from about 5% wt/wt to about 10% wt/wt, from about 10% wt/wt to about 99% wt/wt, from about 10% wt/wt to about 98% wt/wt, from about 10% wt/wt to about 97% wt/wt, from about 10% wt/wt to about 95% wt/wt, from about 10% wt/wt to about 90% wt/wt, from about 10% wt/wt to about 80% wt/wt, from about 10% wt/wt to about 70% wt/wt, from about 10% wt/wt to about 60% wt/wt, from about 10% wt/wt to about 50% wt/wt, from about 10% wt/wt to about 40% wt/wt, from about 10% wt/wt to about 30% wt/wt, from about 10% wt/wt to about 20% wt/wt, from about 20 to less than about 50 percentage by weight, from about 30 to less than about 50 percentage by weight, from about 40 to less than about 50 percentage by weight, and from about 20 to 45 percentage by weight of the sweetening composition.

In another aspect, the one or more steviol glycosides including steviol, stevioside, steviolbioside, rebaudioside A, rebaudioside B, rebaudioside C, rebaudioside D, rebaudioside E, rebaudioside F, rebaudioside M, rubusoside, and dulcoside A are contained in the composition with improved solubility and/or sweetness. The steviol glycosides of the compositions can make up 1% wt/wt, 2% wt/wt, 3% wt/wt, 4% wt/wt, 5% wt/wt, 6% wt/wt, 7% wt/wt, 8% wt/wt, 9% wt/wt, 10% wt/wt, 11% wt/wt, 12% wt/wt, 13% wt/wt, 14% wt/wt, 15% wt/wt, 16% wt/wt, 17% wt/wt, 18% wt/wt, 19% wt/wt, 20% wt/wt, 21 wt/wt, 22% wt/wt, 23% wt/wt, 24% wt/wt, 25% wt/wt, 26% wt/wt, 27% wt/wt, 28% wt/wt, 29% wt/wt, 30% wt/wt, 31% wt/wt, 32% wt/wt, 33% wt/wt, 34% wt/wt, 35% wt/wt, 36% wt/wt, 37% wt/wt, 38% wt/wt, 39% wt/wt, 40% wt/wt, 41% wt/wt, 42% wt/wt, 43% wt/wt, 44% wt/wt, 45% wt/wt, 46% wt/wt, 47% wt/wt, 48% wt/wt, 49% wt/wt, 50% wt/wt, 51% wt/wt, 52% wt/wt, 53% wt/wt, 54% wt/wt, 55% wt/wt, 56% wt/wt, 57% wt/wt, 58% wt/wt, 59% wt/wt, 60% wt/wt, 61% wt/wt, 62% wt/wt, 63% wt/wt, 64% wt/wt, 65% wt/wt, 66% wt/wt, 67% wt/wt, 68% wt/wt, 69% wt/wt, 70% wt/wt, 71% wt/wt, 72% wt/wt, 73% wt/wt, 74% wt/wt, 75% wt/wt, 76% wt/wt, 77% wt/wt, 78% wt/wt, 79% wt/wt, 80% wt/wt, 81% wt/wt, 82% wt/wt, 83% wt/wt, 84% wt/wt, 85% wt/wt, 86% wt/wt, 87% wt/wt, 88% wt/wt, 89% wt/wt, 90% wt/wt, 91% wt/wt, 92% wt/wt, 93% wt/wt, 94% wt/wt, 95% wt/wt, 96% wt/wt, 97% wt/wt, 98% wt/wt, 99% wt/wt, or 100% wt/wt and all ranges between 1 and 100% wt/wt, for example from about 1% wt/wt to about 99% wt/wt, from about 1% wt/wt to about 98% wt/wt, from about 1% wt/wt to about 97% wt/wt, from about 1% wt/wt to about 95% wt/wt, from about 1% wt/wt to about 90% wt/wt, from about 1% wt/wt to about 80% wt/wt, from about 1% wt/wt to about 70% wt/wt, from about 1% wt/wt to about 60% wt/wt, from about 1% wt/wt to about 50% wt/wt, from about 1% wt/wt to about 40% wt/wt, from about 1% wt/wt to about 30% wt/wt, from about 1% wt/wt to about 20% wt/wt, from about 1% wt/wt to about 10% wt/wt, from about 1% wt/wt to about 5% wt/wt, from about 2% wt/wt to about 99% wt/wt, from about 2% wt/wt to about 98% wt/wt, from about 2% wt/wt to about 97% wt/wt, from about 2% wt/wt to about 95% wt/wt, from about 2% wt/wt to about 90% wt/wt, from about 2% wt/wt to about 80% wt/wt, from about 2% wt/wt to about 70% wt/wt, from about 2% wt/wt to about 60% wt/wt, from about 2% wt/wt to about 50% wt/wt, from about 2% wt/wt to about 40% wt/wt, from about 2% wt/wt to about 30% wt/wt, from about 2% wt/wt to about 20% wt/wt, from about 2% wt/wt to about 10% wt/wt, from about 2% wt/wt to about 5% wt/wt, from about 3% wt/wt to about 99% wt/wt, from about 3% wt/wt to about 98% wt/wt, from about 3% wt/wt to about 97% wt/wt, from about 3% wt/wt to about 95% wt/wt, from about 3% wt/wt to about 90% wt/wt, from about 3% wt/wt to about 80% wt/wt, from about 3% wt/wt to about 70% wt/wt, from about 3% wt/wt to about 60% wt/wt, from about 3% wt/wt to about 50% wt/wt, from about 3% wt/wt to about 40% wt/wt, from about 3% wt/wt to about 30% wt/wt, from about 3% wt/wt to about 20% wt/wt, from about 3% wt/wt to about 10% wt/wt, from about 3% wt/wt to about 5% wt/wt, from about 5% wt/wt to about 99% wt/wt, from about 5% wt/wt to about 98% wt/wt, from about 5% wt/wt to about 97% wt/wt, from about 5% wt/wt to about 95% wt/wt, from about 5% wt/wt to about 90% wt/wt, from about 5% wt/wt to about 80% wt/wt, from about 5% wt/wt to about 70% wt/wt, from about 5% wt/wt to about 60% wt/wt, from about 5% wt/wt to about 50% wt/wt, from about 5% wt/wt to about 40% wt/wt, from about 5% wt/wt to about 30% wt/wt, from about 5% wt/wt to about 20% wt/wt, from about 5% wt/wt to about 10% wt/wt, from about 10% wt/wt to about 99% wt/wt, from about 10% wt/wt to about 98% wt/wt, from about 10% wt/wt to about 97% wt/wt, from about 10% wt/wt to about 95% wt/wt, from about 10% wt/wt to about 90% wt/wt, from about 10% wt/wt to about 80% wt/wt, from about 10% wt/wt to about 70% wt/wt, from about 10% wt/wt to about 60% wt/wt, from about 10% wt/wt to about 50% wt/wt, from about 10% wt/wt to about 40% wt/wt, from about 10% wt/wt to about 30% wt/wt, and from about 10% wt/wt to about 20% wt/wt, of the sweetening composition.

In another aspect, the glycosylated steviol glycoside is derived from steviol glycoside comprising rebaudioside A. The rebaudioside A can range from about 20 to about 100 percentage by weight, from about 20 to about 49 percentage by weight, from about 20 to about 40 percentage by weight, from about 60 to about 97 percentage by weight, and from about 50 to about 59 percentage by weight.

In another aspect, the glycosylated steviol glycoside is derived from steviol glycoside comprising rebaudioside A, and rebaudioside B and/or rebaudioside C. The glycosylated steviol glycoside is derived from steviol glycoside comprising from about 20 to about 97 percentage by weight of rebaudioside A, and from about 0 to about 10 percentage by weight of rebaudioside B and/or from about 5 to about 20 percentage by weight of rebaudioside C, from about 30 to about 60 percentage by weight of rebaudioside A, and from about 0.5 to about 8 percentage by weight of rebaudioside B and/or from about 5 to about 18 percentage by weight of rebaudioside C.

In some aspects, the GSG compositions described herein can contain cyclodextrin (CD), such as alpha, beta, and/or gamma cyclodextrin to help improve solubility and/or taste profile. Cyclodextrins are a family of compounds made up of sugar molecules bound together in a ring, cyclic oligosaccharides. They are composed of 5 or more alpha-D-glucopyranoside units linked 1→4, as in amylose. Cyclodextrins are also referred to as cycloamyloses. Cyclodextrin can make up 1% wt/wt, 2% wt/wt, 3% wt/wt, 4% wt/wt, 5% wt/wt, 6% wt/wt, 7% wt/wt, 8% wt/wt. 9% wt/wt, 10% wt/wt, 11% wt/wt, 12% wt/wt, 13% wt/wt, 14% wt/wt, 15% wt/wt, 16% wt/wt, 17% wt/wt, 18% wt/wt, 19% wt/wt, 20% wt/wt, 21% wt/wt, 22% wt/wt, 23% wt/wt, 24% wt/wt, 25% wt/wt, 26% wt/wt, 27% wt/wt, 28% wt/wt, 29% wt/wt, 30% wt/wt, 31% wt/wt, 32% wt/wt, 33% wt/wt, 34% wt/wt, 35% wt/wt, 36% wt/wt, 37% wt/wt, 38% wt/wt, 39% wt/wt, 40% wt/wt, 41% wt/wt, 42% wt/wt, 43% wt/wt, 44% wt/wt, 45% wt/wt, 46% wt/wt, 47% wt/wt, 48% wt/wt, 49% wt/wt, 50% wt/wt, 51% wt/wt, 52% wt/wt, 53% wt/wt, 54% wt/wt, 55% wt/wt, 56% wt/wt, 57% wt/wt, 58% wt/wt, 59% wt/wt, 60% wt/wt, 61% wt/wt, 62% wt/wt, 63% wt/wt, 64% wt/wt, 65% wt/wt, 66% wt/wt, 67% wt/wt, 68% wt/wt, 69% wt/wt, 70% wt/wt, 71% wt/wt, 72% wt/wt, 73% wt/wt, 74% wt/wt, 75% wt/wt, 76% wt/wt, 77% wt/wt, 78% wt/wt, 79% wt/wt, 80% wt/wt, 81% wt/wt, 82% wt/wt, 83% wt/wt, 84% wt/wt, 85% wt/wt, 86% wt/wt, 87% wt/wt, 88% wt/wt, 89% wt/wt, 90% wt/wt, 91% wt/wt, 92% wt/wt, 93% wt/wt, 94% wt/wt, 95% wt/wt, 96% wt/wt, 97% wt/wt, 98% wt/wt, 99% wt/wt, or 100% wt/wt and all ranges between 1 and 100% wt/wt, for example from about 1% wt/wt to about 99% wt/wt, from about 1% wt/wt to about 98% wt/wt, from about 1% wt/wt to about 97% wt/wt, from about 1% wt/wt to about 95% wt/wt, from about 1% wt/wt to about 90% wt/wt, from about 1% wt/wt to about 80% wt/wt, from about 1% wt/wt to about 70% wt/wt, from about 1% wt/wt to about 60% wt/wt, from about 1% wt/wt to about 50% wt/wt, from about 1% wt/wt to about 40% wt/wt, from about 1% wt/wt to about 30% wt/wt, from about 1% wt/wt to about 20% wt/wt, from about 1% wt/wt to about 10% wt/wt, from about 1% wt/wt to about 5% wt/wt, from about 2% wt/wt to about 99% wt/wt, from about 2% wt/wt to about 98% wt/wt, from about 2% wt/wt to about 97% wt/wt, from about 2% wt/wt to about 95% wt/wt, from about 2% wt/wt to about 90% wt/wt, from about 2% wt/wt to about 80% wt/wt, from about 2% wt/wt to about 70% wt/wt, from about 2% wt/wt to about 60% wt/wt, from about 2% wt/wt to about 50% wt/wt, from about 2% wt/wt to about 40% wt/wt, from about 2% wt/wt to about 30% wt/wt, from about 2% wt/wt to about 20% wt/wt, from about 2% wt/wt to about 10% wt/wt, from about 2% wt/wt to about 5% wt/wt, from about 3% wt/wt to about 99% wt/wt, from about 3% wt/wt to about 98% wt/wt, from about 3% wt/wt to about 97% wt/wt, from about 3% wt/wt to about 95% wt/wt, from about 3% wt/wt to about 90% wt/wt, from about 3% wt/wt to about 80% wt/wt, from about 3% wt/wt to about 70% wt/wt, from about 3% wt/wt to about 60% wt/wt, from about 3% wt/wt to about 50% wt/wt, from about 3% wt/wt to about 40% wt/wt, from about 3% wt/wt to about 30% wt/wt, from about 3% wt/wt to about 20% wt/wt, from about 3% wt/wt to about 10% wt/wt, from about 3% wt/wt to about 5% wt/wt, from about 5% wt/wt to about 99% wt/wt, from about 5% wt/wt to about 98% wt/wt, from about 5% wt/wt to about 97% wt/wt, from about 5% wt/wt to about 95% wt/wt, from about 5% wt/wt to about 90% wt/wt, from about 5% wt/wt to about 80% wt/wt, from about 5% wt/wt to about 70% wt/wt, from about 5% wt/wt to about 60% wt/wt, from about 5% wt/wt to about 50% wt/wt, from about 5% wt/wt to about 40% wt/wt, from about 5% wt/wt to about 30% wt/wt, from about 5% wt/wt to about 20% wt/wt, from about 5% wt/wt to about 10% wt/wt, from about 10% wt/wt to about 99% wt/wt, from about 10% wt/wt to about 98% wt/wt, from about 10% wt/wt to about 97% wt/wt, from about 10% wt/wt to about 95% wt/wt, from about 10% wt/wt to about 90% wt/wt, from about 10% wt/wt to about 80% wt/wt, from about 10% wt/wt to about 70% wt/wt, from about 10% wt/wt to about 60% wt/wt, from about 10% wt/wt to about 50% wt/wt, from about 10% wt/wt to about 40% wt/wt, from about 10% wt/wt to about 30% wt/wt, and from about 10% wt/wt to about 20% wt/wt, of the composition.

In another aspect, the GSG compositions disclosed herein may be solubilized in an aqueous solution. The aqueous solution can include water and/or an alcohol, such as one or more of methanol, ethanol, propanol, isopropanol, n-butanol, isobutanol, sec-butanol, tert-butanol, n-pentanol, isopentanol, neopentanol, or combinations thereof.

The water alcohol solution can be less than 60% alcohol, less than 50% alcohol, less than 40% alcohol, less than 30% alcohol, less than 20% alcohol, less than 10% alcohol, less than 5% alcohol, less than 2% alcohol, or less than 1% alcohol by volume.

In another aspect, the compositions containing glycosylated steviol glycosides and steviol glycosides disclosed herein can be provided as solutions with improved sweetness. Specifically, a GSG or GSGs can be combined with one or more of steviol, stevioside, steviolbioside, rebaudioside A, rebaudioside B, rebaudioside C, rebaudioside D, rebaudioside E, rebaudioside F, rebaudioside M, rubusoside, or dulcoside A to provide a sweetened solution with improved sweetness in comparison to each component separately. Alternatively, a GSG or GSGs can be combined with one or more of steviol, stevioside, steviolbioside, rebaudioside A, rebaudioside B, rebaudioside C, rebaudioside D, rebaudioside E, rebaudioside F, rebaudioside M, rubusoside, and dulcoside A and can be treated according to the current invention to provide a sweetened solution with a higher concentration of sweetener having improved sweetness. In a particular aspect, any one or more of GSG or GSGs from GSG-RA20, GSG-RA30, GSG-RA40, GSG-RA50, GSG-RA60, GSG-RA70, GSG-RA80, GSG-RA90, GSG-RA95, GSG-RA97, GSG-(RA50+RB8), GSG-(RA30+RC15), and GSG-(RA40+RB8), combined with steviol, stevioside, steviolbioside, rebaudioside A, rebaudioside B, rebaudioside C, rebaudioside D, rebaudioside E, rebaudioside F, rebaudioside M, rubusoside, or ducoside A can be included in the solution and can range from about 0 to about 2000 ppm of total glycosides, preferably from about 100 ppm to about 1000 ppm of total glycosides, and most preferably from about 300 ppm to about 500 ppm.

In one embodiment, a composition is provided including a GSG and rebaudioside A in solution that has improved sweetness. The GSG can be from GSG-RA50 and the rebaudioside A can be RA50, RA60, RA80, RA95, RA97, RA98, RA99, or RA99.5. The GSG-RA50 can be present in solution at 50 ppm, 100 ppm, 150 ppm, 200 ppm, 250 ppm, 300 ppm, 350 ppm, 400 ppm, 450 ppm, 500 ppm, 550 ppm, 600 ppm, 650 ppm, 700 ppm, 750 ppm, 800 ppm, 850 ppm, 900 ppm, 950 ppm, 1000 ppm or any value or range there between and rebaudioside A can be present at the solution at 50 ppm, 100 ppm, 150 ppm, 200 ppm, 250 ppm, 300 ppm, 350 ppm, 400 ppm, 450 ppm, 500 ppm, 550 ppm, 600 ppm, 650 ppm, 700 ppm, 750 ppm, 800 ppm, 850 ppm, 900 ppm, 950 ppm, 1000 ppm or any value or range there between so the total of steviol glycosides in solution ranges from about 100 ppm to about 2000 ppm, preferably from about 200 ppm to about 1000 ppm, and more preferably from about 300 ppm to about 500 ppm and any value or range there between, specifically 350 ppm, 400 ppm, or 450 ppm. In another embodiment the GSG can be from GSG-RA80 and rebaudioside A can be RA50, RA60, RA80, RA95, RA97, RA98, RA99, or RA99.5. The GSG-RA80 can be present in solution at 50 ppm, 100 ppm, 150 ppm, 200 ppm, 250 ppm, 300 ppm, 350 ppm, 400 ppm, 450 ppm, 500 ppm, 550 ppm, 600 ppm, 650 ppm, 700 ppm, 750 ppm, 800 ppm, 850 ppm, 900 ppm, 950 ppm, 1000 ppm or any value or range there between and rebaudioside A can be present at the solution at 50 ppm, 100 ppm, 150 ppm, 200 ppm, 250 ppm, 300 ppm, 350 ppm, 400 ppm, 450 ppm, 500 ppm, 550 ppm, 600 ppm, 650 ppm, 700 ppm, 750 ppm, 800 ppm, 850 ppm, 900 ppm, 950 ppm, 1000 ppm or any value or range there between so the total of steviol glycosides in solution ranges from about 100 ppm to about 2000 ppm, preferably from about 200 ppm to about 1000 ppm, and more preferably from about 300 ppm to about 500 ppm and any value or range there between, specifically 350 ppm, 400 ppm, or 450 ppm. In yet another embodiment the GSG can be from GSG-RA95 and rebaudioside A can be RA50, RA60, RA80, RA95, RA97, RA98, RA99, or RA99.5. The GSG-RA95 can be present in solution at 50 ppm, 100 ppm, 150 ppm, 200 ppm, 250 ppm, 300 ppm, 350 ppm, 400 ppm, 450 ppm, 500 ppm, 550 ppm, 600 ppm, 650 ppm, 700 ppm, 750 ppm, 800 ppm, 850 ppm, 900 ppm, 950 ppm, 1000 ppm or any value or range there between and rebaudioside A can be present at the solution at 50 ppm, 100 ppm, 150 ppm, 200 ppm, 250 ppm, 300 ppm, 350 ppm, 400 ppm, 450 ppm, 500 ppm, 550 ppm, 600 ppm, 650 ppm, 700 ppm, 750 ppm, 800 ppm, 850 ppm, 900 ppm, 950 ppm, 1000 ppm or any value or range there between so the total of steviol glycosides in solution ranges from about 100 ppm to about 2000 ppm, preferably from about 200 ppm to about 1000 ppm, and more preferably from about 300 ppm to about 500 ppm and any value or range there between, specifically 350 ppm, 400 ppm, or 450 ppm. In yet another embodiment, the GSG can be from GSG-RA20, and rebaudioside A can be RA50, RA60, RA80, RA95, RA97, RA98, RA99, or RA99.5. The GSG-RA20 can be present in solution at 50 ppm, 100 ppm, 150 ppm, 200 ppm, 250 ppm, 300 ppm, 350 ppm, 400 ppm, 450 ppm, 500 ppm, 550 ppm, 600 ppm, 650 ppm, 700 ppm, 750 ppm, 800 ppm, 850 ppm, 900 ppm, 950 ppm, 1000 ppm or any value or range there between and rebaudioside A can be present at the solution at 50 ppm, 100 ppm, 150 ppm, 200 ppm, 250 ppm, 300 ppm, 350 ppm, 400 ppm, 450 ppm, 500 ppm, 550 ppm, 600 ppm, 650 ppm, 700 ppm, 750 ppm, 800 ppm, 850 ppm, 900 ppm, 950 ppm, 1000 ppm or any value or range there between so the total of steviol glycosides in solution ranges from about 100 ppm to about 2000 ppm, preferably from about 200 ppm to about 1000 ppm, and more preferably from about 300 ppm to about 500 ppm and any value or range there between, specifically 350 ppm, 400 ppm, or 450 ppm. In yet another embodiment the GSG can be from GSG-RA40, and rebaudioside A can be RA50, RA60, RA80, RA95, RA97, RA98, RA99, or RA99.5. The GSG-RA40 can be present in solution at 50 ppm, 100 ppm, 150 ppm, 200 ppm, 250 ppm, 300 ppm, 350 ppm, 400 ppm, 450 ppm, 500 ppm, 550 ppm, 600 ppm, 650 ppm, 700 ppm, 750 ppm, 800 ppm, 850 ppm, 900 ppm, 950 ppm, 1000 ppm or any value or range there between and rebaudioside A can be present at the solution at 50 ppm, 100 ppm, 150 ppm, 200 ppm, 250 ppm, 300 ppm, 350 ppm, 400 ppm, 450 ppm, 500 ppm, 550 ppm, 600 ppm, 650 ppm, 700 ppm, 750 ppm, 800 ppm, 850 ppm, 900 ppm, 950 ppm, 1000 ppm or any value or range there between so the total of steviol glycosides in solution ranges from about 100 ppm to about 2000 ppm, preferably from about 200 ppm to about 1000 ppm, and more preferably from about 300 ppm to about 500 ppm and any value or range there between, specifically 350 ppm, 400 ppm, or 450 ppm. Increasing the amount of GSG-RA20, GSG-RA30, or GSG-RA40, or GSG-RA50 or GSG-RA80 or GSG-RA95 can provide a *Stevia* containing composition with increased sweetness and/or solubility compared to an identical composition not containing GSG-RA20, or GSG-RA30, or GSG-RA40, or GSG-RA50 or GSG-RA80 or GSG-RA95. A GSG-RA20, or GSG-RA30, or GSG-RA40, or GSG-RA50 or GSG-RA80 or GSG-RA95 containing composition having increased sweetness can also reduce the amount of other more costly steviol glycosides while at the same time lowering the total amount of steviol glycosides present in the composition. While not to be bound by theory, it is believed that the combination of GSG-RA20, or GSG-RA30, or GSG-RA40, or GSG-RA50 or GSG-RA80 or GSG-RA95 with stevuol glycoside such as RA97, RA75+RB15, RA+RD, RA80+RB10+RD6 at certain ratios provides a synergistic effect to increase sweetness beyond the sweetness expected by simply combining the two different sweeteners, and the combination of GSG-(RA50+RB8), GSG-(RA30+RC15), and GSG-(RA40+RB8) with stevuol glycoside such as RA97 at certain ratios provides a synergistic effect to increase sweetness beyond the sweetness expected by simply combining the two different sweeteners.

The GSG compositions of the current embodiments can also contain one or more salts. The one or more salt can include sodium carbonate, sodium bicarbonate, sodium chloride, potassium chloride, magnesium chloride, sodium sulfate, magnesium sulfate, and potassium sulfate, or any edible salt, for example calcium salts, a metal or metal alkali halide, a metal or metal alkali carbonates, bicarbonates, a metal or metal alkali phosphates, biphosphates, pyrophosphate, triphosphate, metaphosphate, a metal or metal alkali sulfate or metabisulfate.

Alternatively other additives can be used in the GSG compositions to enhance flavor characteristics that are sweet, fruity, floral, herbaceous, spicy, aromatic, pungent, "nut-like" (e.g., almond, pecan), "spicy" (e.g., cinnamon, clove, nutmeg, anise and wintergreen), "non-citrus fruit" flavor (e.g., strawberry, cherry, apple, grape, currant, tomato, gooseberry and blackberry), "citrus fruit" flavor (e.g., orange, lemon and grapefruit), and other useful flavors, including coffee, cocoa, peppermint, spearmint, vanilla and maple.

The GSG compositions noted herein can be used as a sugar substitute alone or in combination with a food product.

The GSG compositions noted herein can be used in beverages, broths, and beverage preparations selected from the group comprising carbonated, non-carbonated, frozen, semi-frozen ("slush"), non-frozen, ready-to-drink, concentrated (powdered, frozen, or syrup), dairy, non-dairy, herbal, non-herbal, caffeinated, non-caffeinated, alcoholic, non-alcoholic, flavored, non-flavored, vegetable-based, fruit-based, root/tuber/corm-based, nut-based, other plant-based, cola-based, chocolate-based, meat-based, seafood-based, other animal-based, algae-based, calorie enhanced, calorie-reduced, and calorie-free products, optionally dispensed in open containers, cans, bottles or other packaging. Such beverages and beverage preparations can be in ready-to-drink, ready-to-cook, ready-to-mix, raw, or ingredient form and can use the *Stevia* composition as a sole sweetener or as a co-sweetener.

The GSG compositions noted herein can be used in foods and food preparations (e.g., sweeteners, soups, sauces, flavorings, spices, oils, fats, and condiments) from dairy-based, cereal-based, baked, vegetable-based, fruit-based, root/tuber/corm-based, nut-based, other plant-based, egg-based, meat-based, seafood-based, other animal-based, algae-based, processed (e.g., spreads), preserved (e.g., meals-ready-to-eat rations), and synthesized (e.g., gels) products.

Such foods and food preparations can be in ready-to-eat, ready-to-cook, ready-to-mix, raw, or ingredient form and can use the *Stevia* compositions as a sole sweetener or as a co-sweetener.

The GSG compositions noted herein can be used in candies, confections, desserts, and snacks selected from the group comprising dairy-based, cereal-based, baked, vegetable-based, fruit-based, root/tuber/corm-based, nut-based, gum-based, other plant-based, egg-based, meat-based, seafood-based, other animal-based, algae-based, processed (e.g., spreads), preserved (e.g., meals-ready-to-eat rations), and synthesized (e.g., gels) products. Such candies, confections, desserts, and snacks can be in ready-to-eat, ready-to-cook, ready-to-mix, raw, or ingredient form, and can use the *Stevia* based compositions as a sole sweetener or as a co-sweetener.

The GSG compositions noted herein can be used in prescription and over-the-counter pharmaceuticals, assays, diagnostic kits, and therapies selected from the group comprising weight control, nutritional supplement, vitamins, infant diet, diabetic diet, athlete diet, geriatric diet, low carbohydrate diet, low fat diet, low protein diet, high carbohydrate diet, high fat diet, high protein diet, low calorie diet, non-caloric diet, oral hygiene products (e.g, toothpaste, mouthwash, rinses, floss, toothbrushes, other implements), personal care products (e.g., soaps, shampoos, rinses, lotions, balms, salves, ointments, paper goods, perfumes, lipstick, other cosmetics), professional dentistry products in which taste or smell is a factor (e.g., liquids, chewables, inhalables, injectables, salves, resins, rinses, pads, floss, implements), medical, veterinarian, and surgical products in which taste or smell is a factor (e.g., liquids, chewables, inhalables, injectables, salves, resins, rinses, pads, floss, implements), and pharmaceutical compounding fillers, syrups, capsules, gels, and coating products.

The GSG compositions noted herein can be used in consumer goods packaging materials and containers selected from the group comprising plastic film, thermoset and thermoplastic resin, gum, foil, paper, bottle, box, ink, paint, adhesive, and packaging coating products.

The GSG compositions noted herein can be used in goods including sweeteners, co-sweeteners, coated sweetener sticks, frozen confection sticks, medicine spoons (human and veterinary uses), dental instruments, presweetened disposable tableware and utensils, sachets, edible sachets, potpourris, edible potpourris, artificial flowers, edible artificial flowers, clothing, edible clothing, massage oils, and edible massage oils.

The GSG compositions described herein can also be used with conventional sweeteners (cane sugar, beet sugar, honey, syrups, sucrose, fructose, maltose, xylitol, sorbitol, dextrose, glucose, mannitol, arabinose, glactactose, mannose, rhamnose, xylose, monk fruit and derivatives, mogorosides 1 through 5, Lohan Guo juice, and other "natural" sweeteners) and artificial or synthetic sweeteners (cyclamates and salts thereof, saccharin and salts thereof, sucralose, aspartame, a *Stevia* composition, acesulfame-K, neotame, thaumatin, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester (hereinafter abbreviated as "ANS9801"), glycyrrhizin, thaumatin, monellin, and other chemically produced high-intensity sweeteners).

Without limitation, the GSG compositions described herein can each individually be in an amorphous form, each individually in a polymorphic form, each individually in a hydrate form, or mixtures thereof.

The following paragraphs enumerated consecutively from 1 through 48 provide for various aspects of the present invention. In one embodiment, in a first paragraph (1), the present invention provides:

1. A composition comprising one or more glycosylated steviol glycoside and one or more steviol glycoside, wherein the composition is in solid or liquid form.

2. The composition of paragraph 1, wherein the amount of glycosylated steviol glycoside in the composition is less than about 70 percentage by weight.

3. The composition of paragraph 2, wherein the amount of glycosylated steviol glycoside in the composition is less than about 50 percentage by weight.

4. The composition of paragraph 2, wherein the amount of glycosylated steviol glycoside in the composition is about 10 or more by weight, less than about 70 percentage by weight.

5. The composition of paragraph 3, wherein the amount of glycosylated steviol glycoside in the composition is about 10 or more by weight, less than about 50 percentage by weight.

6. The composition of paragraph 5, wherein the amount of glycosylated steviol glycoside in the composition is from about 20 to less than about 50 percentage by weight.

7. The composition of paragraph 5, wherein the amount of glycosylated steviol glycoside in the composition is from about 30 to less than about 50 percentage by weight.

8. The composition of paragraph 5, wherein the amount of glycosylated steviol glycoside in the composition is from about 40 to less than about 50 percentage by weight.

9. The composition of paragraph 5, wherein the amount of glycosylated steviol glycoside in the composition is from about 20 to 45 percentage by weight.

10. The composition of paragraph 1, wherein the glycosylated steviol glycoside is derived from steviol glycoside comprising rebaudioside A.

11. The composition of paragraph 2, wherein the glycosylated steviol glycoside is derived from steviol glycoside comprising rebaudioside A.

12. The composition of paragraph 3, wherein the glycosylated steviol glycoside is derived from steviol glycoside comprising rebaudioside A.

13. The composition of paragraph 4, wherein the glycosylated steviol glycoside is derived from steviol glycoside comprising rebaudioside A.

14. The composition of paragraph 5, wherein the glycosylated steviol glycoside is derived from steviol glycoside comprising rebaudioside A.

15. The composition of paragraph 6, wherein the glycosylated steviol glycoside is derived from steviol glycoside comprising rebaudioside A.

16. The composition of paragraph 7, wherein the glycosylated steviol glycoside is derived from steviol glycoside comprising rebaudioside A.

17. The composition of paragraph 8, wherein the glycosylated steviol glycoside is derived from steviol glycoside comprising rebaudioside A.

18. The composition of paragraph 9, wherein the glycosylated steviol glycoside is derived from steviol glycoside comprising rebaudioside A.

19. The composition of paragraph 10, wherein the glycosylated steviol glycoside is derived from steviol glycoside comprising rebaudioside A ranged from about 20 to about 100 percentage by weight.

20. The composition of paragraph 11, wherein the glycosylated steviol glycoside is derived from glycosylating steviol glycoside comprising rebaudioside A ranged from about 20 to about 100 percentage by weight.

21. The composition of paragraph 12, wherein the glycosylated steviol glycoside is derived from glycosylating steviol glycoside comprising rebaudioside A ranged from about 20 to about 100 percentage by weight.

22. The composition of paragraph 13, wherein the glycosylated steviol glycoside is derived from glycosylating steviol glycoside comprising rebaudioside A ranged from about 20 to about 100 percentage by weight.

23. The composition of paragraph 14, wherein the glycosylated steviol glycoside is derived from glycosylating steviol glycoside comprising rebaudioside A ranged from about 20 to about 100 percentage by weight.

24. The composition of paragraph 15, wherein the glycosylated steviol glycoside is derived from glycosylating steviol glycoside comprising rebaudioside A ranged from about 20 to about 100 percentage by weight.

25. The composition of paragraph 16, wherein the glycosylated steviol glycoside is derived from glycosylating steviol glycoside comprising rebaudioside A ranged from about 20 to about 100 percentage by weight.

26. The composition of paragraph 17, wherein the glycosylated steviol glycoside is derived from glycosylating steviol glycoside comprising rebaudioside A ranged from about 20 to about 100 percentage by weight.

27. The composition of paragraph 18, wherein the glycosylated steviol glycoside is derived from glycosylating steviol glycoside comprising rebaudioside A ranged from about 20 to about 100 percentage by weight.

28. The composition of paragraph 19, wherein the amount of rebaudioside A ranges from about 20 to about 49 percentage by weight.

29. The composition of paragraph 20, wherein the amount of rebaudioside A ranges from about 20 to about 49 percentage by weight.

30. The composition of paragraph 21, wherein the amount of rebaudioside A ranges from about 20 to about 49 percentage by weight.

31. The composition of paragraph 22, wherein the amount of rebaudioside A ranges from about 20 to about 49 percentage by weight.

32. The composition of paragraph 23, wherein the amount of rebaudioside A ranges from about 20 to about 49 percentage by weight.

33. The composition of paragraph 24, wherein the amount of rebaudioside A ranges from about 20 to about 49 percentage by weight.

34. The composition of paragraph 25, wherein the amount of rebaudioside A ranges from about 20 to about 49 percentage by weight.

35. The composition of paragraph 26, wherein the amount of rebaudioside A ranges from about 20 to about 49 percentage by weight.

36. The composition of paragraph 27, wherein the amount of rebaudioside A ranges from about 20 to about 49 percentage by weight.

37. The composition of paragraph 28, wherein the amount of rebaudioside A ranges from about 20 to about 40 percentage by weight.

38. The composition of paragraph 29, wherein the amount of rebaudioside A ranges from about 20 to about 40 percentage by weight.

39. The composition of paragraph 30, wherein the amount of rebaudioside A ranges from about 20 to about 40 percentage by weight.

40. The composition of paragraph 31, wherein the amount of rebaudioside A ranges from about 20 to about 40 percentage by weight.

41. The composition of paragraph 32, wherein the amount of rebaudioside A ranges from about 20 to about 40 percentage by weight.

42. The composition of paragraph 33, wherein the amount of rebaudioside A ranges from about 20 to about 40 percentage by weight.

43. The composition of paragraph 34, wherein the amount of rebaudioside A ranges from about 20 to about 40 percentage by weight.

44. The composition of paragraph 35, wherein the amount of rebaudioside A ranges from about 20 to about 40 percentage by weight.

45. The composition of paragraph 36, wherein the amount of rebaudioside A ranges from about 20 to about 40 percentage by weight.

46. The composition of paragraph 19, wherein the amount of rebaudioside A ranges from about 60 to about 97 percentage by weight.

47. The composition of paragraph 20, wherein the amount of rebaudioside A ranges from about 60 to about 97 percentage by weight.

48. The composition of paragraph 21, wherein the amount of rebaudioside A ranges from about 60 to about 97 percentage by weight.

49. The composition of paragraph 22, wherein the amount of rebaudioside A ranges from about 60 to about 97 percentage by weight.

50. The composition of paragraph 23, wherein the amount of rebaudioside A ranges from about 60 to about 97 percentage by weight.

51. The composition of paragraph 24, wherein the amount of rebaudioside A ranges from about 60 to about 97 percentage by weight.

52. The composition of paragraph 25, wherein the amount of rebaudioside A ranges from about 60 to about 97 percentage by weight.

53. The composition of paragraph 26, wherein the amount of rebaudioside A ranges from about 60 to about 97 percentage by weight.

54. The composition of paragraph 27, wherein the amount of rebaudioside A ranges from about 60 to about 97 percentage by weight.

55. The composition of paragraph 19, wherein the amount of rebaudioside A ranges from about 50 to about 59 percentage by weight.

56. The composition of paragraph 20, wherein the amount of rebaudioside A ranges from about 50 to about 59 percentage by weight.

57. The composition of paragraph 21, wherein the amount of rebaudioside A ranges from about 50 to about 59 percentage by weight.

58. The composition of paragraph 22, wherein the amount of rebaudioside A ranges from about 50 to about 59 percentage by weight.

59. The composition of paragraph 23, wherein the amount of rebaudioside A ranges from about 50 to about 59 percentage by weight.

60. The composition of paragraph 24, wherein the amount of rebaudioside A ranges from about 50 to about 59 percentage by weight.

61. The composition of paragraph 25, wherein the amount of rebaudioside A ranges from about 50 to about 59 percentage by weight.

62. The composition of paragraph 26, wherein the amount of rebaudioside A ranges from about 50 to about 59 percentage by weight.

63. The composition of paragraph 27, wherein the amount of rebaudioside A ranges from about 50 to about 59 percentage by weight.

64. The composition of paragraph 1, wherein the one or more glycosylated steviol glycoside comprises glycosylated rebaudioside A, glycosylated stevioside, glycosylated stevioside+glycosylated rebaudioside A, glycosylated rebaudioside B, glycosylated rebaudioside D, glycosylated rebaudioside A+glycosylated rebaudioside B, glycosylated rebaudioside A+glycosylated rebaudioside D, glycosylated rebaudioside D+glycosylated rebaudioside B, or glycosylated rebaudioside A+glycosylated rebaudioside B+glycosylated rebaudioside D.

65. The composition of paragraph 1, wherein the one or more glycosylated steviol glycoside comprises ≥20% glycosylated rebaudioside A, glycosylated stevioside, glycosylated stevioside+glycosylated rebaudioside A, glycosylated rebaudioside B, glycosylated rebaudioside D, glycosylated rebaudioside A+glycosylated rebaudioside B, glycosylated rebaudioside A+glycosylated rebaudioside D, glycosylated rebaudioside D+glycosylated rebaudioside B, or glycosylated rebaudioside A+glycosylated rebaudioside B+glycosylated rebaudioside D, based on total glycosides or total glycosylated steviol glycosides in the composition.

66. The composition of paragraph 65, wherein the one or more glycosylated steviol glycoside comprises ≥30% glycosylated rebaudioside A, glycosylated stevioside, glycosylated stevioside+glycosylated rebaudioside A, glycosylated rebaudioside B, glycosylated rebaudioside D, glycosylated rebaudioside A+glycosylated rebaudioside B, glycosylated rebaudioside A+glycosylated rebaudioside D, glycosylated rebaudioside D+glycosylated rebaudioside B, or glycosylated rebaudioside A+glycosylated rebaudioside B+glycosylated rebaudioside D, based on total glycosides or total glycosylated steviol glycosides in the composition.

67. The composition of paragraph 66, wherein the one or more glycosylated steviol glycoside comprises ≥40% glycosylated rebaudioside A, glycosylated stevioside, glycosylated stevioside+glycosylated rebaudioside A, glycosylated rebaudioside B, glycosylated rebaudioside D, glycosylated rebaudioside A+glycosylated rebaudioside B, glycosylated rebaudioside A+glycosylated rebaudioside D, glycosylated rebaudioside D+glycosylated rebaudioside B, or glycosylated rebaudioside A+glycosylated rebaudioside B+glycosylated rebaudioside D, based on total glycosides or total glycosylated steviol glycosides in the composition.

68. The composition of paragraph 67, wherein the one or more glycosylated steviol glycoside comprises ≥60% glycosylated rebaudioside A, glycosylated stevioside, glycosylated stevioside+glycosylated rebaudioside A, glycosylated rebaudioside B, glycosylated rebaudioside D, glycosylated rebaudioside A+glycosylated rebaudioside B, glycosylated rebaudioside A+glycosylated rebaudioside D, glycosylated rebaudioside D+glycosylated rebaudioside B, or glycosylated rebaudioside A+glycosylated rebaudioside B+glycosylated rebaudioside D, based on total glycosides or total glycosylated steviol glycosides in the composition.

69. The composition of paragraph 1, wherein the glycosylated steviol glycoside is derived from steviol glycoside comprising rebaudioside A, and rebaudioside B and/or rebaudioside C.

70. The composition of paragraph 2, wherein the glycosylated steviol glycoside is derived from steviol glycoside comprising rebaudioside A, and rebaudioside B and/or rebaudioside C.

71. The composition of paragraph 65, wherein the glycosylated steviol glycoside is derived from steviol glycoside comprising from about 20 to about 97 percentage by weight of rebaudioside A, and from about 0 to about 10 percentage by weight of rebaudioside B and/or from about 5 to about 20 percentage by weight of rebaudioside C.

72. The composition of paragraph 67, wherein the glycosylated steviol glycoside is derived from steviol glycoside comprising from about 30 to about 60 percentage by weight of rebaudioside A, and from about 0.5 to about 8 percentage by weight of rebaudioside B and/or from about 5 to about 18 percentage by weight of rebaudioside C.

73. The composition of paragraph 1, wherein the one or more steviol glycoside is steviol, stevioside, steviolbioside, rebaudioside A, rebaudioside B, rebaudioside C, rebaudioside D, rebaudioside E, rebaudioside F, rebaudioside M, rubusoside, or dulcoside A.

74. The composition of paragraph 73, wherein the one or more steviol glycoside is rebaudioside A, rebaudioside B, rebaudioside D, rebaudioside A+rebaudioside B, rebaudioside A+rebaudioside D, rebaudioside B+rebaudioside D, or rebaudioside A+rebaudioside B+rebaudioside D.

75. The composition of paragraph 73, wherein the steviol glycoside comprises from about 50 to about 99.5 percentage by weight of rebaudioside A.

76. The composition of paragraph 75, wherein the steviol glycoside comprises from about 75 to about 97 percentage by weight of rebaudioside A.

77. The composition of paragraph 76, wherein steviol glycoside further comprises from 0 to about 20 percentage by weight of rebaudioside B and/or from 0 to about 10 percentage by weight of rebaudioside D.

78. The composition of claim 77, wherein steviol glycoside further comprises from about 10 to about 15 percentage by weight of rebaudioside B and/or from about 6 to about 10 percentage by weight of rebaudioside D.

79. The composition of paragraph 75, wherein the rebaudioside A is RA20, RA40, RA50, RA60, RA80, RA95, RA97, RA98, RA99, or RA99.5.

80. The composition of paragraph 79, wherein the glycosylated steviol glycoside derived from the glycosylation of RA50 comprises rebaudioside A, rebaudioside A-G1, rebaudioside A-G2, stevioside, and stevioside-G1, stevioside-G2.

81. The composition of paragraph 80, wherein the glycosylated steviol glycoside derived from the glycosylation of RA50 comprises rebaudioside A, strebaudioside A-G1, rebaudioside A-G2, rebaudioside A-G3, rebaudioside A-G4, rebaudioside A-G5, rebaudioside A-G6, rebaudioside A-G7, glycosylated rebaudioside A having glycosyl group to be more than 7, stevioside, stevioside-G1, stevioside-G2, stevioside-G3, stevioside-G4, stevioside-G5, stevioside G6, stevioside-G7, and glycosylated stevioside having glycosyl group to be more than 7. Glycosylated rebaudioside C can not be detected in the glycosylated steviol glycoside derived from the glycosylation of RA50.

82. The composition of paragraph 79, wherein the glycosylated steviol glycoside derived from the glycosylation of RA80 comprises rebaudioside A, rebaudioside A-G1, rebaudioside A-G2.

83. The composition of paragraph 82, wherein the glycosylated steviol glycoside derived from the glycosylation of RA80 comprises rebaudioside A, rebaudioside A-G1, rebaudioside A-G2, rebaudioside A-G3, rebaudioside A-G4, rebaudioside A-G5, rebaudioside A-G6, rebaudioside A-G7 and glycosylated rebaudioside A having glycosyl group to be more than 7. Glycosylated rebaudioside C can not be detected in the glycosylated steviol glycoside derived from the glycosylation of RA80.

84. The composition of paragraph 79, wherein the glycosylated steviol glycoside derived from the glycosylation of RA95 comprises rebaudioside A, rebaudioside A-G1, rebaudioside A-G2.

85. The composition of paragraph 84, wherein the glycosylated steviol glycoside derived from the glycosylation of RA95 comprises rebaudioside A, rebaudioside A-G1, rebaudioside A-G2, rebaudioside A-G3, rebaudioside A-G4, rebaudioside A-G5, rebaudioside A-G6, rebaudioside A-G7 and glycosylated rebaudioside A having glycosyl group to be more than 7. Glycosylated rebaudioside C can not be detected in the glycosylated steviol glycoside derived from the glycosylation of RA95.

86. The composition of paragraph 79, wherein the glycosylated steviol glycoside derived from the glycosylation of RA20 comprises rebaudioside A, rebaudioside A-G1, rebaudioside A-G2, stevioside, stevioside-G1, stevioside-G2, rebaudioside C, rebaudioside C-G1, and rebaudioside C-G2.

87. The composition of paragraph 86, wherein the glycosylated steviol glycoside derived from the glycosylation of RA20 comprises rebaudioside A, rebaudioside A-G1, rebaudioside A-G2, rebaudioside A-G3, rebaudioside A-G4, rebaudioside A-G5, rebaudioside A-G6, rebaudioside A-G7, glycosylated rebaudioside A having glycosyl group to be more than 7, stevioside, stevioside-G1, stevioside-G2, stevioside-G3, stevioside-G4, stevioside-G5, stevioside G6, stevioside-G7, glycosylated stevioside having glycosyl group to be more than 7, rebaudioside C, rebaudioside C-G1, rebaudioside C-G2, rebaudioside C-G3, rebaudioside C-G4, rebaudioside C-G5, rebaudioside C-G6, rebaudioside C-G7, and glycosylated rebaudioside C having glycosyl group to be more than 7.

88. The composition of paragraph 87, wherein the amount of glycosylated steviol glycoside derived by rebaudioside A is from about 30 to about 40 percantage by weight, the amount of glycosylated steviol glycoside derived by stevioside is from about 20 to about 30 percantage by weight, and the amount of glycosylated steviol glycoside derived by rebaudioside C is from about 10 to about 20 percantage by weight.

89. The composition of paragraph 88, wherein the glycosylated steviol glycoside derived from the glycosylation of RA40 comprises rebaudioside A, rebaudioside A-G1, rebaudioside A-G2, stevioside, stevioside-G1, stevioside-G2, rebaudioside C, rebaudioside C-G1, and rebaudioside C-G2.

90. The composition of paragraph 89, wherein the glycosylated steviol glycoside derived from the glycosylation of RA40 comprises rebaudioside A, rebaudioside A-G1, rebaudioside A-G2, rebaudioside A-G3, rebaudioside A-G4, rebaudioside A-G5, rebaudioside A-G6, rebaudioside A-G7, glycosylated rebaudioside A having glycosyl group to be more than 7, stevioside, stevioside-G1, stevioside-G2, stevioside-G3, stevioside-G4, stevioside-G5, stevioside G6, stevioside-G7, and glycosylated stevioside having glycosyl group to be more than 7. Glycosylated rebaudioside C can not be detected in the glycosylated steviol glycoside derived from the glycosylation of RA40.

91. The composition of paragraph 1, wherein the composition is an amorphous solid.

92. The composition of paragraph 91, wherein the ratio of the one or more glycosylated steviol glycoside to the one or more steviol glycoside is 1 to 0.4 or more; preferably 1 to 1 or more.

93. The composition of paragraph 92, wherein the ratio of the one or more glycosylated steviol glycoside to the one or more steviol glycoside is from about 1:0.4 to about 1:9, preferably 1:1 to 1:9.

94. The composition of paragraph 93, wherein the ratio of the one or more glycosylated steviol glycoside to the one or more steviol glycoside is from about 1:1 to about 1:2.3, preferably 1:1 to 1:1.5, more preferably 1:1.2 to 1:4.

95. The composition of any of paragraph 1, wherein the total glycosides concentration ranges from about 100 ppm to about 1000 ppm in solution.

96. The composition of paragraph 95, wherein the total glycosides concentration ranges from about 300 ppm to about 500 ppm in solution.

97. The composition of paragraph 96, wherein the total glycosides concentration is about 350 ppm, 400 ppm, or 450 ppm in solution.

98. The composition of paragraph 97, wherein glycosylated steviol glycoside derived from RA50 and steviol glycoside of RA97 together comprise from about 350 ppm to about 450 ppm in solution.

99. The composition of paragraph 97, wherein glycosylated steviol glycoside derived from RA95 and steviol glycoside of RA97 together comprise from about 350 ppm to about 450 ppm in solution.

100. The composition of paragraph 97, wherein glycosylated steviol glycoside derived from RA80 and steviol glycoside of RA97 together comprise from about 350 ppm to about 450 ppm in solution.

101. The composition of paragraph 97, wherein glycosylated steviol glycoside derived from RA50, RA80, RA95, and steviol glycoside of RA97 together comprise from about 350 ppm to about 450 ppm in solution.

102. The composition of paragraph 1, wherein the composition provides a SE of 1-20%, preferably 5-15%, and most preferably 7-12%, e.g., 7%, 8%, 9%, 10%, 11%, 12% in solution.

103. The composition of paragraph 1, further comprising one or more sweeteners, such as cane sugar, beet sugar, honey, sucrose, fructose, maltose, xylitol, sorbitol, dextrose, glucose, mannitol, arabinose, glatactose, mannose, rhamnose, xylose, sucralose, aspartame, *Stevia* acesulfame-K, neotame, thaumatin, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, thaumatin, monellin, monk fruit and derivatives, mogorosides 1 through 5, or Lohan Guo juice.

104. The composition of paragraph 103, the amount of sweeteners is 0.5-10% by weight.

105. The composition of paragraph 1, further comprising one or more salts, such as sodium carbonate, sodium bicarbonate, sodium chloride, potassium chloride, magnesium chloride, sodium sulfate, magnesium sulfate, and potassium sulfate, or any edible salt.

106. A composition comprising one or more half-glycosylated steviol glycoside and one or more steviol glycoside, wherein the composition is in solid or liquid form.

107. The composition of paragraph 106, wherein the one or more half-glycosylated steviol glycoside comprises from about 50% to about 90% glycosylated rebaudioside A, glycosylated stevioside, glycosylated stevioside+glycosylated rebaudioside A, glycosylated rebaudioside B, glycosylated rebaudioside D, glycosylated rebaudioside A+glycosylated rebaudioside B, glycosylated rebaudioside A+glycosylated rebaudioside D, glycosylated rebaudioside D+glycosylated rebaudioside B, or glycosylated rebaudioside A+glycosylated rebaudioside B+glycosylated rebaudioside D, based on total glycosides or total glycosylated steviol glycosides in the composition.

108. The composition of paragraph 107, wherein the one or more steviol glycoside comprises from about 10% to about 50% stevioside, rebaudioside A, rebaudioside B, rebaudioside C, or rebaudioside D, based on total glycosides or total glycosylated steviol glycosides in the composition.

109. A composition comprising a highly soluble multiple glycosylated rebaudioside A glycoside or glycosylated stevioside glycoside, wherein the glycosylated rebaudioside A glycoside or glycosylated stevioside glycoside comprises one or more of rebaudioside A, strebaudioside A-G1, rebaudioside A-G2, rebaudioside A-G3, rebaudioside A-G4, rebaudioside A-G5, rebaudioside A-G6, rebaudioside A-G7, stevioside, stevioside-G1, stevioside-G2, stevioside-G3, stevioside-G4, stevioside-G5, stevioside G6, and stevioside-G7.

110. The highly soluble multiple glycosylated rebaudioside A glycoside or glycosylated stevioside glycoside, wherein the solubility of the glycoside is greater than 0.5 g per 100 g of water.

111. The composition of paragraph 110, wherein the ratio of glycosylated steviol glycoside derived from RA50 to steviol glycosides is 9:1 or more.

112. The highly soluble multiple glycosylated rebaudioside A glycoside or glycosylated stevioside glycoside of paragraph 33, wherein the solubilized glycoside remains stable in the water for greater than 10 days at room temperature.

113. A composition comprising a spray dried or recrystallized multiple glycosylated rebaudioside A glycoside or glycosylated stevioside glycoside and a spray dried or recrystallized *Stevia* extract.

114. The composition of paragraph 113, wherein the spray dried or recrystallized *Stevia* extract comprises rebuadioside A, rebaudioside B, rebaudioside C, rebaudioside D, or rubusoside.

115. The composition of paragraph 114, wherein the spray dried or recrystallized *Stevia* extract has a solubility of 0.5 g per 100 g of water.

116. The composition of paragraph 115 wherein the composition remains stable in the water for greater than 10 days at room temperature.

117. The composition of paragraph 113, wherein the glycosylated rebaudioside A glycoside or glycosylated stevioside glycoside and a spray dried or recrystallized *Stevia* extract are spray dried or recrystallized together.

118. The composition of paragraph 113, wherein the glycosylated rebaudioside A glycoside or glycosylated stevioside glycoside and a spray dried or recrystallized *Stevia* extract are spray dried or recrystallized separately.

119. A composition comprising a spray dried or recrystallized multiple glycosylated rebaudioside A glycoside or glycosylated stevioside glycoside and a *Stevia* extract.

120. A composition comprising a multiple glycosylated rebaudioside A glycoside or glycosylated stevioside glycoside and a spray dried or recrystallized *Stevia* extract.

121. A process for the preparation of a composition comprising one or more glycosylated steviol glycosides and one or more steviol glycosides to provide improved solubility in an aqueous solution comprising the following steps: (1) mixing a glycosylated steviol glycoside and a steviol glycoside with water, (2) heating the mixture while stirring, until the mixture was completely dissolved to obtain a clear solution, (3) further stirring the solution at the temperature, and then cooling to ambient temperature.

122. The process according to paragraph 121, wherein a further step (4) is added to include subjecting the solution to crystallization or spray drying.

123. The process according to paragraph 121 or 122, wherein the mixture is heated to 40-100° C. in step (2).

124. The process according to paragraph 123, wherein the mixture is heated to 50-90° C. in step (2).

125. The process according to paragraph 124, wherein the mixture is heated to 60-70° C. in step (2).

126. The composition of paragraph 1, further comprising cyclodextrin.

In a preferred embodiment, the GSGs used in the present invention are prepared as follows:
i) dissovling tapioca dextrin in RO water,
ii) adding the *Stevia* extract with total steviol glycosides content between 70% and 99% to liquefied dextrin to obtain a mixture, wherein the ratio of dexrin to *Stevia* extract was optimized between 40:60 and 60:40,
iii) adding CGTase enzyme to the mixture and incubating at 60° C. for a desired length of reaction time to glycosylate steviol glycosides with glucose molecules derived from Tapioca dextrin.
iv) after achieving desired ratio of GSG and residual steviol glycoside contents, heating the reaction mixture to 90-100° C. for 30 min to inactivate the CGTase, which is then removed by filter.

v) decoloring and spray drying the resulting solution of GSG, residual steviol glycosides and dextrin.

The invention will be further described with reference to the following non-limiting Examples. It will be apparent to those skilled in the art that many changes can be made in the embodiments described without departing from the scope of the present invention. Thus the scope of the present invention should not be limited to the embodiments described in this application, but only by embodiments described by the language of the claims and the equivalents of those embodiments. Unless otherwise indicated, all percentages are by weight.

EXAMPLES

Compositions of GSGs and steviol glycosides.

TABLE 1

| | \multicolumn{6}{c}{Raw materials} | | | | | |
|---|---|---|---|---|---|---|
| | RA | RD | RB | RC | STV | Total GSG |
| RA97 | 98% | | | | | |
| RA/RD | 93.96% | 4.54% | | | | |
| RA50 | 57.1% | | | | 30.3% | |
| RA95 | 95.1% | | | | | |
| RA98 | 98.4% | | | | 0.4% | |
| RA99.5 | 99.6% | | | | | |
| RA75/RB15 | 77.46% | | 16.45% | | 0.45% | |
| RA80/RB10/RD6 | 77.0% | 6.0% | 11.0% | | | |
| GSG-RA50 | 2.39% | | | | 1.39% | 89.35% |
| GSG-RA95 | 6.00% | | | | | 90.6% |
| GSG-RA60 | 3.22% | | | | 1.07% | 89.64% |
| GSG-RA70 | 3.98% | | | | 0.78% | 89.90% |
| GSG-RA80 | 4.23% | | | | 0.43% | 89.00% |
| GSG-RA90 | 5.42% | | | | 0.14% | 90.07% |
| GSG-RA20 | 3.7% | | | | 2.86% | 74.25% |
| GSG(RA50 + RC5) | | | | | | 77.3% |
| RA50/RC5 | 55.01% | | | 0.5% | 5.65% | |
| GSG(RA30 + RC15) | | | | | | 75.9% |
| RA30/RC15 | 29.8% | | 4.6% | 17.62% | | |
| GSG(RA40 + RB8) | | | | | | 80.2% |
| RA40/RB8 | 41.57% | | 7.65% | 6.49% | | |

GSG-RA20, GSG-RA30, GSG-RA40, GSG-RA50, GSG-RA60, GSG-RA70, GSG-RA80, GSG-RA90, GSG-RA95, GSG-(RA50+RC5), GSG-(RA30+RC15), GSG-(RA40+RB8) were used in the follow examples. GSG-RA20, GSG-RA30, GSG-RA40, GSG-RA50, GSG-RA60, GSG-RA70, GSG-RA80, GSG-RA90, and GSG-RA95 uses RA with stevioside as starting material. Therefore, it is assumed that GSG-RA20, GSG-RA30, GSG-RA40, GSG-RA50 GSG-RA60, GSG-RA70, GSG-RA80, GSG-RA90, and GSG-RA95 contains stevvioside, stevioside-G1, stevioside-G2, stevioside-G3, stevioside-G4, stevioside-G5, RA, RA-G1, RA-G2, RA-G3, RA-G4, and RA-G5 as the main components.

GSG-RA50 used in the following examples can be prepared as follows: 120 g Tapioca dextrin was dissolved in 2 L water; 100 g *Stevia* extract (RA 53.1%, total steviol glycosides 80.6%) was added to liquefied dextrin to obtain a mixture; the dexrin to *Stevia* extract ratio was 55:45; 5 ml CGTase enzyme was added to the mixture and incubated at 60° C. for 48 hours to glycosylate steviol glycosides with glucose molecules derived from Tapioca dextrin.

After desired ratio of GSG and residual steviol glycoside contents achieved, the reaction mixture was heated to 95° C. for 30 min to inactivate the CGTase, which is then removed by filter.

The resulting solution of GSG, residual steviol glycosides and dextrin is decolored and spray dried. Thus yield 230 g white powder GSG-RA50.

GSG-RA95, GSG-RA60, GSG-RA70, GSG-RA80, GSG-RA90, GSG-RA20, GSG-(RA50+RC5), GSG-(RA30+RC15), GSG-(RA40+RB8) can be prepared respectively by the method as the same as that of GSG-RA50.

Evaluation of Taste Profile:

1. The components where mixed and then dissolved in aqueous citric acid (pH 3.8) with ultrasound at room temperature and left to sit for 30 min.

2. Panel: 6 persons

3. Method: For the sweetness evaluation of each sample, the sample was tested in pairwise with several sucrose solutions of given sweetness. The sweetness of each sample was compared with those of the sucrose solutions, and the sweetness was evaluated and recorded according to the judgement that the sweetness of the sample was similar to a specific sugar solution or between specific sugar solutions. The results were recorded as the mean value of the results provided by the panel.

For evaluation of taste profile, the samples were tested and were scored 0-5 according to the increasing sugar like, bitterness, aftertaste and lingering taste profiles. The results were recorded as the mean value of the results provided by the panel.

Example 1

Evaluating the taste profile of GSG-RA50 and RA97 compositions in order to find optimized ratios with preferred synergistic taste effects.

Conditions: The sample were tested in aqueous solution of citric acid at pH 3.8. The control sample was RA97 at 350 ppm, corresponding to 8% SE.

TABLE 2

| | Samples | | |
|---|---|---|---|
| Sample No. | RA97 | GSG-RA50 | total GSG |
| 1 | 350 ppm | — | |
| 2-1 | 300 ppm | 50 ppm | 12.76% |
| 2-2 | 300 ppm | 100 ppm | 22.34% |
| 2-3 | 300 ppm | 150 ppm | 29.78% |
| 3-1 | 250 ppm | 100 ppm | 25.53% |
| 3-2 | 250 ppm | 150 ppm | 33.51% |
| 3-3 | 250 ppm | 200 ppm | 39.71% |
| 4-1 | 200 ppm | 150 ppm | 38.29% |
| 4-2 | 200 ppm | 200 ppm | 44.68% |
| 4-3 | 200 ppm | 250 ppm | 49.64% |
| 5-1 | 150 ppm | 200 ppm | 51.06% |
| 5-2 | 150 ppm | 250 ppm | 55.84% |
| 5-3 | 150 ppm | 300 ppm | 59.57% |
| 6-1 | 100 ppm | 250 ppm | 63.82% |
| 6-2 | 100 ppm | 300 ppm | 67.01% |
| 6-3 | 100 ppm | 350 ppm | 69.49% |

TABLE 3

Results

| Sample No. | RA97 | GSG-RA50 | Total solid content | SE | Sugar like | Bitterness | Aftertaste | Lingering |
|---|---|---|---|---|---|---|---|---|
| 1 | 350 ppm | — | 350 ppm | 8%* | 3 | 2 | 3 | 4 |
| 2-1 | 300 ppm | 50 ppm | 350 ppm | 7% | 3.5 | 0.5 | 2.5 | 3 |
| 2-2 | 300 ppm | 100 ppm | 400 ppm | 8% | 3.5 | 0 | 2 | 2 |
| 2-3 | 300 ppm | 150 ppm | 450 ppm | 8.5% | 3.5 | 0 | 2 | 2 |
| 3-1 | 250 ppm | 100 ppm | 350 ppm | 8% | 4 | 0 | 0.5 | 3 |
| 3-2 | 250 ppm | 150 ppm | 400 ppm | 8.2% | 4 | 0 | 0.5 | 2 |
| 3-3 | 250 ppm | 200 ppm | 450 ppm | 8.5% | 4.5 | 0 | 0 | 2 |
| 4-1 | 200 ppm | 150 ppm | 350 ppm | 7.8% | 4.5 | 0 | 0 | 2 |
| 4-2 | 200 ppm | 200 ppm | 400 ppm | 8% | 4 | 0 | 0.5 | 2 |
| 4-3 | 200 ppm | 250 ppm | 450 ppm | 8.5% | 4.5 | 0 | 0 | 2 |
| 5-1 | 150 ppm | 200 ppm | 350 ppm | 7% | 4.5 | 0 | 0 | 2 |
| 5-2 | 150 ppm | 250 ppm | 400 ppm | 7.5% | 4 | 0 | 0.5 | 2 |
| 5-3 | 150 ppm | 300 ppm | 450 ppm | 7.5% | 4 | 0 | 1 | 2 |
| 6-1 | 100 ppm | 250 ppm | 350 ppm | 7% | 4.8 | 0 | 0 | 2 |
| 6-2 | 100 ppm | 300 ppm | 400 ppm | 7.5% | 4.8 | 0 | 0 | 2 |
| 6-3 | 100 ppm | 350 ppm | 450 ppm | 7.5% | 4.8 | 0 | 0 | 2 |

*The concentration of the solutions depends on the desired sweetness. In the working examples, the sweetness is set to 8%, but it can be lower or higher, depending on desired applications.

Therefore, the concentration can also be lower or higher, depending on desired applications.

Conclusion

GSG-RA50 improved the taste profile of RA97. Increasing the concentration of GSG-RA50 in the composition increases sugar like (i.e. feels and tastes like sugar). However, the sweetness of the composition decreases at higher ratio of GSG-RA50.

The samples with a solid content of 350 ppm (1, 2-1, 3-1, 4-1, 5-1, 6-1) were selected and examined further as depicted in FIGS. 1-4. As evident from the FIGS. 1-4 the best synergistic effect at 350 ppm total solid content was achieved at a GSG-RA50/RA97 ratio of between 100/250 and 150/200 having a sweetness equal to 350 ppm RA, while achieving the best taste profile.

The samples with about 8% SE (1, 2-2, 3-3, 4-1, 5-2, 6-3) were selected and examined further. In these samples at high and low RA97 concentration, increased GSG-RA50 was needed to achieve desired sweetness. At lower RA97 concentration, the same sweetness of 100% RA97 could not be obtained even with a large amount of GSG-RA50. Thus in order to maintain 8% SE with a decrease in RA97 concentration using GSG-RA50, the concentration of total solid content was increased until the concentration of RA97 reached 200 ppm, demonstrating that there was synergistic effect at this concentration. At low RA97 concentration, the addition of GSG-RA50 cannot compensate for the sweetness of the reduction of same amount RA97, i.e. additional amount of GSG-RA50 should be added. The tendency was reversed until RA97 reached 200 ppm.

Example 2

Evaluating the taste profiles of GSG-RA95 and RA97 compositions to identify optimized ratios with preferred synergistic tastes effects.

Conditions: The samples were tested in aqueous solution of citric acid at pH 3.8. The control sample was RA97 at 350 ppm, corresponding to 8% SE.

TABLE 4

Samples

| Sample No. | RA97 | GSG-RA95 | total GSG |
|---|---|---|---|
| 1 | 350 ppm | — | |
| 2-1 | 300 ppm | 50 ppm | 12.94% |
| 2-2 | 300 ppm | 100 ppm | 22.65% |
| 2-3 | 300 ppm | 150 ppm | 30.20% |
| 3-1 | 250 ppm | 100 ppm | 25.89% |
| 3-2 | 250 ppm | 150 ppm | 33.98% |
| 3-3 | 250 ppm | 200 ppm | 40.27% |
| 4-1 | 200 ppm | 150 ppm | 38.83% |
| 4-2 | 200 ppm | 200 ppm | 45.30% |
| 4-3 | 200 ppm | 250 ppm | 50.33% |
| 5-1 | 150 ppm | 200 ppm | 51.77% |
| 5-2 | 150 ppm | 250 ppm | 56.63% |
| 5-3 | 150 ppm | 300 ppm | 60.40% |
| 6-1 | 100 ppm | 250 ppm | 64.71% |
| 6-2 | 100 ppm | 300 ppm | 67.95% |
| 6-3 | 100 ppm | 350 ppm | 70.47% |

TABLE 5

Results

| Sample No. | RA97 | GSG-RA95 | Total Solid contents | SE | Sugar like | Bitterness | Aftertaste | Lingering |
|---|---|---|---|---|---|---|---|---|
| 1 | 350 ppm | — | 350 ppm | 8% | 3 | 2 | 3 | 4 |
| 2-1 | 300 ppm | 50 ppm | 350 ppm | 7.80% | 3.5 | 0 | 1.5 | 3 |
| 2-2 | 300 ppm | 100 ppm | 400 ppm | 8% | 4 | 0 | 0.5 | 2 |
| 2-3 | 300 ppm | 150 ppm | 450 ppm | 8.50% | 4 | 0 | 0.5 | 2 |

TABLE 5-continued

Results

| Sample No. | RA97 | GSG-RA95 | Total Solid contents | SE | Sugar like | Bitterness | Aftertaste | Lingering |
|---|---|---|---|---|---|---|---|---|
| 3-1 | 250 ppm | 100 ppm | 350 ppm | 8% | 4 | 0 | 0.5 | 2 |
| 3-2 | 250 ppm | 150 ppm | 400 ppm | 8.30% | 4 | 0 | 0.5 | 2 |
| 3-3 | 250 ppm | 200 ppm | 450 ppm | 8.50% | 4.5 | 0 | 0.5 | 2 |
| 4-1 | 200 ppm | 150 ppm | 350 ppm | 8% | 4 | 0 | 0 | 2 |
| 4-2 | 200 ppm | 200 ppm | 400 ppm | 8.30% | 4 | 0 | 0 | 2 |
| 4-3 | 200 ppm | 250 ppm | 450 ppm | 8.50% | 4.5 | 0 | 0 | 2 |
| 5-1 | 150 ppm | 200 ppm | 350 ppm | 7.50% | 4.5 | 0 | 0 | 2 |
| 5-2 | 150 ppm | 250 ppm | 400 ppm | 7.80% | 4.5 | 0 | 0 | 2 |
| 5-3 | 150 ppm | 300 ppm | 450 ppm | 7.80% | 4.5 | 0 | 0 | 2 |
| 6-1 | 100 ppm | 250 ppm | 350 ppm | 6.80% | 4.5 | 0 | 0 | 2 |
| 6-2 | 100 ppm | 300 ppm | 400 ppm | 7.20% | 4.5 | 0 | 0 | 2 |
| 6-3 | 100 ppm | 350 ppm | 450 ppm | 7.50% | 4.8 | 0 | 0 | 2 |

Conclusion

GSG-RA95 improved the taste profile of RA97. With the increase of the ratio of GSG-RA95, the overall taste profile of the composition became more sugar like (i.e. like sugar). However, the sweetness of the composition decreased at a high ratio of GSG-RA95.

The samples with a solid content of 350 ppm (1, 2-1, 3-1, 4-1, 5-1, 6-1) were selected and examined further in FIGS. 5-8. As evident from the FIGS. 5-8 the best synergistic effect at 350 ppm total solid content was achieved at a GSG-RA95/RA97 ratio of between 100/250 and 150/200 having a sweetness equal to 350 ppm RA, while achieving the best taste profile.

The samples with about 8% SE (1, 2-2, 3-3, 4-1, 5-2, 6-3) were selected and examined further. In these samples at high and low RA97 concentration, increased GSG-RA95 was needed to achieve desired sweetness. At lower RA97 concentration, the same sweetness of 100% RA97 could not be obtained even with a large amount of GSG-RA95. Thus in order to maintain 8% SE with a decrease in RA97 concentration using GSG-RA95, the concentration of total solid content was increased until the concentration of RA97 reached 250 ppm and the effect was maintained until the concentration of RA97 reached 200 ppm, demonstrating that there was synergistic effect at these concentrations.

Example 3

Evaluating the taste profile of GSG-RA50, GSG-RA95 and RA97 compositions in order to find optimized ratios with preferred synergistic taste effects.

Conditions: The samples were tested in aqueous solution of citric acid at pH 3.8. The control sample was RA97 at 350 ppm, corresponding to 8% SE.

TABLE 6

Samples

| Sample No. | RA97 | GSG-RA50 | GSG-RA95 | total GSG |
|---|---|---|---|---|
| 1 | 350 | — | — | |
| 2 | 200 | 25 | 175 | 45.22% |
| 3 | 200 | 50 | 150 | 45.14% |
| 4 | 200 | 75 | 125 | 45.07% |
| 5 | 200 | 100 | 100 | 44.99% |
| 6 | 200 | 125 | 75 | 44.91% |
| 7 | 200 | 150 | 50 | 44.83% |
| 8 | 200 | 175 | 25 | 44.75% |

TABLE 7

Results

| Sample No. | RA97 (ppm) | GSG-RA50 (ppm) | GSG-RA95 (ppm) | Sugar like | Bitterness | Aftertaste | Lingering |
|---|---|---|---|---|---|---|---|
| 1 | 350 | — | — | 3 | 2 | 3 | 4 |
| 2 | 200 | 25 | 175 | 4.5 | 0 | 1 | 2 |
| 3 | 200 | 50 | 150 | 5 | 0 | 1 | 2 |
| 4 | 200 | 75 | 125 | 5 | 0 | 0 | 1 |
| 5 | 200 | 100 | 100 | 4.5 | 0 | 0 | 2 |
| 6 | 200 | 125 | 75 | 4.5 | 0 | 0.5 | 2 |
| 7 | 200 | 150 | 50 | 4.5 | 0 | 0.5 | 2 |
| 8 | 200 | 175 | 25 | 4.5 | 0 | 0.5 | 2 |

Conclusion

The mixture of GSG-RA50 and GSG-RA95 improved the taste profile of RA97 at all ratios. The improvement was more significant at a GSG-RA50/GSG-RA95 ratio of 50/150 and 75/125 where the taste profile was more sugar like.

Example 4

Evaluating the taste profile of GSG-RA95 and steviol glycoside comprising RD (RA/RD) compositions in order to find optimized ratio with preferred synergistic taste effects.

Raw material: RA/RD (RA 93.96%, RD 4.54%)

TABLE 8

Samples

| Sample No. | RA/RD | GSG-RA95 | total GSG |
|---|---|---|---|
| 1 | 350 ppm | — | |
| 2-1 | 200 ppm | 150 ppm | 38.83% |
| 2-2 | 200 ppm | 200 ppm | 45.30% |
| 2-3 | 200 ppm | 250 ppm | 50.33% |
| 3-1 | 150 ppm | 200 ppm | 51.77% |
| 3-2 | 150 ppm | 250 ppm | 56.63% |
| 3-3 | 150 ppm | 300 ppm | 60.40% |

TABLE 9

Results

| Sample No. | RA/RD (ppm) | GSG-RA95 (ppm) | Total solid content (ppm) | SE | Sugar like | Bitterness | Aftertaste | Lingering |
|---|---|---|---|---|---|---|---|---|
| 1 | 350 | — | 350 | 8.5% | 3.5 | 1 | 2 | 2.5 |
| 2-1 | 200 | 150 | 350 | 8.5% | 4 | 0 | 0.5 | 2 |
| 2-2 | 200 | 200 | 400 | 8.5% | 4 | 0 | 0 | 2 |
| 2-3 | 200 | 250 | 450 | 8.8% | 4 | 0 | 0.5 | 2 |
| 3-1 | 150 | 200 | 350 | 8.2% | 4.5 | 0 | 0 | 2 |
| 3-2 | 150 | 250 | 400 | 8.7% | 4.5 | 0 | 0.5 | 2 |
| 3-3 | 150 | 300 | 450 | 8.8% | 4.5 | 0 | 0.5 | 2 |

Conclusion

GSG-RA95 improved both the bitterness and the aftertaste of RA/RD having a wide effective range. In comparison to RA97, RA/RD had wider synergistic range with GSG-RA95.

Example 5

Evaluating the taste profile of GSG-RA50 and steviol glycoside comprising RD (RA/RD) compositions in order to find optimized ratios with preferred synergistic taste effects.
Raw material: RA/RD, (RA 93.96%, RD 4.54%)

TABLE 10

Samples

| Sample No. | (RA/RD) | GSG-RA50 | total GSG |
|---|---|---|---|
| 1 | 350 ppm | — | |
| 2-1 | 200 ppm | 150 ppm | 38.29% |
| 2-2 | 200 ppm | 200 ppm | 44.68% |
| 2-3 | 200 ppm | 250 ppm | 49.64% |
| 3-1 | 150 ppm | 200 ppm | 51.06% |
| 3-2 | 150 ppm | 250 ppm | 55.84% |
| 3-3 | 150 ppm | 300 ppm | 59.57% |

TABLE 11

Results

| Sample No. | RA/RD (ppm) | GSG-RA50 (ppm) | Total solid content (ppm) | SE | Sugar like | Bitterness | Aftertaste | Lingering |
|---|---|---|---|---|---|---|---|---|
| 1 | 350 | — | 350 | 8.5% | 3.5 | 1 | 2 | 2.5 |
| 2-1 | 200 | 150 | 350 | 8.0% | 4 | 0 | 0 | 2 |
| 2-2 | 200 | 200 | 400 | 8.5% | 4 | 0 | 0 | 2 |
| 2-3 | 200 | 250 | 450 | 8.8% | 4 | 0 | 0 | 2 |
| 3-1 | 150 | 200 | 350 | 7.7% | 4 | 0 | 0 | 2 |
| 3-2 | 150 | 250 | 400 | 8% | 4.5 | 0 | 0 | 2 |
| 3-3 | 150 | 300 | 450 | 8% | 4 | 0 | 0.5 | 2 |

GSG-RA50 improved both the bitterness and the aftertaste of RA/RD. As for the synergistic effects in sweetness, GSG-RA50 was not as good as GSG-RA95 due to a narrow synergistic range.

Example 6: Effects of GSG-RA50 on the Taste Profile of Steviol Glycosides

GSG-RA50 was mixed with various steviol glycosides at a ratio of 1:1, and the taste profile of the mixtures water (500 ppm) were tested.

TABLE 12

RA50

| Sample | GSG-RA50 | RA50 | SE | Bitter taste | Aftertaste (bitter, metallic, licorice) | Lingering |
|---|---|---|---|---|---|---|
| 1-1 | 250 ppm | 250 ppm | 6.8% | 0.5 | 1.5 | 3.5 |
| 1-2 | — | 500 ppm | 6.5% | 2 | 5 | 5 |

GSG-RA50 Rich improved the taste profile of RA50.

TABLE 13

RA95

| Sample | GSG-RA50 | RA95 | SE | Bitter taste | Aftertaste (bitter, metallic, licorice) | Lingering | total GSG |
|---|---|---|---|---|---|---|---|
| 1-1 | 250 ppm | 250 ppm | 7.4% | 0 | 1 | 3 | 44.68% |
| 1-2 | — | 500 ppm | 7.5% | 0.5 | 3 | 3 | |

GSG-RA50 improved the bitter and metallic aftertaste of RA95, but did not alter the sweetness significantly.

TABLE 14

RA97

| Sample | GSG-RA50 | RA97 | SE | Bitter taste | Aftertaste (bitter, metallic, licorice) | Lingering | total GSG |
|---|---|---|---|---|---|---|---|
| 1-1 | 250 ppm | 250 ppm | 7.4% | 0 | 2 | 2.5 | 44.68% |
| 1-2 | — | 500 ppm | 7.5% | 0.5 | 3.5 | 3 | |

GSG-RA50 improved the bitter and metallic aftertaste of RA97, but did not alter the sweetness significantly.

TABLE 15

RA98

| Sample | GSG-RA50 | RA98 | SE | Bitter taste | Aftertaste (bitter, metallic, licorice) | Lingering | total GSG |
|---|---|---|---|---|---|---|---|
| 1-1 | 250 ppm | 250 ppm | 7.5% | 0.5 | 0.5 | 2.5 | 44.68% |
| 1-2 | — | 500 ppm | 7.5% | 0.5 | 2 | 3 | |

GSG-RA50 improved the bitter and metallic aftertaste of RA98, but did not alter the sweetness significantly.

TABLE 16

RA99.5

| Sample | GSG-RA50 | RA99.5 | SE | Bitter taste | Aftertaste (bitter, metallic, licorice) | Lingering | total GSG |
|---|---|---|---|---|---|---|---|
| 1-1 | 250 ppm | 250 ppm | 7.8% | 0 | 1 | 2 | 44.68% |
| 1-2 | — | 500 ppm | 8.0% | 0 | 2 | 2 | |

GSG-RA50 improved the bitter aftertaste of RA99.5, but did not alter the sweetness significantly.

TABLE 17

RA/RD

| Sample | GSG-RA50 | RA/RD | SE | Bitter taste | Aftertaste (bitter, metallic, licorice) | Lingering | total GSG |
|---|---|---|---|---|---|---|---|
| 1-1 | 250 ppm | 250 ppm | 7.7% | 0 | 1 | 2 | 44.68% |
| 1-2 | — | 500 ppm | 7.8% | 0 | 1 | 2 | |

GSG-RA50 did not affect the taste profile of RA/RD, however GSG-RA50 is cheaper than RD and thus will reduce cost.

TABLE 18

Control sample.

| Sample | GSG-RA50 | SE | Bitter taste | Aftertaste (bitter, metallic, licorice) | Lingering |
|---|---|---|---|---|---|
| | 500 ppm | 6.5% | 0.5 | 2 | 4 |

Example 7: Sweetness of GSG-RA50 and RA97 Compositions

Figure 9:
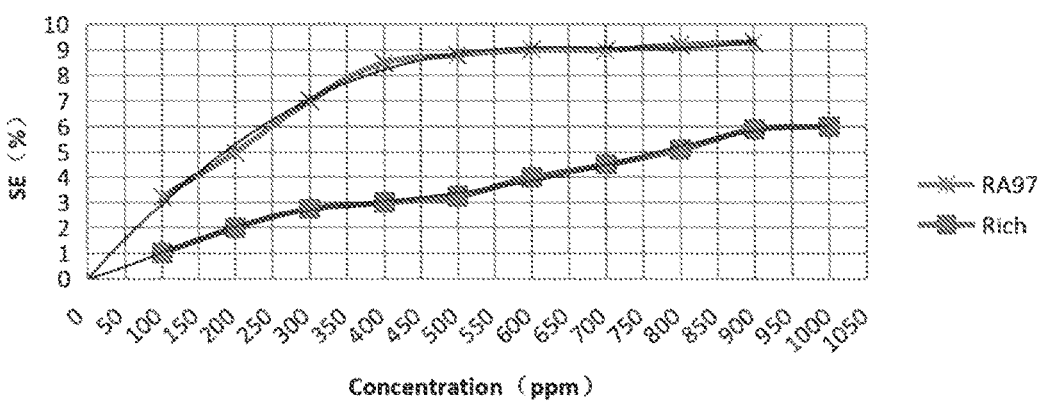
FIG. 9 is a graphical illustration showing the sweetness curve of GSG-RA50 and RA97.

The sweetness of GSG-RA50 and RA97 compositions at varying concentrations was measured according to the sweetness curve (FIG. 9), and the combined sweetness of each composition of GSG-RA50 and RA97 was calculated and compared with the measured value in Table 19.

TABLE 19

| RA97 concentration | Calculated SE of RA97 | GSG-RA50 concentration | Calculated SE of GSG-RA50 | Calculated SE of the composition | Measured SE of the composition |
|---|---|---|---|---|---|
| 350 ppm | — | — | — | — | 8%* |
| 300 ppm | 6.9% | 50 ppm | 0.5% | 7.4% | 7% |
| 300 ppm | 6.9% | 100 ppm | 1% | 7.9% | 8% |
| 300 ppm | 6.9% | 150 ppm | 1.5% | 8.4% | 8.5% |
| 250 ppm | 6% | 100 ppm | 1% | 7% | 8% |
| 250 ppm | 6% | 150 ppm | 1.5% | 7.5% | 8.2% |
| 250 ppm | 6% | 200 ppm | 2% | 8% | 8.5% |
| 200 ppm | 5% | 150 ppm | 1.5% | 6.5% | 7.8% |
| 200 ppm | 5% | 200 ppm | 2% | 7% | 8% |
| 200 ppm | 5% | 250 ppm | 2.4% | 7.4% | 8.5% |
| 150 ppm | 4.2% | 200 ppm | 2% | 6.2% | 7% |
| 150 ppm | 4.2% | 250 ppm | 2.4% | 6.6% | 7.5% |
| 150 ppm | 4.2% | 300 ppm | 2.75% | 6.95% | 7.5% |
| 100 ppm | 3% | 250 ppm | 2.4% | 5.4% | 7% |
| 100 ppm | 3% | 300 ppm | 2.75% | 5.75% | 7.5% |
| 100 ppm | 3% | 350 ppm | 3% | 6% | 7.5% |

*Control sample. 8% SE is equal to the sweetness of 8 g of sucrose dissolved in 100 g water.

Conclusion

The sweetness of GSG-RA50 and RA97 compositions benefit from a synergistic effect that first appears when the concentration of GSG-RA50 reaches 100 ppm.

Example 8

Sweetness of 350 ppm GSG-RA50 and RA97 compositions are shown in Table 20.

TABLE 20

| RA97 | Calc. SE of RA97 | GSG-RA50 | Calc. SE of GSG-RA50 | Calc. SE of the composition | Measured SE of the composition | Calc. sweetness (ppm sugar) of GSG-RA50 per ppm | Measured sweetness (ppm sugar) of GSG-RA50 per ppm |
|---|---|---|---|---|---|---|---|
| 350 ppm | — | — | — | — | 8% | 0 | 0 |
| 300 ppm | 6.9% | 50 ppm | 0.5% | 7.4% | 7% | 100 | 20 |
| 250 ppm | 6% | 100 ppm | 1% | 7% | 8% | 100 | 200 |
| 200 ppm | 5% | 150 ppm | 1.5% | 6.5% | 7.8% | 100 | 186 |
| 150 ppm | 4.2% | 200 ppm | 2% | 6.2% | 7% | 100 | 140 |
| 100 ppm | 3% | 250 ppm | 2.4% | 5.4% | 7% | 96 | 160 |

Calculated SE (ppm sucrose) of GSG-RA50 per ppm=calculated SE of GSG-RA50/concentration of GSG-RA50. Measured sweetness (ppm sucrose) of GSG-RA50 per ppm=(Measured SE−Calculated SE of RA97)/concentration of GSG-RA50.

Conclusion

Figure 10:
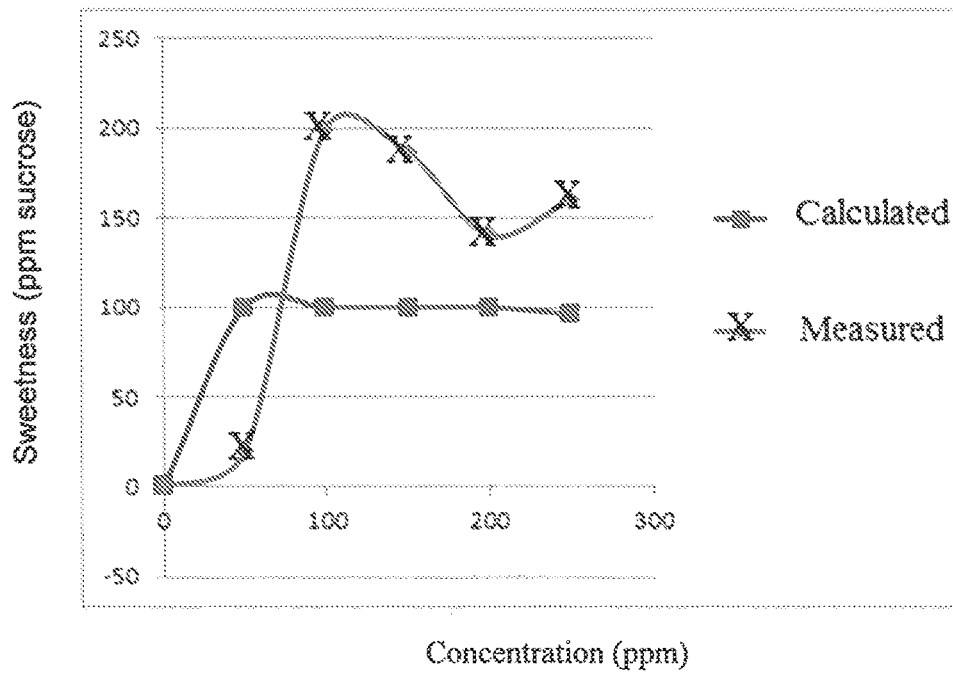
FIG. 10 is a graphical illustration showing the calculated and measured sweetness of GSG-RA50 per ppm in 350 ppm GSG-RA50 and RA97 compositions.

At 350 ppm total solid content, increasing the amount of GSG-RA50 results in a measured contribution to sweetness that was higher than the calculated value (FIG. 10). A positive synergistic sweetness effect was found when GSG-RA50>100 ppm, although the optimized range was 100-150 ppm.

Example 9

Sweetness of 400 ppm GSG-RA50 and RA97 compositions are shown in Table 21.

TABLE 21

| RA97 | Calc. SE of RA97 | GSG-RA50 | Calc. SE of GSG-RA50 | Calc. SE of the composition | Measured SE of the composition | Calc. sweetness (ppm sugar) of GSG-RA50 per ppm | Measured sweetness (ppm sugar) of GSG-RA50 per ppm |
|---|---|---|---|---|---|---|---|
| 300 ppm | 6.9% | 100 oom | 1% | 7.9% | 8% | 100 | 110 |
| 250 ppm | 6% | 150 ppm | 1.5% | 7.5% | 8.2% | 100 | 146.67 |
| 200 ppm | 5% | 200 ppm | 2% | 7% | 8% | 100 | 150 |
| 150 ppm | 4.2% | 250 ppm | 2.4% | 6.6% | 7.5% | 96 | 132 |
| 100 ppm | 3% | 300 ppm | 2.75% | 5.75% | 7.5% | 91.7 | 150 |

Calculated SE (ppm sucrose) of GSG-RA50 per ppm=calculated SE of GSG-RA50/concentration of GSG-RA50. Measured sweetness (ppm sucrose) of GSG-RA50 per ppm=(Measured SE−Calculated SE of RA97)/concentration of GSG-RA50.

Conclusion

Figure 11:
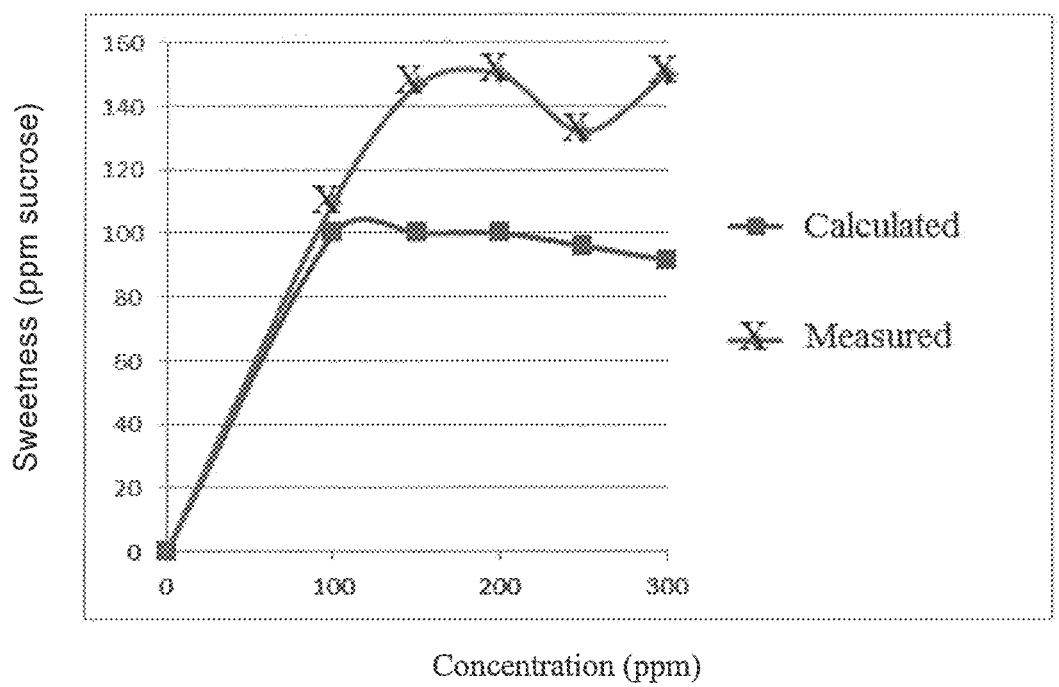
FIG. 11 is a graphical illustration showing the calculated and measured sweetness of GSG-RA50 per ppm in 400 ppm GSG-RA50 and RA97 compositions.

At 400 ppm total solid content, increasing the amount of GSG-RA50 results in a measured contribution to sweetness that was higher than the calculated value (FIG. 11). A positive synergistic sweetness effect was found when GSG-RA50>100 ppm.

Example 10

Sweetness of 450 ppm GSG-RA50 and RA97 compositions are shown in Table 22.

TABLE 22

| RA97 | Calc. SE of RA97 | GSG-RA50 | Calc. SE of GSG-RA50 | Calc. SE of the composition | Measured SE of the composition | Calc. sweetness (ppm sugar) of GSG-RA50 per ppm | Measured sweetness (ppm sugar) of GSG-RA50 per ppm |
|---|---|---|---|---|---|---|---|
| 300 ppm | 6.9% | 150 ppm | 1.5% | 8.4% | 8.5% | 100 | 106.67 |
| 250 ppm | 6% | 200 ppm | 2% | 8% | 8.5% | 100 | 125 |
| 200 ppm | 5% | 250 ppm | 2.4% | 7.4% | 8.5% | 96 | 140 |
| 150 ppm | 4.2% | 300 ppm | 2.75% | 6.95% | 7.5% | 91.7 | 110 |
| 100 ppm | 3% | 350 ppm | 3% | 6% | 7.5% | 85.7 | 128.57 |

Calculated SE (ppm sucrose) of GSG-RA50 per ppm=calculated SE of GSG-RA50/concentration of GSG-RA50. Measured sweetness (ppm sucrose) of GSG-RA50 per ppm=(Measured SE−Calculated SE of RA97)/concentration of GSG-RA50.

Conclusion

Figure 12:
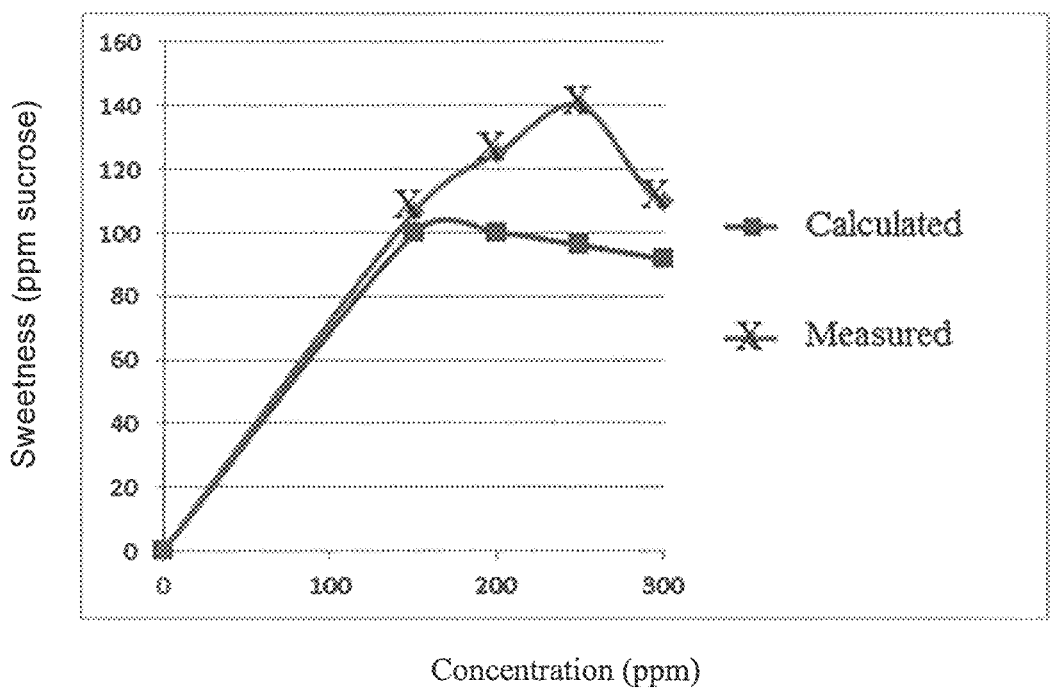
FIG. 12 is a graphical illustration showing the calculated and measured sweetness of GSG-RA50 per ppm in 450 ppm GSG-RA50 and RA97 compositions.

At 450 ppm total solid content, increasing the amount of GSG-RA50 results in a measured contribution to sweetness that was higher than the calculated value (FIG. 12). A positive synergistic sweetness effect was found when GSG-RA50>150 ppm, although the optimized range was 200-250 ppm.

Example 11: Sweetness of GSG-RA95 and RA97 Compositions

Figure 13:
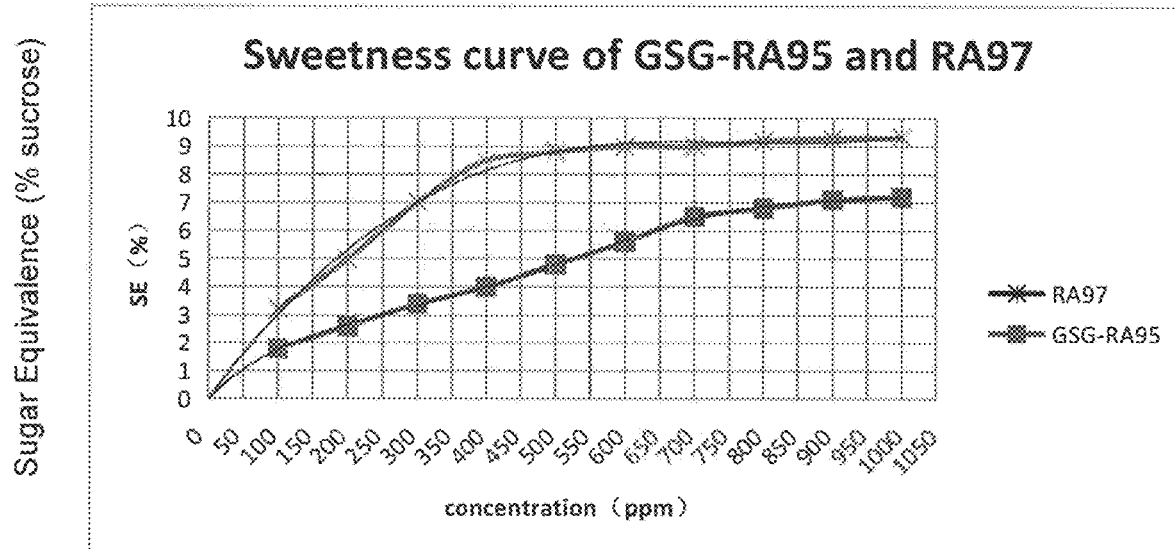
FIG. 13 is a graphical illustration showing the sweetness curve of GSG-RA95 and RA97.

The sweetness of GSG-RA95 and rebaudioside A, 97% purity (RA) RA97 compositions at varying concentrations was measured according to the sweetness curve (FIG. 13), and the combined sweetness of each composition of GSG-RA95 and RA97 was calculated and compared with the measured value in Table 23.

TABLE 23

| RA97 concentration | Calculated SE of RA97 | GSG-RA95 concentration | Calculated SE of GSG-RA95 | Calculated SE of the composition | Measured SE of the composition |
|---|---|---|---|---|---|
| 350 ppm | — | — | — | — | 8% |
| 300 ppm | 6.9% | 50 ppm | 0.7% | 7.6% | 7.8% |
| 300 ppm | 6.9% | 100 ppm | 1.4% | 8.3% | 8% |
| 300 ppm | 6.9% | 150 ppm | 1.9% | 8.8% | 8.5% |
| 250 ppm | 6% | 100 ppm | 1.4% | 7.4% | 8% |

TABLE 23-continued

| RA97 concentration | Calculated SE of RA97 | GSG-RA95 concentration | Calculated SE of GSG-RA95 | Calculated SE of the composition | Measured SE of the composition |
|---|---|---|---|---|---|
| 250 ppm | 6% | 150 ppm | 1.9% | 7.9% | 8.3% |
| 250 ppm | 6% | 200 ppm | 2.2% | 8.2% | 8.5% |
| 200 ppm | 5% | 150 ppm | 1.9% | 6.9% | 8% |
| 200 ppm | 5% | 200 ppm | 2.2% | 7.2% | 8.3% |
| 200 ppm | 5% | 250 ppm | 2.5% | 7.5% | 8.5% |
| 150 ppm | 4.2% | 200 ppm | 2.2% | 6.4% | 7.5% |
| 150 ppm | 4.2% | 250 ppm | 2.5% | 6.7% | 7.8% |
| 150 ppm | 4.2% | 300 ppm | 2.9% | 7.1% | 7.8% |
| 100 ppm | 3% | 250 ppm | 2.5% | 5.5% | 6.8% |
| 100 ppm | 3% | 300 ppm | 2.9% | 5.9% | 7.2% |
| 100 ppm | 3% | 350 ppm | 3.1% | 6.1% | 7.5% |

Conclusion

The sweetness of GSG-RA95 and RA97 compositions benefit from a synergistic effect that first appears when the concentration of GSG-RA95 reaches 100 ppm.

Example 12

Sweetness of 350 ppm GSG-RA95 and RA97 compositions are shown in Table 24.

TABLE 24

| RA97 (ppm) | Calc. SE of RA97 | GSG-RA95 (ppm) | Calc. SE of GSG-RA95 | Calc. SE of the composition | Measured SE of the composition | Calc. sweetness (ppm sucrose) of GSG-RA95 per ppm | Measured sweetness (ppm sucrose) of GSG-RA95 per ppm |
|---|---|---|---|---|---|---|---|
| 350 | — | — | — | — | 8% | 0 | 0 |
| 300 | 6.9% | 50 | 0.7% | 7.6% | 7.8% | 140 | 180 |
| 250 | 6% | 100 | 1.4% | 7.4% | 8% | 140 | 200 |
| 200 | 5% | 150 | 1.9% | 6.9% | 8% | 126.7 | 200 |
| 150 | 4.2% | 200 | 2.2% | 6.4% | 7.5% | 110 | 165 |
| 100 | 3% | 250 | 2.5% | 5.5% | 6.8% | 100 | 152 |

Calculated SE (ppm sucrose) of GSG-RA95 per ppm=calculated SE of GSG-RA95/concentration of GSG-RA95. Measured sweetness (ppm sucrose) of GSG-RA95 per ppm=(Measured SE−Calculated SE of RA97)/concentration of GSG-RA95.

Conclusion

Figure 14:
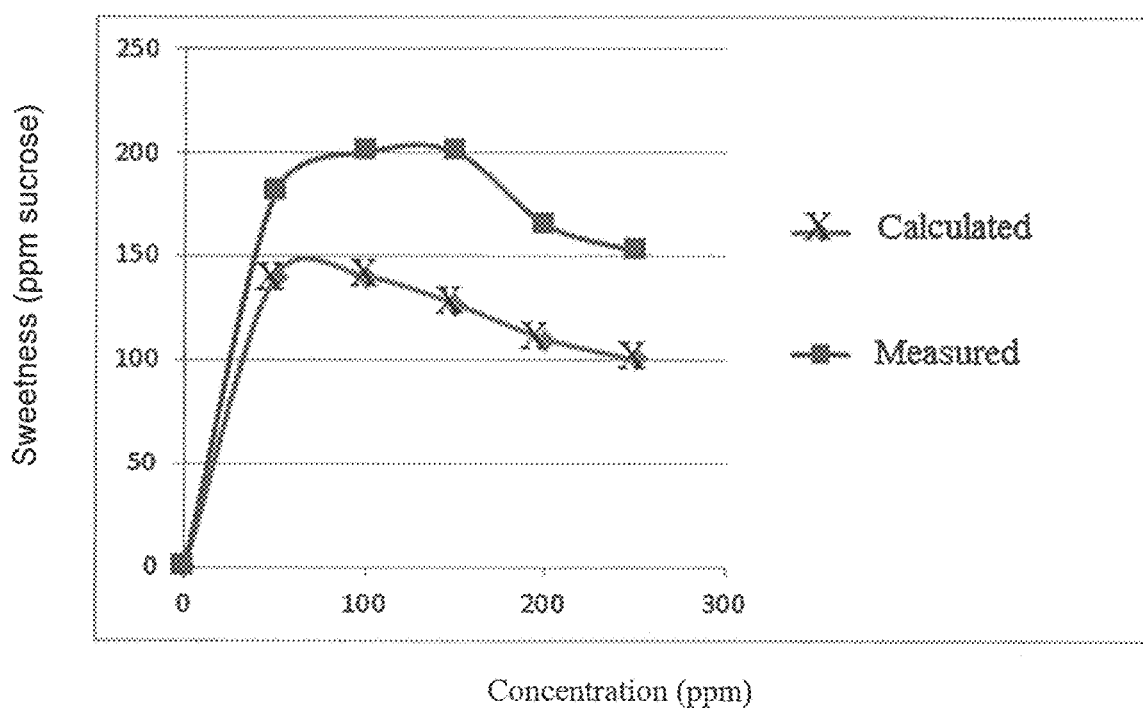
FIG. 14 is a graphical illustration showing the calculated and measured sweetness of GSG-RA95 per ppm in 350 ppm GSG-RA95 and RA97 compositions.

At 350 ppm total solid content, increasing the amount of GSG-RA95 results in a measured contribution to sweetness that was higher than the calculated value (FIG. 14). A positive synergistic sweetness effect was found when GSG-RA95>100 ppm with an optimized range of 100-150 ppm.

Example 13

Sweetness of 400 ppm GSG-RA95 and RA97 compositions are shown in Table 25.

TABLE 25

| RA97 (ppm) | Calc. SE of RA97 | GSG-RA95 (ppm) | Calc. SE of GSG-RA95 | Calc. SE of the composition | Measured SE of the composition | Calc. sweetness (ppm sucrose) of GSG-RA95 per ppm | Measured sweetness (ppm sucrose) of GSG-RA95 per ppm |
|---|---|---|---|---|---|---|---|
| 300 | 6.9% | 100 | 1.4% | 8.3% | 8% | 140 | 110 |
| 250 | 6% | 150 | 1.9% | 7.9% | 8.3% | 126.7 | 153.33 |
| 200 | 5% | 200 | 2.2% | 7.2% | 8.3% | 110 | 165 |
| 150 | 4.2% | 250 | 2.5% | 6.7% | 7.8% | 100 | 144 |
| 100 | 3% | 300 | 2.9% | 5.9% | 7.2% | 96.7 | 140 |

Calculated SE (ppm sucrose) of GSG-RA95 per ppm=calculated SE of GSG-RA95/concentration of GSG-RA95. Measured sweetness (ppm sucrose) of GSG-RA95 per ppm=(Measured SE−Calculated SE of RA97)/concentration of GSG-RA95.

Conclusion

Figure 15:
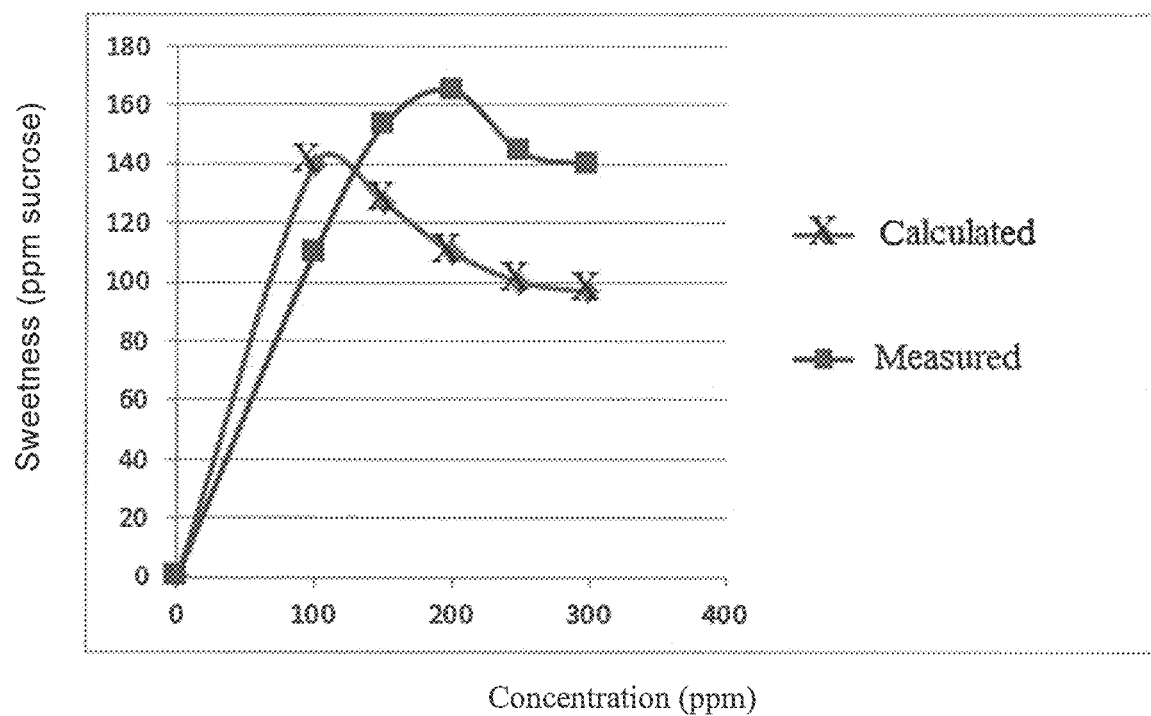
FIG. 15 is a graphical illustration showing the calculated and measured sweetness of GSG-RA95 per ppm in 400 ppm GSG-RA95 and RA97 compositions.

At 400 ppm total solid content, increasing the amount of GSG-RA95 results in a measured contribution to sweetness that was higher than the calculated value (FIG. 15). A positive synergistic sweetness effect was found when GSG-RA95>150 ppm with an optimized range of 150-200 ppm.

Example 14

Sweetness of 450 ppm GSG-RA95 and RA97 compositions are shown in Table 26.

TABLE 26

| RA97 | Calc. SE of RA97 | GSG-RA95 | Calc. SE of GSG-RA95 | Calc. SE of the composition | Measured SE of the composition | Calc. SE (ppm sucrose) of GSG-RA95 per ppm | Measured SE (ppm sucrose) of GSG-RA95 per ppm |
|---|---|---|---|---|---|---|---|
| 300 ppm | 6.9% | 150 ppm | 1.5% | 8.4% | 8.5% | 100 | 106.67 |
| 250 ppm | 6% | 200 ppm | 2% | 8% | 8.5% | 100 | 125 |
| 200 ppm | 5% | 250 ppm | 2.4% | 7.4% | 8.5% | 96 | 140 |
| 150 ppm | 4.2% | 300 ppm | 2.75% | 6.95% | 7.5% | 91.7 | 110 |
| 100 ppm | 3% | 350 ppm | 3% | 6% | 7.5% | 85.7 | 128.57 |

Calculated SE (ppm sucrose) of GSG-RA95 per ppm=calculated SE of GSG-RA95/concentration of GSG-RA95. Measured sweetness (ppm sucrose) of GSG-RA95 per ppm=(Measured SE−Calculated SE of RA97)/concentration of GSG-RA95.

Conclusion

Figure 16:
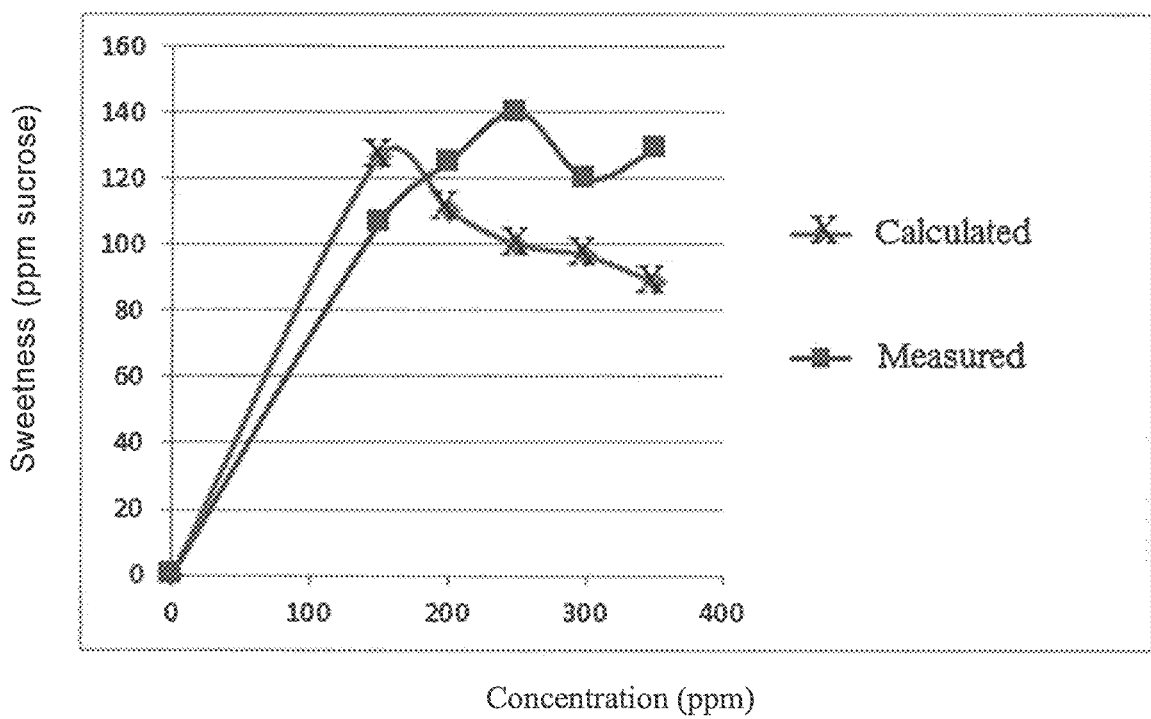
FIG. 16 is a graphical illustration showing the calculated and measured sweetness of GSG-RA95 per ppm in 450 ppm GSG-RA95 and RA97 compositions.

At 450 ppm total solid content, increasing the amount of GSG-RA95 results in a measured contribution to sweetness that was higher than the calculated value (FIG. 16). A positive synergistic sweetness effect was found when GSG-RA95>200 ppm with an optimized range of 200-250 ppm.

Example 15: Compositions of Steviol Glycosides and GSG-RA50

TABLE 27

| Steviol glycoside | GSG-RA50 | Water | Untreated (room temperature) | Treated (room temperature) | Stability |
|---|---|---|---|---|---|
| RA, 0.85 g | 0.15 g | 10 g | Soluble | Soluble | 10 days |
| RA, 0.9 g | 0.1 g | 10 g | Soluble | Soluble | 10 days |
| RB, 0.5 g | 0.5 g | 10 g | Insoluble | Insoluble | — |
| RC, 0.5 g | 0.5 g | 10 g | Insoluble | Insoluble | — |
| RD, 0.5 g | 0.5 g | 10 g | Insoluble | Insoluble | — |
| RB, 0.1 g | 0.9 g | 10 g | Insoluble | Insoluble | — |
| RC, 0.1 g | 0.9 g | 10 g | Insoluble | Soluble | 10 days |
| RD, 0.1 g | 0.9 g | 10 g | Insoluble | Soluble | 10 days |
| RB, 0.05 g | 0.95 g | 10 g | Insoluble | Soluble | 10 days |

For compositions of RA and GSG-RA50, the solubility can be improved by the treatment of according to the present invention. For composition of RA, RC, or RD and GSG-RA50, the solubility is improved by the treatment according to the present invention, only at higher GSG-RA50 to steviol glycoside ratio.

Example 16: HPLC-MS Experiments

HPLC-system: Agilent 1100 (quart. Pump, Autosampler, Column oven, UV/VIS-detector coupled to Agilent ESI MS (G1956 A) operated at 350° C., 12 L/min N2, Fragmentor: 150, pos. Scan mode.

Mobile Phase: Acetonitrile/0.01% acetic acid=95/5 at 0 min to 80/20 at 20 min (linear gradient) hold for another 20 minutes, return to source concitions.

Figure 17:
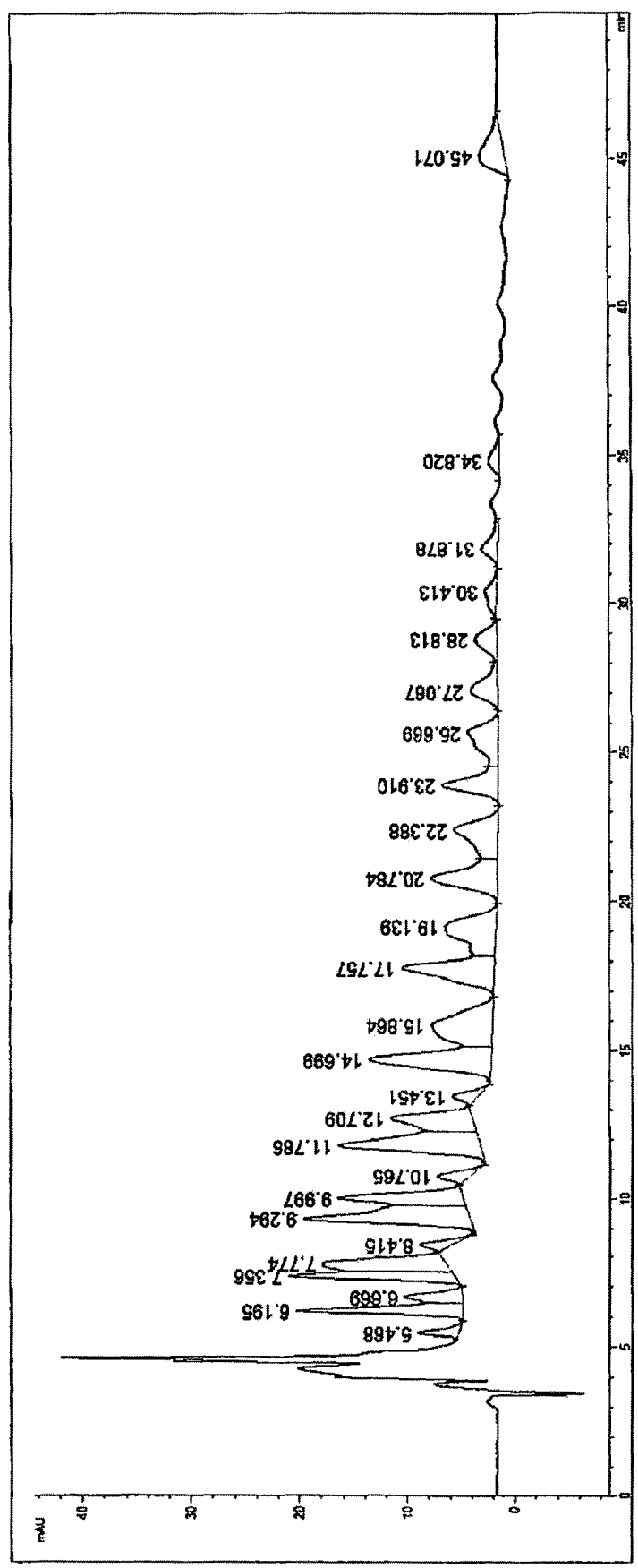
FIG. 17 is an optimized HPLC spectrum of GSG-RA50.

Column: Supelcosil-LC-NH2, 250×4.6 mm, 5 μm
Flow rate: 1 mL/min
Temperature: 35° C.
Injection vol: 0.015 mL GSG-RA50 was characterized by HPLC-MS (FIG. 17) and the ratios of GSGs are shown in Table 28.

TABLE 28

| Compound | Area | mg RA/100 ml | mol mass | mg/100 ml | % of total sample |
|---|---|---|---|---|---|
| — | 52.9 | 2.42 |  | 2.42 | 1.79 |
| ST-G1 | 250 | 3.82 | 967 | 3.82 | 2.83 |
| ST-G1 | 114 | 2.85 | 967 | 2.85 | 2.11 |
| RA-G1 | 288 | 4.09 | 1129 | 4.77 | 3.54 |
| RA-G1 | 393 | 4.84 | 1129 | 5.65 | 4.18 |
| ST-G2 | 110 | 2.82 | 1129 | 3.30 | 2.44 |
| RA-G2 | 479 | 5.44 | 1291 | 7.27 | 5.38 |
| RA-G2 | 341 | 4.46 | 1291 | 5.96 | 4.41 |
| ST-G3 | 105 | 2.78 | 1291 | 3.72 | 2.75 |
| RA-G3 | 470 | 5.39 | 1453 | 8.09 | 5.99 |
| RA-G3 | 319 | 4.31 | 1453 | 6.47 | 4.80 |
| ST-G4 | 87.6 | 2.66 | 1453 | 4.00 | 2.97 |
| RA-G4 | 408 | 4.94 | 1615 | 8.25 | 6.11 |
| ST-G5 | 346 | 4.50 | 1615 | 7.51 | 5.57 |
| RA-G5 | 329 | 4.38 | 1777 | 8.05 | 5.96 |
| ST-G6 | 286 | 4.07 | 1777 | 7.48 | 5.54 |

TABLE 28-continued

| Compound | Area | mg RA/100 ml | mol mass | mg/100 ml | % of total sample |
|---|---|---|---|---|---|
| RA-G6 | 311 | 4.25 | 1939 | 8.53 | 6.32 |
| ST-G7 | 173 | 3.27 | 1939 | 6.56 | 4.86 |
| RA-G7 | 184 | 3.35 | 2101 | 7.28 | 5.39 |
| >RA/ST-G7 | 232 | 3.69 | 2263 | 8.64 | 6.40 |
| Sum: | | 78.35 | | 120.63 | 89.35 |

Figure 18:
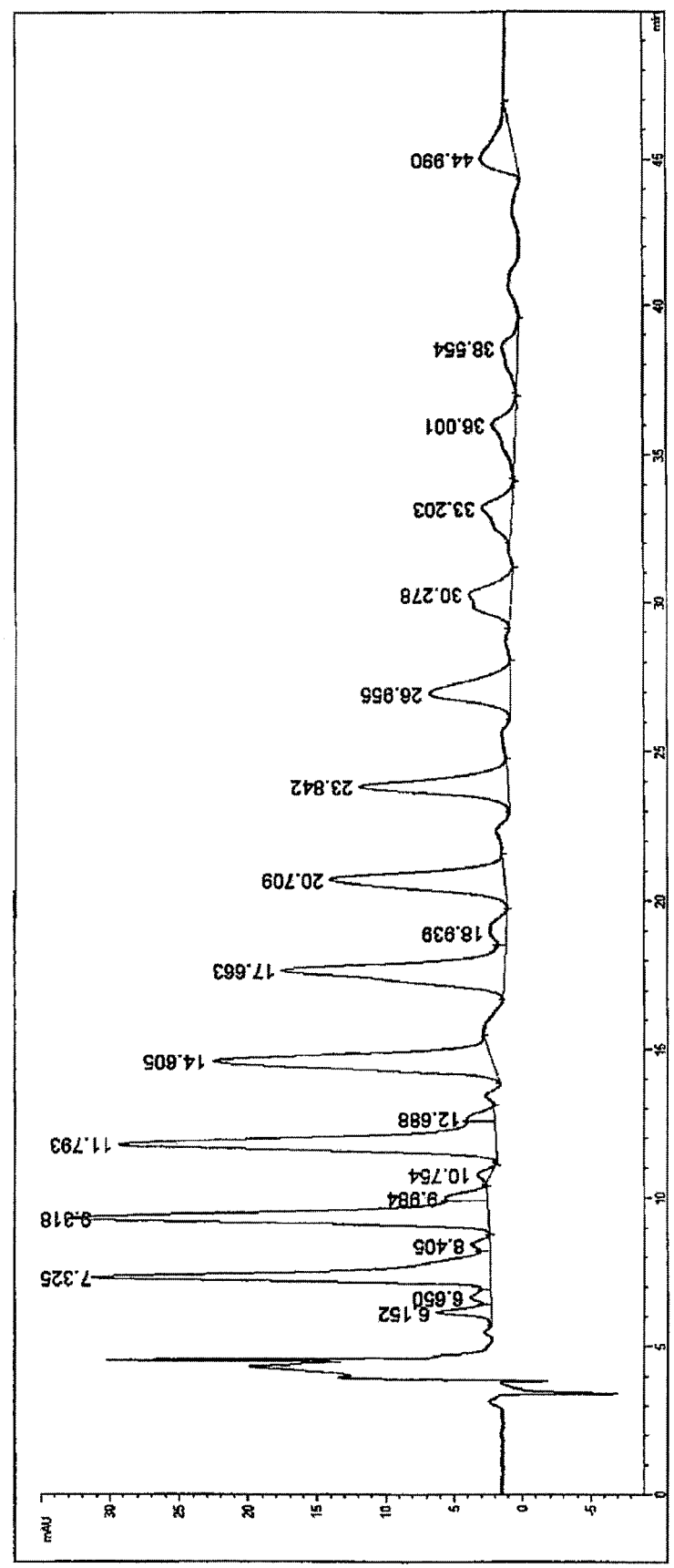
FIG. 18 is an optimized HPLC spectrum of GSG-RA80.

GSG-RA95 was characterized by HPLC-MS (FIG. 18) and the ratios of GSGs are shown in Table 29.

TABLE 29

| Compound | Area | mg RA/100 ml | mol mass | mg/100 ml | % of total sample |
|---|---|---|---|---|---|
| — | 65.4 | 2.51 | | 2.5 | 2.04 |
| — | 33.4 | 2.28 | | 2.3 | 1.85 |
| RA-G1 | 687 | 6.93 | 1129 | 8.10 | 6.59 |
| — | 38.5 | 2.32 | | 2.32 | 1.88 |
| RA-G2 | 886 | 8.34 | 1291 | 11.2 | 9.07 |
| — | 36.9 | 2.30 | | 2.30 | 1.87 |
| RA-G3 | 873 | 8.24 | 1453 | 12.4 | 10.09 |
| RA-G4 | 811 | 7.81 | 1615 | 13.1 | 10.63 |
| RA-G5 | 681 | 6.88 | 1777 | 12.7 | 10.31 |
| RA-G6 | 548 | 5.94 | 1939 | 11.9 | 9.70 |
| RA-G7 | 411 | 4.96 | 2101 | 10.8 | 8.79 |
| G7 | 920 | 8.58 | 2263 | 20.1 | 16.36 |
| Sum: | | 67.1 | | 110 | 89 |

Figure 19:
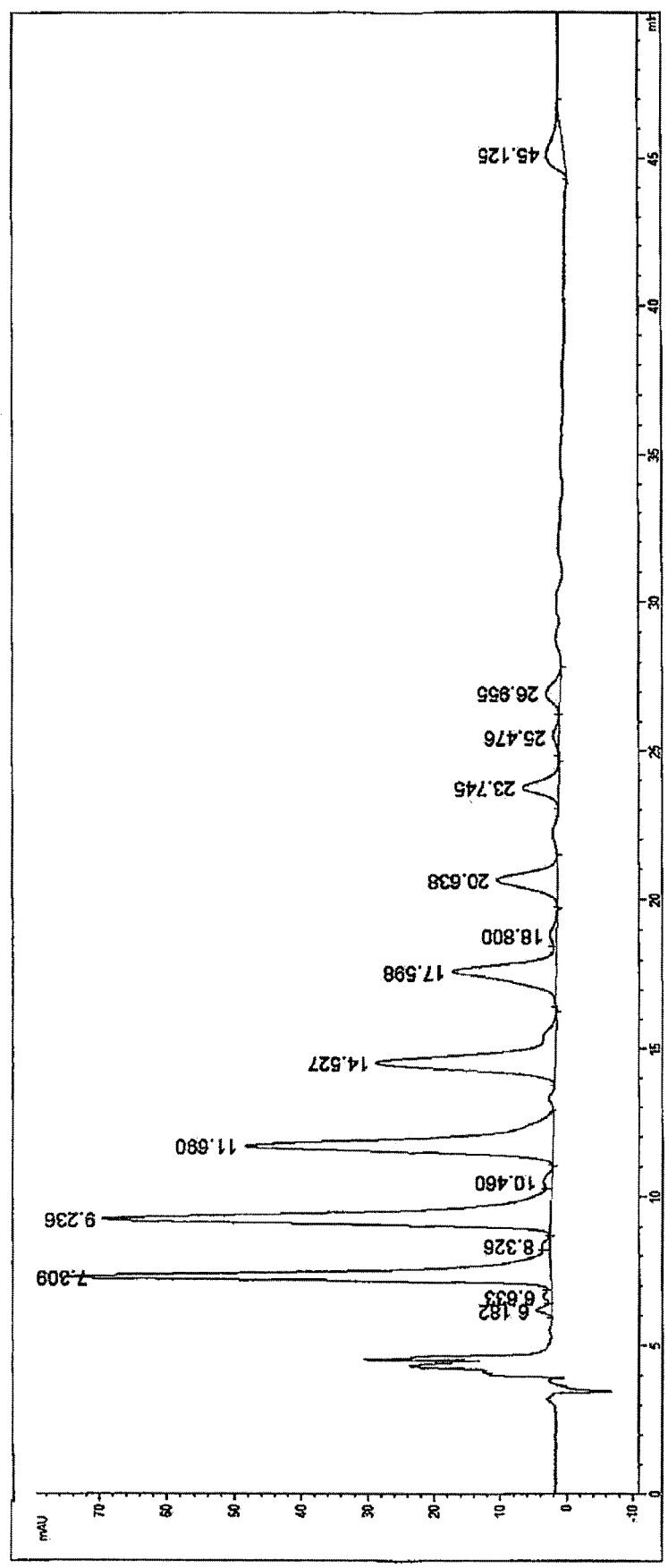
FIG. 19 is an optimized HPLC spectrum of GSG-RA95.

GSG-RA95 was characterized by HPLC-MS (FIG. 19) and the ratios of GSGs are shown in Table 30.

TABLE 30

| Compound | Area | mg RA/100 ml | mol mass | mg/100 ml | % of total sample |
|---|---|---|---|---|---|
| RA-G1 | 1545 | 13.0 | 1129 | 15.2 | 12.7 |
| RA-G2 | 1848 | 15.2 | 1291 | 20.3 | 16.9 |
| RA-G3 | 1458 | 12.4 | 1453 | 18.7 | 15.6 |
| RA-G4 | 1001 | 9.15 | 1615 | 15.3 | 12.8 |
| RA-G5 | 631 | 6.53 | 1777 | 12.0 | 10.0 |
| RA-G6 | 383 | 4.77 | 1939 | 9.58 | 8.0 |
| RA-G7 | 179 | 3.32 | 2101 | 7.22 | 6.0 |
| >RA-G7 | 332 | 4.40 | 2263 | 10.3 | 8.6 |
| Sum: | | 68.8 | | 109 | 90.6 |

Example 17 HPLC-MS Experiments

HPLC-system: Agilent 1100/1200.

| Mobile Phase: | | | | |
|---|---|---|---|---|
| Time | Solv. A* | Solv. B** | Flow | Pressure |
| 0.00 | 72.2 | 27.8 | 1.000 | 300 |
| 8.00 | 55.6 | 44.4 | 1.000 | 300 |
| 12.00 | 55.6 | 44.4 | 1.000 | 300 |
| 18.00 | 62.2 | 37.8 | 1.000 | 300 |
| 20.00 | 72.2 | 27.8 | 1.000 | 300 |

*Solv.A: 0.01M NH4-Acetate with 0.1% Acetic Acid and 0.01% trimethylamine, saturated with dichloromethane
**Solv.B: 90% Acetonitrile/10% water with 0.1% Acetic Acid and 0.01% trimethylamine and 0.1% dichloromethane Injector volume: 30.00 µl Detector Diode: Array Detector and UV Wavelength: 210 nm Temperature settings: 45.0° C. Flow rate: 1 mL/min MS: Agilent G 1956 A Ionization Mode: API-ES Scan Parameters Gas Temp: 300° C. *maximum* 350° C.

DryingGas: 11.0 l/min maximum 13.0 l/min

Neb Pres: 29 psig maximum 60 psig

Quad Temp: 0° C. *maximum* 0° C.

VCap (Positive): 3000 V

VCap (Negative): 4000 V

Figure 20:
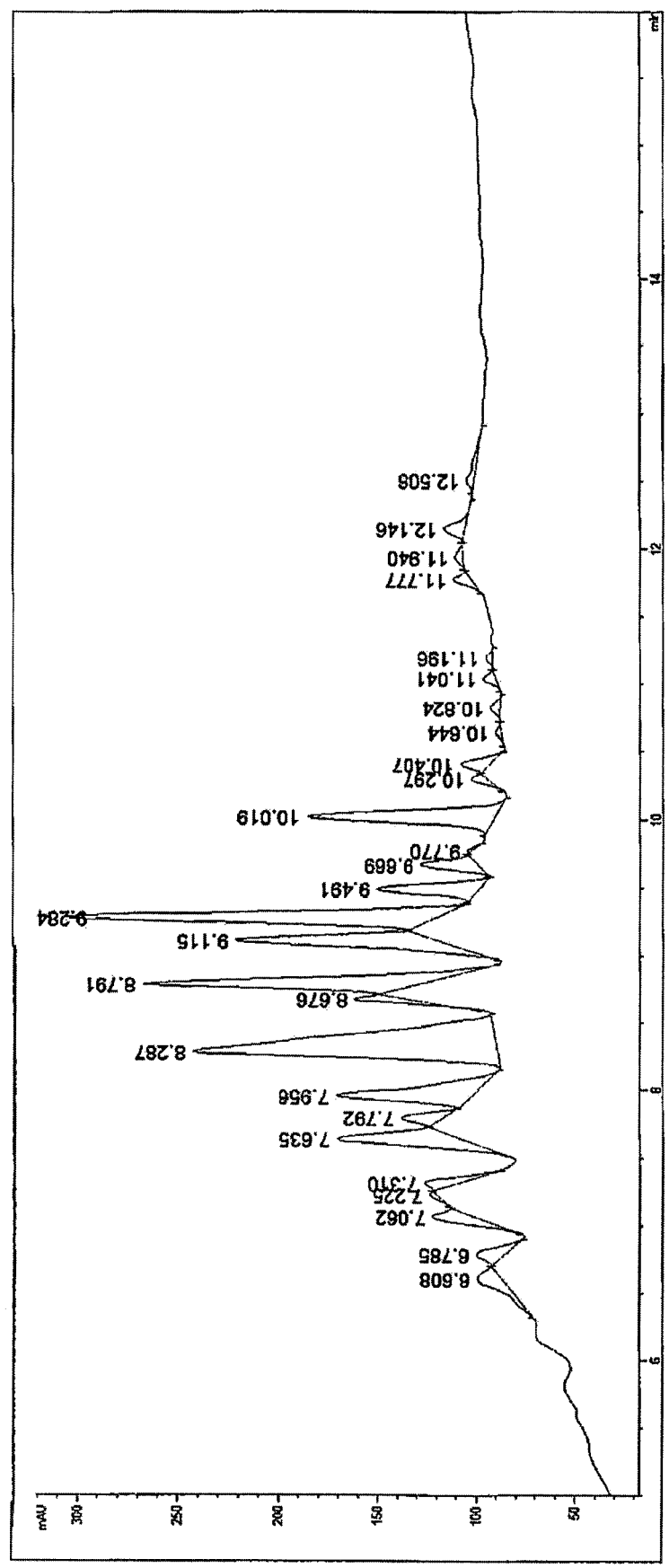
FIG. 20 is an optimized HPLC spectrum of GSG-RA20.

GSG-RA20 was characterized by HPLC-MS (FIG. 20) and the ratios of GSGs are shown in Table 31.

TABLE 31

| Basic struchture | Specification | Actual Test Result (% m/m) | Mass fragment $[M - 2H^+]^{-2}$ | Mass fragment $[M - H^+]^{-1}$ | R-A derived (% m/m)* | SW derived (% m/m)* | Reb C derived (% m/m)** |
|---|---|---|---|---|---|---|---|
| ST-G1 | | 11.52 | 563 | 1128 | 4.98 | 3.63 | 2.91 |
| ST-G2 | | 8.48 | 644 | 1290 | 3.57 | 2.90 | 2.00 |
| ST-G3 | | 10.21 | 725 | 1452 | 4.30 | 3.21 | 2.70 |
| ST-G4 | | 12.02 | 806 | 1614 | 5.37 | 3.84 | 2.80 |
| ST-G5 | | 8.02 | 887 | 1776 | 3.45 | 2.71 | 1.86 |
| ST-G6 | | 5.85 | 968 | 1938 | 2.58 | 1.94 | 1.33 |
| ST-G7 | | 2.24 | 1049 | 2100 | 1.00 | 0.77 | 0.46 |
| ST-G8 | | 5.83 | 1130 | 2262 | 2.65 | 1.89 | 1.29 |
| ST-G9 | | 4.69 | 1211 | 2424 | 1.97 | 1.55 | 1.16 |

TABLE 31-continued

| Basic structure | Specification | Actual Test Result (% m/m) | Mass fragment [M − 2H+]−2 | Mass fragment [M − H+]−1 | R-A derived (% m/m)* | SW derived (% m/m)* | Reb C derived (% m/m)** |
|---|---|---|---|---|---|---|---|
| ST-G10 | | 3.74 | 1292 | 2586 | 1.58 | 1.28 | 0.88 |
| ST-G11 | | 1.65 | 1373 | 2748 | 0.75 | 0.57 | 0.33 |
| Total GSG | 75 | 74.25 | 1454 | 2910 | 34.30 | 24.65 | 15.30 |
| Stevioside | 6 | 6.56 | | | | | |
| SGs | 4 | | | | | | |
| Dextrin | 20 | <=20 | | | | | |

Figure 21:
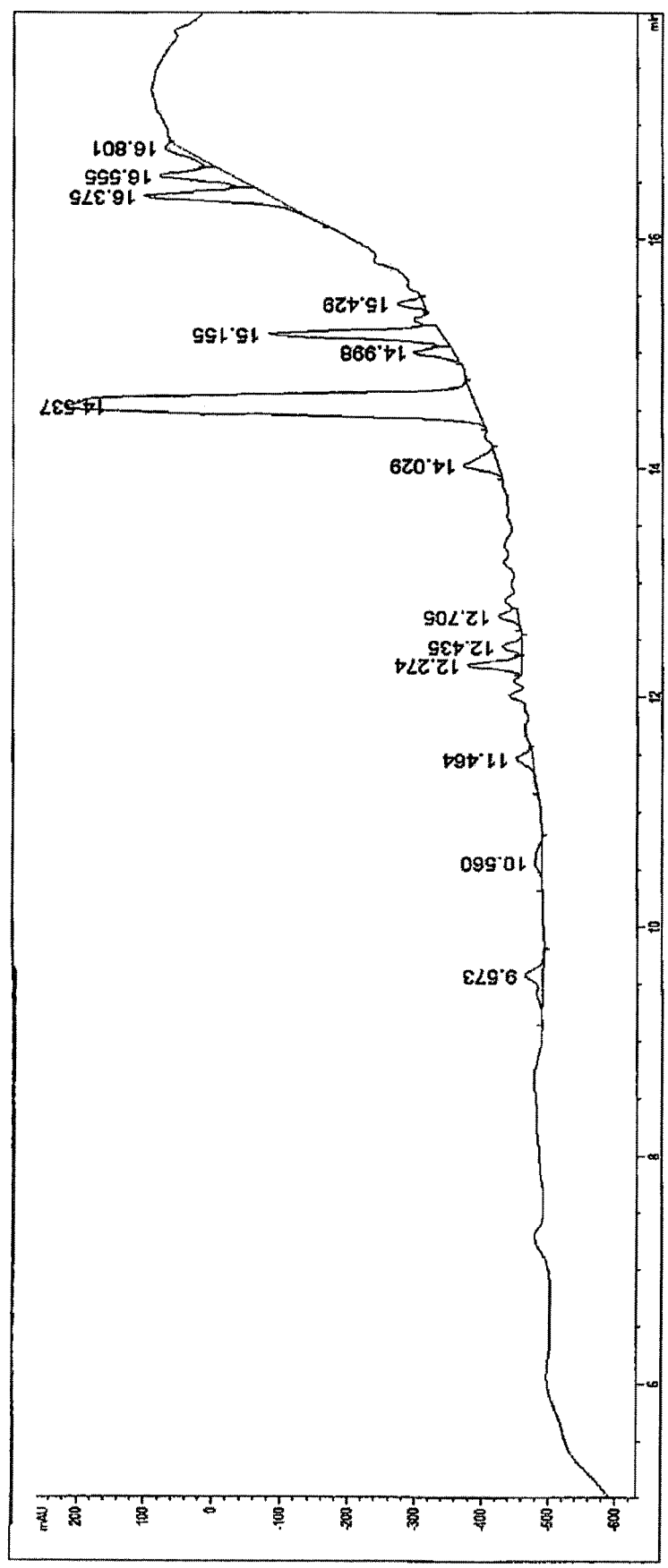
FIG. 21 is an optimized HPLC spectrum of GSG-RA40.

*estimated from chromatogram comparison of Reb-A GSGs to STV GSGs
**estimated from unique mass of Reb-C fragment GSG-RA40 was characterized by HPLC-MS (FIG. 21) and the ratios of GSGs are shown in Table 32.

TABLE 32

| Basic structure | GSG (% m/m) | Mass fragment [M − 2H+]−2 | Mass fragment [M − H+]−1 | R-A derived (% m/m) | Stev derived (% m/m) |
|---|---|---|---|---|---|
| ST-G1 | 0.02 | 563 | 1128 | 0.01 | 0.00 |
| ST-G2 | 5.89 | 644 | 1290 | 4.71 | 1.18 |
| ST-G3 | 1.14 | 725 | 1452 | 0.91 | 0.23 |
| ST-G4 | 0.09 | 806 | 1614 | 0.07 | 0.02 |
| ST-G5 | 0.82 | 887 | 1776 | 0.65 | 0.16 |
| ST-G6 | 1.60 | 968 | 1938 | 1.28 | 0.32 |
| ST-G7 | 0.85 | 1049 | 2100 | 0.68 | 0.17 |
| ST-G8 | 2.71 | 1130 | 2262 | 2.17 | 0.54 |
| ST-G9 | 0.72 | 1211 | 2424 | 0.58 | 0.14 |
| ST-G10 | 0.38 | 1292 | 2586 | 0.31 | 0.08 |
| ST-G11 | 1.15 | 1373 | 2748 | 0.92 | 0.23 |
| un-identified | 7.0 | | | | |
| Total GSG | 22.4 | | | | |
| Reb-A/Stev | 53.6 | | | | |

Figure 22:
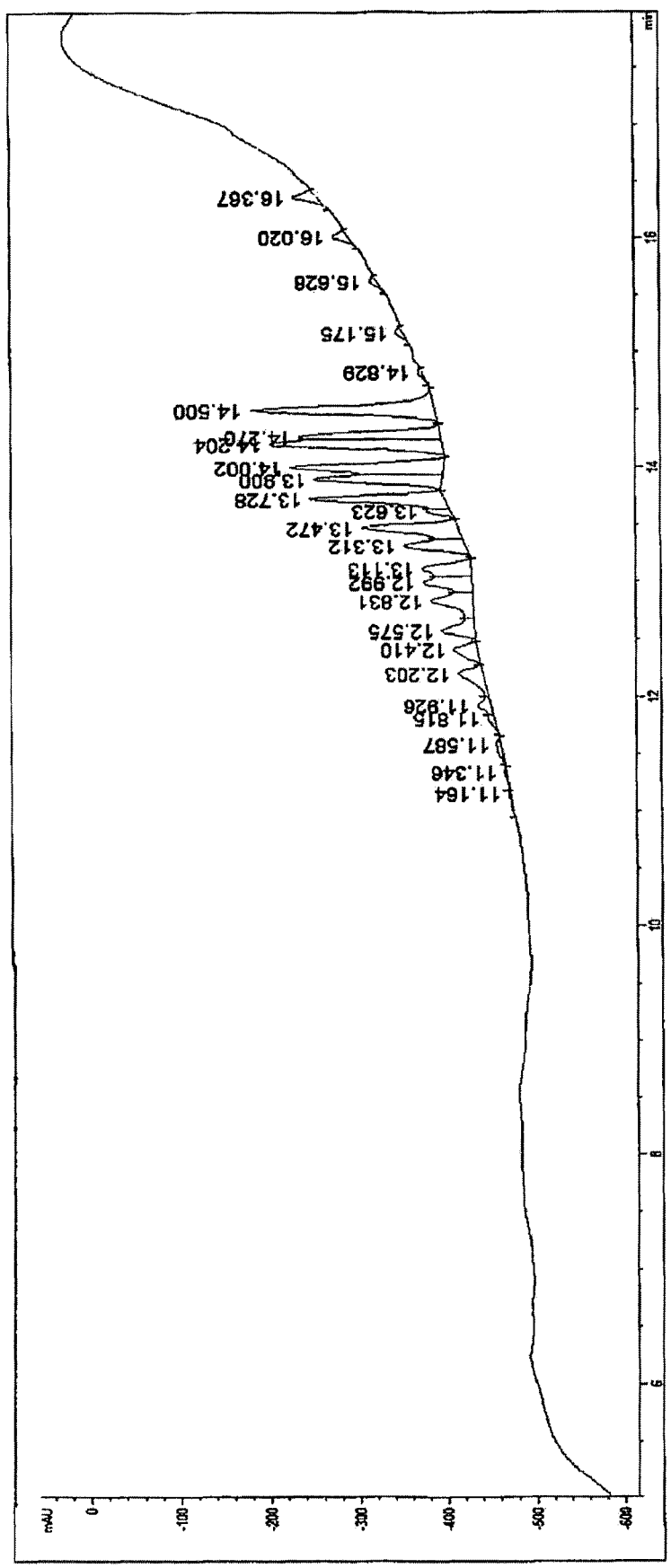
FIG. 22 is an optimized HPLC spectrum of GSG-RA85.

GSG-RA85 was characterized by HPLC-MS (FIG. 22) and the ratios of GSGs are shown in Table 33A.

TABLE 33A

| Basic structure | R-A derived (% m/m) | Mass fragment [M − 2H+]−2 | Mass fragment [M − H+]−1 |
|---|---|---|---|
| ST-G1 | 1.36 | 563 | 1128 |
| ST-G2 | 13.77 | 644 | 1290 |
| ST-G3 | 20.87 | 725 | 1452 |
| ST-G4 | 20.70 | 806 | 1614 |
| ST-G5 | 4.14 | 887 | 1776 |
| ST-G6 | 4.29 | 968 | 1938 |
| ST-G7 | 1.82 | 1049 | 2100 |
| ST-G8 | 1.87 | 1130 | 2262 |
| ST-G9 | 0.67 | 1211 | 2424 |
| ST-G10 | 0.45 | 1292 | 2586 |
| ST-G11 | 0.60 | 1373 | 2748 |
| Total GSG | 70.5 | 1454 | 2910 |
| Reb-A | 1.8 | 482 | 965 |

Figure 23:
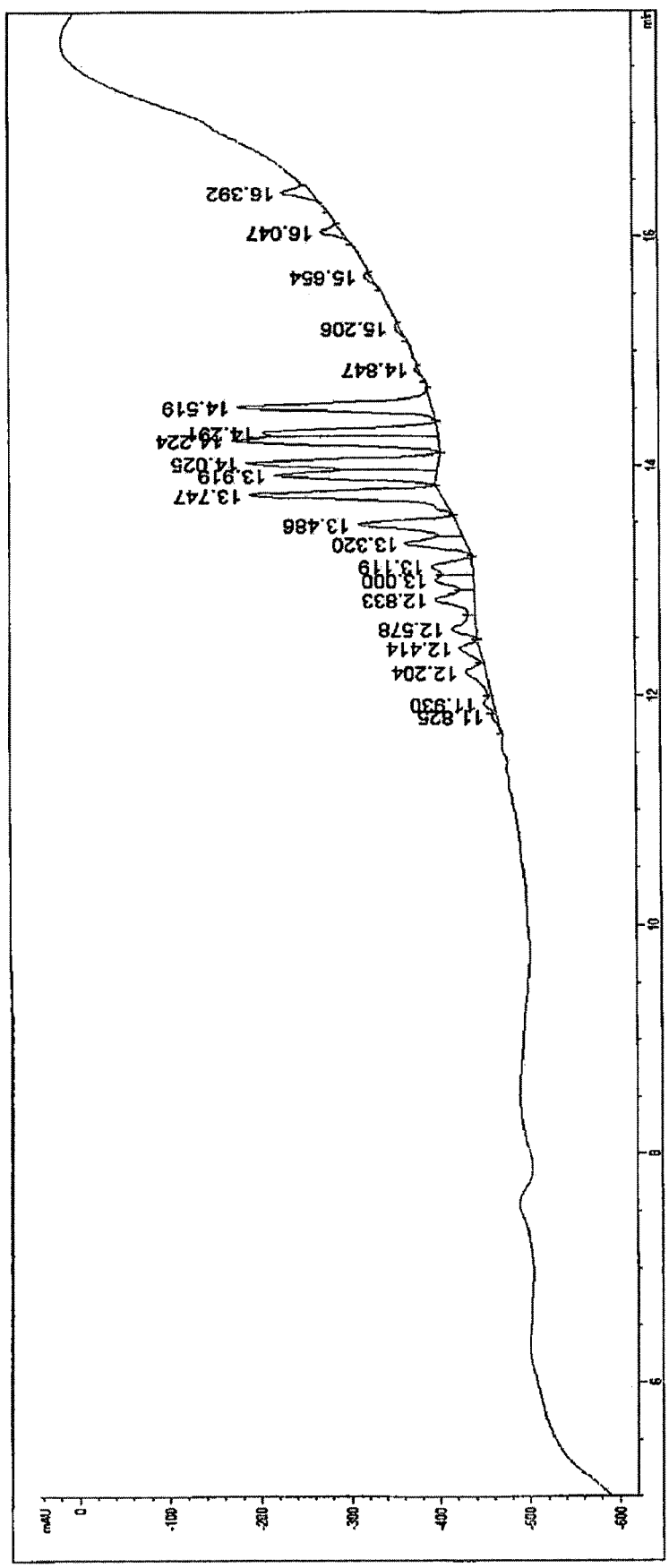
FIG. 23 is an optimized HPLC spectrum of GSG-RA90.

GSG-RA90 was characterized by HPLC-MS (FIG. 23) and the ratios of GSGs are shown in Table 33B.

TABLE 33B

| Basic structure | R-A derived (% m/m) | Mass fragment [M − 2H+]−2 | Mass fragment [M − H+]−1 |
|---|---|---|---|
| ST-G1 | 1.28 | 563 | 1128 |
| ST-G2 | 17.76 | 644 | 1290 |
| ST-G3 | 24.22 | 725 | 1452 |
| ST-G4 | 16.26 | 806 | 1614 |
| ST-G5 | 7.04 | 887 | 1776 |
| ST-G6 | 3.46 | 968 | 1938 |
| ST-G7 | 1.39 | 1049 | 2100 |
| ST-G8 | 1.51 | 1130 | 2262 |
| ST-G9 | 0.42 | 1211 | 2424 |
| ST-G10 | 0.31 | 1292 | 2586 |
| ST-G11 | 0.28 | 1373 | 2748 |
| Total GSG | 73.9 | 1454 | 2910 |
| Reb-A | 1.7 | 482 | 965 |

Example 18: Synergistic Effects of GSG-RA50 with RA97

Figure 24:
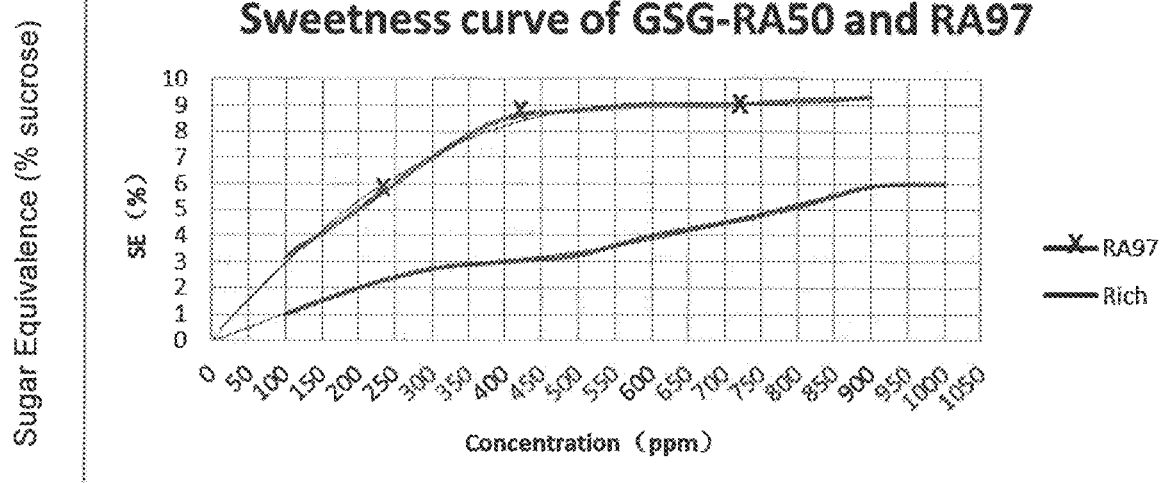
FIG. 24 is a graphical illustration showing the sweetness curve of GSG-RA50 and RA97.

A sweetness curve was prepared for GSG-RA50 and RA97 compositions (FIG. 24), and the taste profiles of 200 ppm total solid content samples were taken as shown in Table 34.

TABLE 34

| RA97 (ppm) | Calc. SE of RA97 | GSG-RA50 (ppm) | Calc. SE of GSG-RA50 | Calc. SE of the composition | Measured SE of the composition | Calc. sweetness (ppm sugar) of GSG-RA50 per ppm | Measured sweetness (ppm sugar) of GSG-RA50 per ppm | total CSG |
|---|---|---|---|---|---|---|---|---|
| 150 | 4.2% | 50 | 0.5% | 4.70% | 5.00% | 100 | 160.00 | 22.34% |
| 100 | 3.0% | 100 | 1.0% | 4.00% | 5.00% | 100 | 200.00 | 44.68% |
| 50 | 1.5% | 150 | 1.5% | 3.00% | 4.50% | 100 | 200.00 | 67.01% |

Calculated sweetness (ppm sugar) of GSG-RA50 per ppm=calculated SE of GSG-RA50/concentration of GSG-RA50. Measured sweetness (ppm sugar) of GSG-RA50 per ppm=(Measured SE-calculated SE of RA97)/concentration of GSG-RA50.

Conclusion

Figure 25:
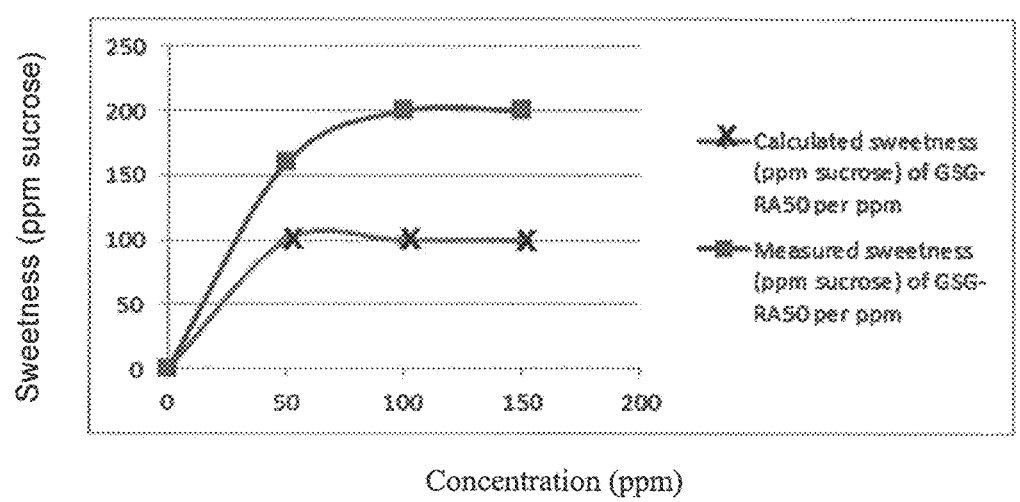
FIG. 25 is a graphical illustration showing the calculated and measured sweetness of GSG-RA50 per ppm in 200 ppm GSG-RA50 and RA97 compositions.

At 200 ppm total solid content, increasing the amount of GSG-RA50 results in a measured contribution to sweetness that was higher than the calculated value as shown in FIG. 25. A positive synergistic sweetness effect was found when GSG-RA50≥50 ppm.

The samples with total solid content of 350 ppm are shown in Table 35.

TABLE 35

| RA97 (ppm) | Calc. SE of RA97 | GSG-RA50 (ppm) | Calc. SE of GSG-RA50 | Calc. SE of the composition | Measured SE of the composition | Calc. sweetness (ppm sucrose) of GSG-RA50 per ppm | Measured sweetness (ppm sucrose) of GSG-RA50 per ppm |
|---|---|---|---|---|---|---|---|
| 350 | — | — | — | — | 8% | 0 | 0 |
| 300 | 6.9% | 50 | 0.5% | 7.4% | 7% | 100 | 20.00 |
| 250 | 6% | 100 | 1% | 7% | 8% | 100 | 200.00 |
| 200 | 5% | 150 | 1.5% | 6.5% | 7.8% | 100 | 186.67 |
| 150 | 4.2% | 200 | 2% | 6.2% | 7% | 100 | 140.00 |
| 100 | 3% | 250 | 2.4% | 5.4% | 7% | 96 | 160.00 |

Conclusion

Figure 26:
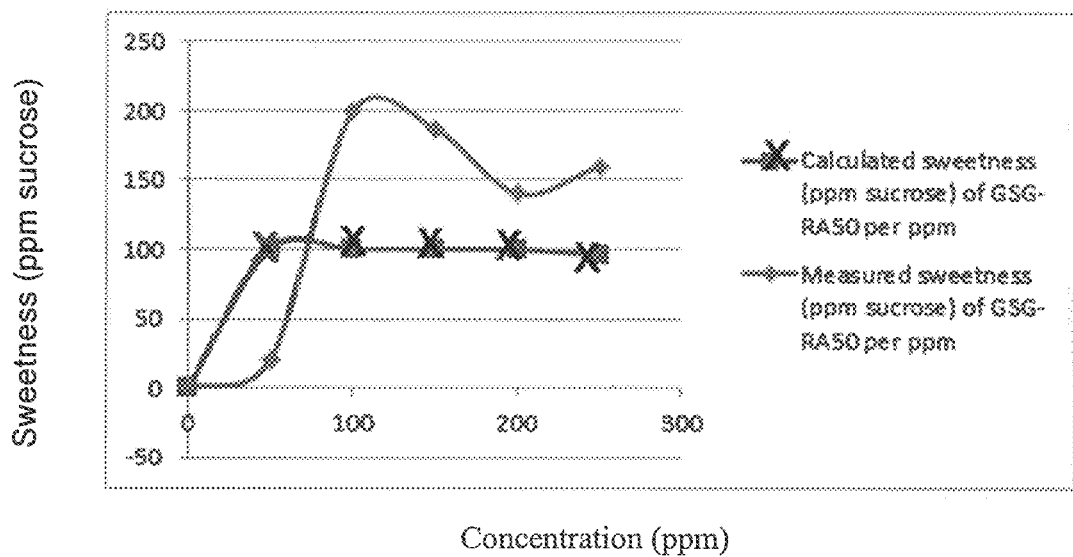
FIG. 26 is a graphical illustration showing the calculated and measured sweetness of GSG-RA50 per ppm in 350 ppm GSG-RA50 and RA97 compositions.

At 350 ppm total solid content, increasing the amount of GSG-RA50 results in a measured contribution of sweetness that was higher than the calculated value as shown in FIG. 26. A positive synergistic sweetness effect was found when GSG-RA50≥100 ppm, with an optimal range of 100-150 ppm.

The samples with total solid content of 400 ppm are shown in Table 36.

TABLE 36

| RA97 (ppm) | Calc. SE of RA97 | GSG-RA50 (ppm) | Calc. SE of GSG-RA50 | Calc. SE of the composition | Measured SE of the composition | Calc. sweetness (ppm sucrose) of GSG-RA50 per ppm | Measured sweetness (ppm sucrose) of GSG-RA50 per ppm |
|---|---|---|---|---|---|---|---|
| 300 | 6.9% | 100 | 1% | 7.9% | 8% | 100 | 110.00 |
| 250 | 6% | 150 | 1.5% | 7.5% | 8.2% | 100 | 146.67 |
| 200 | 5% | 200 | 2% | 7% | 8% | 100 | 150.00 |
| 150 | 4.2% | 250 | 2.4% | 6.6% | 7.5% | 96 | 132.00 |
| 100 | 3% | 300 | 2.75% | 5.75% | 7.5% | 91.7 | 150.00 |

Conclusion

Figure 27:
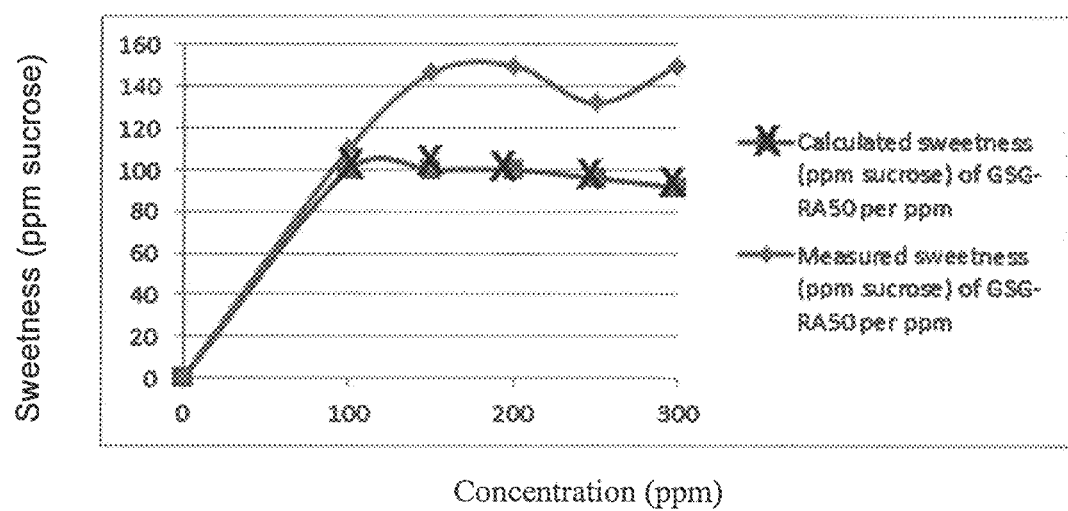
FIG. 27 is a graphical illustration showing the calculated and measured sweetness of GSG-RA50 per ppm in 400 ppm GSG-RA50 and RA97 compositions.

At 400 ppm total solid content, increasing the amount of GSG-RA50 results in a measured contribution of sweetness that was higher than the calculated value as shown in FIG. 27. A positive synergistic sweetness effect was found when GSG-RA50≥100 ppm.

The samples with total solid content of 450 ppm are shown in Table 37.

TABLE 37

| RA97 (ppm) | Calc. SE of RA97 | GSG-RA50 (ppm) | Calc. SE of GSG-RA50 | Calc. SE of the composition | Measured SE of the composition | Calc. sweetness (ppm sucrose) of GSG-RA50 per ppm | Measured sweetness (ppm sucrose) of GSG-RA50 per ppm |
|---|---|---|---|---|---|---|---|
| 300 | 6.9% | 150 | 1.5% | 8.4% | 8.5% | 100 | 106.67 |
| 250 | 6% | 200 | 2% | 8% | 8.5% | 100 | 125.00 |
| 200 | 5% | 250 | 2.4% | 7.4% | 8.5% | 96 | 140.00 |
| 150 | 4.2% | 300 | 2.75% | 6.95% | 7.5% | 91.7 | 110.00 |
| 100 | 3% | 350 | 3% | 6% | 7.5% | 85.7 | 128.57 |

Conclusion

Figure 28:
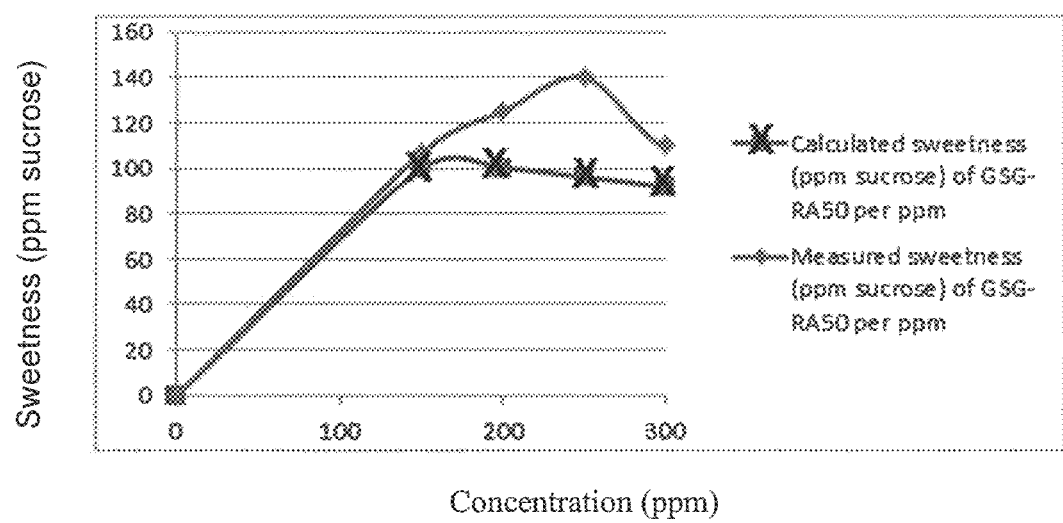
FIG. 28 is a graphical illustration showing the calculated and measured sweetness of GSG-RA50 per ppm in 450 ppm GSG-RA50 and RA97 compositions.

At 450 ppm total solid content, increasing the amount of GSG-RA50 results in a measured contribution of sweetness that was higher than the calculated value as shown in FIG. 28. A positive synergistic sweetness effect was found when GSG-RA50≥150 ppm.

The samples with total solid content of 500 ppm are shown in Table 38.

TABLE 38

| RA97 (ppm) | Calc. SE of RA97 | GSG-RA50 (ppm) | Calc. SE of GSG-RA50 | Calc. SE of the composition | Measured SE of the composition | Calc. sweetness (ppm sucrose) of GSG-RA50 per ppm | Measured sweetness (ppm sucrose) of GSG-RA50 per ppm |
|---|---|---|---|---|---|---|---|
| 400 | 8.25% | 100 | 1% | 9.25% | 9% | 100 | 75.00 |
| 300 | 7% | 200 | 2% | 8.9% | 9% | 100 | 105.00 |
| 200 | 5% | 300 | 2.75% | 7.75% | 8% | 91.66667 | 100.00 |
| 100 | 3% | 400 | 3% | 6% | 7.5% | 75 | 112.50 |

Conclusion

Figure 29:
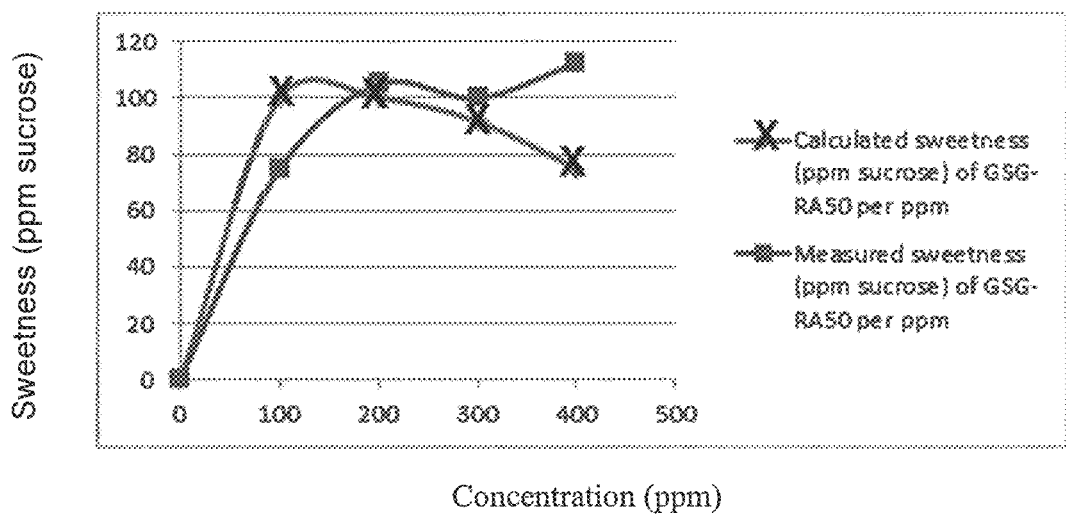
FIG. 29 is a graphical illustration showing the calculated and measured sweetness curves of 500 ppm GSG-RA50 and RA97 compositions.

At 500 ppm total solid content, increasing the amount of GSG-RA50 results in a measured contribution of sweetness that was higher than the calculated value as shown in FIG. 29. A positive synergistic sweetness effect was found when GSG-RA50≥200 ppm.

Example 19: Synergistic Effects of GSG-RA60 with RA97

Figure 30:
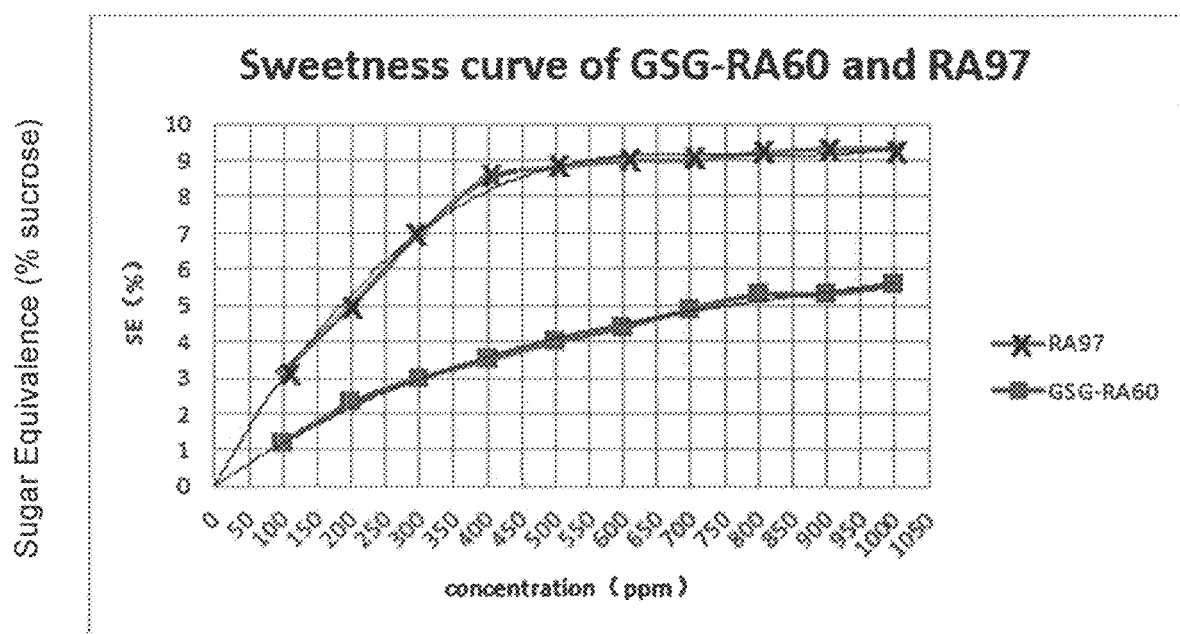
FIG. 30 is a graphical illustration showing the sweetness curve of GSG-RA60 and RA97.

A sweetness curve was prepared for GSG-RA60 and RA97 compositions (FIG. 30), and the taste profiles of 350 ppm total solid content samples were taken as shown in Table 39.

TABLE 39

| RA97 (ppm) | Calc. SE of RA97 | GSG-RA60 (ppm) | Calc. SE of GSG-RA60 | Calc. SE of the composition | Measured SE of the composition | Calc. sweetness (ppm sugar) of GSG-RA60 per ppm | Measured sweetness (ppm sugar) of GSG-RA60 per ppm | total GSG |
|---|---|---|---|---|---|---|---|---|
| 300 | 6.9% | 50 | 0.6% | 7.5% | 7.2% | 120 | 60.00 | 12.81% |
| 250 | 6% | 100 | 1.2% | 7.2% | 6.8% | 120 | 80.00 | 25.61% |
| 200 | 5% | 150 | 1.8% | 6.8% | 7.2% | 120 | 146.67 | 38.42% |
| 150 | 4% | 200 | 2.3% | 6.3% | 7.5% | 115 | 175.00 | 51.22% |
| 100 | 3.2% | 250 | 2.7% | 5.9% | 7.5% | 108 | 172.00 | 64.03% |
| 50 | 1.5% | 300 | 3% | 4.5% | 6% | 100 | 150.00 | 76.83% |

Calculated sweetness (ppm sugar) of GSG-RA60 per ppm=calculated SE of GSG-RA60/concentration of GSG-RA60. Measured sweetness (ppm sugar) of GSG-RA60 per ppm=(Measured SE-calculated SE of RA97)/concentration of GSG-RA60.

Conclusion

Figure 31:
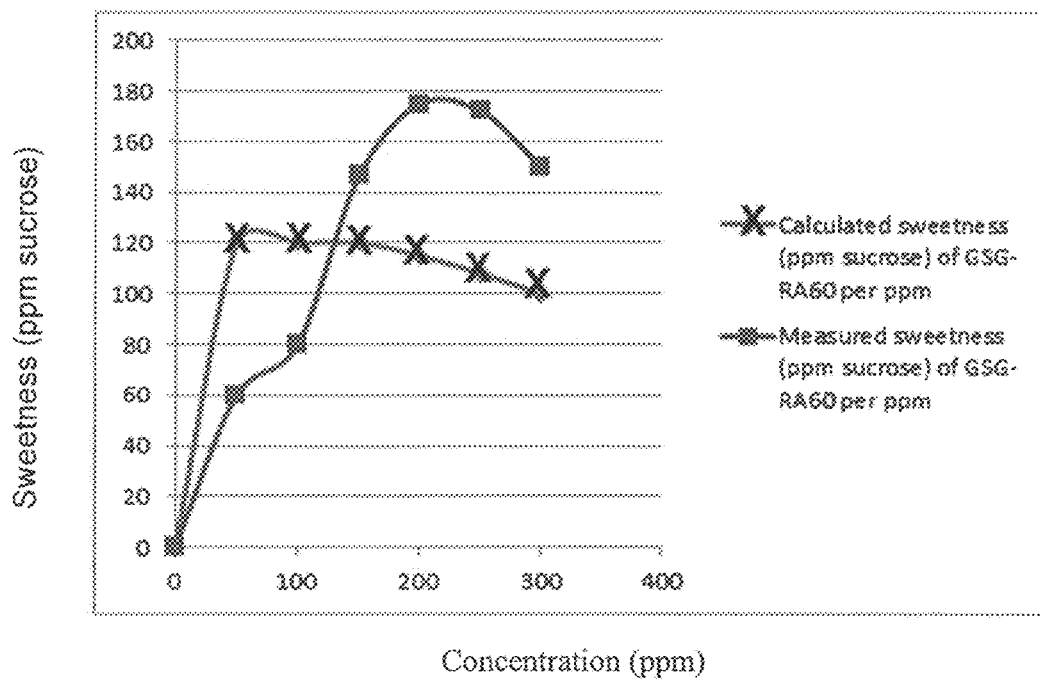
FIG. 31 is a graphical illustration showing the calculated and measured sweetness of GSG-RA60 per ppm in 350 ppm GSG-RA60 and RA97 compositions.

At 350 ppm total solid content, increasing the amount of GSG-RA60 results in a measured contribution of sweetness that rises continuously as shown in FIG. 31. When the concentration of GSG-RA60 is more than 150 ppm, the measured contribution of sweetness is higher than calculated. A positive synergistic sweetness effect was found when the concentration of GSG-RA60 was 150-300 ppm.

Example 20: Synergistic Effects of GSG-RA70 with RA97

Figure 32:
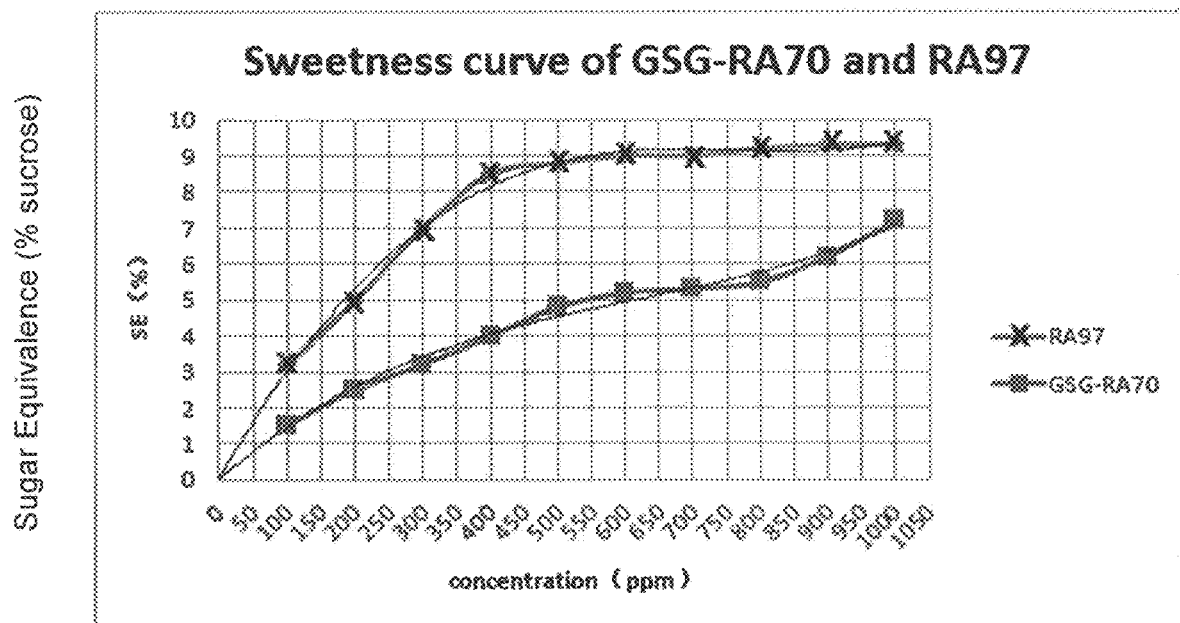
FIG. 32 is a graphical illustration showing the sweetness curve of GSG-RA70 and RA97.

A sweetness curve was prepared for GSG-RA70 and RA97 compositions (FIG. 32), and the taste profiles of 350 ppm total solid content samples were taken as shown in Table 40.

TABLE 40

| RA97 (ppm) | Calc. SE of RA97 | GSG-RA70 (ppm) | Calc. SE of GSG-RA70 | Calc. SE of the composition | Measured SE of the composition | Calc. sweetness (ppm sugar) of GSG-RA70 per ppm | Measured sweetness (ppm sugar) of GSG-RA70 per ppm | total GSG |
|---|---|---|---|---|---|---|---|---|
| 300 | 6.9% | 50 | 0.8% | 7.7% | 7.2% | 160 | 60.00 | 12.84% |
| 250 | 6% | 100 | 1.5% | 7.5% | 7% | 150 | 100.00 | 25.69% |
| 200 | 5% | 150 | 2% | 7% | 7.5% | 133 | 166.67 | 38.53% |
| 150 | 4% | 200 | 2.5% | 6.5% | 7.5% | 125 | 175.00 | 51.37% |
| 100 | 3.2% | 250 | 3% | 6.2% | 7% | 120 | 152.00 | 64.21% |
| 50 | 1.5% | 300 | 3% | 5.1% | 6% | 120 | 150.00 | 77.06% |

Calculated sweetness (ppm sugar) of GSG-RA70 per ppm=calculated SE of GSG-RA70/concentration of GSG-RA70. Measured sweetness (ppm sugar) of GSG-RA70 per ppm=(Measured SE-calculated SE of RA97)/concentration of GSG-RA70.

Conclusion

Figure 33:
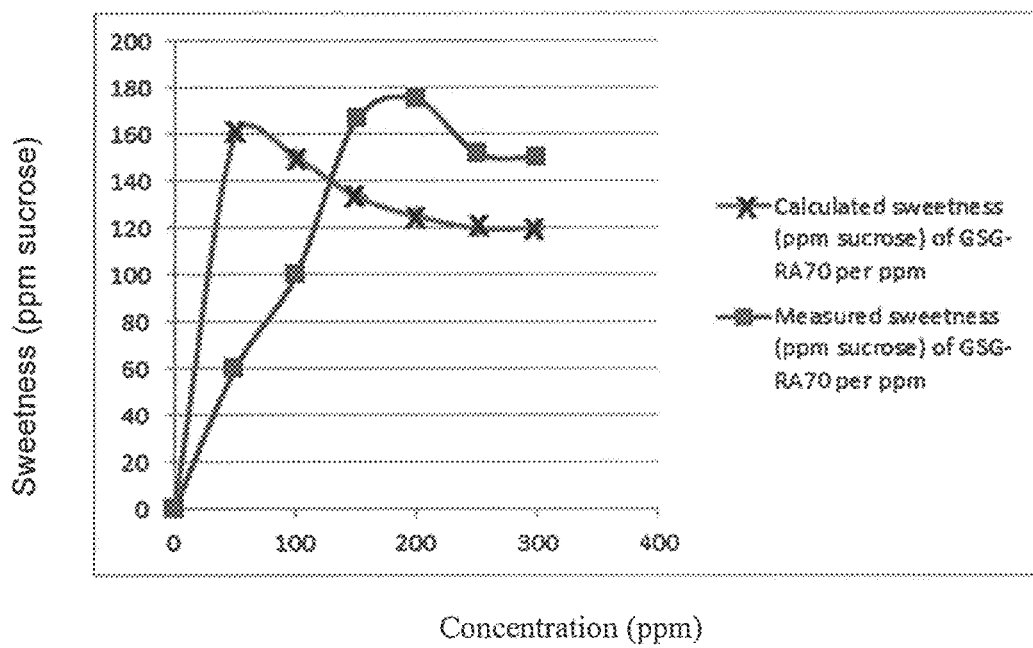
FIG. 33 is a graphical illustration showing the calculated and measured sweetness of GSG-RA70 per ppm in 350 ppm GSG-RA70 and RA97 compositions.

At 350 ppm total solid content, increasing the amount of GSG-RA70 results in a measured contribution of sweetness that rises continuously as shown in FIG. 33. When the concentration of GSG-RA70 is more than 150 ppm, the measured contribution of sweetness is higher than calculated. A positive synergistic sweetness effect was found when the concentration of GSG-RA70 was 150-200 ppm.

Example 21: Synergistic Effects of GSG-RA80 with RA97

Figure 34:
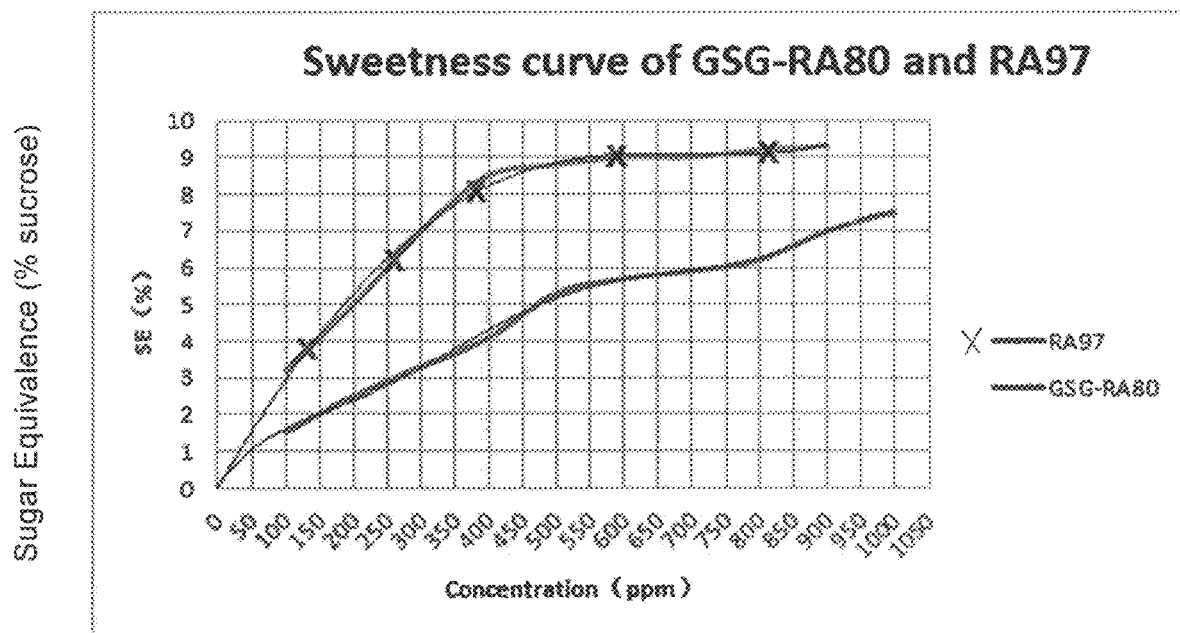
FIG. 34 is a graphical illustration showing the sweetness curve of GSG-RA80 and RA97.

A sweetness curve was prepared for GSG-RA80 and RA97 compositions (FIG. 34), and the taste profiles of 350 ppm total solid content samples were taken as shown in Table 41.

TABLE 41

| RA97 (ppm) | GSG-RA80 (ppm) | Total solid content (ppm) | SE | Sugar like | Bitterness | After-taste | Lingering | total GSG |
|---|---|---|---|---|---|---|---|---|
| 350 | — | 350 | 8% | 3 | 2 | 3 | 4 | |
| 300 | 50 | 350 | 7.5% | 4 | 0 | 1 | 2 | 12.71% |
| 250 | 100 | 350 | 8% | 4 | 0 | 0.5 | 2 | 25.43% |
| 200 | 150 | 350 | 7.8% | 4.5 | 0 | 0 | 2 | 38.14% |
| 150 | 200 | 350 | 7.2% | 4 | 0 | 0 | 2 | 50.86% |
| 100 | 250 | 350 | 7% | 4 | 0 | 0 | 2 | 63.57% |

At 350 ppm total solid content, a synergistic effect was found at a range of 200-250 ppm RA97 and 100-150 ppm GSG-RA80.

The sweetness of GSG-RA80 or RA97 at each concentration was read according to the sweetness curve, and the combined sweetness of each composition of GSG-RA80 and RA97 was calculated and compared with measured value in Table 42.

TABLE 42

| RA97 (ppm) | Calc. SE of RA97 | GSG-RA80 | Calc. SE of GSG-RA80 | Calc. SE of the composition | Measured SE of the composition | Calc. sweetness (ppm sugar) of GSG-RA80 per ppm | Measured sweetness (ppm sugar) of GSG-RA80 per ppm |
|---|---|---|---|---|---|---|---|
| 350 | — | — | — | — | 8% | 0 | 0 |
| 300 | 6.9% | 50 | 1% | 7.9% | 7.5% | 200 | 120 |
| 250 | 6% | 100 | 1.5% | 7.5% | 8% | 150 | 200 |
| 200 | 5% | 150 | 2% | 7% | 7.8% | 133.33 | 186.67 |
| 150 | 4.2% | 200 | 2.5% | 6.7% | 7.2% | 125 | 150 |
| 100 | 3% | 250 | 3% | 6% | 7% | 120 | 160 |

Calculated sweetness (ppm sucrose) of GSG-RA80 per ppm=calculated SE of GSG-RA80/concentration of GSG-RA80. Measured sweetness (ppm sucrose) of GSG-RA80 per ppm=(Measured SE−calculated SE of RA97)/concentration of GSG-RA80.

Conclusion

Figure 35:
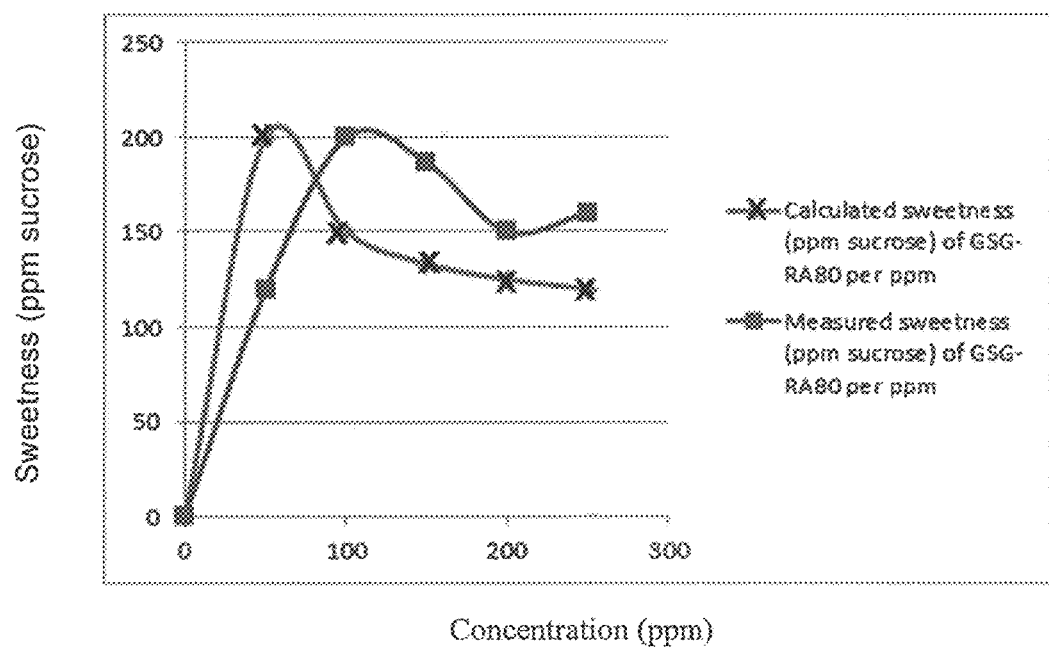
FIG. 35 is a graphical illustration showing the calculated and measured sweetness of GSG-RA80 per ppm in 350 ppm GSG-RA80 and RA97 compositions.

At 350 ppm total solid content, increasing the amount of GSG-RA80 results in a measured contribution of sweetness that rises continuously as shown in FIG. 35. When the concentration of GSG-RA80 is more than 100 ppm, the measured contribution of sweetness is higher than calculated. A positive synergistic sweetness effect was found when the concentration of GSG-RA80 was more than 100 ppm.

Example 22: Synergistic Effects of GSG-RA90 with RA97

Figure 36:
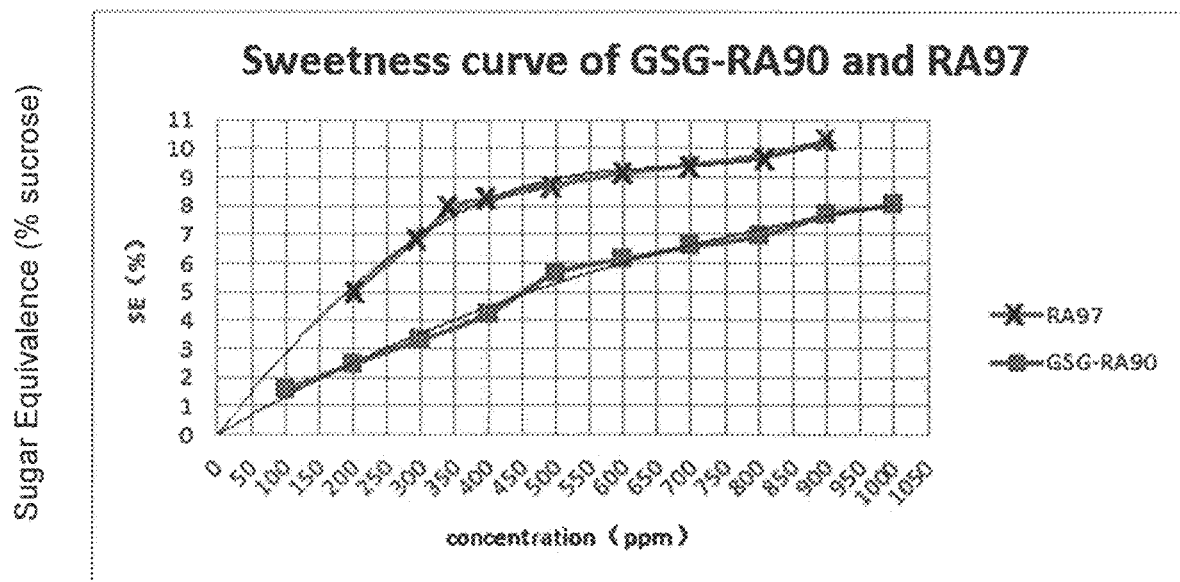
FIG. 36 is a graphical illustration showing the sweetness curve of GSG-RA90 and RA97.

A sweetness curve was prepared for GSG-RA90 and RA97 compositions (FIG. 36), and the taste profiles of 350 ppm total solid content samples were taken as shown in Table 43.

TABLE 43

| RA97 (ppm) | Calc. SE of RA97 | GSG-RA90 (ppm) | Calc. SE of GSG-RA90 | Calc. SE of the composition | Measured SE of the composition | Calc. sweetness (ppm sugar) of GSG-RA90 per ppm | Measured sweetness (ppm sugar) of GSG-RA90 per ppm | total GSG |
|---|---|---|---|---|---|---|---|---|
| 300 | 6.9% | 50 | 0.7% | 7.6% | 7.2% | 140 | 60.00 | 12.87% |
| 250 | 6% | 100 | 1.6% | 7.6% | 7% | 160 | 100.00 | 25.73% |
| 200 | 5% | 150 | 2% | 7% | 7.5% | 133 | 166.67 | 38.60% |
| 150 | 4% | 200 | 2.5% | 6.5% | 7.5% | 125 | 175.00 | 51.47% |
| 100 | 3.2% | 250 | 3% | 6.2% | 7% | 120 | 152.00 | 64.34% |
| 50 | 1.5% | 300 | 3.2% | 4.7% | 6% | 107 | 150.00 | 77.20% |

Calculated sweetness (ppm sugar) of GSG-RA90 per ppm=calculated SE of GSG-RA90/concentration of GSG-RA90. Measured sweetness (ppm sugar) of GSG-RA90 per ppm=(Measured SE-calculated SE of RA97)/concentration of GSG-RA90.

Conclusion

Figure 37:
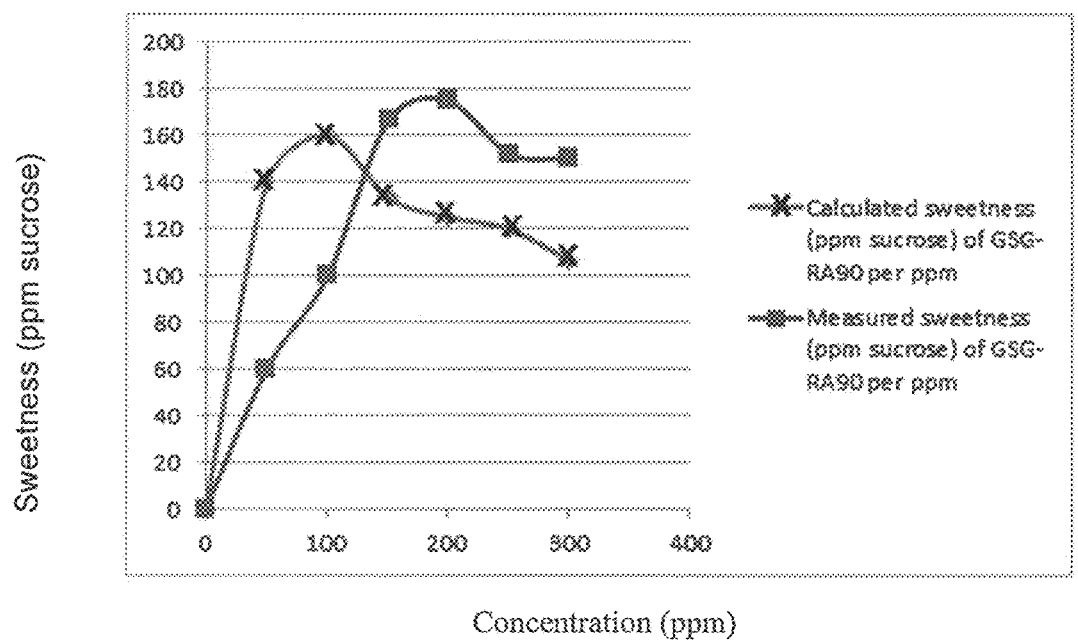
FIG. 37 is a graphical illustration showing the calculated and measured sweetness of GSG-RA90 per ppm in 350 ppm GSG-RA90 and RA97 compositions.

At 350 ppm total solid content, increasing the amount of GSG-RA90 results in a measured contribution of sweetness that rises continuously as shown in FIG. 37. When the concentration of GSG-RA90 is more than 150 ppm, the measured contribution of sweetness is higher than calculated. A positive synergistic sweetness effect was found when the concentration of GSG-RA90 was 150-200 ppm.

Example 23: Synergistic Effects of GSG-RA95 with RA97

Figure 38:
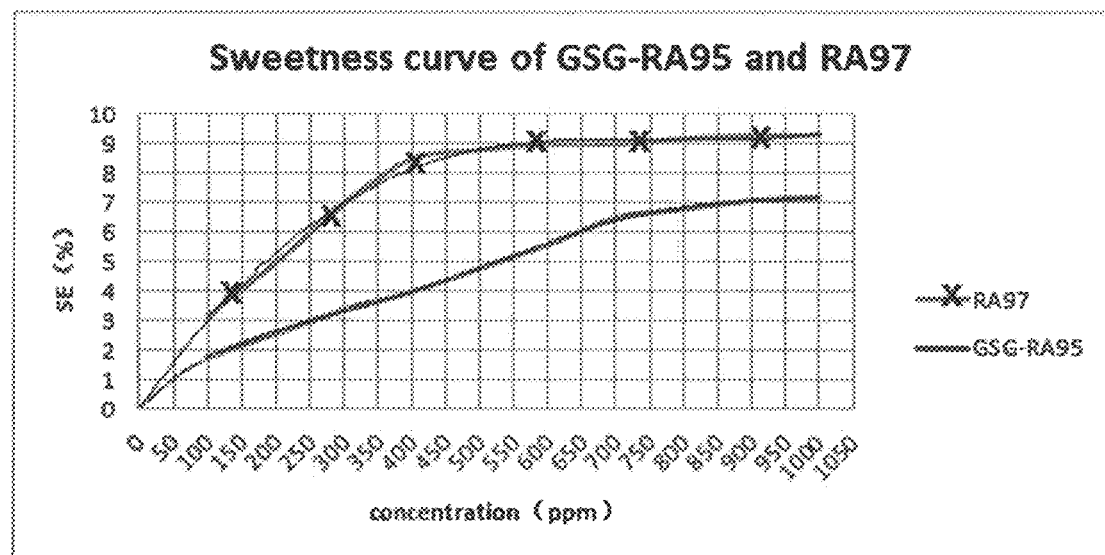
FIG. 38 is a graphical illustration showing the sweetness curve of GSG-RA95 and RA97.

A sweetness curve was prepared for GSG-RA95 and RA97 compositions (FIG. 38), and the taste profiles of 200 ppm total solid content samples were taken as shown in Table 44.

TABLE 44

| RA97 (ppm) | Calc. SE of RA97 | GSG-RA95 (ppm) | Calc. SE of GSG-RA95 | Calc. SE of the composition | Measured SE of the composition | Calc. sweetness (ppm sugar) of GSG-RA95 per ppm | Measured sweetness (ppm sugar) of GSG-RA95 per ppm | total GSG |
|---|---|---|---|---|---|---|---|---|
| 150 | 4.2% | 50 | 1% | 5.2% | 5% | 200 | 160.00 | 22.65% |
| 100 | 3% | 100 | 1.8% | 4.8% | 4.5% | 180 | 150.00 | 45.30% |
| 50 | 1.5% | 150 | 2.2% | 3.7% | 4% | 146.67 | 166.67 | 67.95% |

Calculated sweetness (ppm sugar) of GSG-RA95 per ppm=calculated SE of GSG-RA95/concentration of GSG-RA95. Measured sweetness (ppm sugar) of GSG-RA95 per ppm=(Measured SE-calculated SE of RA97)/concentration of GSG-RA95.

Conclusion

Figure 39:
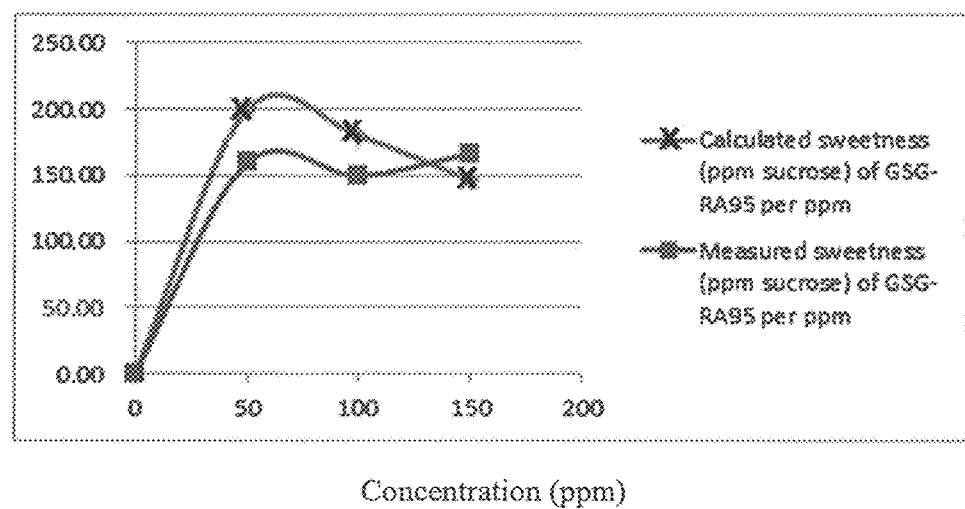
FIG. 39 is a graphical illustration showing the calculated and measured sweetness of GSG-RA95 per ppm in 200 ppm GSG-RA95 and RA97 compositions.

At 200 ppm total solid content, increasing the amount of GSG-RA95 results in a measured contribution to sweetness that was higher than the calculated value as shown in FIG. 39. A positive synergistic sweetness effect was found when GSG-RA95>100 ppm.

The samples with total solid content of 350 ppm are shown in Table 45.

TABLE 45

| RA97 (ppm) | Calc. SE of RA97 | GSG-RA95 (ppm) | Calc. SE of GSG-RA95 | Calc. SE of the composition | Measured SE of the composition | Calc. sweetness (ppm sucrose) of GSG-RA95 per ppm | Measured sweetness (ppm sucrose) of GSG-RA95 per ppm |
|---|---|---|---|---|---|---|---|
| 300 | 6.9% | 50 | 1% | 7.9% | 7% | 200 | 20.00 |
| 250 | 6% | 100 | 1.8% | 7.8% | 7.4% | 180 | 140.00 |
| 200 | 5% | 150 | 2.2% | 7.2% | 7.3% | 146.67 | 153.33 |
| 150 | 4% | 200 | 2.6% | 6.6% | 7.6% | 130 | 180.00 |
| 100 | 3.2% | 250 | 3% | 6.2% | 7.8% | 120 | 184.00 |
| 50 | 1.5% | 300 | 3.4% | 4.9% | 7.5% | 113.33 | 200.00 |

Conclusion

Figure 40:
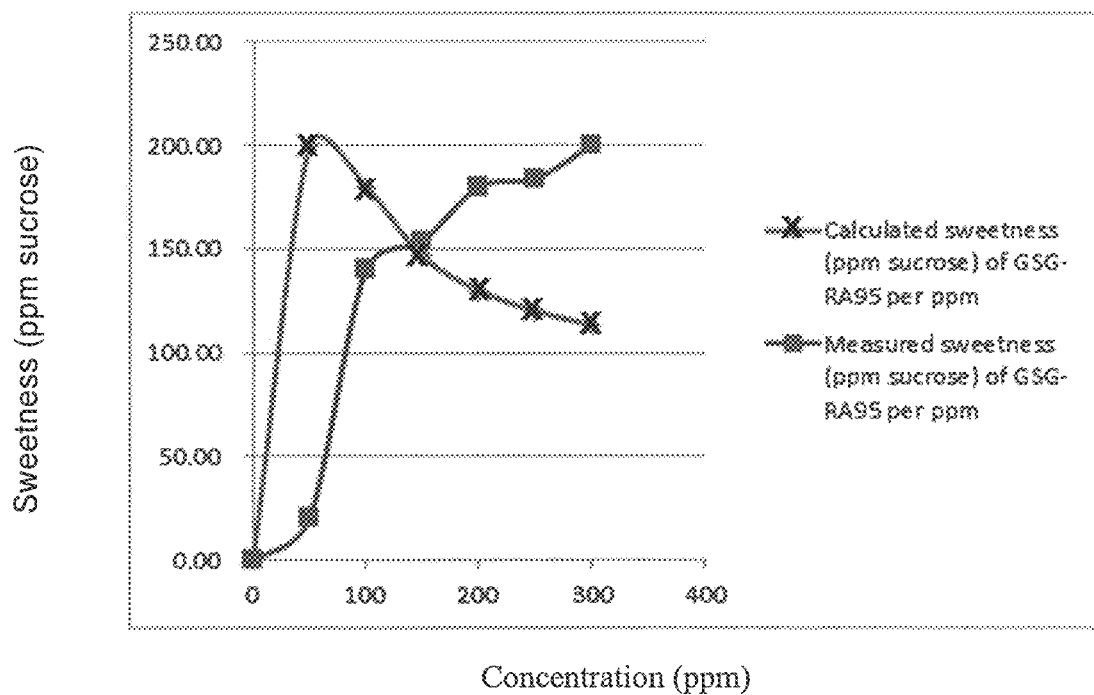
FIG. 40 is a graphical illustration showing the calculated and measured sweetness of GSG-RA95 per ppm in 350 ppm GSG-RA95 and RA97 compositions.

At 350 ppm total solid content, increasing the amount of GSG-RA95 results in a measured contribution of sweetness that was higher than the calculated value as shown in FIG. 40. A positive synergistic sweetness effect was found when GSG-RA95>150 ppm, specifically >200 ppm.

The samples with total solid content of 400 ppm are shown in Table 46.

TABLE 46

| RA97 (ppm) | Calc. SE of RA97 | GSG-RA95 (ppm) | Calc. SE of GSG-RA95 | Calc. SE of the composition | Measured SE of the composition | Calc. sweetness (ppm sucrose) of GSG-RA95 per ppm | Measured sweetness (ppm sucrose) of GSG-RA95 per ppm |
|---|---|---|---|---|---|---|---|
| 300 | 6.9% | 100 | 1.8% | 8.7% | 8% | 180 | 110.00 |
| 250 | 6% | 150 | 2.2% | 8.2% | 8.3% | 146.67 | 153.33 |
| 200 | 5% | 200 | 2.6% | 7.6% | 8.3% | 130 | 165.00 |
| 150 | 4.2% | 250 | 3% | 7.2% | 7.8% | 120 | 144.00 |
| 100 | 3% | 300 | 3.4% | 6.4% | 7.2% | 113.33 | 140.00 |

Conclusion

Figure 41:
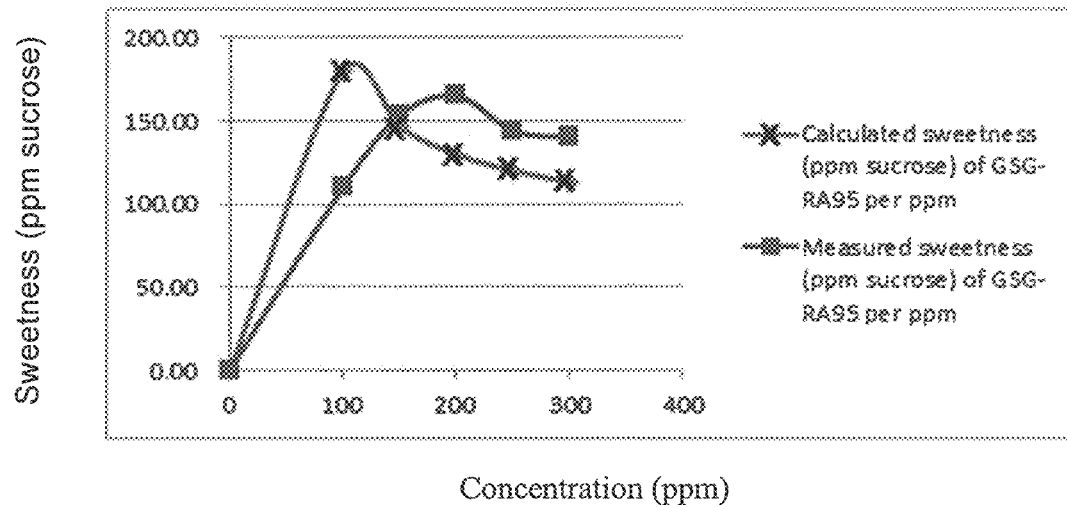
FIG. 41 is a graphical illustration showing the calculated and measured sweetness of GSG-RA95 per ppm in 400 ppm GSG-RA95 and RA97 compositions.

At 400 ppm total solid content, increasing the amount of GSG-RA50 results in a measured contribution of sweetness that was higher than the calculated value as shown in FIG. 41. A positive synergistic sweetness effect was found when GSG-RA95>150 ppm, with an optimal range of 150-200 ppm.

The samples with total solid content of 450 ppm are shown in Table 47.

TABLE 47

| RA97 (ppm) | Calc. SE of RA97 | GSG-RA95 (ppm) | Calc. SE of GSG-RA95 | Calc. SE of the composition | Measured SE of the composition | Calc. sweetness (ppm sucrose) of GSG-RA95 per ppm | Measured sweetness (ppm sucrose) of GSG-RA95 per ppm |
|---|---|---|---|---|---|---|---|
| 300 | 6.9% | 150 | 2.2% | 9.1% | 8.5% | 146.67 | 106.67 |
| 250 | 6% | 200 | 2.6% | 8.6% | 8.5% | 130.00 | 125.00 |
| 200 | 5% | 250 | 3% | 8% | 8.5% | 120.00 | 140.00 |
| 150 | 4.2% | 300 | 3.4% | 7.6% | 8% | 113.33 | 126.67 |
| 100 | 3% | 350 | 3.8% | 6.8% | 7.5% | 108.57 | 128.57 |

Conclusion

Figure 42:
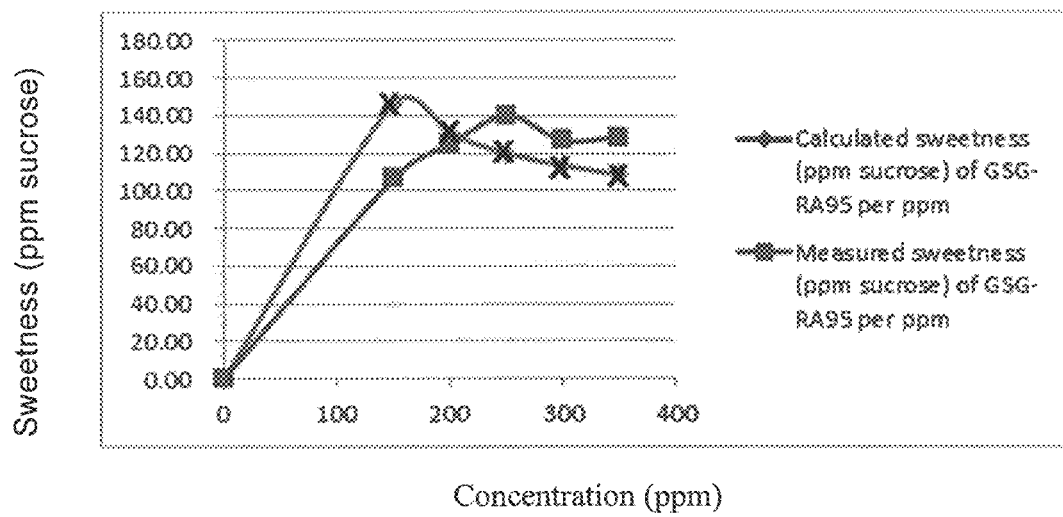
FIG. 42 is a graphical illustration showing the calculated and measured sweetness of GSG-RA95 per ppm in 450 ppm GSG-RA95 and RA97 compositions.

At 450 ppm total solid content, increasing the amount of GSG-RA50 results in a measured contribution of sweetness that was higher than the calculated value as shown in FIG. 42. A positive synergistic sweetness effect was found when GSG-RA50>200 ppm, with an optimal range about 250 ppm.

The samples with total solid content of 500 ppm are shown in Table 48.

TABLE 48

| RA97 (ppm) | Calc. SE of RA97 | GSG-RA95 (ppm) | Calc. SE of GSG-RA95 | Calc. SE of the composition | Measured SE of the composition | Calc. sweetness (ppm sucrose) of GSG-RA95 per ppm | Measured sweetness (ppm sucrose) of GSG-RA95 per ppm |
|---|---|---|---|---|---|---|---|
| 400 | 8.25% | 100 | 1.8% | 10.05% | 9% | 180 | 75.00 |
| 300 | 7% | 200 | 2.6% | 9.5% | 9.8% | 130 | 145.00 |
| 200 | 5% | 300 | 3.4% | 8.4% | 9.2% | 113 | 140.00 |
| 100 | 3% | 400 | 4% | 7% | 8.2% | 100 | 130.00 |

Conclusion

Figure 43:
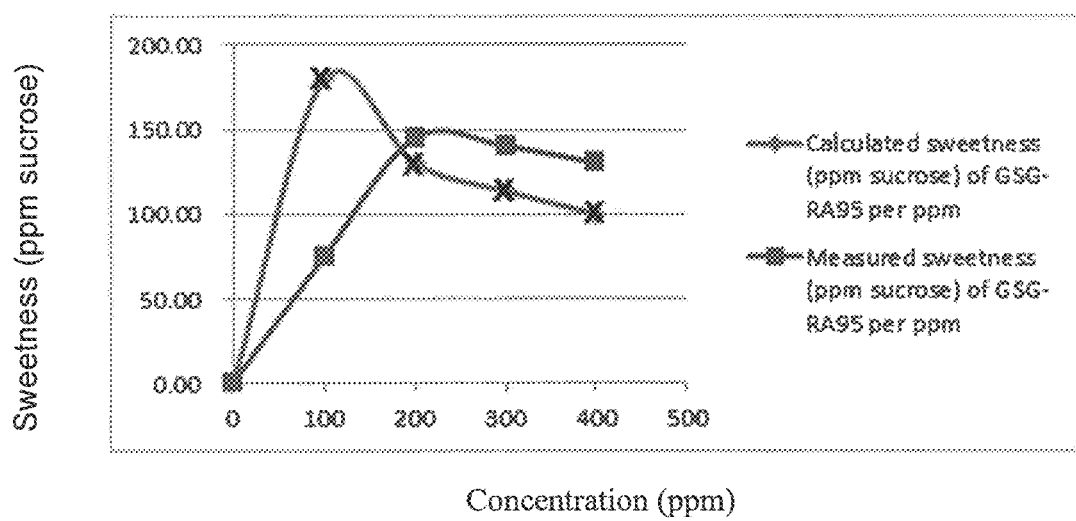
FIG. 43 is a graphical illustration showing the calculated and measured sweetness curves of GSG-RA95 per ppm in 500 ppm GSG-RA95 and RA97 compositions.

At 500 ppm total solid content, increasing the amount of GSG-RA95 results in a measured contribution of sweetness that was higher than the calculated value as shown in FIG. 43. A positive synergistic sweetness effect was found when GSG-RA95>200 ppm.

Example 24

Evaluating the taste profile of RA50/RC5 and GSG-RC5, in order to find out the taste improvement effect to RA50/RC5 by glycosylating.

Conditions: The samples were tested in aqueous solution of citric acid at pH 3.8.

The samples were as follows

TABLE 49

| RA50/RC5 | GSG-(RA50 + RC5) |
|---|---|
| 500 ppm | — |
| — | 1000 ppm |

The concentration of GSG-(RA50+RC5) is twice as high as RA50/RC5 in order to make the sweetness of them similar.

TABLE 50

| | | Results | | | |
|---|---|---|---|---|---|
| RA50/RC5 | GSG-(RA50 + RC5) | Sugar like | Bitterness | Aftertaste | Lingering |
| 500 ppm | — | 1 | 5 | 5 | 4 |
| — | 1000 ppm | 3 | 0.5 | 3 | 2 |

Glycosylating can improve the taste profile of RA50/RC5 significantly.

Example 25

Evaluating the taste profile of RA30/RC15 and GSG-(RA50+RC5), in order to find out the taste improvement effect to RA30/RC15 by glycosylating.

The samples were tested in aqueous solution of citric acid at pH 3.8.

The samples were as follows:

TABLE 51

| RA30/RC15 | GSG-(RA30 + RC15) |
|---|---|
| 500 ppm | — |
| — | 1000 ppm |

The concentration of GSG-(RA30+RC15) is twice as high as RA30/RC15 in order to make the sweetness of them similar.

TABLE 52

| | | Results | | | |
|---|---|---|---|---|---|
| RA30/RC15 | GSG-(RA30 + RC15) | Sugar like | Bitterness | Aftertaste | Lingering |
| 500 ppm | — | 0.5 | 5 | 5 | 4 |
| — | 1000 ppm | 3.5 | 0.5 | 2.5 | 2 |

Glycosylating can improve the taste profile of RA30/RC15 significantly.

Example 26

Evaluating the taste profile of RA40/RB8 and GSG-(RA40+RB8), in order to find out the taste improvement effect to RA40/RB8 by glycosylating.

The samples were tested in aqueous solution of citric acid at pH 3.8.

The samples were as follows:

TABLE 53

| RA40/RB8 | GSG-(RA40 + RB8) |
|---|---|
| 500 ppm | — |
| — | 1000 ppm |

The concentration of GSG-(RA40+RB8) is twice as high as RA40/RB8 in order to make the sweetness of them similar.

TABLE 54

| | | Results | | | |
|---|---|---|---|---|---|
| RA40/RB8 | GSG-(RA40 + RB8) | Sugar like | Bitterness | Aftertaste | Lingering |
| 500 ppm | — | 2 | 2 | 3 | 4 |
| — | 1000 ppm | 4 | 0 | 1 | 2 |

Glycosylating can improve the taste profile of RA40/RB8 significantly.

Example 27

Evaluating the taste profile of compositions of GSG-(RA50+RC5) and RA97, in order to find out the optimized ratio with the best synergistic taste effects.

The samples were tested in aqueous solution of citric acid at pH 3.8.

The control sample was RA97 at 400 ppm, corresponding to 8.3% SE.

The samples were as follows:

TABLE 55

| RA97 | GSG-(RA50 + RC5) |
|---|---|
| 400 ppm | — |
| 300 ppm | 100 ppm |
| 250 ppm | 150 ppm |
| 200 ppm | 200 ppm |
| 150 ppm | 250 ppm |
| 100 ppm | 300 ppm |

Figure 44:
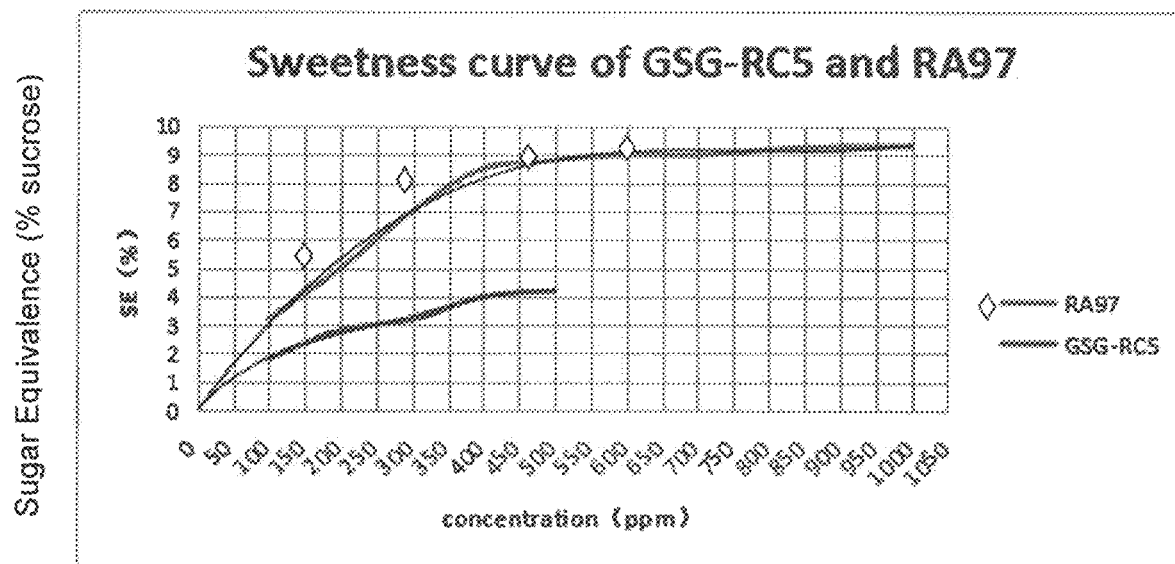
FIG. 44 is a graphical illustration showing the sweetness curve of GSG-(RA50+RC5) and RA97.

Sweetness curve of GSG-(RA50+RC5) and RA97 was shown as FIG. 44.

Taste profile of RA97/GSG-(RA50+RC5) composition was shown as follows:

TABLE 56

| RA97 | GSG-(RA50 + RC5) | SE | Sugar like | Bitterness | Aftertaste | Lingering |
|---|---|---|---|---|---|---|
| 400 ppm | | 8.30% | 3 | 2 | 3 | 4 |
| 300 ppm | 100 ppm | 8.30% | 3.5 | 0.5 | 2 | 3 |
| 250 ppm | 150 ppm | 8.50% | 4 | 0.5 | 1.5 | 3 |
| 200 ppm | 200 ppm | 8.50% | 3.5 | 0.5 | 2 | 2 |
| 150 ppm | 250 ppm | 8.00% | 3.5 | 0.5 | 3 | 3 |
| 100 ppm | 300 ppm | 7.00% | 3.5 | 0.5 | 3 | 2 |

The taste of RA97 was improved by GSG-(RA50+RC5), especially at the ratio of 3:1 to 1:1.

As for the synergistic effect, it can be found that

TABLE 57

| RA97 concentration | Calculated SE of RA97 | GSG-(RA50 + RC5) concentration | Calculated SE of GSG-(RA50 + RC5) | Calculated SE of the composition | Measured SE of the compositon | Calculated sweetness (ppm sucrose) of GSG-(RA50 + RC5) per ppm | Measured sweetness (ppm sucrose) of GSG-(RA50 + RC5) per ppm |
|---|---|---|---|---|---|---|---|
| 400 ppm | | 0 | | | | 0.00 | 0 |
| 300 ppm | 6.90% | 100 | 1.80% | 8.70% | 8.30% | 180.00 | 140.00 |
| 250 ppm | 6% | 150 | 2.30% | 8.30% | 8.50% | 153.33 | 166.67 |
| 200 ppm | 5% | 200 | 2.80% | 7.80% | 8.50% | 140.00 | 175.00 |
| 150 ppm | 4.20% | 250 | 3.00% | 7.20% | 8.00% | 120.00 | 152.00 |
| 100 ppm | 3% | 300 | 3.20% | 6.20% | 7.00% | 106.67 | 133.33 |

Calculated sweetness (ppm sugar) of GSG-(RA50+RC5) per ppm=calculated SE of GSG-(RA50+RC5)/concentration of GSG-RC5.

Measured sweetness (ppm sugar) of GSG-(RA50+RC5) per ppm=(Measured SE-calculated SE of RA97)/concentration of GSG-(RA50+RC5).

Figure 45:
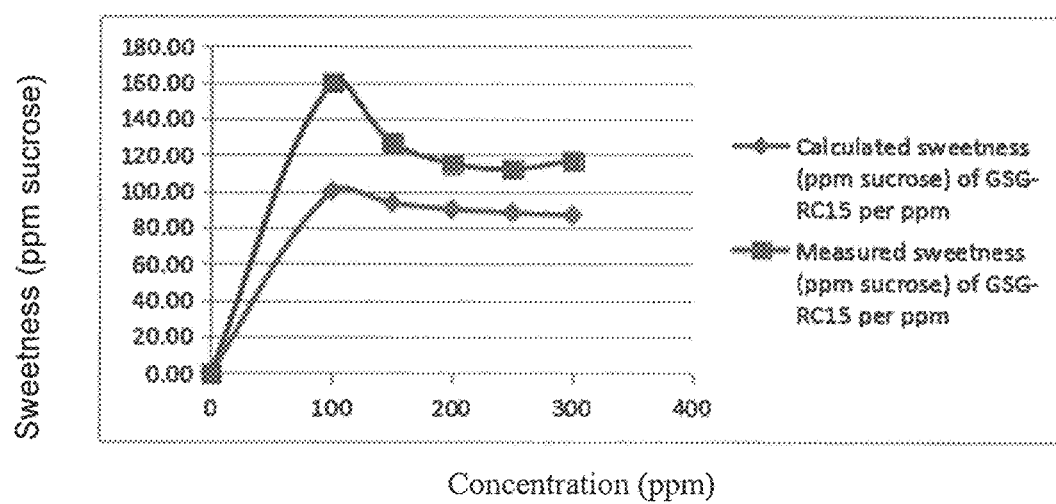
FIG. 45 is a graphical illustration showing the calculated and measured sweetness of GSG-RA80 per ppm in 400 ppm GSG-(RA50+RC5) and RA97 compositions.

The data were showed in FIG. 45.

It is found that at 400 ppm total solid content, with the increase of the amount of GSG-(RA50+RC5), its measured contribution of sweetness was higher than calculated value. Significant synergistic effect was found when GSG-(RA50+RC5)>150 ppm, although the optimized range was 150-200 ppm.

Example 28

Evaluating the taste profile of compositions of GSG-(RA30+RC15) and RA97, in order to find out the optimized ratio with the best synergistic taste effects.

The samples were tested in aqueous solution of citric acid at pH 3.8.

The control sample was RA97 at 400 ppm, corresponding to 8.3% SE.

The samples were as follows:

TABLE 58

| RA97 | GSG-(RA30 + RC15) |
|---|---|
| 400 ppm | — |
| 300 ppm | 100 ppm |
| 250 ppm | 150 ppm |
| 200 ppm | 200 ppm |
| 150 ppm | 250 ppm |
| 100 ppm | 300 ppm |

Figure 46:
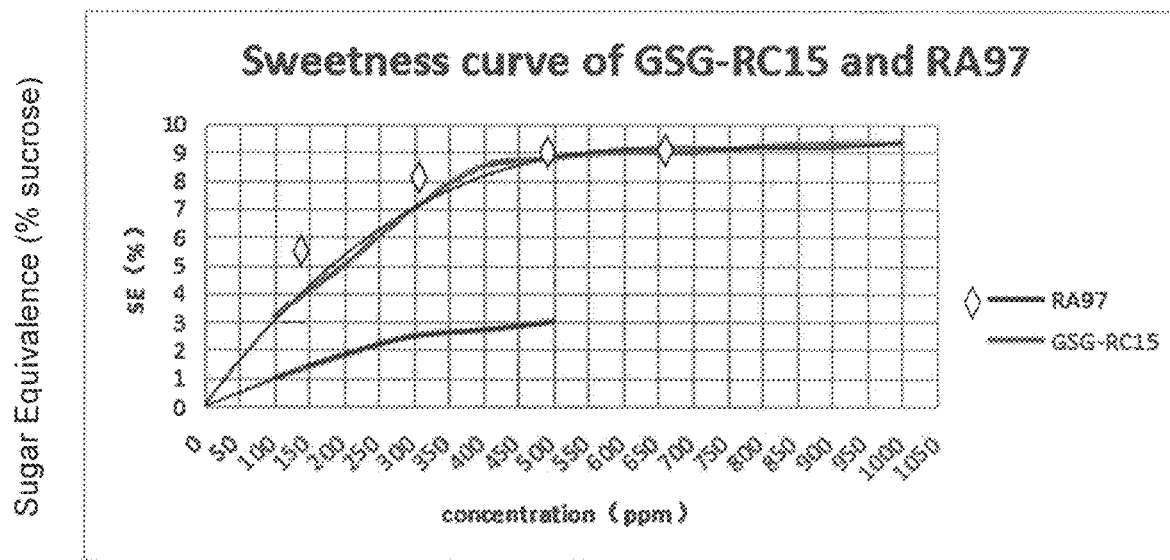
FIG. 46 is a graphical illustration showing the sweetness curve of GSG-(RA30+RC15) and RA97.

Sweetness curve of GSG-(RA30+RC15) and RA97 was shown in FIG. 46.

Taste profile of RA97/GSG-(RA30+RC15) composition was shown as follows:

TABLE 59

| RA97 | GSG-(RA30 + RC15) | SE | Sugar like | Bitterness | Aftertaste | Lingering |
|---|---|---|---|---|---|---|
| 400 ppm | | 8.30% | 3 | 2 | 3 | 4 |
| 300 ppm | 100 ppm | 8.50% | 3.5 | 0.5 | 1.5 | 2.5 |
| 250 ppm | 150 ppm | 7.90% | 3.5 | 0.5 | 1.5 | 2 |
| 200 ppm | 200 ppm | 7.30% | 3.5 | 0.5 | 1 | 2 |

TABLE 59-continued

| RA97 | GSG-(RA30 + RC15) | SE | Sugar like | Bitterness | Aftertaste | Lingering |
|---|---|---|---|---|---|---|
| 150 ppm | 250 ppm | 7.00% | 3.5 | 0.5 | 1 | 2 |
| 100 ppm | 300 ppm | 6.50% | 3.5 | 0.5 | 1.5 | 2 |

The taste of RA97 was improved by GSG-(RA30+RC15).
As for the synergistic effect, it can be found in Table 60.

TABLE 60

| RA97 concentration | Calculated SE of RA97 | GSG-(RA30 + RC15) concentration | Calculated SE of GSG-(RA30 + RC15) | Calculated SE of the composition | Measured SE of the composition | Calculated sweetness (ppm sucrose) of GSG-(RA30 + RC15) per ppm | Measured sweetness (ppm sucrose) of GSG-(RA30 + RC15) per ppm |
|---|---|---|---|---|---|---|---|
| 400 ppm | | 0 | | | | 0.00 | 0 |
| 300 ppm | 6.90% | 100 | 1.00% | 7.90% | 8.50% | 100.00 | 160.00 |
| 250 ppm | 6% | 150 | 1.40% | 7.40% | 7.90% | 93.33 | 126.67 |
| 200 ppm | 5% | 200 | 1.80% | 6.80% | 7.30% | 90.00 | 115.00 |
| 150 ppm | 4.20% | 250 | 2.20% | 6.40% | 7.00% | 88.00 | 112.00 |
| 100 ppm | 3% | 300 | 2.60% | 5.60% | 6.50% | 86.67 | 116.67 |

Calculated sweetness (ppm sugar) of GSG-(RA30+RC15) per ppm=calculated SE of GSG-(RA30+RC15)/concentration of GSG-(RA30+RC15)

Measured sweetness (ppm sugar) of GSG-(RA30+RC15) per ppm=(Measured SE-calculated SE of RA97)/concentration of GSG-(RA30+RC15)

Figure 47:
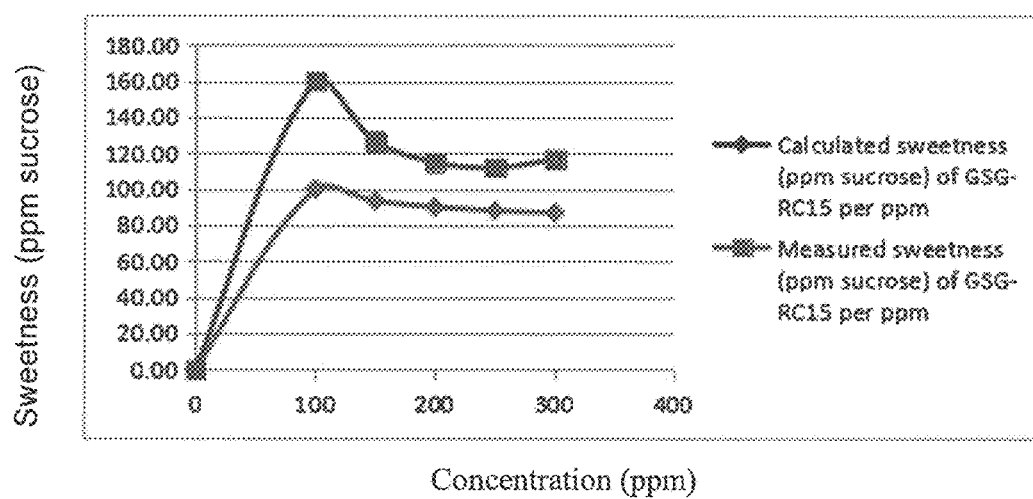
FIG. 47 is a graphical illustration showing the calculated and measured sweetness of GSG-(RA50+RC5) per ppm in 400 ppm GSG-(RA50+RC5) and RA97 compositions.

The data were showed in FIG. 47.

It is found that at 400 ppm total solid content, with the increase of the amount of GSG-(RA30+RC15), its measured contribution of sweetness was higher than calculated value. Significant synergistic effect was found when GSG-(RA30+RC15)>100 ppm, although the optimized range was 100-150 ppm.

Example 29

Evaluating the taste profile of compositions of GSG-(RA40+RB8) and RA97, in order to find out the optimized ratio with the best synergistic taste effects.

The samples were tested in aqueous solution of citric acid at pH 3.8.

The control sample was RA97 at 400 ppm, corresponding to 8.3% SE.

The samples were as follows:

TABLE 61

| RA97 | GSG-(RA40 + RB8) |
|---|---|
| 400 ppm | — |
| 300 ppm | 100 ppm |
| 250 ppm | 150 ppm |
| 200 ppm | 200 ppm |
| 150 ppm | 250 ppm |
| 100 ppm | 300 ppm |

Figure 48:
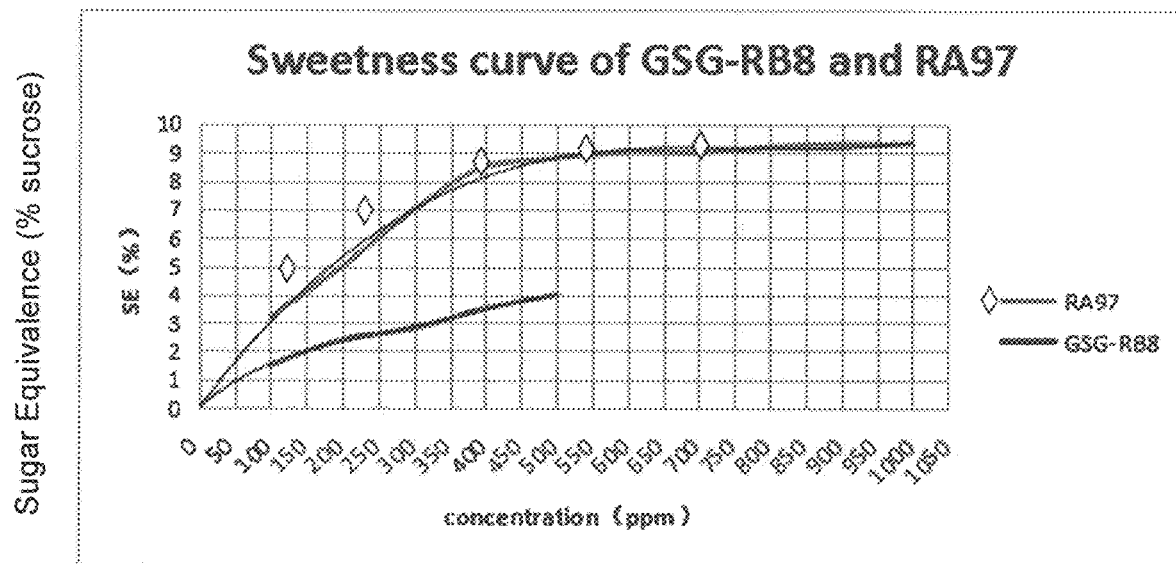
FIG. 48 is a graphical illustration showing the sweetness curve of GSG-(RA40+RB8) and RA97.

Sweetness curve of GSG-(RA40+RB8) and RA97 was shown in FIG. 48.

Taste profile of RA97/GSG-(RA40+RB8) composition was shown in Table 62.

TABLE 62

| RA97 | GSG-(RA40 + RB8) | SE | Sugar like | Bitterness | Aftertaste | Lingering |
|---|---|---|---|---|---|---|
| 400 ppm | — | 8.30% | 3 | 2 | 3 | 4 |
| 300 ppm | 100 ppm | 8.30% | 3 | 1 | 2 | 2.5 |
| 250 ppm | 150 ppm | 8.00% | 4.5 | 0 | 0.5 | 1 |
| 200 ppm | 200 ppm | 7.80% | 4 | 0 | 1 | 1 |
| 150 ppm | 250 ppm | 7.50% | 3.5 | 0 | 2 | 2 |
| 100 ppm | 300 ppm | 7.00% | 3.5 | 0 | 1.5 | 2 |

The taste of RA97 was improved by GSG-(RA40+RB8). As for the synergistic effect, it can be found in table 63.

TABLE 63

| RA97 concentration | Calculated SE of RA97 | GSG-(RA40 + RB8) concentration | Calculated SE of GSG-(RA40 + RB8) | Calculated SE of the composition | Measured SE of the composition | Calculated sweetness (ppm sucrose) of GSG-(RA40 + RB8) per ppm | Measured sweetness (ppm sucrose) of GSG-(RA40 + RB8) per ppm |
|---|---|---|---|---|---|---|---|
| 400 ppm | | 0 | | | | 0.00 | 0 |
| 300 ppm | 6.90% | 100 | 1.50% | 8.40% | 8.30% | 150.00 | 140.00 |

TABLE 63-continued

| RA97 concentration | Calculated SE of RA97 | GSG- (RA40 + RB8) concentration | Calculated SE of GSG- (RA40 + RB8) | Calculated SE of the composition | Measured SE of the composition | Calculated sweetness (ppm sucrose) of GSG- (RA40 + RB8) per ppm | Measured sweetness (ppm sucrose) of GSG- (RA40 + RB8) per ppm |
|---|---|---|---|---|---|---|---|
| 250 ppm | 6% | 150 | 2.00% | 8.00% | 8.00% | 133.33 | 133.33 |
| 200 ppm | 5% | 200 | 2.40% | 7.40% | 7.80% | 120.00 | 140.00 |
| 150 ppm | 4.20% | 250 | 2.70% | 6.90% | 7.50% | 108.00 | 132.00 |
| 100 ppm | 3% | 300 | 2.80% | 5.80% | 7.00% | 93.33 | 133.33 |

Calculated sweetness (ppm sugar) of GSG-(RA40+RB8) per ppm=calculated SE of GSG-(RA40+RB8)/concentration of GSG-(RA40+RB8)

Measured sweetness (ppm sugar) of GSG-(RA40+RB8) per ppm=(Measured SE-calculated SE of RA97)/concentration of GSG-(RA40+RB8)

Figure 49:
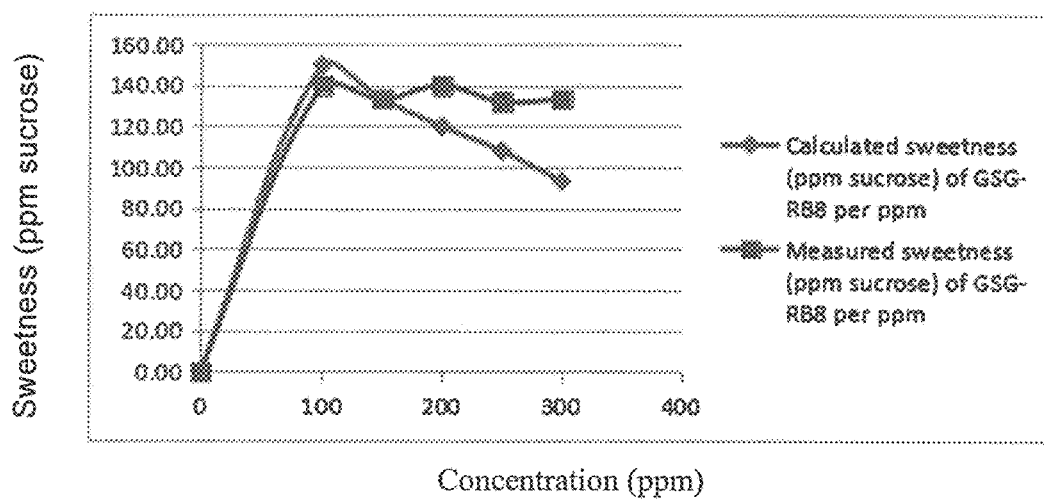
FIG. 49 is a graphical illustration showing the calculated and measured sweetness of GSG-(RA40+RB8) per ppm in 400 ppm GSG-(RA40+RB8) and RA97 compositions.

The data was showed in FIG. 49.

It is found that at 400 ppm total solid content, with the increase of the amount of GSG-(RA40+RB8), its measured contribution of sweetness was higher than calculated value. Significant synergistic effect was found when GSG-(RA40+RB8)>150 ppm, although the optimized range was 200-300 ppm.

Example 30

Evaluating the taste profile of compositions of GSG-RA20 and RA/RB/RD composition, in order to find out the optimized ratio with the best synergistic taste effects.

The samples were tested in aqueous solution of citric acid at pH 3.8.

The control sample was RA/RB/RD at 400 ppm, corresponding to 8.3% SE.

The samples were as follows:

TABLE 64

| RA/RB/RD composition | GSG-RA20 |
|---|---|
| 400 ppm | — |
| 300 ppm | 100 ppm |
| 250 ppm | 150 ppm |
| 200 ppm | 200 ppm |
| 150 ppm | 250 ppm |
| 100 ppm | 300 ppm |

Figure 50:
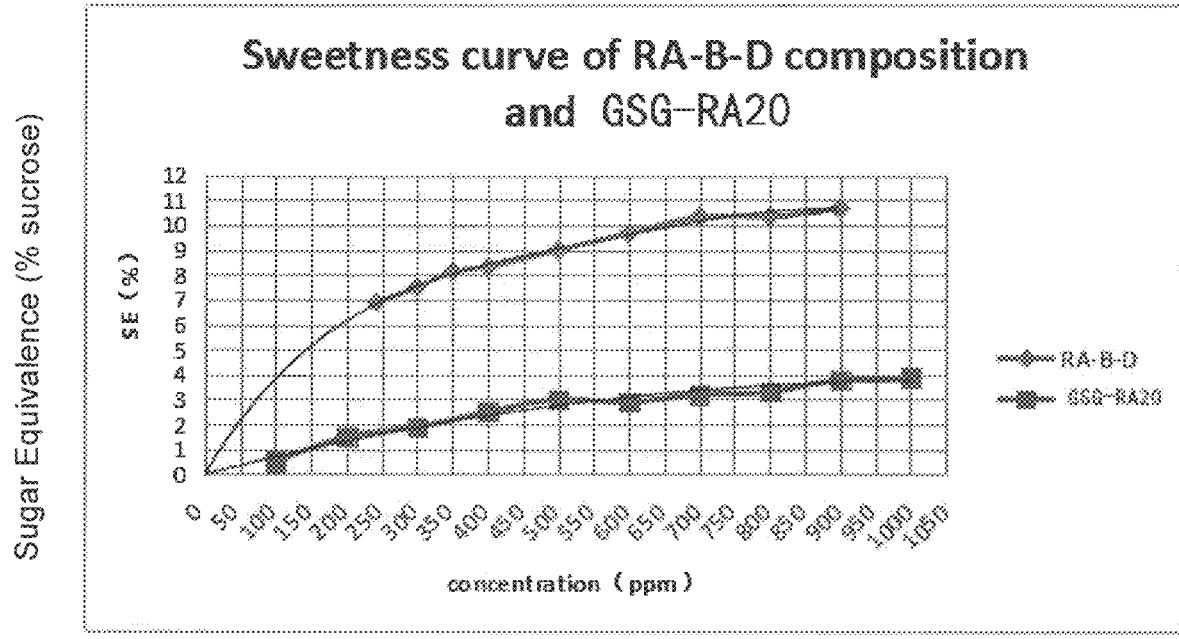
FIG. 50 is a graphical illustration showing the sweetness curve of GSG-RA20 and RA/RB/RD.

Sweetness curve of GSG-RA20 and RA/RB/RD composition was shown as FIG. 50.

Taste profile of RA/RB/RD/GSG-RA20 composition was shown in table 65.

TABLE 65

| RA/RB/RD composition | GSG-RA20 | SE |
|---|---|---|
| 400 ppm | — | 8.30% |
| 300 ppm | 100 ppm | 8.70% |
| 250 ppm | 150 ppm | 9.00% |
| 200 ppm | 200 ppm | 8.80% |
| 150 ppm | 250 ppm | 8.50% |
| 100 ppm | 300 ppm | 8.00% |

As for the synergistic effect, it can be found in table 66.

TABLE 66

| RA-B-D concentration | Calculated SE of RA-B-D | GSG- RA20 concentration | Calculated SE of GSG- RA20 | Calculated SE of the composition | Measured SE of the composition | Calculated sweetness (ppm sucrose) of GSG-RA20 per ppm | Measured sweetness (ppm sucrose) of GSG-RA20 per ppm |
|---|---|---|---|---|---|---|---|
| 400 ppm |  | 0 |  |  |  | 0.00 | 0 |
| 300 ppm | 7.20% | 100 | 1.50% | 8.70% | 8.70% | 150.00 | 150.00 |
| 250 ppm | 6.00% | 150 | 2.00% | 8.00% | 9.00% | 133.33 | 200.00 |
| 200 ppm | 5.40% | 200 | 2.40% | 7.80% | 8.80% | 120.00 | 170.00 |
| 150 ppm | 4.20% | 250 | 2.70% | 6.90% | 8.50% | 108.00 | 172.00 |
| 100 ppm | 3.00% | 300 | 2.80% | 5.80% | 8.00% | 93.33 | 166.67 |

Calculated sweetness (ppm sugar) of GSG-RA20 per ppm=calculated SE of GSG-RA20/concentration of GSG-RA20

Measured sweetness (ppm sugar) of GSG-RA20 per ppm=(Measured SE–calculated SE of RA-B-D composition)/concentration of GSG-RA20

Figure 51:
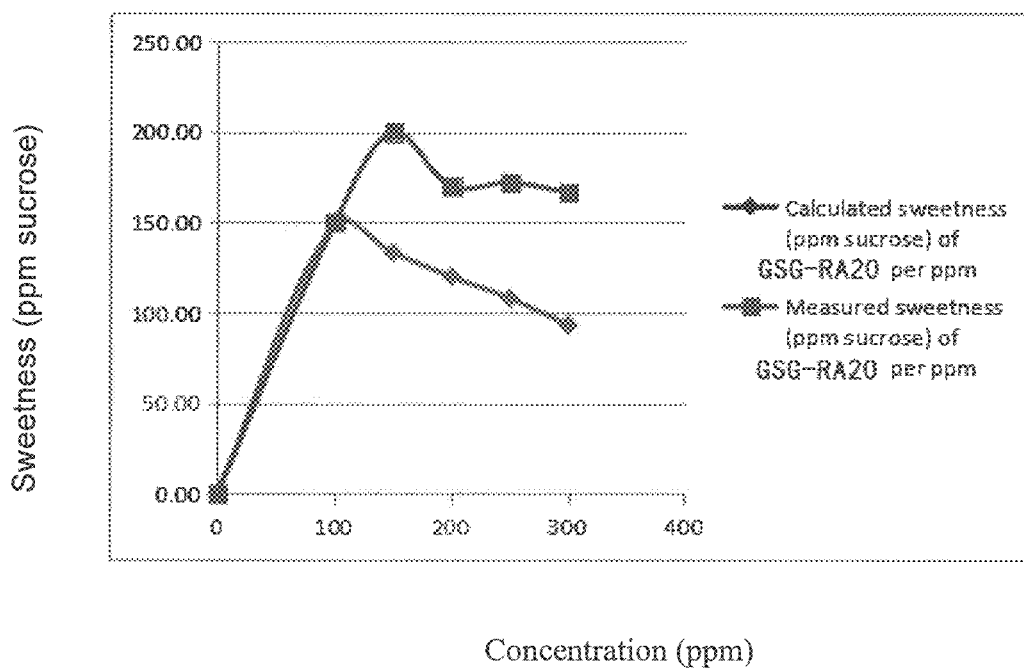
FIG. 51 is a graphical illustration showing the calculated and measured sweetness of GSG-RA20 per ppm in 400 ppm GSG-RA20 and RA/RB/RD compositions.

The data were showed in FIG. 51.

It is found that at 400 ppm total solid content, with the increase of the amount of GSG-RA20, its measured contribution of sweetness was higher than calculated value. Significant synergistic effect was found when GSG-RA20>100 ppm, although the optimized range was 150-200 ppm.

Example 31

Evaluating the taste profile of compositions of GSG-RA95 and RA75/RB15, in order to find out the optimized ratio with the best synergistic taste effects.

The samples were tested in aqueous solution of citric acid at pH 3.8.

The control sample was RA75/RB15 at 400 ppm, corresponding to 7.0% SE.

The samples were as follows:

TABLE 67

| RA75/RB15 | GSG-RA95 | total GSG |
|---|---|---|
| 400 ppm | — | |
| 300 ppm | 100 ppm | 22.65% |
| 250 ppm | 150 ppm | 33.98% |
| 200 ppm | 200 ppm | 45.30% |
| 150 ppm | 250 ppm | 56.63% |
| 100 ppm | 300 ppm | 67.95% |

Figure 52:
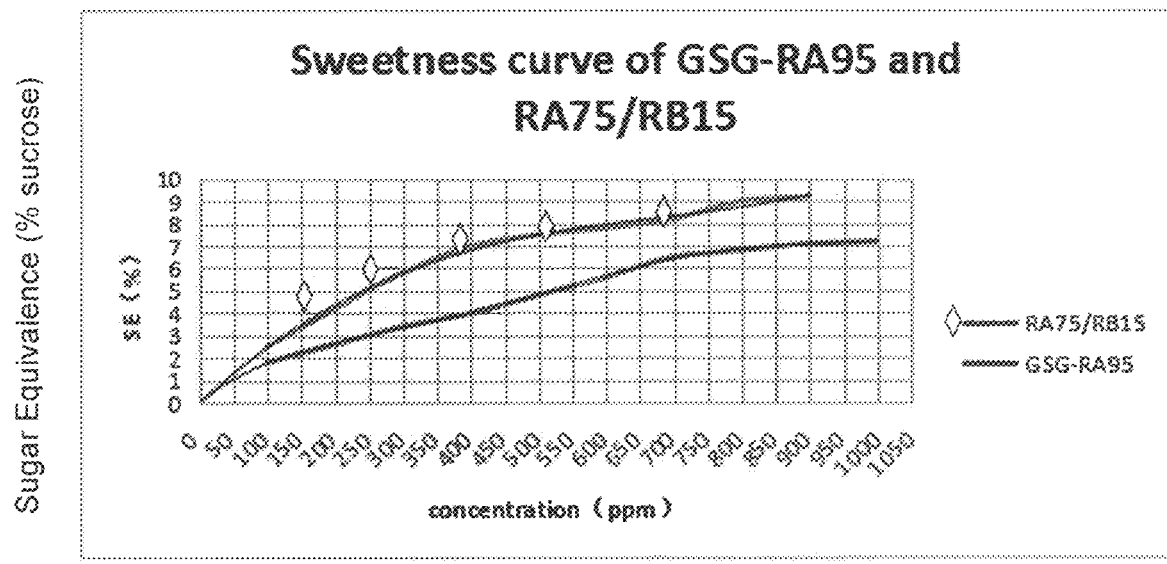
FIG. 52 is a graphical illustration showing the sweetness curve of GSG-RA95 and RA75/RB15.

Sweetness curve of GSG-RA95 and RA75/RB15 was shown in FIG. 52.

Taste profile of RA75/RB15/GSG-RA95 composition was shown in table 68.

TABLE 68

| RA75/RB15 | GSG-RA95 | SE | Sugar like | Bitterness | Aftertaste | Lingering |
|---|---|---|---|---|---|---|
| 400 ppm | — | 7.0% | 4.5 | 0 | 1.5 | 1.5 |
| 300 ppm | 100 ppm | 7.0% | 4.5 | 0 | 1 | 1.5 |
| 250 ppm | 150 ppm | 7.8% | 4 | 0 | 2 | 2 |
| 200 ppm | 200 ppm | 7.5% | 4 | 0 | 2 | 2 |
| 150 ppm | 250 ppm | 6.5% | 4.5 | 0 | 0.5 | 1 |
| 100 ppm | 300 ppm | 6.0% | 4.5 | 0 | 0.5 | 1.5 |

The taste of RA75/RB15 was improved by GSG-RA95 although the taste of itself is good enough.

As for the synergistic effect, it can be found in table 69.

TABLE 69

| RA75/RB15 concentration | Calculated SE of RA75/RB15 | GSG-RA95 concentraion | Calculated SE of GSG-RA95 | Calculated SE of the compostion | Measured SE of the compositon | Calculated sweetness (ppm sucrose) of GSG-RA95 per ppm | Measured sweetness (ppm sucrose) of GSG-RA95 per ppm |
|---|---|---|---|---|---|---|---|
| 400 ppm | 0 | | | | | 0.00 | 0 |
| 300 ppm | 5.80% | 100 | 1.80% | 7.60% | 7.40% | 180.00 | 160.00 |
| 250 ppm | 5% | 150 | 2.20% | 7.20% | 7.90% | 146.67 | 193.33 |
| 200 ppm | 4% | 200 | 2.60% | 6.80% | 7.70% | 130.00 | 175.00 |
| 150 ppm | 3.40% | 250 | 3.00% | 6.40% | 6.80% | 120.00 | 136.00 |
| 100 ppm | 3% | 300 | 3.40% | 5.90% | 6.50% | 113.33 | 133.33 |

Calculated sweetness (ppm sugar) of GSG-RA95 per ppm=calculated SE of GSG-RA95/concentration of GSG-RA95

Measured sweetness (ppm sugar) of GSG-RA95 per ppm=(Measured SE−calculated SE of RA75/RB15)/concentration of GSG-RA95

Figure 53:
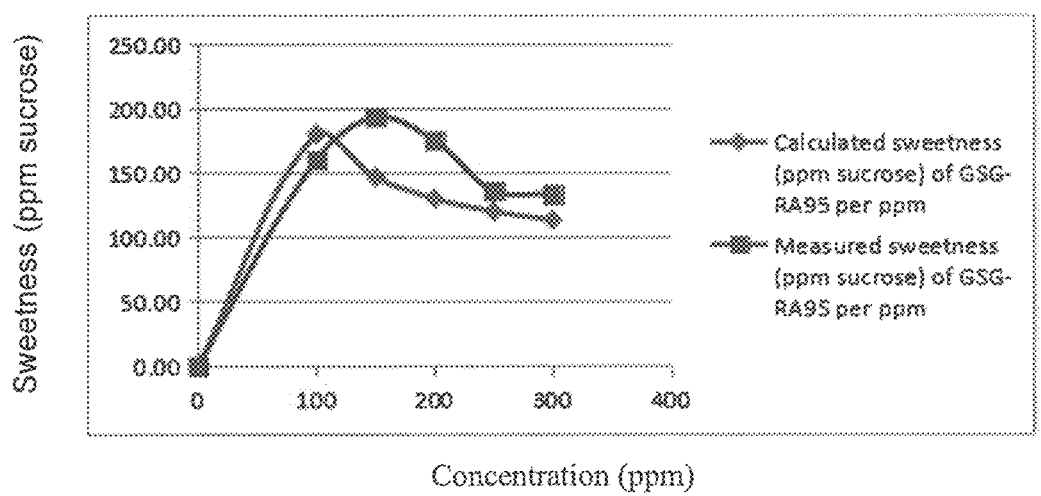
FIG. 53 is a graphical illustration showing the calculated and measured sweetness of GSG-RA95 per ppm in 400 ppm GSG-RA95 and RA75/RB15 compositions.

The data were showed in FIG. 53.

It is found that at 400 ppm total solid content, with the increase of the amount of GSG-RA95, its measured contribution of sweetness was higher than calculated value. Significant synergistic effect was found when GSG-RA95>150 ppm, although the optimized range was 150-200 ppm.

Example 32

Evaluating the taste profile of compositions of GSG-RA95 and RA/RD, in order to find out the optimized ratio with the best synergistic taste effects.

The samples were tested in aqueous solution of citric acid at pH 3.8.

The control sample was RA/RD at 400 ppm, corresponding to 6.5% SE.

The samples were as follows:

TABLE 70

| RA/RD | GSG-RA95 | total GSG |
|---|---|---|
| 400 ppm | — | |
| 300 ppm | 100 ppm | 22.65% |
| 250 ppm | 150 ppm | 33.98% |
| 200 ppm | 200 ppm | 45.30% |
| 150 ppm | 250 ppm | 56.63% |
| 100 ppm | 300 ppm | 67.95% |

Figure 54:
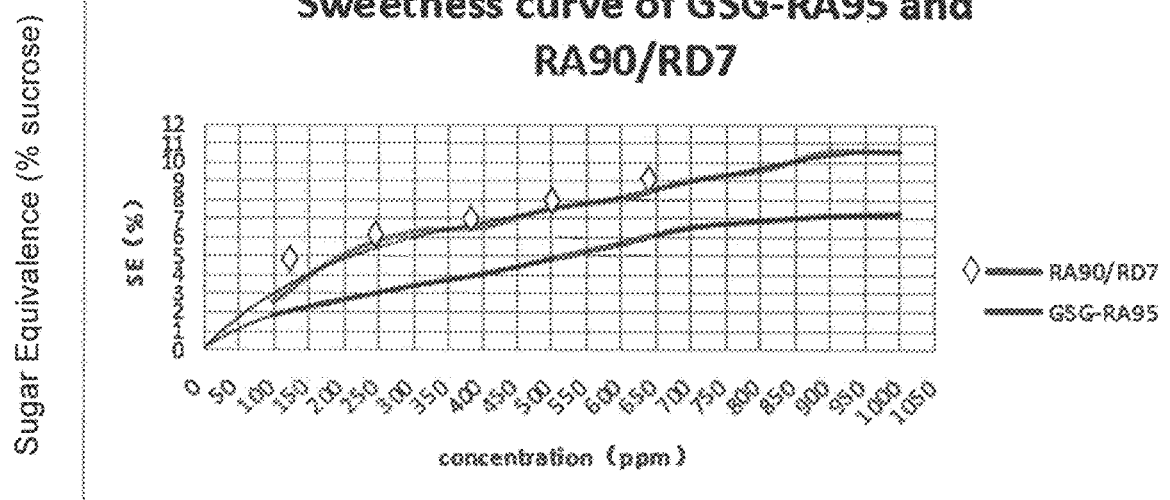
FIG. 54 is a graphical illustration showing the sweetness curve of GSG-RA95 and RA/RD.

Sweetness curve of GSG-RA95 and RA/RD was shown as FIG. 54.

Taste profile of RA/RD/GSG-RA95 composition was shown in table 71.

TABLE 71

| RA/RD | GSG-RA95 | SE | Sugar like | Bitterness | Aftertaste | Lingering |
|---|---|---|---|---|---|---|
| 400 ppm | — | 6.5% | 3.5 | 1 | 1 | 1.5 |
| 300 ppm | 100 ppm | 8% | 4.5 | 0 | 0.5 | 0.5 |
| 250 ppm | 150 ppm | 8.30% | 4 | 0 | 1 | 0.5 |
| 200 ppm | 200 ppm | 7.80% | 4.5 | 0 | 0.5 | 0.5 |
| 150 ppm | 250 ppm | 7.50% | 4.5 | 0 | 0.5 | 0.5 |
| 100 ppm | 300 ppm | 6.80% | 4.5 | 0 | 0 | 0.5 |

The taste of RA/RD was improved by GSG-RA95 by reducing the bitterness and lingering.

As for the synergistic effect, it can be found in table 72.

TABLE 72

| RA/RD concentration | Calculated SE of RA/RD | GSG-RA95 concentration | Calculated SE of GSG-RA95 | Calculated SE of the composition | Measured SE of the composition | Calculated sweetness (ppm sucrose) of GSG-RA95 per ppm | Measured sweetness (ppm sucrose) of GSG-RA95 per ppm |
|---|---|---|---|---|---|---|---|
| 400 ppm | | 0 | | | | 0.00 | 0 |
| 300 ppm | 6.00% | 100 | 1.80% | 7.80% | 8% | 180.00 | 200.00 |
| 250 ppm | 5.50% | 150 | 2.20% | 7.70% | 8.30% | 146.67 | 186.67 |
| 200 ppm | 4.80% | 200 | 2.60% | 7.40% | 7.80% | 130.00 | 150.00 |
| 150 ppm | 4.00% | 250 | 3.00% | 7.00% | 7.50% | 120.00 | 140.00 |
| 100 ppm | 3.00% | 300 | 3.40% | 6.40% | 6.80% | 113.33 | 126.67 |

Calculated sweetness (ppm sugar) of GSG-RA95 per ppm=calculated SE of GSG-RA95/concentration of GSG-RA95

Measured sweetness (ppm sugar) of GSG-RA95 per ppm=(Measured SE−calculated SE of RA/RD)/concentration of GSG-RA95

Figure 55:
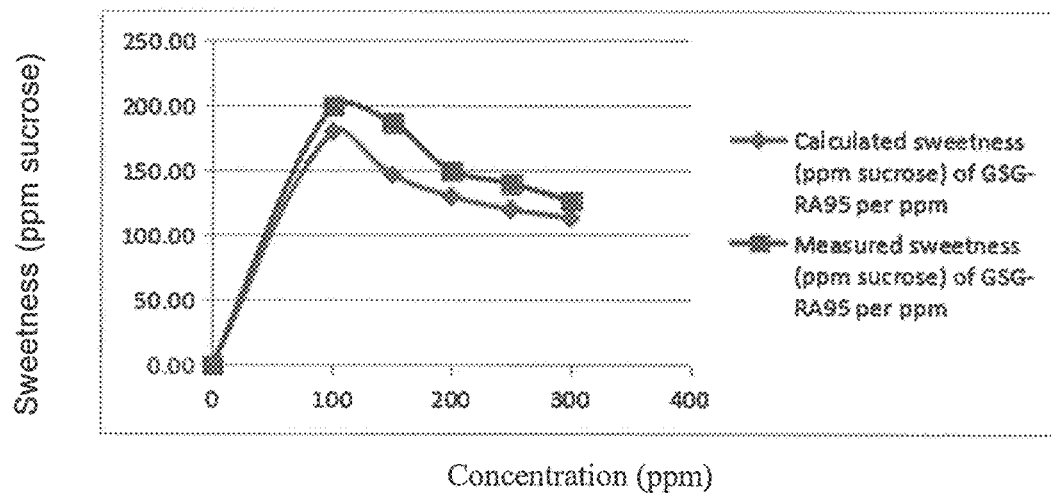
FIG. 55 is a graphical illustration showing the calculated and measured sweetness of GSG-RA95 per ppm in 400 ppm GSG-RA95 and RA/RD compositions.

The data were showed in FIG. 55.

It is found that at 400 ppm total solid content, with the increase of the amount of GSG-RA95, its measured contribution of sweetness was higher than calculated value. Significant synergistic effect was found when GSG-RA95>100 ppm, although the optimized range was 100-250 ppm.

Example 33

Evaluating the taste profile of compositions of GSG-RA95 and RA80/RB10/RD6, in order to find out the optimized ratio with the best synergistic taste effects.

The samples were tested in aqueous solution of citric acid at pH 3.8.

The control sample was RA80/RB10/RD6 at 400 ppm, corresponding to 8.3% SE.

The samples were as follows:

TABLE 73

| RA80/RB10/RD6 | GSG-RA95 | total GSG |
|---|---|---|
| 400 ppm | — | |
| 300 ppm | 100 ppm | 22.65% |
| 250 ppm | 150 ppm | 33.98% |
| 200 ppm | 200 ppm | 45.30% |
| 150 ppm | 250 ppm | 56.63% |
| 100 ppm | 300 ppm | 67.95% |

Figure 56:
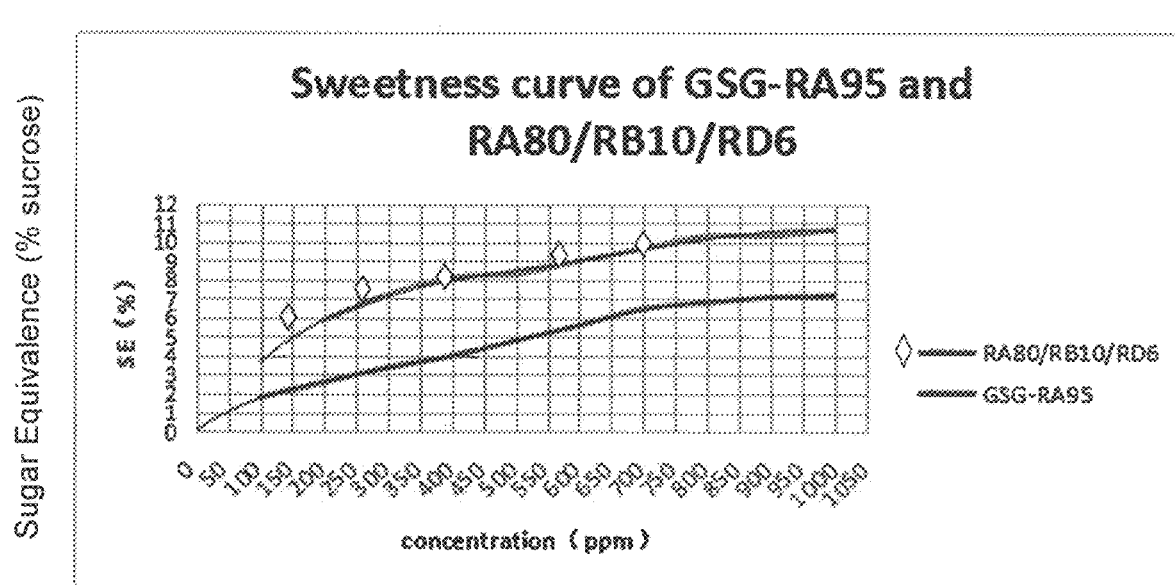
FIG. 56 is a graphical illustration showing the sweetness curve of GSG-RA95 and RA80/RB10/RD6.

Sweetness curve of GSG-RA95 and RA80/RB10/RD6 was shown as FIG. 56.

Taste profile of RA80/RB10/RD6/GSG-RA95 composition was shown in table 74.

TABLE 74

| RA80/RB10/RD6 | GSG-RA95 | SE | Sugar like | Bitterness | Aftertaste | Lingering |
|---|---|---|---|---|---|---|
| 400 ppm | — | 8.3% | 4.5 | 0 | 0 | 0.5 |
| 300 ppm | 100 ppm | 7.70% | 4.5 | 0 | 0.5 | 0.5 |
| 250 ppm | 150 ppm | 8.30% | 4.5 | 0 | 0 | 0.5 |
| 200 ppm | 200 ppm | 8.30% | 4 | 0 | 0.5 | 0.5 |

TABLE 74-continued

| RA80/RB10/RD6 | GSG-RA95 | SE | Sugar like | Bitterness | Aftertaste | Lingering |
|---|---|---|---|---|---|---|
| 150 ppm | 250 ppm | 8.20% | 4.5 | 0 | 0 | 0.5 |
| 100 ppm | 300 ppm | 7.20% | 3.5 | 0 | 1 | 1 |

As for the synergistic effect, it can be found in table 75.

TABLE 75

| RA80/RB10/RD6 concentration | Calculated SE of RA80/RB10/RD6 | GSG-RA95 concentration | Calculated SE of GSG-RA95 | Calculated SE of the composition | Measured SE of the composition | Calculated sweetness (ppm sucrose) of GSG-RA95 per ppm | Measured sweetness (ppm sucrose) of GSG-RA95 per ppm |
|---|---|---|---|---|---|---|---|
| 400 ppm | | 0 | | | | 0.00 | 0 |
| 300 ppm | 7.20% | 100 | 1.80% | 9.00% | 7.70% | 180.00 | 50.00 |
| 250 ppm | 6.00% | 150 | 2.20% | 8.20% | 8.30% | 146.67 | 153.33 |
| 200 ppm | 5.40% | 200 | 2.60% | 8.00% | 8.30% | 130.00 | 145.00 |
| 150 ppm | 4.20% | 250 | 3.00% | 7.20% | 8.20% | 120.00 | 160.00 |
| 100 ppm | 3.00% | 300 | 3.40% | 6.40% | 7.20% | 113.33 | 140.00 |

Calculated sweetness (ppm sugar) of GSG-RA95 per ppm=calculated SE of GSG-RA95/concentration of GSG-RA95

Measured sweetness (ppm sugar) of GSG-RA95 per ppm=(Measured SE−calculated SE of RA80/RB10/RD6)/concentration of GSG-RA95

Figure 57:
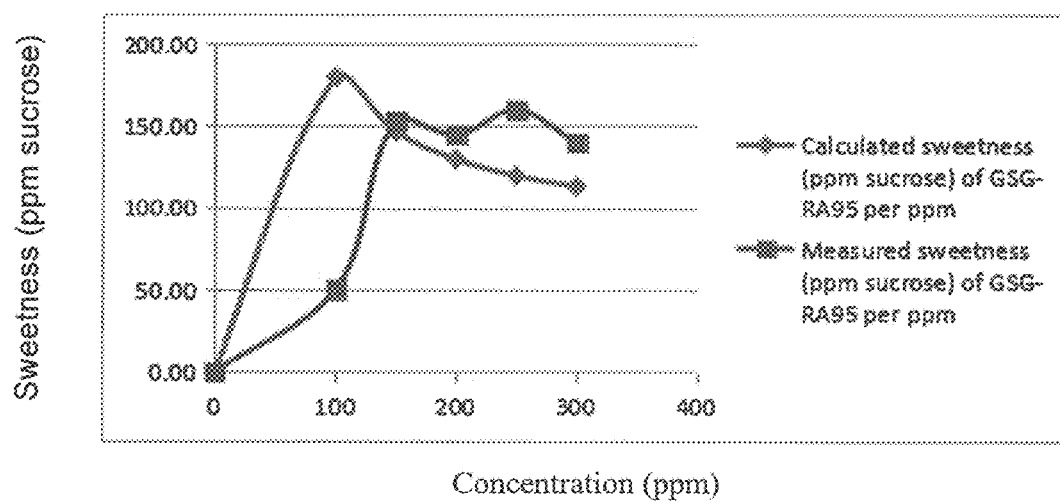
FIG. 57 is a graphical illustration showing the calculated and measured sweetness of GSG-RA95 per ppm in 400 ppm GSG-RA95 and RA80/RB10/RD6 compositions.

The data were showed in FIG. 57.

It is found that at 400 ppm total solid content, with the increase of the amount of GSG-RA95, its measured contribution of sweetness was higher than calculated value. Significant synergistic effect was found when GSG-RA95>150 ppm, although the optimized range was 200-250 ppm.

Example 34

Evaluating the taste profile of compositions of GSG-RA80 and RA75/RB15, in order to find out the optimized ratio with the best synergistic taste effects.

The samples were tested in aqueous solution of citric acid at pH 3.8.

The control sample was RA75/RB15 at 400 ppm, corresponding to 7.0% SE.

The samples were as follows:

TABLE 76

| RA75/RB15 | GSG-RA80 | total GSG |
|---|---|---|
| 400 ppm | — | |
| 300 ppm | 100 ppm | 22.25% |
| 250 ppm | 150 ppm | 33.38% |
| 200 ppm | 200 ppm | 44.50% |
| 150 ppm | 250 ppm | 55.63% |
| 100 ppm | 300 ppm | 66.75% |

Figure 58:
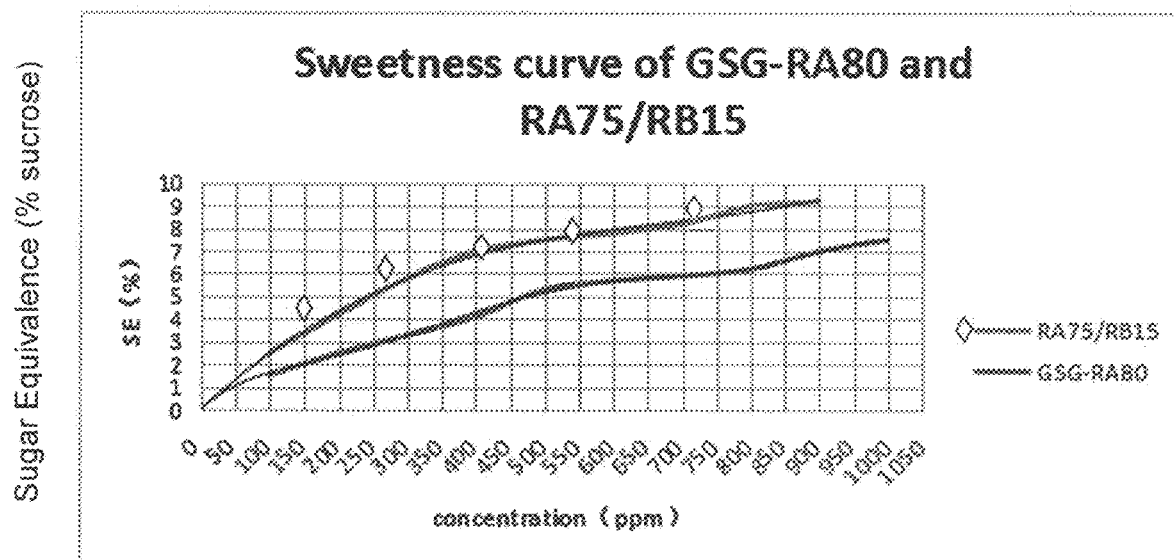
FIG. 58 is a graphical illustration showing the sweetness curve of GSG-RA80 and RA75/RB15.

Sweetness curve of GSG-RA80 and RA75/RB15 was shown as FIG. 58.

Taste profile of RA75/RB15/GSG-RA80 composition was shown in table 77.

TABLE 77

| RA75/RB15 | GSG-RA80 | SE | Sugar like | Bitterness | Aftertaste | Lingering |
|---|---|---|---|---|---|---|
| 400 ppm | — | 7.0% | 4.5 | 0 | 1.5 | 1.5 |
| 300 ppm | 100 ppm | 7.2% | 4 | 0 | 0.5 | 1 |
| 250 ppm | 150 ppm | 7.7% | 4 | 0 | 0.5 | 1 |
| 200 ppm | 200 ppm | 7.5% | 4 | 0 | 0.5 | 1 |
| 150 ppm | 250 ppm | 6.8% | 4.5 | 0 | 0 | 0.5 |
| 100 ppm | 300 ppm | 6.3% | 4 | 0 | 1 | 0.5 |

As for the synergistic effect, it can be found in table 78.

TABLE 78

| RA75/RB15 concentration | Calculated SE of RA75/RB15 | GSG-RA80 concentration | Calculated SE of GSG-RA80 | Calculated SE of the composition | Measured SE of the composition | Calculated sweetness (ppm sucrose) of GSG-RA80 per ppm | Measured sweetness (ppm sucrose) of GSG-RA80 per ppm |
|---|---|---|---|---|---|---|---|
| 400 ppm | | 0 | | | | 0.00 | 0 |
| 300 ppm | 5.80% | 100 | 1.50% | 7.30% | 7.20% | 150.00 | 140.00 |
| 250 ppm | 5% | 150 | 2.00% | 7.00% | 7.70% | 133.33 | 180.00 |
| 200 ppm | 4% | 200 | 2.50% | 6.70% | 7.50% | 125.00 | 165.00 |

TABLE 78-continued

| RA75/RB15 concentration | Calculated SE of RA75/RB15 | GSG-RA80 concentration | Calculated SE of GSG-RA80 | Calculated SE of the composition | Measured SE of the composition | Calculated sweetness (ppm sucrose) of GSG-RA80 per ppm | Measured sweetness (ppm sucrose) of GSG-RA80 per ppm |
|---|---|---|---|---|---|---|---|
| 150 ppm | 3.40% | 250 | 2.90% | 6.30% | 6.80% | 116.00 | 136.00 |
| 100 ppm | 3% | 300 | 3.30% | 5.80% | 6.30% | 110.00 | 126.67 |

Calculated sweetness (ppm sugar) of GSG-RA80 per ppm=calculated SE of GSG-RA80/concentration of GSG-RA80

Measured sweetness (ppm sugar) of GSG-RA80 per ppm=(Measured SE−calculated SE of RA75/RB15)/concentration of GSG-RA80

Figure 59:
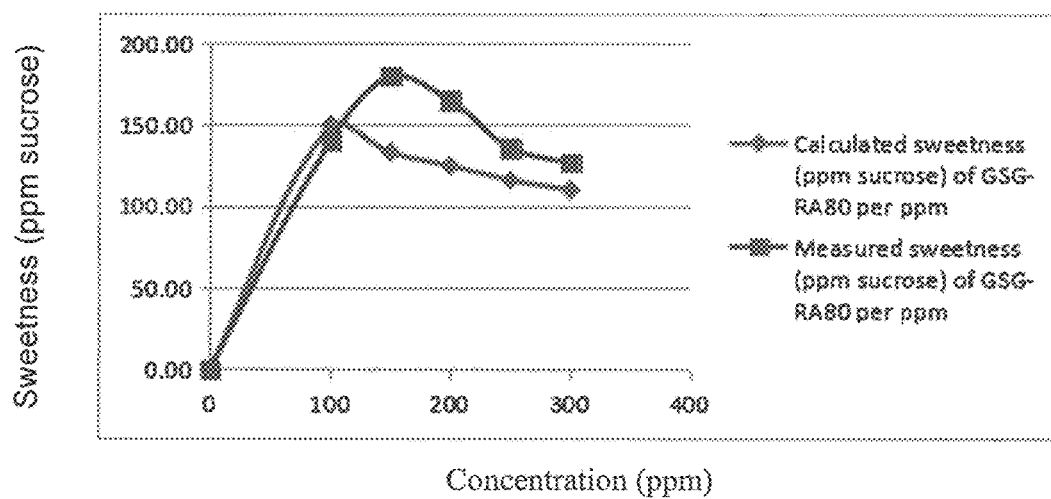
FIG. 59 is a graphical illustration showing the calculated and measured sweetness of GSG-RA80 per ppm in 400 ppm GSG-RA80 and RA75/RB15 compositions.

The data were showed in FIG. 59.

It is found that at 400 ppm total solid content, with the increase of the amount of GSG-RA80, its measured contribution of sweetness was higher than calculated value. Significant synergistic effect was found when GSG-RA80>150 ppm, although the optimized range was 150-250 ppm.

Example 35

Evaluating the taste profile of compositions of GSG-RA80 and RA/RD, in order to find out the optimized ratio with the best synergistic taste effects.

The samples were tested in aqueous solution of citric acid at pH 3.8.

The control sample was RA/RD at 400 ppm, corresponding to 6.5% SE.

The samples were as follows:

TABLE 79

| RA/RD | GSG-RA80 | total GSG |
|---|---|---|
| 400 ppm | — | |
| 300 ppm | 100 ppm | 22.25% |
| 250 ppm | 150 ppm | 33.38% |
| 200 ppm | 200 ppm | 44.50% |
| 150 ppm | 250 ppm | 55.63% |
| 100 ppm | 300 ppm | 66.75% |

Figure 60:
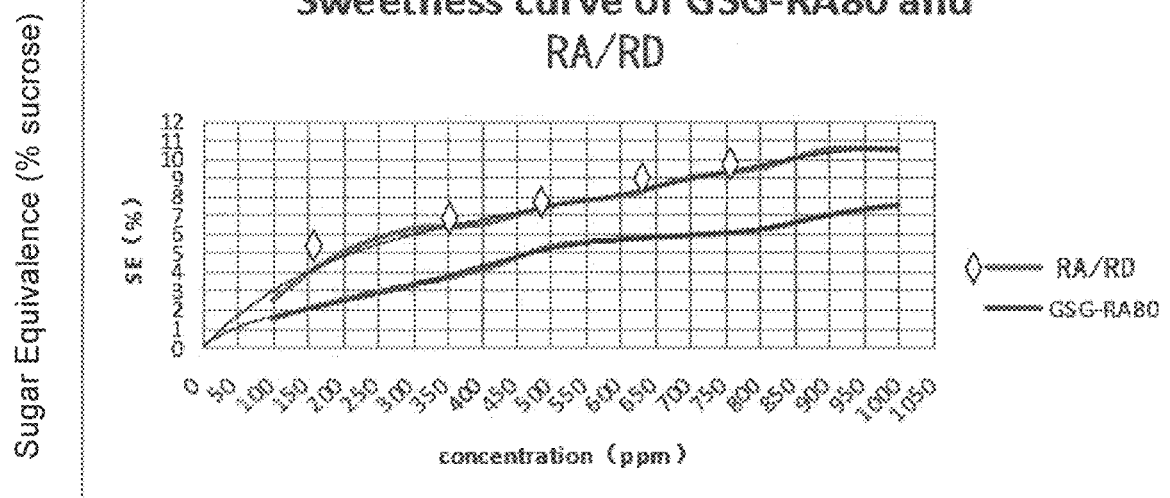
FIG. 60 is a graphical illustration showing the sweetness curve of GSG-RA80 and RA/RD.

Sweetness curve of GSG-RA80 and RA/RD was shown as FIG. 60.

Taste profile of RA/RD/GSG-RA80 composition was shown in table 80.

TABLE 80

| RA/RD | GSG-RA80 | SE | Sugar like | Bitterness | Aftertaste | Lingering |
|---|---|---|---|---|---|---|
| 400 ppm | — | 6.5% | 3.5 | 1 | 1 | 1.5 |
| 300 ppm | 100 ppm | 8.2% | 3.5 | 2 | 2 | 2 |
| 250 ppm | 150 ppm | 7.9% | 4 | 0.5 | 0.5 | 1 |
| 200 ppm | 200 ppm | 7.2% | 4 | 0 | 1 | 1 |
| 150 ppm | 250 ppm | 6.5% | 4.5 | 0 | 0.5 | 1 |
| 100 ppm | 300 ppm | 6.0% | 4 | 0 | 0.5 | 1 |

The taste of RA/RD was improved by GSG-RA80 by reducing the bitterness and lingering.

As for the synergistic effect, it can be found in table 81.

TABLE 81

| RA/RD concentration | Calculated SE of RA/RD | GSG-RA80 concentration | Calculated SE of GSG-RA80 | Calculated SE of the composition | Measured SE of the composition | Calculated sweetness (ppm sucrose) of GSG-RA80 per ppm | Measured sweetness (ppm sucrose) of GSG-RA80 per ppm |
|---|---|---|---|---|---|---|---|
| 400 ppm | | 0 | | | | 0.00 | 0 |
| 300 ppm | 6.00% | 100 | 1.50% | 7.50% | 8.20% | 150.00 | 220.00 |
| 250 ppm | 5.50% | 150 | 2.00% | 7.50% | 7.90% | 133.33 | 160.00 |
| 200 ppm | 4.80% | 200 | 2.50% | 7.30% | 7.20% | 125.00 | 120.00 |
| 150 ppm | 4.00% | 250 | 2.90% | 6.90% | 6.50% | 116.00 | 100.00 |
| 100 ppm | 3.00% | 300 | 3.30% | 6.30% | 6.00% | 110.00 | 100.00 |

Calculated sweetness (ppm sugar) of GSG-RA80 per ppm=calculated SE of GSG-RA80/concentration of GSG-RA80

Measured sweetness (ppm sugar) of GSG-RA80 per ppm=(Measured SE–calculated SE of RA/RD)/concentration of GSG-RA80

Figure 61:
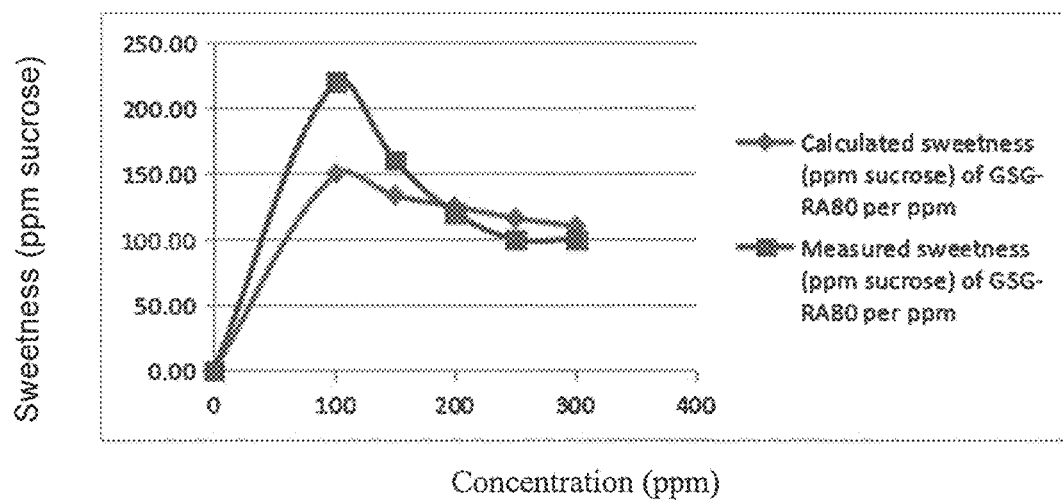
FIG. 61 is a graphical illustration showing the calculated and measured sweetness of GSG-RA80 per ppm in 400 ppm GSG-RA80 and RA/RD compositions.

The data were showed in FIG. 61.

It is found that at 400 ppm total solid content, with the increase of the amount of GSG-RA80, its measured contribution of sweetness was higher than calculated value. Significant synergistic effect was found when GSG-RA80 was 100-200 ppm, although the optimized range was 100-150 ppm.

Example 36

Evaluating the taste profile of compositions of GSG-RA80 and RA80/RB10/RD6, in order to find out the optimized ratio with the best synergistic taste effects.

The samples were tested in aqueous solution of citric acid at pH 3.8.

The control sample was RA80/RB10/RD6 at 400 ppm, corresponding to 8.3% SE.

The samples were as follows:

TABLE 82

| RA80/RB10/RD6 | GSG-RA80 | total GSG |
|---|---|---|
| 400 ppm | — | |
| 300 ppm | 100 ppm | 22.25% |
| 250 ppm | 150 ppm | 33.38% |
| 200 ppm | 200 ppm | 44.50% |
| 150 ppm | 250 ppm | 55.63% |
| 100 ppm | 300 ppm | 66.75% |

Figure 62:
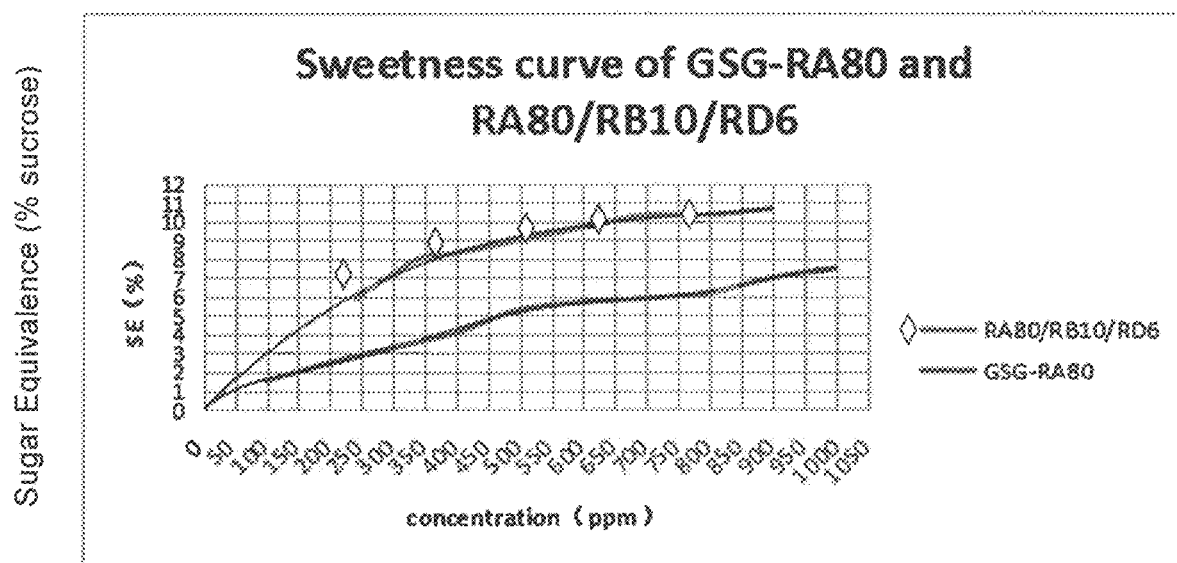
FIG. 62 is a graphical illustration showing the sweetness curve of GSG-RA80 and RA80/RB10/RD6.

Sweetness curve of GSG-RA80 and RA80/RB10/RD6 was shown in FIG. 62.

Taste profile of RA80/RB10/RD6/GSG-RA80 composition was shown in table 83.

TABLE 83

| RA80/RB10/RD6 | GSG-RA80 | SE | Sugar like | Bitterness | Aftertaste | Lingering |
|---|---|---|---|---|---|---|
| 400 ppm | — | 8.3% | 4.5 | 0 | 0 | 0.5 |
| 300 ppm | 100 ppm | 7.5% | 4 | 0 | 1 | 0.5 |
| 250 ppm | 150 ppm | 8.3% | 3.5 | 0.5 | 2 | 2 |
| 200 ppm | 200 ppm | 8.1% | 4.5 | 0 | 0.5 | 0.5 |
| 150 ppm | 250 ppm | 7.8% | 4.5 | 0 | 0.5 | 0.5 |
| 100 ppm | 300 ppm | 7.0% | 4 | 0 | 1 | 1 |

As for the synergistic effect, it can be found in table 84.

TABLE 84

| RA80/RB10/RD6 concentration | Calculated SE of RA80/RB10/RD6 | GSG-RA80 concentration | Calculated SE of GSG-RA80 | Calculated SE of the composition | Measured SE of the composition | Calculated sweetness (ppm sucrose) of GSG-RA80 per ppm | Measured sweetness (ppm sucrose) of GSG-RA80 per ppm |
|---|---|---|---|---|---|---|---|
| 400 ppm | | 0 | | | | 0.00 | 0 |
| 300 ppm | 7.20% | 100 | 1.50% | 8.70% | 7.50% | 150.00 | 30.00 |
| 250 ppm | 6.00% | 150 | 2.00% | 8.00% | 8.30% | 133.33 | 153.33 |
| 200 ppm | 5.40% | 200 | 2.50% | 7.90% | 8.10% | 125.00 | 135.00 |
| 150 ppm | 4.20% | 250 | 2.90% | 7.10% | 7.80% | 116.00 | 144.00 |
| 100 ppm | 3.00% | 300 | 3.30% | 6.30% | 7.00% | 110.00 | 133.33 |

Calculated sweetness (ppm sugar) of GSG-RA80 per ppm=calculated SE of GSG-RA80/concentration of GSG-RA80

Measured sweetness (ppm sugar) of GSG-RA80 per ppm=(Measured SE–calculated SE of RA80/RB10/RD6)/concentration of GSG-RA80

Figure 63:
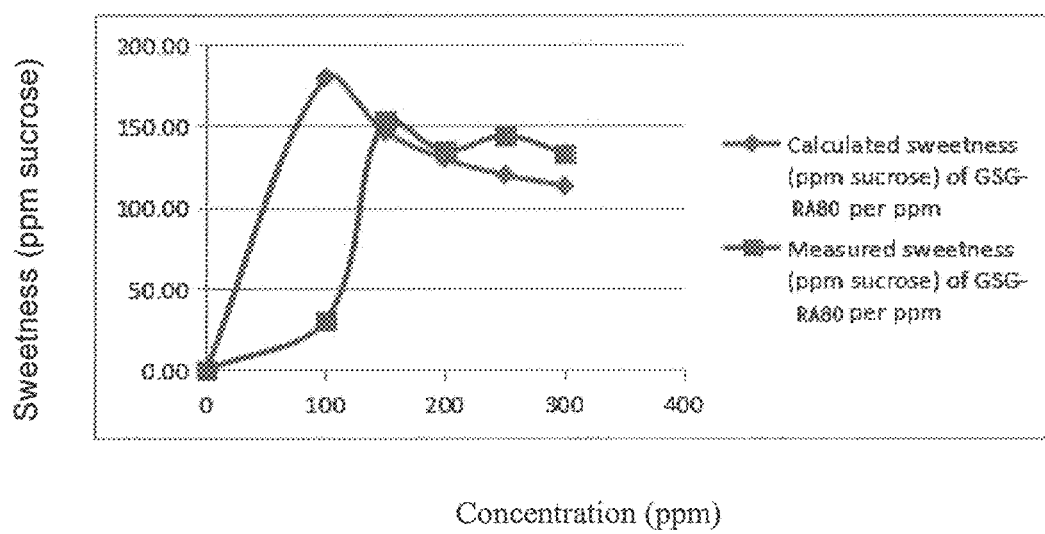
FIG. 63 is a graphical illustration showing the calculated and measured sweetness of GSG-RA80 per ppm in 400 ppm GSG-RA80 and RA80/RB10/RD6 compositions.

The data were showed in FIG. 63.

It is found that at 400 ppm total solid content, with the increase of the amount of GSG-RA80, its measured contribution of sweetness was higher than calculated value. Significant synergistic effect was found when GSG-RA80>150 ppm, although the optimized range was 250-300 ppm.

Example 37

Evaluating the taste profile of compositions of GSG-RA50 and RA75/RB15, in order to find out the optimized ratio with the best synergistic taste effects.

The samples were tested in aqueous solution of citric acid at pH 3.8.

The control sample was RA75/RB15 at 400 ppm, corresponding to 7.0% SE.

The samples were as follows:

TABLE 85

| RA75/RB15 | GSG-RA50 | total GSG |
|---|---|---|
| 400 ppm | — | |
| 300 ppm | 100 ppm | 22.34% |
| 250 ppm | 150 ppm | 33.51% |
| 200 ppm | 200 ppm | 44.68% |
| 150 ppm | 250 ppm | 55.84% |
| 100 ppm | 300 ppm | 67.01% |

Figure 64:
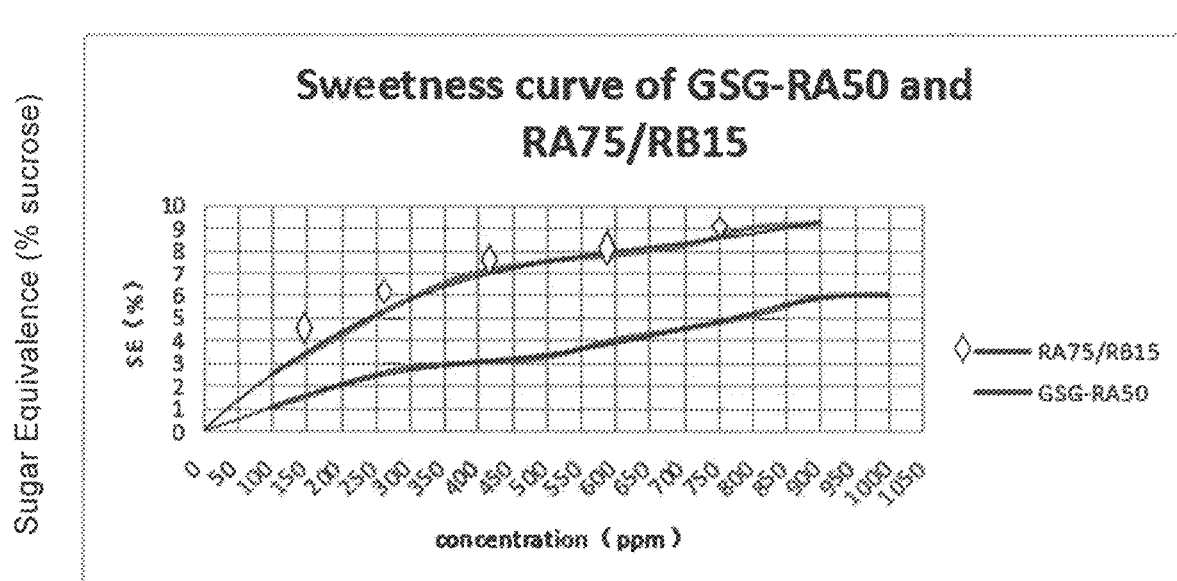
FIG. 64 is a graphical illustration showing the sweetness curve of GSG-RA50 and RA75/RB15.

Sweetness curve of GSG-RA50 and RA75/RB15 was shown in FIG. 64.

Taste profile of RA75/RB15/GSG-RA50 composition was shown in table. 86.

TABLE 86

| RA75/RB15 | GSG-RA50 | SE | Sugar like | Bitterness | Aftertaste | Lingering |
|---|---|---|---|---|---|---|
| 400 ppm | — | 7.0% | 4.5 | 0 | 1.5 | 1.5 |
| 300 ppm | 100 ppm | 7.8% | 4.5 | 0 | 0.5 | 1 |
| 250 ppm | 150 ppm | 8.0% | 4.5 | 0 | 0.5 | 1 |
| 200 ppm | 200 ppm | 7.8% | 4 | 0 | 1 | 1.5 |
| 150 ppm | 250 ppm | 7.0% | 4.5 | 0 | 0.5 | 0.5 |
| 100 ppm | 300 ppm | 6.4% | 4.5 | 0 | 0.5 | 0.5 |

As for the synergistic effect, it can be found in table 87.

TABLE 87

| RA75/RB15 concentration | Calculated SE of RA75/RB15 | GSG-RA50 concentration | Calculated SE of GSG-RA50 | Calculated SE of the composition | Measured SE of the composition | Calculated sweetness (ppm sucrose) of GSG-RA50 per ppm | Measured sweetness (ppm sucrose) of GSG-RA50 per ppm |
|---|---|---|---|---|---|---|---|
| 400 ppm |  | 0 |  |  | 6.80% | 0.00 | 0 |
| 300 ppm | 5.80% | 100 | 1% | 6.80% | 7.80% | 100.00 | 200.00 |
| 250 ppm | 5% | 150 | 1.50% | 6.50% | 8.00% | 100.00 | 200.00 |
| 200 ppm | 4% | 200 | 2% | 6.20% | 7.80% | 100.00 | 180.00 |
| 150 ppm | 3.40% | 250 | 2.40% | 5.80% | 7.00% | 96.00 | 144.00 |
| 100 ppm | 3% | 300 | 2.75% | 5.25% | 6.40% | 91.67 | 130.00 |

Calculated sweetness (ppm sugar) of GSG-RA50 per ppm=calculated SE of GSG-RA50/concentration of GSG-RA50

Measured sweetness (ppm sugar) of GSG-RA50 per ppm=(Measured SE−calculated SE of RA75/RB15)/concentration of GSG-RA50

Figure 65:
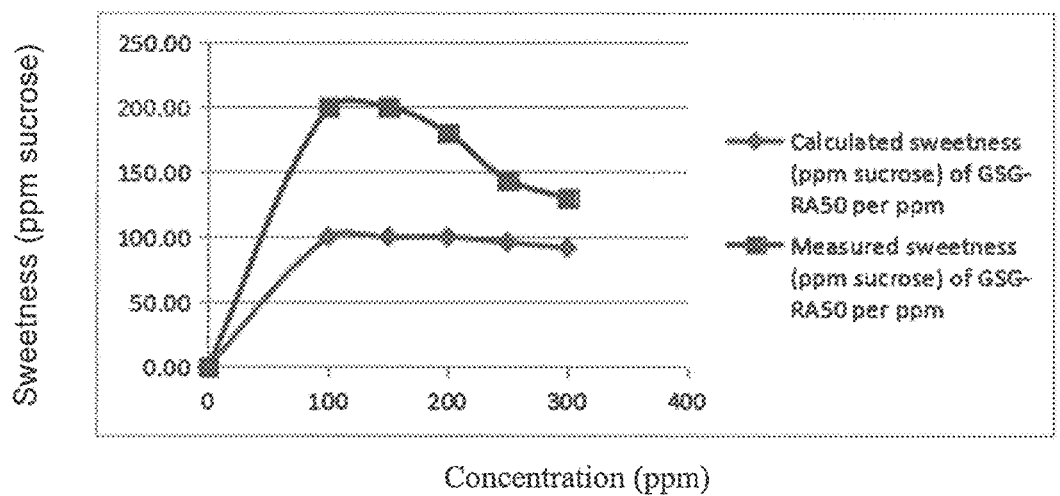
FIG. 65 is a graphical illustration showing the calculated and measured sweetness of GSG-RA50 per ppm in 400 ppm GSG-RA50 and RA75/RB15 compositions.

The data were showed in FIG. 65.

It is found that at 400 ppm total solid content, with the increase of the amount of GSG-RA50, its measured contribution of sweetness was higher than calculated value. Significant synergistic effect was found when GSG-RA50>100 ppm, although the optimized range was 100-200 ppm.

Example 38

Evaluating the taste profile of compositions of GSG-RA50 and RA/RD, in order to find out the optimized ratio with the best synergistic taste effects.

The samples were tested in aqueous solution of citric acid at pH 3.8.

The control sample was RA/RD at 400 ppm, corresponding to 6.5% SE.

The samples were as follows:

TABLE 88

| RA/RD | GSG-RA50 | total GSG |
|---|---|---|
| 400 ppm | — |  |
| 300 ppm | 100 ppm | 22.34% |
| 250 ppm | 150 ppm | 33.51% |
| 200 ppm | 200 ppm | 44.68% |
| 150 ppm | 250 ppm | 55.84% |
| 100 ppm | 300 ppm | 67.01% |

Figure 66:
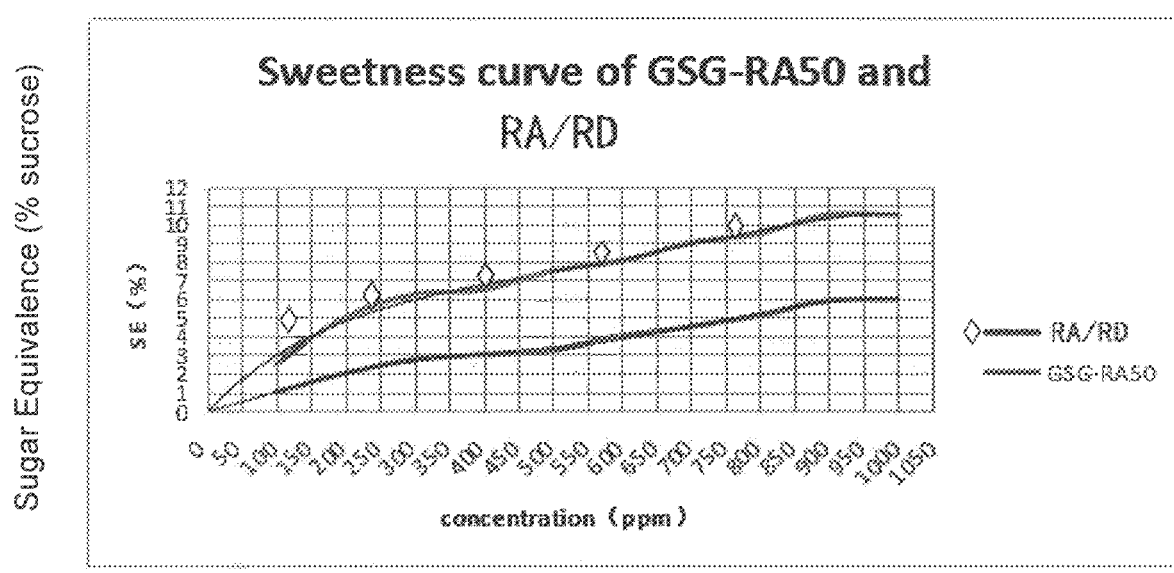
FIG. 66 is a graphical illustration showing the sweetness curve of GSG-RA50 and RA/RD.

Sweetness curve of GSG-RA50 and RA/RD was shown in FIG. 66.

Taste profile of RA/RD/GSG-RA50 composition was shown in table 89.

TABLE 89

| RA/RD | GSG-RA50 | SE | Sugar like | Bitterness | Aftertaste | Lingering |
|---|---|---|---|---|---|---|
| 400 ppm | — | 6.5% | 3.5 | 1 | 1 | 1.5 |
| 300 ppm | 100 ppm | 7.8% | 4 | 1 | 1 | 1 |
| 250 ppm | 150 ppm | 8.0% | 4 | 0.5 | 1 | 1 |
| 200 ppm | 200 ppm | 7.5% | 4.5 | 0 | 0.5 | 0.5 |
| 150 ppm | 250 ppm | 7.0% | 4.5 | 0 | 0.5 | 0.5 |
| 100 ppm | 300 ppm | 7.0% | 4.5 | 0 | 0.5 | 1 |

The taste of RA/RD was improved by GSG-RA50 by reducing the bitterness and lingering.

As for the synergistic effect, it can be found in talbe 90.

TABLE 90

| RA/RD concentration | Calculated SE of RA/RD | GSG-RA50 concentration | Calculated SE of GSG-RA50 | Calculated SE of the composition | Measured SE of the composition | Calculated sweetness (ppm sucrose) of GSG-RA50 per ppm | Measured sweetness (ppm sucrose) of GSG-RA50 per ppm |
|---|---|---|---|---|---|---|---|
| 400 ppm |  | 0 |  |  |  | 0.00 | 0 |
| 300 ppm | 6.00% | 100 | 1% | 7.00% | 7.80% | 100.00 | 180.00 |

TABLE 90-continued

| RA/RD concentration | Calculated SE of RA/RD | GSG-RA50 concentration | Calculated SE of GSG-RA50 | Calculated SE of the composition | Measured SE of the composition | Calculated sweetness (ppm sucrose) of GSG-RA50 per ppm | Measured sweetness (ppm sucrose) of GSG-RA50 per ppm |
|---|---|---|---|---|---|---|---|
| 250 ppm | 5.50% | 150 | 1.50% | 7.00% | 8.00% | 100.00 | 166.67 |
| 200 ppm | 4.80% | 200 | 2% | 6.80% | 7.50% | 100.00 | 135.00 |
| 150 ppm | 4.00% | 250 | 2.40% | 6.40% | 7.00% | 96.00 | 120.00 |
| 100 ppm | 3.00% | 300 | 2.75% | 5.75% | 7.00% | 91.67 | 133.33 |

Calculated sweetness (ppm sugar) of GSG-RA50 per ppm=calculated SE of GSG-RA50/concentration of GSG-RA50

Measured sweetness (ppm sugar) of GSG-RA50 per ppm=(Measured SE−calculated SE of RA/RD)/concentration of GSG-RA50

Figure 67:
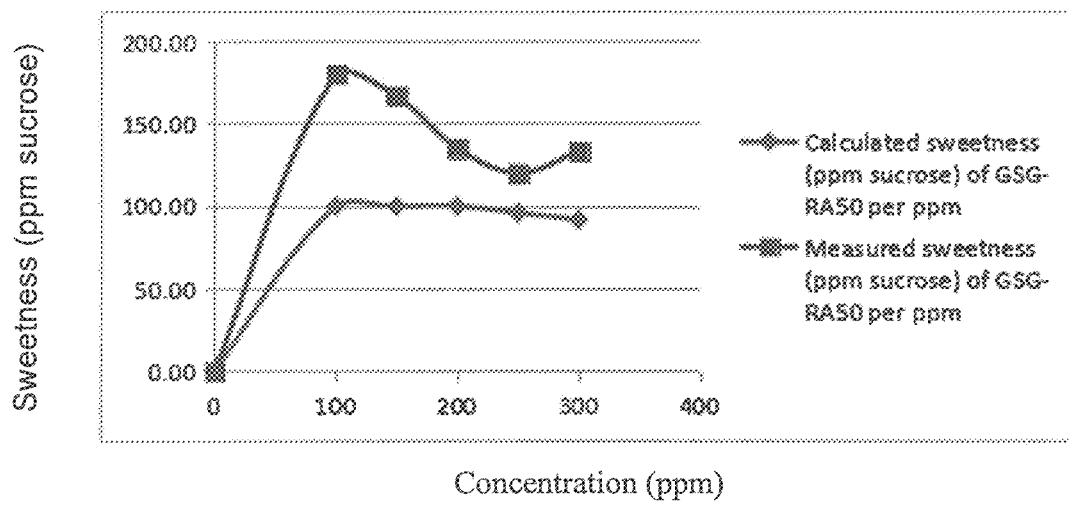
FIG. 67 is a graphical illustration showing the calculated and measured sweetness of GSG-RA50 per ppm in 400 ppm GSG-RA50 and RA/RD compositions.

The data were showed in FIG. 67.

It is found that at 400 ppm total solid content, with the increase of the amount of GSG-RA50, its measured contribution of sweetness was higher than calculated value. Significant synergistic effect was found when GSG-RA50>100 ppm, although the optimized range was 100-200 ppm.

Example 39

Evaluating the taste profile of compositions of GSG-RA50 and RA80/RB10/RD6, in order to find out the optimized ratio with the best synergistic taste effects.

The samples were tested in aqueous solution of citric acid at pH 3.8.

The control sample was RA80/RB10/RD6 at 400 ppm, corresponding to 8.3% SE.

The samples were as follows:

TABLE 91

| RA80/RB10/RD6 | GSG-RA50 | total GSG |
|---|---|---|
| 400 ppm | — | |
| 300 ppm | 100 ppm | 22.34% |
| 250 ppm | 150 ppm | 33.51% |
| 200 ppm | 200 ppm | 44.68% |
| 150 ppm | 250 ppm | 55.84% |
| 100 ppm | 300 ppm | 67.01% |

Figure 68:
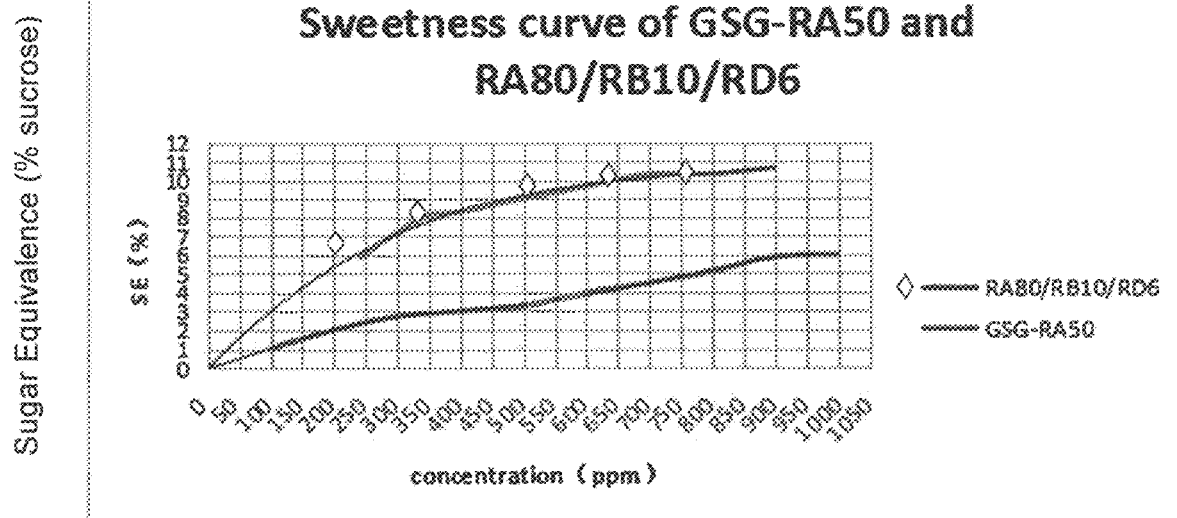
FIG. 68 is a graphical illustration showing the sweetness curve of GSG-RA50 and RA80/RB10/RD6.

Sweetness curve of GSG-RA50 and RA80/RB10/RD6 was shown as FIG. 68.

Taste profile of RA80/RB10/RD6/GSG-RA50 composition was shown in table 92.

| RA80/RB10/RD6 | GSG-RA50 | SE | Sugar like | Bitterness | Aftertaste | Lingering |
|---|---|---|---|---|---|---|
| 400 ppm | — | 8.3% | 4.5 | 0 | 0 | 0.5 |
| 300 ppm | 100 ppm | 7.8% | 4.5 | 0 | 0.5 | 0.5 |
| 250 ppm | 150 ppm | 8.0% | 4.5 | 0 | 0.5 | 0.5 |
| 200 ppm | 200 ppm | 7.8% | 4.5 | 0 | 0.5 | 0.5 |
| 150 ppm | 250 ppm | 7.0% | 4.5 | 0 | 0 | 0.5 |
| 100 ppm | 300 ppm | 6.5% | 4.5 | 0 | 0 | 0.5 |

As for the synergistic effect, it can be found in table 93.

TABLE 93

| RA80/RB10/RD6 concentration | Calculated SE of RA80/RB10/RD6 | GSG-RA80 concentration | Calculated SE of GSG-RA80 | Calculated SE of the composition | Measured SE of the composition | Calculated sweetness (ppm sucrose) of GSG-RA80 per ppm | Measured sweetness (ppm sucrose) of GSG-RA80 per ppm |
|---|---|---|---|---|---|---|---|
| 400 ppm | | 0 | | | | 0.00 | 0 |
| 300 ppm | 7.20% | 100 | 1% | 8.20% | 7.80% | 100.00 | 60.00 |
| 250 ppm | 6.00% | 150 | 1.50% | 7.50% | 8.00% | 100.00 | 133.33 |
| 200 ppm | 5.40% | 200 | 2% | 7.40% | 7.80% | 100.00 | 120.00 |
| 150 ppm | 4.20% | 250 | 2.40% | 6.60% | 7.00% | 96.00 | 112.00 |
| 100 ppm | 3.00% | 300 | 2.75% | 5.75% | 6.50% | 91.67 | 116.67 |

Calculated sweetness (ppm sugar) of GSG-RA50 per ppm=calculated SE of GSG-RA50/concentration of GSG-RA50

Measured sweetness (ppm sugar) of GSG-RA50 per ppm=(Measured SE−calculated SE of RA80/RB10/RD6)/concentration of GSG-RA50

Figure 69:
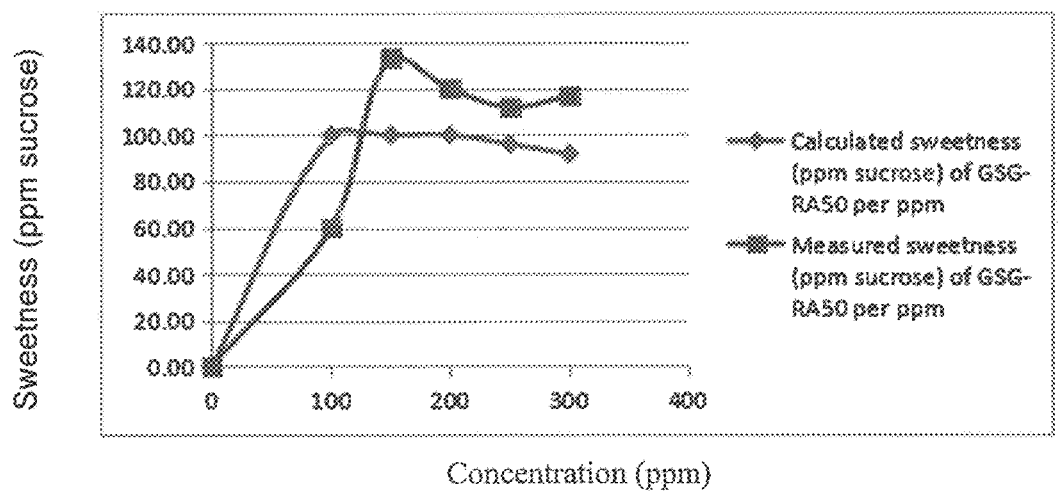
FIG. 69 is a graphical illustration showing the calculated and measured sweetness of GSG-RA50 per ppm in 400 ppm GSG-RA50 and RA80/RB10/RD6 compositions.

The data were showed in FIG. 69.

It is found that at 400 ppm total solid content, with the increase of the amount of GSG-RA50, its measured contribution of sweetness was higher than calculated value. Significant synergistic effect was found when GSG-RA50>150 ppm, although the optimized range was 150-200 ppm.

Example 40

Evaluating the taste profile of compositions of GSG-RA40 and RA75/RB15, in order to find out the optimized ratio with the best synergistic taste effects.

The samples were tested in aqueous solution of citric acid at pH 3.8.

The control sample was RA75/RB15 at 400 ppm, corresponding to 7.0% SE.

The samples were as follows:

TABLE 94

| RA75/RB15 | GSG-RA40 |
|---|---|
| 400 ppm | — |
| 300 ppm | 100 ppm |
| 250 ppm | 150 ppm |
| 200 ppm | 200 ppm |
| 150 ppm | 250 ppm |
| 100 ppm | 300 ppm |

Figure 70:
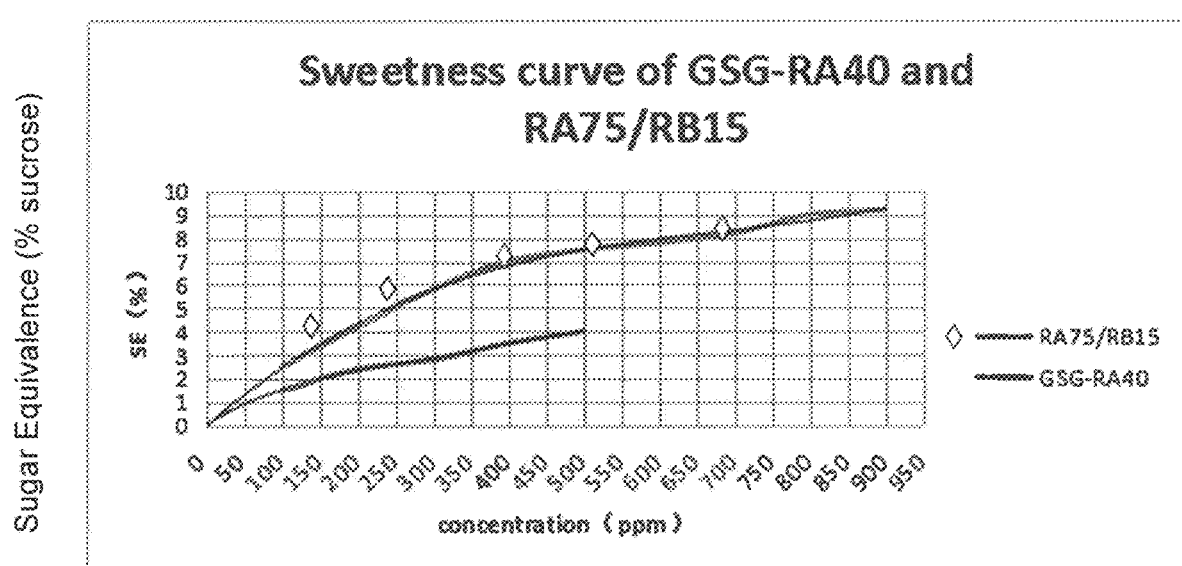
FIG. 70 is a graphical illustration showing the sweetness curve of GSG-RA40 and RA75/RB15.

Sweetness curve of GSG-RA40 and RA75/RB15 was shown in FIG. 70.

Taste profile of RA75/RB15/GSG-RA40 composition was shown in table 95.

TABLE 95

| RA75/RB15 | GSG-RA40 | SE | Sugar like | Bitterness | Aftertaste | Lingering |
|---|---|---|---|---|---|---|
| 400 ppm | — | 7.0% | 4.5 | 0 | 1.5 | 1.5 |
| 300 ppm | 100 ppm | 7.4% | 4 | 0 | 1 | 1 |
| 250 ppm | 150 ppm | 7.5% | 4 | 0 | 1 | 1 |
| 200 ppm | 200 ppm | 7.0% | 3.5 | 0 | 2 | 2 |
| 150 ppm | 250 ppm | 6.8% | 3.5 | 0 | 1.5 | 1.5 |
| 100 ppm | 300 ppm | 6.5% | 4 | 0 | 1 | 1 |

As for the synergistic effect, it can be found in table 96.

TABLE 96

| RA75/RB15 concentration | Calculated SE of RA75/RB15 | GSG-RA40 concentration | Calculated SE of GSG-RA40 | Calculated SE of the composition | Measured SE of the composition | Calculated sweetness (ppm sucrose) of GSG-RA40 per ppm | Measured sweetness (ppm sucrose) of GSG-RA40 per ppm |
|---|---|---|---|---|---|---|---|
| 400 ppm | | 0 | | | | 0.00 | 0 |
| 300 ppm | 5.80% | 100 | 1.50% | 7.30% | 7.40% | 150.00 | 160.00 |
| 250 ppm | 5% | 150 | 2.00% | 7.00% | 7.50% | 133.33 | 166.67 |
| 200 ppm | 4% | 200 | 2.40% | 6.60% | 7.00% | 120.00 | 140.00 |
| 150 ppm | 3.40% | 250 | 2.70% | 6.10% | 6.80% | 108.00 | 136.00 |
| 100 ppm | 3% | 300 | 2.80% | 5.30% | 6.50% | 93.33 | 133.33 |

Calculated sweetness (ppm sugar) of GSG-RA40 per ppm=calculated SE of GSG-RA40/concentration of GSG-RA40

Measured sweetness (ppm sugar) of GSG-RA40 per ppm=(Measured SE−calculated SE of RA75/RB15)/concentration of GSG-RA40

Figure 71:
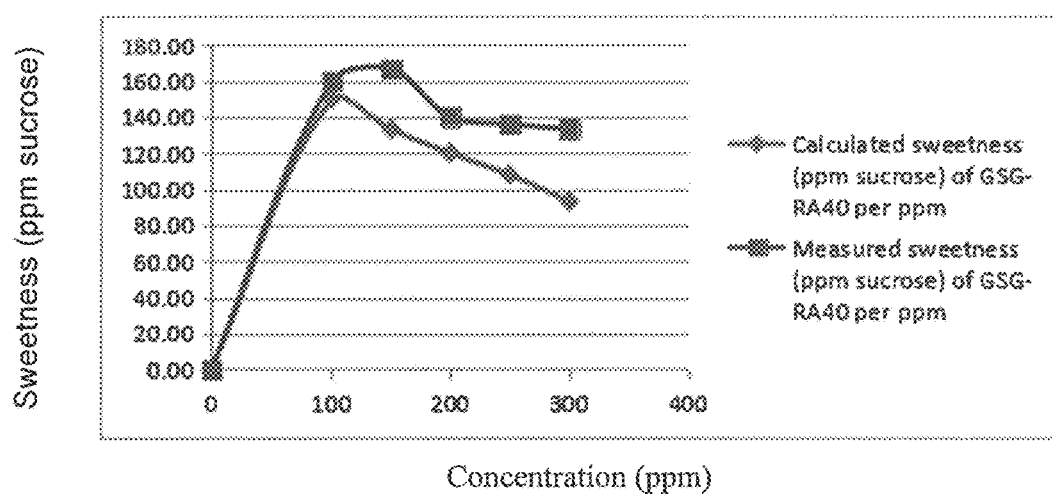
FIG. 71 is a graphical illustration showing the calculated and measured sweetness of GSG-RA40 per ppm in 400 ppm GSG-RA40 and RA75/RB15 compositions.

The data were showed in FIG. 71.

It is found that at 400 ppm total solid content, with the increase of the amount of GSG-RA40, its measured contribution of sweetness was higher than calculated value. Significant synergistic effect was found when GSG-RA40>150 ppm, although the optimized range was 150-200 ppm.

Example 41

Evaluating the taste profile of compositions of GSG-RA40 and RA/RD, in order to find out the optimized ratio with the best synergistic taste effects.

The samples were tested in aqueous solution of citric acid at pH 3.8.

The control sample was RA/RD at 400 ppm, corresponding to 6.5% SE.

The samples were as follows:

TABLE 97

| RA/RD | GSG-RA40 |
|---|---|
| 400 ppm | — |
| 300 ppm | 100 ppm |
| 250 ppm | 150 ppm |
| 200 ppm | 200 ppm |
| 150 ppm | 250 ppm |
| 100 ppm | 300 ppm |

Figure 72:
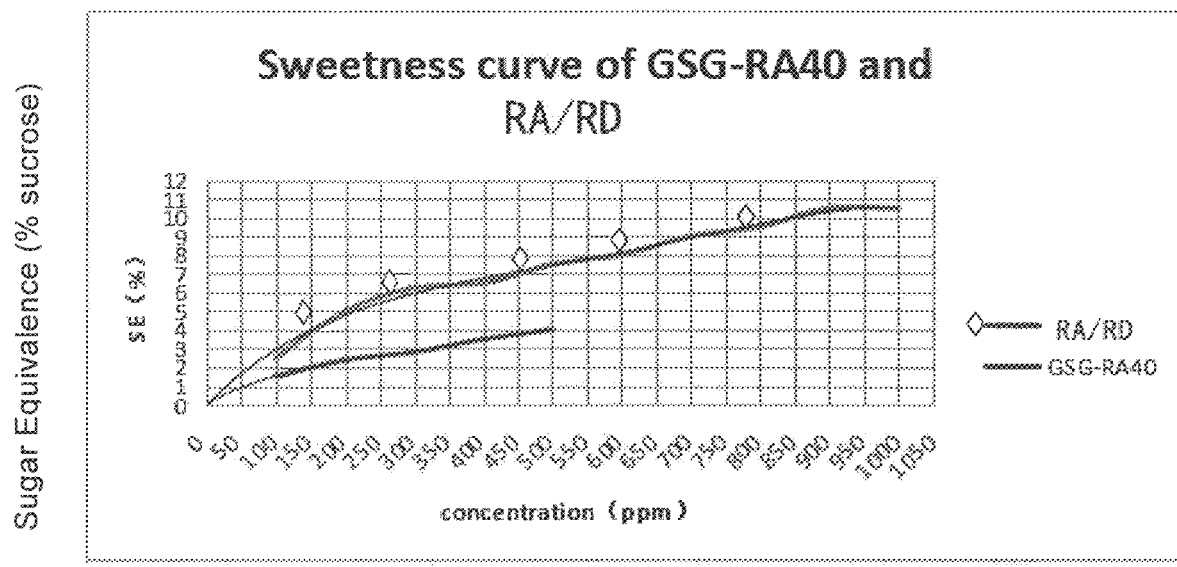
FIG. 72 is a graphical illustration showing the sweetness curve of GSG-RA40 and RA/RD.

Sweetness curve of GSG-RA40 and RA/RD was shown in FIG. 72.

Taste profile of RA/RD/GSG-RA40 composition was shown in talbe 98.

TABLE 98

| RA/RD | GSG-RA40 | SE | Sugar like | Bitterness | Aftertaste | Lingering |
|---|---|---|---|---|---|---|
| 400 ppm | — | 6.5% | 3.5 | 1 | 1 | 1.5 |
| 300 ppm | 100 ppm | 7.2% | 3.5 | 0.5 | 1.5 | 2 |
| 250 ppm | 150 ppm | 7.8% | 3.5 | 1 | 1 | 1.5 |
| 200 ppm | 200 ppm | 7.5% | 3 | 0.5 | 2 | 2 |

TABLE 98-continued

| RA/RD | GSG-RA40 | SE | Sugar like | Bitterness | Aftertaste | Lingering |
|---|---|---|---|---|---|---|
| 150 ppm | 250 ppm | 7.2% | 4 | 0.5 | 1 | 1.5 |
| 100 ppm | 300 ppm | 6.5% | 3.5 | 0.5 | 2 | 1.5 |

As for the synergistic effect, it can be found in table 99.

TABLE 99

| RA/RD concentration | Calculated SE of RA/RD | GSG-RA40 concentration | Calculated SE of GSG-RA40 | Calculated SE of the composition | Measured SE of the composition | Calculated sweetness (ppm sucrose) of GSG-RA40 per ppm | Measured sweetness (ppm sucrose) of GSG-RA40 per ppm |
|---|---|---|---|---|---|---|---|
| 400 ppm | — | 0 | | | | 0.00 | 0 |
| 300 ppm | 6.00% | 100 | 1.50% | 7.50% | 7.20% | 150.00 | 120.00 |
| 250 ppm | 5.50% | 150 | 2.00% | 7.50% | 7.80% | 133.33 | 153.33 |
| 200 ppm | 4.80% | 200 | 2.40% | 7.20% | 7.50% | 120.00 | 135.00 |
| 150 ppm | 4.00% | 250 | 2.70% | 6.70% | 7.20% | 108.00 | 128.00 |
| 100 ppm | 3.00% | 300 | 2.80% | 5.80% | 6.50% | 93.33 | 116.67 |

Calculated sweetness (ppm sugar) of GSG-RA40 per ppm=calculated SE of GSG-RA40/concentration of GSG-RA40

Measured sweetness (ppm sugar) of GSG-RA40 per ppm=(Measured SE−calculated SE of RA/RD)/concentration of GSG-RA40

Figure 73:
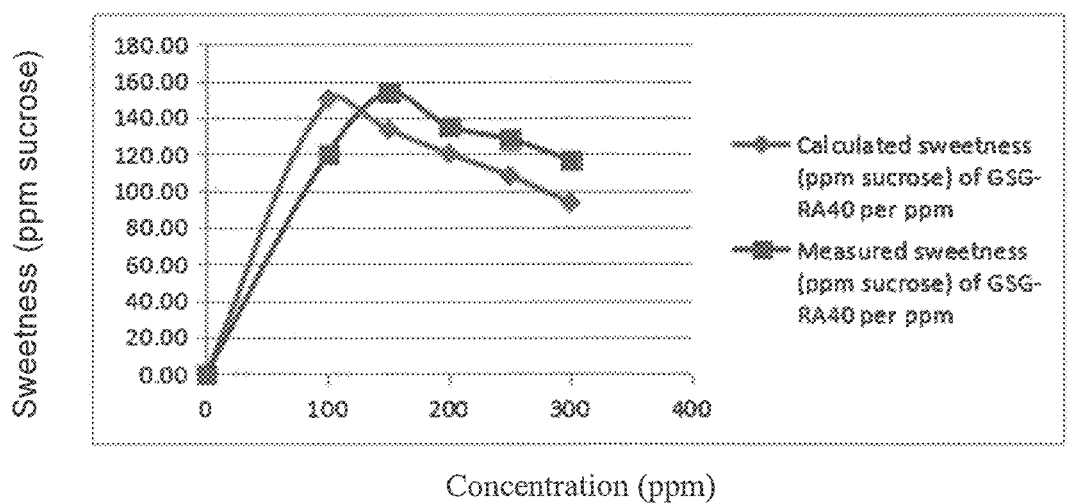
FIG. 73 is a graphical illustration showing the calculated and measured sweetness of GSG-RA40 per ppm in 400 ppm GSG-RA40 and RA/RD compositions.

The data were showed in FIG. 73.

It is found that at 400 ppm total solid content, with the increase of the amount of GSG-RA40, its measured contribution of sweetness was higher than calculated value. Significant synergistic effect was found when GSG-RA40>150 ppm, although the optimized range was 150-250 ppm.

Example 42

Evaluating the taste profile of compositions of GSG-RA40 and RA80/RB10/RD6, in order to find out the optimized ratio with the best synergistic taste effects.

The samples were tested in aqueous solution of citric acid at pH 3.8.

The control sample was RA80/RB10/RD6 at 400 ppm, corresponding to 8.3% SE.

Figure 74:
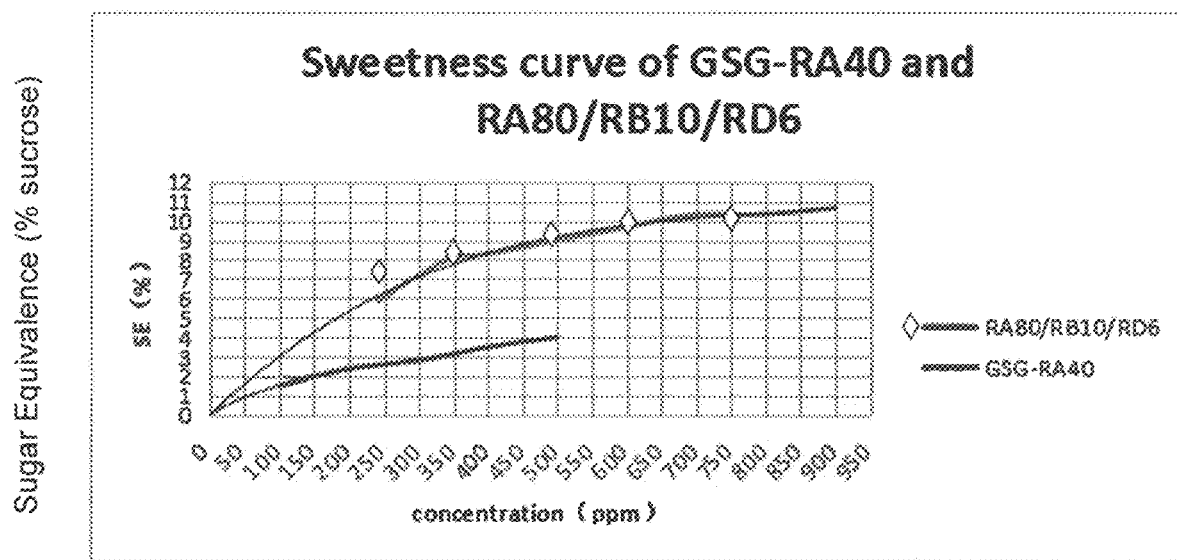
FIG. 74 is a graphical illustration showing the sweetness curve of GSG-RA40 and RA80/RB10/RD6.

Sweetness curve of GSG-RA40 and RA80/RB10/RD6 was shown as FIG. 74.

Taste profile of RA80/RB10/RD6/GSG-RA40 composition was shown in table 101.

TABLE 101

| RA80/RB10/RD6 | GSG-RA40 | SE | Sugar like | Bitterness | Aftertaste | Lingering |
|---|---|---|---|---|---|---|
| 400 ppm | — | 8.3% | 4.5 | 0 | 0 | 0.5 |
| 300 ppm | 100 ppm | 8.1% | 3.5 | 0 | 2 | 2 |
| 250 ppm | 150 ppm | 8.5% | 4 | 0 | 1 | 1 |
| 200 ppm | 200 ppm | 8.2% | 4 | 0 | 1 | 1 |
| 150 ppm | 250 ppm | 7.5% | 4 | 0 | 1 | 1 |
| 100 ppm | 300 ppm | 7.0% | 3 | 0 | 2.5 | 2 |

As for the synergistic effect, it can be found in table 102.

TABLE 102

| RA80/RB10/RD6 concentration | Calculated SE of RA80/RB10/RD6 | GSG-RA40 concentration | Calculated SE of GSG-RA40 | Calculated SE of the composition | Measured SE of the composition | Calculated sweetness (ppm sucrose) of GSG-RA40 per ppm | Measured sweetness (ppm sucrose) of GSG-RA40 per ppm |
|---|---|---|---|---|---|---|---|
| 400 ppm | — | 0 | | | | 0.00 | 0 |
| 300 ppm | 7.20% | 100 | 1.50% | 8.70% | 8.10% | 150.00 | 90.00 |
| 250 ppm | 6.00% | 150 | 2.00% | 8.00% | 8.50% | 133.33 | 166.67 |
| 200 ppm | 5.40% | 200 | 2.40% | 7.80% | 8.20% | 120.00 | 140.00 |
| 150 ppm | 4.20% | 250 | 2.70% | 6.90% | 7.50% | 108.00 | 132.00 |
| 100 ppm | 3.00% | 300 | 2.80% | 5.80% | 7.00% | 93.33 | 133.33 |

The samples were as follows:

TABLE 100

| RA80/RB10/RD6 | GSG-RA40 |
|---|---|
| 400 ppm | — |
| 300 ppm | 100 ppm |
| 250 ppm | 150 ppm |
| 200 ppm | 200 ppm |
| 150 ppm | 250 ppm |
| 100 ppm | 300 ppm |

Calculated sweetness (ppm sugar) of GSG-RA40 per ppm=calculated SE of GSG-RA40/concentration of GSG-RA40

Measured sweetness (ppm sugar) of GSG-RA40 per ppm=(Measured SE−calculated SE of RA80/RB10/RD6)/concentration of GSG-RA40

Figure 75:
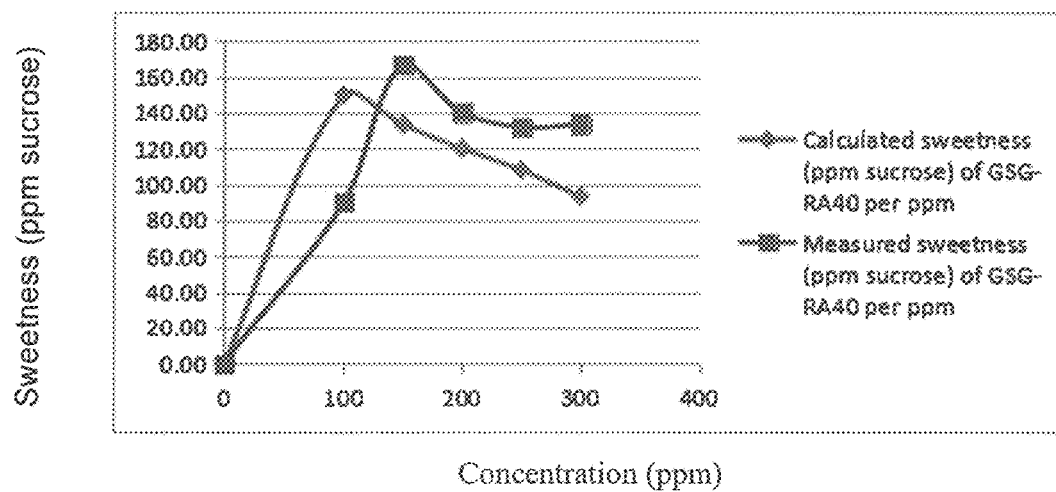
FIG. 75 is a graphical illustration showing the calculated and measured sweetness of GSG-RA40 per ppm in 400 ppm GSG-RA40 and RA80/RB10/RD6 compositions.

The data were showed in FIG. 75.

It is found that at 400 ppm total solid content, with the increase of the amount of GSG-RA40, its measured contribution of sweetness was higher than calculated value. Significant synergistic effect was found when GSG-RA40>150 ppm, although the optimized range was 150-250 ppm.

Example 43

Evaluating the taste profile of compositions of GSG-RA20 and RA75/RB15, in order to find out the optimized ratio with the best synergistic taste effects.

The samples were tested in aqueous solution of citric acid at pH 3.8.

The control sample was RA75/RB15 at 400 ppm, corresponding to 7.0% SE.

The samples were as follows:

TABLE 103

| RA75/RB15 | GSG-RA20 | total GSG |
|---|---|---|
| 400 ppm | — | |
| 300 ppm | 100 ppm | 18.56% |
| 250 ppm | 150 ppm | 27.84% |
| 200 ppm | 200 ppm | 37.13% |
| 150 ppm | 250 ppm | 46.41% |
| 100 ppm | 300 ppm | 55.69% |

Figure 76:
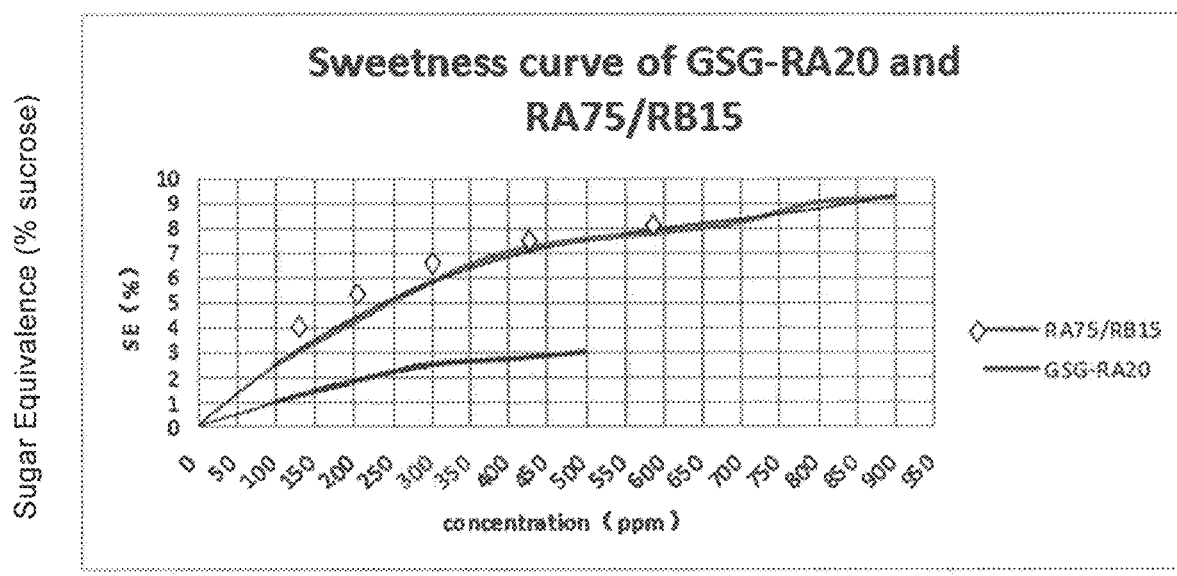
FIG. 76 is a graphical illustration showing the sweetness curve of GSG-RA20 and RA75/RB15.

Sweetness curve of GSG-RA20 and RA75/RB15 was shown as FIG. 76.

Taste profile of RA75/RB15/GSG-RA20 composition was shown in table 104.

TABLE 104

| RA75/RB15 | GSG-RA20 | SE | Sugar like | Bitterness | Aftertaste | Lingering |
|---|---|---|---|---|---|---|
| 400 ppm | — | 7.0% | 4.5 | 0 | 1.5 | 1.5 |
| 300 ppm | 100 ppm | 7.2% | 4 | 0 | 1 | 1 |
| 250 ppm | 150 ppm | 7.5% | 4 | 0 | 1 | 1 |
| 200 ppm | 200 ppm | 6.8% | 3.5 | 0 | 2 | 2 |
| 150 ppm | 250 ppm | 6.9% | 3.5 | 0 | 1.5 | 1.5 |
| 100 ppm | 300 ppm | 6.5% | 4 | 0 | 1 | 1 |

As for the synergistic effect, it can be found in table 105

TABLE 105

| RA75/RB15 concentration | Calculated SE of RA75/RB15 | GSG-RA20 concentration | Calculated SE of GSG-RA20 | Calculated SE of the composition | Measured SE of the composition | Calculated sweetness (ppm sucrose) of GSG-RA20 per ppm | Measured sweetness (ppm sucrose) of GSG-RA20 per ppm |
|---|---|---|---|---|---|---|---|
| 400 ppm | | 0 | | | | 0.00 | 0 |
| 300 ppm | 5.80% | 100 | 1.00% | 6.80% | 7.20% | 100.00 | 140.00 |
| 250 ppm | 5% | 150 | 1.40% | 6.40% | 7.50% | 93.33 | 166.67 |
| 200 ppm | 4% | 200 | 1.80% | 6.00% | 6.80% | 90.00 | 130.00 |
| 150 ppm | 3.40% | 250 | 2.20% | 5.60% | 6.90% | 88.00 | 140.00 |
| 100 ppm | 3% | 300 | 2.60% | 5.10% | 6.50% | 86.67 | 133.33 |

Calculated sweetness (ppm sugar) of GSG-RA20 per ppm=calculated SE of GSG-RA20/concentration of GSG-RA20

Measured sweetness (ppm sugar) of GSG-RA20 per ppm=(Measured SE−calculated SE of RA75/RB15)/concentration of GSG-RA20

Figure 77:
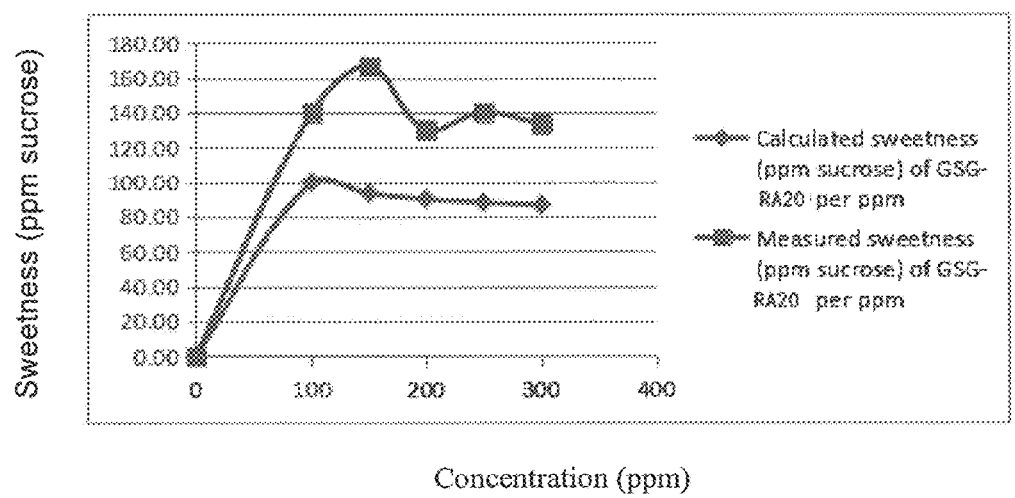
FIG. 77 is a graphical illustration showing the calculated and measured sweetness of GSG-RA20 per ppm in 400 ppm GSG-RA20 and RA75/RB15 compositions.

The data were showed in FIG. 77.

It is found that at 400 ppm total solid content, with the increase of the amount of GSG-RA20, its measured contribution of sweetness was higher than calculated value. Significant synergistic effect was found when GSG-RA20>100 ppm, although the optimized range was 100-200 ppm.

Example 44

Evaluating the taste profile of compositions of GSG-RA20 and RA/RD, in order to find out the optimized ratio with the best synergistic taste effects.

The samples were tested in aqueous solution of citric acid at pH 3.8.

The control sample was RA/RD at 400 ppm, corresponding to 6.5% SE.

The samples were as follows:

TABLE 106

| RA/RD | GSG-RA20 | total GSG |
|---|---|---|
| 400 ppm | — | |
| 300 ppm | 100 ppm | 18.56% |
| 250 ppm | 150 ppm | 27.84% |
| 200 ppm | 200 ppm | 37.13% |
| 150 ppm | 250 ppm | 46.41% |
| 100 ppm | 300 ppm | 55.69% |

Figure 78:
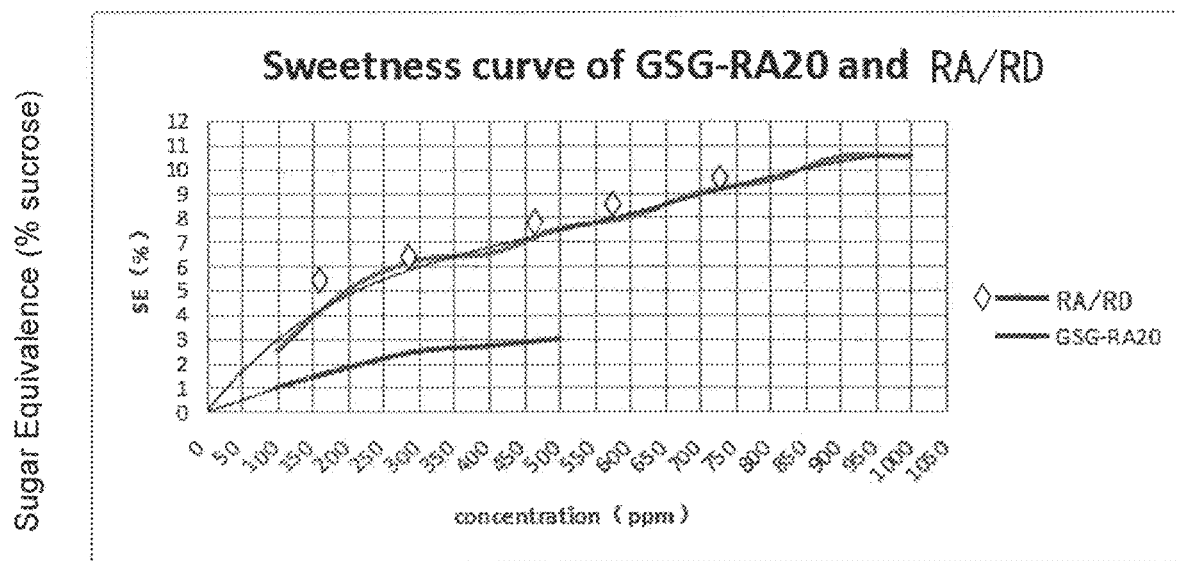
FIG. 78 is a graphical illustration showing the sweetness curve of GSG-RA20 and RA/RD.

Sweetness curve of GSG-RA20 and RA/RD was shown as FIG. 78.

Taste profile of RA/RD/GSG-RA20 composition was shown in table 107.

TABLE 107

| RA/RD | GSG-RA20 | SE | Sugar like | Bitterness | Aftertaste | Lingering |
|---|---|---|---|---|---|---|
| 400 ppm | — | 6.5% | 3.5 | 1 | 1 | 1.5 |
| 300 ppm | 100 ppm | 7.0% | 4 | 0 | 1 | 1 |
| 250 ppm | 150 ppm | 7.4% | 4 | 0 | 1 | 1 |
| 200 ppm | 200 ppm | 7.1% | 4.5 | 0 | 0.5 | 1 |

TABLE 107-continued

| RA/RD | GSG-RA20 | SE | Sugar like | Bitterness | Aftertaste | Lingering |
|---|---|---|---|---|---|---|
| 150 ppm | 250 ppm | 6.9% | 4 | 0 | 1 | 1 |
| 100 ppm | 300 ppm | 6.2% | 3.5 | 0 | 2 | 1.5 |

As for the synergistic effect, it can be found in FIG. 108.

| RA/RD concentration | Calculated SE of RA/RD | GSG-RA20 concentration | Calculated SE of GSG-RA20 | Calculated SE of the composition | Measured SE of the composition | Calculated sweetness (ppm sucrose) of GSG-RA20 per ppm | Measured sweetness (ppm sucrose) of GSG-RA20 per ppm |
|---|---|---|---|---|---|---|---|
| 400 ppm | | 0 | | | | 0.00 | 0 |
| 300 ppm | 6.00% | 100 | 1.00% | 7.00% | 7.00% | 100.00 | 100.00 |
| 250 ppm | 5.50% | 150 | 1.40% | 6.90% | 7.40% | 93.33 | 126.67 |
| 200 ppm | 4.80% | 200 | 1.80% | 6.60% | 7.10% | 90.00 | 115.00 |
| 150 ppm | 4.00% | 250 | 2.20% | 6.20% | 6.90% | 88.00 | 116.00 |
| 100 ppm | 3.00% | 300 | 2.60% | 5.60% | 6.20% | 86.67 | 106.67 |

Calculated sweetness (ppm sugar) of GSG-RA20 per ppm=calculated SE of GSG-RA20/concentration of GSG-RA20

Measured sweetness (ppm sugar) of GSG-RA20 per ppm=(Measured SE−calculated SE of RA/RD)/concentration of GSG-RA20

Figure 79:
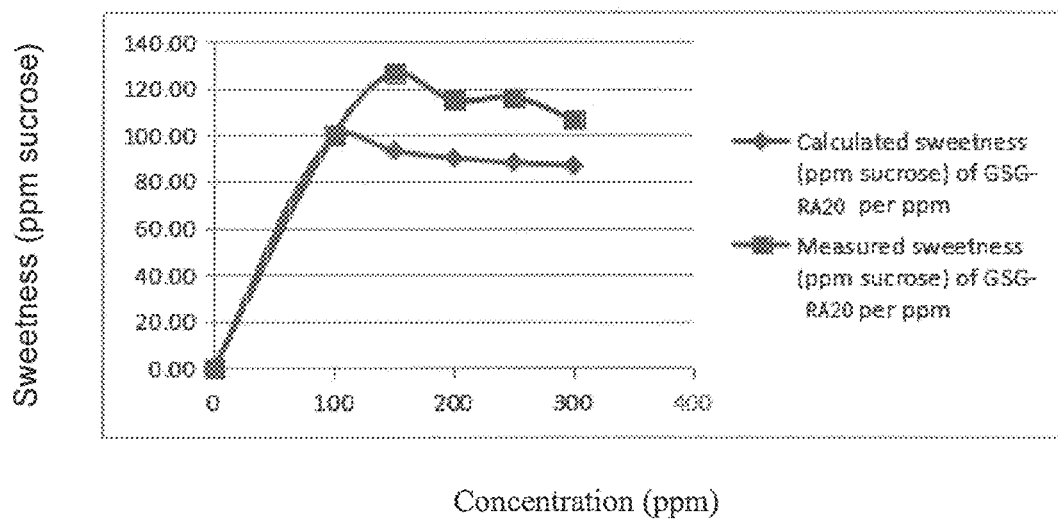
FIG. 79 is a graphical illustration showing the calculated and measured sweetness of GSG-RA20 per ppm in 400 ppm GSG-RA20 and RA/RD compositions.

The data were showed in FIG. 79.

It is found that at 400 ppm total solid content, with the increase of the amount of GSG-RA20, its measured contribution of sweetness was higher than calculated value. Significant synergistic effect was found when GSG-RA20>150 ppm, although the optimized range was 150-250 ppm.

Example 45

Evaluating the taste profile of compositions of GSG-RA20 and RA80/RB10/RD6, in order to find out the optimized ratio with the best synergistic taste effects.

The samples were tested in aqueous solution of citric acid at pH 3.8.

The control sample was RA80/RB10/RD6 at 400 ppm, corresponding to 8.3% SE.

The samples were as follows:

TABLE 109

| RA80/RB10/RD6 | GSG-RA20 | total GSG |
|---|---|---|
| 400 ppm | — | |
| 300 ppm | 100 ppm | 18.56% |
| 250 ppm | 150 ppm | 27.84% |
| 200 ppm | 200 ppm | 37.13% |
| 150 ppm | 250 ppm | 46.41% |
| 100 ppm | 300 ppm | 55.69% |

Figure 80:
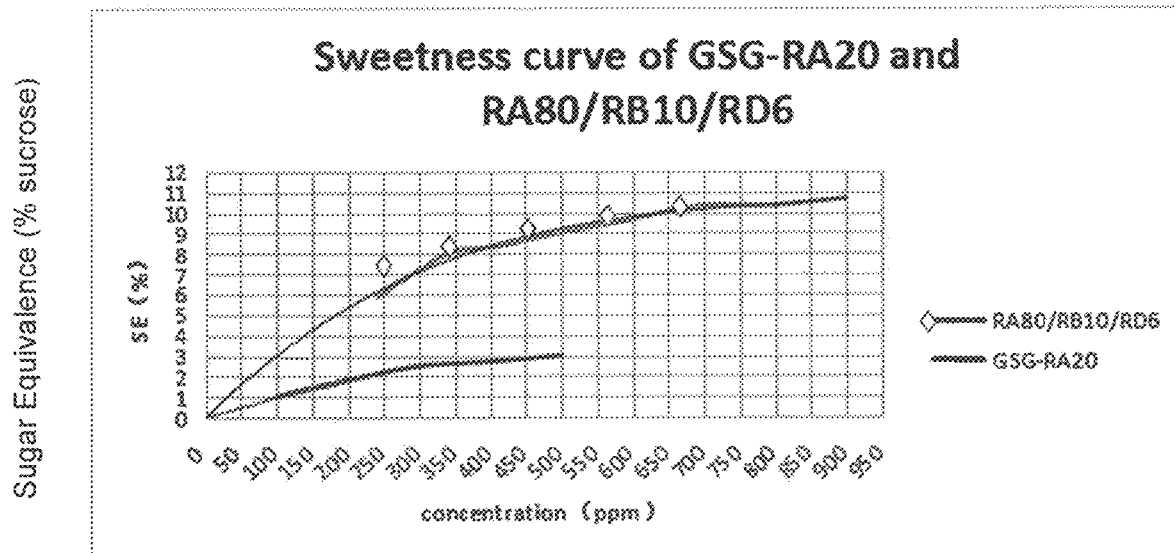
FIG. 80 is a graphical illustration showing the sweetness curve of GSG-RA20 and RA80/RB10/RD6.

Sweetness curve of GSG-RA20 and RA80/RB10/RD6 was shown in FIG. 80.

Taste profile of RA80/RB10/RD6/GSG-RA20 composition was shown in table 110.

TABLE 110

| RA80/RB10/RD6 | GSG-RA20 | SE | Sugar like | Bitterness | Aftertaste | Lingering |
|---|---|---|---|---|---|---|
| 400 ppm | — | 8.3% | 4.5 | 0 | 0 | 0.5 |
| 300 ppm | 100 ppm | 7.8% | 4.5 | 0 | 0.5 | 0.5 |
| 250 ppm | 150 ppm | 7.5% | 4 | 0 | 1 | 1 |
| 200 ppm | 200 ppm | 7.5% | 3.5 | 0 | 1.5 | 1.5 |
| 150 ppm | 250 ppm | 7.0% | 4 | 0 | 0.5 | 1 |
| 100 ppm | 300 ppm | 6.5% | 3.5 | 0 | 1.5 | 1.5 |

As for the synergistic effect, it can be found in table 111.

TABLE 111

| RA80/RB10/RD6 concentration | Calculated SE of RA80/RB10/RD6 | GSG-RA20 concentration | Calculated SE of GSG-RA20 | Calculated SE of the composition | Measured SE of the composition | Calculated sweetness (ppm sucrose) of GSG-RA20 per ppm | Measured sweetness (ppm sucrose) of GSG-RA20 per ppm |
|---|---|---|---|---|---|---|---|
| 400 ppm | | 0 | | 8.20% | 7.80% | 0.00 | 0 |
| 300 ppm | 7.20% | 100 | 1.00% | 8.20% | 7.80% | 100.00 | 60.00 |
| 250 ppm | 6.00% | 150 | 1.40% | 7.40% | 7.50% | 93.33 | 100.00 |
| 200 ppm | 5.40% | 200 | 1.80% | 7.20% | 7.50% | 90.00 | 105.00 |
| 150 ppm | 4.20% | 250 | 2.20% | 6.40% | 7.00% | 88.00 | 112.00 |
| 100 ppm | 3.00% | 300 | 2.60% | 5.60% | 6.50% | 86.67 | 116.67 |

Calculated sweetness (ppm sugar) of GSG-RA20 per ppm=calculated SE of GSG-RA20/concentration of GSG-RA20

Measured sweetness (ppm sugar) of GSG-RA20 per ppm=(Measured SE−calculated SE of RA80/RB10/RD6)/concentration of GSG-RA20

Figure 81:
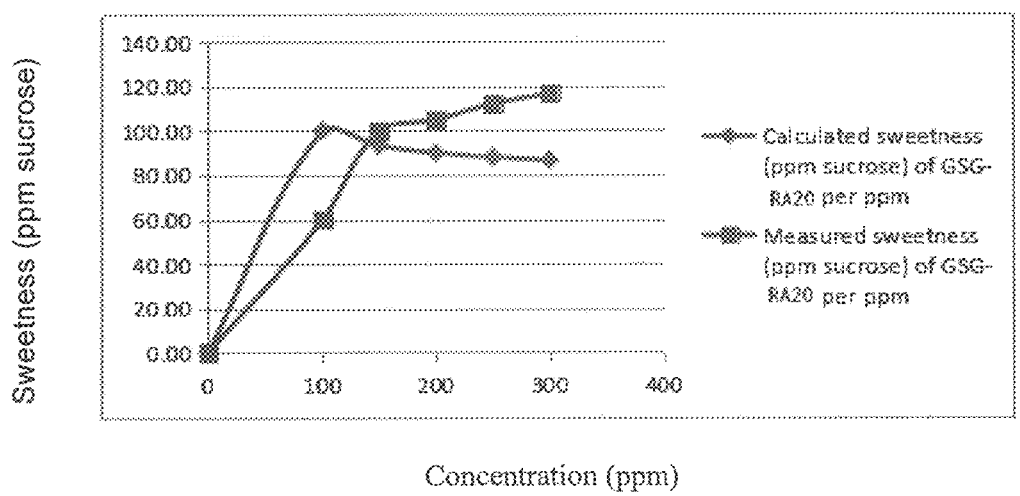
FIG. 81 is a graphical illustration showing the calculated and measured sweetness of GSG-RA20 per ppm in 400 ppm GSG-RA20 and RA80/RB10/RD6 compositions.

The data were showed in FIG. 81.

It is found that at 400 ppm total solid content, with the increase of the amount of GSG-RA20, its measured contribution of sweetness was higher than calculated value. Significant synergistic effect was found when GSG-RA20>150 ppm, although the optimized range was 200-300 ppm.

Example 46

Evaluating the taste profile of compositions of GSG-RA20, RA97 and sugar, in order to find out the optimized ratio with the best synergistic taste effects.

The samples were tested in aqueous solution of citric acid at pH 3.8.

The samples were as follows:

TABLE 112

| RA97 | GSG-RA20 | sugar | total GSG |
|---|---|---|---|
| 250 ppm | 100 ppm | 3% | 21.21% |
| 200 ppm | 150 ppm | 3% | 31.82% |
| 150 ppm | 200 ppm | 3% | 42.43% |

Taste profile of RA97/GSG-RA20/sugar composition was shown in table 113.

TABLE 113

| RA97 | GSG-RA20 | sugar | SE | Taste profile |
|---|---|---|---|---|
| 250 ppm | 100 ppm | 3% | 12% | Taste is as same as sugar |
| 200 ppm | 150 ppm | 3% | 13% | Taste is as same as sugar |
| 150 ppm | 200 ppm | 3% | 11.5% | Taste is as same as sugar |

As for the synergistic effect, it can be found in table 114.

TABLE 114

| RA97 concentration | Calculated SE of RA97 | GSG-RA20 concentration | Calculated SE of GSG-RA20 | Calculated SE of GSG-RA20 plus RA97 | sugar concentration | Calculated SE of the composition | Measured SE of the composition | Calculated sweetness (ppm sucrose) of GSG-RA20 plus RA97 per ppm | Measured sweetness (ppm sucrose) of GSG-RA20 plus RA97 per ppm |
|---|---|---|---|---|---|---|---|---|---|
| 250 ppm | 6.00% | 100 ppm | 1.50% | 7.5% | 3% | 10.5% | 12% | 214.29 | 257.14 |
| 200 ppm | 5.00% | 150 ppm | 2.00% | 7.0% | 3% | 10.0% | 13% | 200.00 | 285.71 |
| 150 ppm | 4.00% | 200 ppm | 2.40% | 6.4% | 3% | 9.4% | 11.50% | 182.86 | 242.86 |

Calculated sweetness (ppm sugar) of GSG-RA20 plus RA97 per ppm=calculated SE of GSG-RA20 plus RA97/concentration of GSG-RA20 plus RA97

Measured sweetness (ppm sugar) of GSG-RA20 plus RA97 per ppm=(Measured SE of GSG-RA20 plus RA97−sugar concentration)/concentration of GSG-RA20 plus RA97

It is found that at 350 ppm total GSG-RA20 plus RA97 content, when blend with 3% sugar, its measured contribution of sweetness was higher than calculated value. The composition of GSG-RA20 plus RA97 has significant synergic effect to the sweetness of sugar.

Example 47

Evaluating the taste profile of compositions of GSG-RA20, RA75/RB15 and sugar, in order to find out the optimized ratio with the best synergistic taste effects.

The samples were tested in aqueous solution of citric acid at pH 3.8.

The samples were as follows:

TABLE 115

| RA75/RB15 | GSG-RA20 | sugar | total GSG |
|---|---|---|---|
| 300 ppm | 100 ppm | 3% | 18.56% |
| 200 ppm | 200 ppm | 3% | 37.13% |
| 100 ppm | 300 ppm | 3% | 55.69% |

Taste profile of RA75/RB15/GSG-RA20/sugar composition was shown in table 116.

TABLE 116

| RA75/RB15 | GSG-RA20 | sugar | SE | Taste profile |
|---|---|---|---|---|
| 300 ppm | 100 ppm | 3% | 12.5% | Taste is as same as sugar |
| 200 ppm | 200 ppm | 3% | 12.5% | Taste is as same as sugar |
| 100 ppm | 300 ppm | 3% | 12% | Taste is as same as sugar |

As for the synergistic effect, it can be found in table 117.

TABLE 117

| RA75/RB15 concentration | Calculated SE of RA75/RB15 | GSG-RA20 concentration | Calculated SE of GSG-RA20 | Calculated SE of GSG-RA20 plus RA75/RB15 | sugar concentration | Calculated SE of the composition | Measured SE of the composition | Calculated sweetness (ppm sucrose) of GSG-RA20 plus RA75/RB15 per ppm | Measured sweetness (ppm sucrose) of GSG-RA20 plus RA75/RB15 per ppm |
|---|---|---|---|---|---|---|---|---|---|
| 300 ppm | 5.8% | 100 ppm | 1.50% | 7.3% | 3% | 10.3% | 12.50% | 208.57 | 271.43 |
| 200 ppm | 4.2% | 200 ppm | 2.40% | 6.6% | 3% | 9.6% | 12.50% | 188.57 | 271.43 |
| 100 ppm | 3.0% | 300 ppm | 2.80% | 5.8% | 3% | 8.8% | 12% | 165.71 | 257.14 |

Calculated sweetness (ppm sugar) of GSG-RA20 plus RA75/RB15 per ppm=calculated SE of GSG-RA20 plus RA75/RB15/concentration of GSG-RA20 plus RA75/RB15

Measured sweetness (ppm sugar) of GSG-RA20 plus RA75/RB15 per ppm=(Measured SE of GSG-RA20 plus RA75/RB15−sugar concentration)/concentration of GSG-RA20 plus RA75/RB15

It is found that at 400 ppm total GSG-RA20 plus RA75/RB15 content, when blend with 3% sugar, its measured contribution of sweetness was higher than calculated value. The composition of GSG-RA20 plus RA75/RB15 has significant synergic effect to the sweetness of sugar.

Example 48

Evaluating the taste profile of compositions of GSG-RA20, RA80/RB10/RD6 and sugar, in order to find out the optimized ratio with the best synergistic taste effects.

The samples were tested in aqueous solution of citric acid at pH 3.8.

The samples were as follows:

TABLE 118

| RA80/RB10/RD6 | GSG-RA20 | sugar | total GSG |
|---|---|---|---|
| 300 ppm | 100 ppm | 3% | 18.56% |
| 200 ppm | 200 ppm | 3% | 37.13% |
| 100 ppm | 300 ppm | 3% | 55.69% |

Taste profile of RA80/RB10/RD6/GSG-RA20/sugar composition was shown in table 119.

TABLE 119

| RA80/RB10/RD6 | GSG-RA20 | sugar | SE | Taste profile |
|---|---|---|---|---|
| 300 ppm | 100 ppm | 3% | 13% | Taste is as same as sugar |
| 200 ppm | 200 ppm | 3% | 12.5% | Taste is as same as sugar |
| 100 ppm | 300 ppm | 3% | 12% | Taste is as same as sugar |

As for the synergistic effect, it can be found in table 120.

TABLE 120

| RA80/RB10/RD6 concentration | Calculated SE of RA80/RB10/RD6 | GSG-RA20 concentration | Calculated SE of GSG-RA20 | Calculated SE of GSG-RA20 plus RA80/RB10/RD6 | sugar concentration | Calculated SE of the composition | Measured SE of the composition | Calculated sweetness (ppm sucrose) of GSG-RA20 plus RA80/RB10/RD6 per ppm | Measured sweetness (ppm sucrose) of GSG-RA20 plus RA80/RB10/RD6 per ppm |
|---|---|---|---|---|---|---|---|---|---|
| 300 ppm | 7.2% | 100 ppm | 1.50% | 8.7% | 3% | 11.7% | 13% | 248.57 | 285.71 |
| 200 ppm | 5.4% | 200 ppm | 2.40% | 7.8% | 3% | 10.8% | 12.50% | 222.86 | 271.43 |
| 100 ppm | 3.0% | 300 ppm | 2.80% | 5.8% | 3% | 8.8% | 12% | 165.71 | 257.14 |

Calculated sweetness (ppm sugar) of GSG-RA20 plus RA80/RB10/RD6 per ppm=calculated SE of GSG-RA20 plus RA80/RB10/RD6/concentration of GSG-RA20 plus RA80/RB10/RD6

Measured sweetness (ppm sugar) of GSG-RA20 plus RA80/RB10/RD6 per ppm=(Measured SE of GSG-RA20 plus RA80/RB10/RD6−sugar concentration)/concentration of GSG-RA20 plus RA RA80/RB10/RD6

It is found that at 400 ppm total GSG-RA20 plus RA80/RB10/RD6 content, when blend with 3% sugar, its measured contribution of sweetness was higher than calculated value. The composition of GSG-RA20 plus RA80/RB10/RD6 has significant synergic effect to the sweetness of sugar.

Example 49

Evaluate the taste profile of compositions of GSG-RA50, RA97 and sugar, in order to find out the optimized ratio with the best synergistic taste effects.

The samples were tested in aqueous solution of citric acid at pH 3.8.

The samples were as follows:

TABLE 121

| RA97 | GSG-RA50 | sugar | total GSG |
|---|---|---|---|
| 250 ppm | 100 ppm | 3% | 25.53% |
| 200 ppm | 150 ppm | 3% | 38.29% |
| 150 ppm | 200 ppm | 3% | 51.06% |

Taste profile of RA97/GSG-RA50/sugar composition was shown in talbe 122.

TABLE 122

| RA97 | GSG-RA50 | sugar | SE | Taste profile |
|---|---|---|---|---|
| 250 ppm | 100 ppm | 3% | 13% | Taste is as same as sugar |
| 200 ppm | 150 ppm | 3% | 13% | Taste is as same as sugar |
| 150 ppm | 200 ppm | 3% | 12% | Taste is as same as sugar |

As for the synergistic effect, it can be found in talbe 123.

| RA97 concentration | Calculated SE of RA97 | GSG-RA50 concentration | Calculated SE of GSG-RA50 | Calculated SE of GSG-RA50 plus RA97 | sugar concentration | Calculated SE of the composition | Measured SE of the composition | Calculated sweetness (ppm sucrose) of GSG-RA50 plus RA97 per ppm | Measured sweetness (ppm sucrose) of GSG-RA50 plus RA97 per ppm |
|---|---|---|---|---|---|---|---|---|---|
| 250 ppm | 6.00% | 100 ppm | 1.00% | 7.0% | 3% | 10.0% | 13% | 200.00 | 285.71 |
| 200 ppm | 5.00% | 150 ppm | 1.50% | 6.5% | 3% | 9.5% | 13% | 185.71 | 285.71 |
| 150 ppm | 4.00% | 200 ppm | 2.00% | 6.0% | 3% | 9.0% | 12% | 171.43 | 257.14 |

Calculated sweetness (ppm sugar) of GSG-RA50 plus RA97 per ppm=calculated SE of GSG-RA50 plus RA97/concentration of GSG-RA50 plus RA97

Measured sweetness (ppm sugar) of GSG-RA50 plus RA97 per ppm=(Measured SE of GSG-RA50 plus RA97−sugar concentration)/concentration of GSG-RA50 plus RA97

It is found that at 350 ppm total GSG-RA50 plus RA97 content, when blend with 3% sugar, its measured contribution of sweetness was higher than calculated value. The composition of GSG-RA50 plus RA97 has significant synergic effect to the sweetness of sugar.

Example 50

Evaluating the taste profile of compositions of GSG-RA50, RA75/RB15 and sugar, in order to find out the optimized ratio with the best synergistic taste effects.

The samples were tested in aqueous solution of citric acid at pH 3.8.

The samples were as follows:

TABLE 124

| RA75/RB15 | GSG-RA50 | sugar | total GSG |
|---|---|---|---|
| 300 ppm | 100 ppm | 3% | 25.53% |
| 200 ppm | 200 ppm | 3% | 38.29% |
| 100 ppm | 300 ppm | 3% | 51.06% |

Taste profile of RA75/RB15/GSG-RA50/sugar composition was shown in table 125.

TABLE 125

| RA75/RB15 | GSG-RA50 | sugar | SE | Taste profile |
|---|---|---|---|---|
| 300 ppm | 100 ppm | 3% | 13.5% | Taste is as same as sugar |
| 200 ppm | 200 ppm | 3% | 13% | Taste is as same as sugar |
| 100 ppm | 300 ppm | 3% | 12% | Taste is as same as sugar |

As for the synergistic effect, it can be found in table 126.

TABLE 126

| RA75/RB15 concentration | Calculated SE of RA75/RB15 | GSG-RA50 concentration | Calculated SE of GSG-RA50 | Calculated SE of GSG-RA50 plus RA75/RB15 | sugar concentration | Calculated SE of the composition | Measured SE of the composition | Calculated sweetness (ppm sucrose) of GSG-RA50 plus RA75/RB15 per ppm | Measured sweetness (ppm sucrose) of GSG-RA50 plus RA75/RB15 per ppm |
|---|---|---|---|---|---|---|---|---|---|
| 300 ppm | 5.8% | 100 ppm | 1.00% | 6.8% | 3% | 9.8% | 13.5% | 194.29 | 300.00 |
| 200 ppm | 4.2% | 200 ppm | 2.00% | 6.2% | 3% | 9.2% | 13% | 177.14 | 285.71 |
| 100 ppm | 3.0% | 300 ppm | 2.75% | 5.8% | 3% | 8.8% | 12% | 164.29 | 257.14 |

Calculated sweetness (ppm sugar) of GSG-RA50 plus RA75/RB15 per ppm=calculated SE of GSG-RA50 plus RA75/RB15/concentration of GSG-RA50 plus RA75/RB15

Measured sweetness (ppm sugar) of GSG-RA50 plus RA75/RB15 per ppm=(Measured SE of GSG-RA50 plus RA75/RB15−sugar concentration)/concentration of GSG-RA50 plus RA75/RB15

It is found that at 400 ppm total GSG-RA50 plus RA75/RB15 content, when blend with 3% sugar, its measured contribution of sweetness was higher than calculated value. The composition of GSG-RA50 plus RA75/RB15 has significant synergic effect to the sweetness of sugar.

Example 51

Evaluating the taste profile of compositions of GSG-RA50, RA80/RB10/RD6 and sugar, in order to find out the optimized ratio with the best synergistic taste effects.

The samples were tested in aqueous solution of citric acid at pH 3.8.

The samples were as follows:

TABLE 127

| RA80/RB10/RD6 | GSG-RA50 | sugar | total GSG |
|---|---|---|---|
| 300 ppm | 100 ppm | 3% | 25.53% |
| 200 ppm | 200 ppm | 3% | 38.29% |
| 100 ppm | 300 ppm | 3% | 51.06% |

Taste profile of RA80/RB10/RD6/GSG-RA50/sugar composition was shown in table 128.

TABLE 128

| RA80/RB10/RD6 | GSG-RA50 | sugar | SE | Taste profile |
|---|---|---|---|---|
| 300 ppm | 100 ppm | 3% | 12% | Taste is as same as sugar |
| 200 ppm | 200 ppm | 3% | 11% | Taste is as same as sugar |
| 100 ppm | 300 ppm | 3% | 11.5% | Taste is as same as sugar |

As for the synergistic effect, it can be found in table 129.

Calculated sweetness (ppm sugar) of GSG-RA50 plus RA80/RB10/RD6 per ppm=calculated SE of GSG-RA50 plus RA80/RB10/RD6/concentration of GSG-RA50 plus RA80/RB10/RD6

Measured sweetness (ppm sugar) of GSG-RA50 plus RA80/RB10/RD6 per ppm=(Measured SE of GSG-RA50 plus RA80/RB10/RD6−sugar concentration)/concentration of GSG-RA50 plus RA RA80/RB10/RD6

It is found that at 400 ppm total GSG-RA50 plus RA80/RB10/RD6 content, when blend with 3% sugar, its measured contribution of sweetness was higher than calculated value. The composition of GSG-RA50 plus RA80/RB10/RD6 has significant synergic effect to the sweetness of sugar.

Example 52

Evaluate the taste profile of compositions of GSG-RA95, RA97 and sugar, in order to find out the optimized ratio with the best synergistic taste effects.

The samples were tested in aqueous solution of citric acid at pH 3.8.

The samples were as follows:

TABLE 130

| RA97 | GSG-RA95 | sugar | total GSG |
|---|---|---|---|
| 250 ppm | 100 ppm | 3% | 25.89% |
| 200 ppm | 150 ppm | 3% | 38.83% |
| 150 ppm | 200 ppm | 3% | 51.77% |

Taste profile of RA97/GSG-RA95/sugar composition was shown in table 131.

TABLE 131

| RA97 | GSG-RA95 | sugar | SE | Taste profile |
|---|---|---|---|---|
| 250 ppm | 100 ppm | 3% | 12.5% | Taste is as same as sugar |
| 200 ppm | 150 ppm | 3% | 11.8% | Taste is as same as sugar |
| 150 ppm | 200 ppm | 3% | 12.8% | Taste is as same as sugar |

As for the synergistic effect, it can be found in table 132.

TABLE 129

| RA80/RB10/RD6 concentration | Calculated SE of RA80/RB10/RD6 | GSG-RA50 concentration | Calculated SE of GSG-RA50 | Calculated SE of GSG-RA50 plus RA80/RB10/RD6 | sugar concentration | Calculated SE of the composition | Measured SE of the composition | Calculated sweetness (ppm sucrose) of GSG-RA50 plus RA80/RB10/RD6 per ppm | Measured sweetness (ppm sucrose) of GSG-RA50 plus RA80/RB10/RD6 per ppm |
|---|---|---|---|---|---|---|---|---|---|
| 300 ppm | 7.2% | 100 ppm | 1.00% | 8.2% | 3% | 11.2% | 12% | 234.29 | 257.14 |
| 200 ppm | 5.4% | 200 ppm | 2.00% | 7.4% | 3% | 10.4% | 11% | 211.43 | 228.57 |
| 100 ppm | 3.0% | 300 ppm | 2.75% | 5.8% | 3% | 8.8% | 11.50% | 164.29 | 242.86 |

TABLE 132

| RA97 concentration | Calculated SE of RA97 | GSG-RA95 concentration | Calculated SE of GSG-RA95 | Calculated SE of GSG-RA95 plus RA97 | sugar concentration | Calculated SE of the composition | Measured SE of the composition | Calculated sweetness (ppm sucrose) of GSG-RA95 plus RA97 per ppm | Measured sweetness (ppm sucrose) of GSG RA95 plus RA97 per ppm |
|---|---|---|---|---|---|---|---|---|---|
| 250 ppm | 6.00% | 100 ppm | 1.80% | 7.8% | 3% | 10.8% | 12.50% | 222.86 | 271.43 |
| 200 ppm | 5.00% | 150 ppm | 2.20% | 7.2% | 3% | 10.2% | 11.80% | 205.71 | 251.43 |
| 150 ppm | 4.00% | 200 ppm | 2.60% | 6.6% | 3% | 9.6% | 12.80% | 188.75 | 280.00 |

Calculated sweetness (ppm sugar) of GSG-RA95 plus RA97 per ppm=calculated SE of GSG-RA95 plus RA97/concentration of GSG-RA95 plus RA97

Measured sweetness (ppm sugar) of GSG-RA95 plus RA97 per ppm=(Measured SE of GSG-RA95 plus RA97−sugar concentration)/concentration of GSG-RA95 plus RA97

It is found that at 350 ppm total GSG-RA95 plus RA97 content, when blend with 3% sugar, its measured contribution of sweetness was higher than calculated value. The composition of GSG-RA95 plus RA97 has significant synergic effect to the sweetness of sugar.

Example 53

Evaluating the taste profile of compositions of GSG-RA95, RA75/RB15 and sugar, in order to find out the optimized ratio with the best synergistic taste effects.

The samples were tested in aqueous solution of citric acid at pH 3.8.

The samples were as follows:

TABLE 133

| RA75/RB15 | GSG-RA95 | sugar | total GSG |
|---|---|---|---|
| 300 ppm | 100 ppm | 3% | 22.65% |
| 200 ppm | 200 ppm | 3% | 45.3% |
| 100 ppm | 300 ppm | 3% | 67.95% |

Taste profile of RA75/RB15/GSG-RA95/sugar composition was shown in talbe 134.

TABLE 134

| RA75/RB15 | GSG-RA95 | sugar | SE | Taste profile |
|---|---|---|---|---|
| 300 ppm | 100 ppm | 3% | 13% | Taste is as same as sugar |
| 200 ppm | 200 ppm | 3% | 12.2% | Taste is as same as sugar |
| 100 ppm | 300 ppm | 3% | 11.5% | Taste is as same as sugar |

As for the synergistic effect, it can be found in table 135.

TABLE 135

| RA75/RB15 concentration | Calculated SE of RA75/RB15 | GSG-RA95 concentration | Calculated SE of GSG-RA95 | Calculated SE of GSG-RA95 plus RA75/RB15 | sugar concentration | Calculated SE of the composition | Measured SE of the composition | Calculated sweetness (ppm sucrose) of GSG-RA95 plus RA75/RB15 per ppm | Measured sweetness (ppm sucrose) of GSG-RA95 plus RA75/RB15 per ppm |
|---|---|---|---|---|---|---|---|---|---|
| 300 ppm | 5.8% | 100 ppm | 1.80% | 7.6% | 3% | 10.6% | 13.0% | 217.14 | 285.71 |
| 200 ppm | 4.2% | 200 ppm | 2.60% | 6.8% | 3% | 9.8% | 12.2% | 194.29 | 262.86 |
| 100 ppm | 3.0% | 300 ppm | 3.40% | 6.4% | 3% | 9.4% | 11.5% | 182.86 | 242.86 |

Calculated sweetness (ppm sugar) of GSG-RA95 plus RA75/RB15 per ppm=calculated SE of GSG-RA95 plus RA75/RB15/concentration of GSG-RA95 plus RA75/RB15

Measured sweetness (ppm sugar) of GSG-RA95 plus RA75/RB15 per ppm=(Measured SE of GSG-RA95 plus RA75/RB15–sugar concentration)/concentration of GSG-RA95 plus RA75/RB15

It is found that at 400 ppm total GSG-RA95 plus RA75/RB15 content, when blend with 3% sugar, its measured contribution of sweetness was higher than calculated value. The composition of GSG-RA95 plus RA75/RB15 has significant synergic effect to the sweetness of sugar.

Example 54

Evaluating the taste profile of compositions of GSG-RA95, RA80/RB10/RD6 and sugar, in order to find out the optimized ratio with the best synergistic taste effects.

The samples were tested in aqueous solution of citric acid at pH 3.8.

The samples were as follows:

TABLE 136

| RA80/RB10/RD6 | GSG-RA95 | sugar | total GSG |
|---|---|---|---|
| 300 ppm | 100 ppm | 3% | 22.65% |
| 200 ppm | 200 ppm | 3% | 45.3% |
| 100 ppm | 300 ppm | 3% | 67.95% |

Taste profile of RA80/RB10/RD6/GSG-RA95/sugar composition was shown in table 137.

TABLE 137

| RA80/RB10/RD6 | GSG-RA95 | sugar | SE | Taste profile |
|---|---|---|---|---|
| 300 ppm | 100 ppm | 3% | 12.5% | Taste is as same as sugar |
| 200 ppm | 200 ppm | 3% | 11.5% | Taste is as same as sugar |
| 100 ppm | 300 ppm | 3% | 11% | Taste is as same as sugar |

As for the synergistic effect, it can be found in table 138.

TABLE 138

| RA80/RB10/RD6 concentration | Calculated SE of RA80/RB10/RD6 | GSG-RA95 concentration | Calculated SE of GSG-RA95 | Calculated SE of GSG-RA95 plus RA80/RB10/RD6 | sugar concentration | Calculated SE of the composition | Measured SE of the composition | Calculated sweetness (ppm sucrose) of GSG-RA95 plus RA80/RB10/RD6 per ppm | Measured sweetness (ppm sucrose) of GSG-RA95 plus RA80/RB10/RD6 per ppm |
|---|---|---|---|---|---|---|---|---|---|
| 300 ppm | 7.2% | 100 ppm | 1.80% | 9.0% | 3% | 12.0% | 12.5% | 257.14 | 271.43 |
| 200 ppm | 5.4% | 200 ppm | 2.60% | 8.0% | 3% | 11.0% | 11.5% | 228.57 | 242.86 |
| 100 ppm | 3.0% | 300 ppm | 3.40% | 6.4% | 3% | 9.4% | 11.0% | 182.86 | 228.57 |

Calculated sweetness (ppm sugar) of GSG-RA95 plus RA80/RB10/RD6 per ppm=calculated SE of GSG-RA95 plus RA80/RB10/RD6/concentration of GSG-RA95 plus RA80/RB10/RD6

Measured sweetness (ppm sugar) of GSG-RA95 plus RA80/RB10/RD6 per ppm=(Measured SE of GSG-RA95 plus RA80/RB10/RD6–sugar concentration)/concentration of GSG-RA95 plus RA RA80/RB10/RD6

It is found that at 400 ppm total GSG-RA95 plus RA80/RB10/RD6 content, when blend with 3% sugar, its measured contribution of sweetness was higher than calculated value. The composition of GSG-RA95 plus RA80/RB10/RD6 has significant synergic effect to the sweetness of sugar.

Example 55

Evaluate the taste profile of compositions of GSG-RA20, RA97 and salt, in order to find out the taste improvement.

The samples were tested in aqueous solution of citric acid at pH 3.8.

The samples were as follows:

TABLE 139

| RA97 | GSG-RA95 | Salt (NaCl) | total GSG |
|---|---|---|---|
| 200 ppm | 200 ppm | — | 45.30% |
| 200 ppm | 200 ppm | 100 ppm | 45.30% |
| 200 ppm | 200 ppm | 200 ppm | 45.30% |

Taste profile of RA97/GSG-RA20/sugar composition was shown in talbe 140.

TABLE 140

| RA97 | GSG-RA20 | Salt (NaCl) | SE | Sugar like | Bitterness | Aftertaste | Lingering |
|---|---|---|---|---|---|---|---|
| 200 ppm | 200 ppm | — | 8% | 4 | 0 | 1 | 1.5 |
| 200 ppm | 200 ppm | 100 ppm | 8% | 4.5 | 0 | 0.5 | 0.5 |
| 200 ppm | 200 ppm | 200 ppm | 8% | 4.5 | 0 | 0.5 | 1 |

It is found that at 400 ppm total GSG-RA20 plus RA97 content, when blend with salt, the sweetness did not increase but the taste profile had been improved by reducing the aftertaste and lingering.

Example 56

GSG-RA20 was mixed with RA, RB, RD or stevioside as the ratio of 1:1 by weight so as to obtain a mixture, a certain amount of solvent, such as water, ethanol/water mixture, was added into the obtained mixture, heated to a certain temperature until the mixture was completely dissolved, and the temperature was kept for an hour. The solution was treated by spray drying to obtain the composition comprising GSG and SG. Compared with the solubility of RA, RB, RD or stevioside alone, the solubility of the composition was shown in table 141.

TABLE 141

| water | GSG-RA20 | RA | RB | RD | SS | Stable time |
|---|---|---|---|---|---|---|
| 10 ml | | 1 g | | | | 2 h |
| 10 ml | 1 g | 1 g | | | | >14 d |
| 10 ml | | | | | 0.05 g | insoluble |
| 10 ml | 0.05 g | | | | 0.05 g | 14 d |
| 10 ml | | | | | 0.25 g | insoluble |
| 10 ml | 0.25 g | | | | 0.25 g | 2 d |
| 10 ml | | | 0.01 g | | | insoluble |
| 10 ml | 0.01 g | | 0.01 g | | | 1 d |
| 10 ml | | | | 0.01 g | | insoluble |
| 10 ml | 0.01 g | | | 0.01 g | | >14 d |

It can be concluded that GSG can improve the solubility of steviol glycoside.

Example 57

GSG-RA20 was mixed with RA, RB, RD or stevioside as the ratio of 1:1 by weight so as to obtain a mixture, and then the obtained mixture was mixed with γ-cyclodextrin as the ratio of 1:1 by weight. A certain amount of solvent, such as water, ethanol/water mixture, was added into the mixture, heated to a certain temperature until the mixture was completely dissolved, and the temperature was kept for an hour. The solution was treated by spray drying to obtain the composition comprising GSG, SG and γ-cyclodextrin. Compared with the solubility of the composition comprising GSG and SG, the solubility of the composition was shown in table 142.

TABLE 142

| water | GSG-RA20 | γ-CD | RB | RD | SS | Stable time |
|---|---|---|---|---|---|---|
| 10 ml | 0.05 g | | 0.05 g | | | insoluble |
| 10 ml | 0.05 g | 0.1 g | 0.05 g | | | 2 d |
| 10 ml | 0.05 g | | | 0.05 g | | insoluble |
| 10 ml | 0.05 g | 0.1 g | | 0.05 g | | >14 d |
| 10 ml | 0.05 g | | | | 0.05 g | 14 d |
| 10 ml | 0.05 g | 0.1 g | | | 0.05 g | >14 d |

It can be concluded that γ-cyclodextrin can further improve the solubility of the composition comprising GSG and SG.

What is claimed is:

1. A food product comprising a composition that comprises:
   (A) a glycosylated steviol glycoside (GSG) composition, wherein the GSG composition comprises at least 70% by weight GSGs and is derived from a first steviol glycoside (SG) composition comprising 20-99.5% rebaudioside A (RA) by weight; and
   (B) a second SG composition comprising 20-99.5% RA by weight,
   wherein the weight ratio of A:B is in the range of 1:6 to 3.5:1 and wherein the composition has a measured sucrose equivalent that is greater than the calculated sucrose equivalence of the composition.

2. The food product of claim 1, wherein the composition comprises less than 70% GSG by weight.

3. The food product of claim 1, wherein the composition is present in the food product at a concentration of 50-2000 ppm.

4. The food product of claim 1, wherein the composition is present in the food product at a final concentration of 100 ppm or less.

5. The food product of claim 1, wherein the composition is used as a sweetener.

6. The food product of claim 1, wherein the composition is used as a flavoring.

7. A beverage comprising a composition that comprises:
   (A) a GSG composition, wherein the GSG composition comprises at least 70% by weight GSGs and is derived from a SG composition comprising 20-99.5% RA by weight; and
   (B) a second SG composition comprising 20-99.5% RA by weight,
   wherein the weight ratio of A:B is in the range of 1:6 to 3.5:1 and wherein the composition has a measured sucrose equivalent that is greater than the calculated sucrose equivalence of the composition.

8. The beverage of claim 7, wherein the composition comprises less than 70% GSG by weight.

9. The beverage of claim 7, wherein the composition is present in the beverage at a concentration of 50-2000 ppm.

10. The beverage of claim 7, wherein the composition is present in the beverage at a final concentration of 100 ppm or less.

11. The beverage of claim 7, wherein the composition is used as a sweetener.

12. The beverage of claim 7, wherein the composition is used as a flavoring.

13. An orally consumable product comprising a composition that comprises:
   (A) a GSG composition, wherein the GSG composition comprises at least 70% by weight GSGs and is derived from a first SG composition comprising 20-99.5% RA by weight; and
   (B) a second SG composition comprising 20-99.5% RA by weight,
   wherein the weight ratio of A:B is in the range of 1:6 to 3.5:1 and wherein the composition has a measured sucrose equivalent that is greater than the calculated sucrose equivalence of the composition.

14. The orally consumable product of claim 13, wherein the orally consumable product is selected from the group consisting of food and food preparations, candies, confections, snacks, prescription and over-the-counter pharmaceuticals, and sweeteners.

15. The orally consumable product of claim 13, wherein the composition comprises less than 70% GSG by weight.

16. The orally consumable product of claim 13, wherein the composition is present in the orally consumable product at a concentration of 50-2000 ppm.

17. The orally consumable product of claim 13, wherein the composition is present in the orally consumable product at a final concentration of 100 ppm or less.

18. The orally consumable product of claim 13, wherein the composition is used as a sweetener.

19. The orally consumable product of claim 13, wherein the composition is used as a flavoring.

* * * * *